US010702903B2

(12) United States Patent
Costa

(10) Patent No.: US 10,702,903 B2
(45) Date of Patent: Jul. 7, 2020

(54) METHOD AND APPARATUS FOR ENCODING DATA ON A WORK PIECE

(71) Applicant: Larry J. Costa, Mooresville, NC (US)

(72) Inventor: Larry J. Costa, Mooresville, NC (US)

( * ) Notice: Subject to any disclaimer, the term of this patent is extended or adjusted under 35 U.S.C. 154(b) by 0 days.

(21) Appl. No.: 16/442,853

(22) Filed: Jun. 17, 2019

(65) Prior Publication Data

US 2019/0351470 A1 Nov. 21, 2019

Related U.S. Application Data

(62) Division of application No. 14/875,284, filed on Oct. 5, 2015, now Pat. No. 10,335,842.

(Continued)

(51) Int. Cl.
*B21C 51/00* (2006.01)
*G05B 19/401* (2006.01)

(Continued)

(52) U.S. Cl.
CPC ............ *B21C 51/005* (2013.01); *G03B 11/06* (2013.01); *G03B 17/561* (2013.01); *G05B 19/00* (2013.01);

(Continued)

(58) Field of Classification Search
CPC ........ G05B 19/402; G05B 2219/36053; G05B 2219/37555; G05B 2219/45041; G05B 19/406; G05B 2219/37359; G05B 2219/42307; G05B 2219/45222; G03B 11/04; B44B 2700/02; B44B 3/00; B44B 3/002; B44B 3/005

(Continued)

(56) References Cited

U.S. PATENT DOCUMENTS 3,122,376 A 2/1964 Atherholt
3,163,936 A * 1/1965 Zuse ....................... B44B 3/061 33/18.1

(Continued)

FOREIGN PATENT DOCUMENTS

EP 0296723 12/1988
EP 2296102 3/2011

(Continued)

OTHER PUBLICATIONS

Notification of Transmittal of the International Search Report and the Written Opinion of the International Searching Authority, or the Declaration, issued by the Korean Intellectual Property Office for PCT/US2015/054036 dated Dec. 7, 2015, 12 pages.

(Continued)

*Primary Examiner* — Yaritza Guadalupe-McCall
(74) *Attorney, Agent, or Firm* — Perkins Coie LLP

(57) ABSTRACT

A method and apparatus for encoding data on a work piece. The method includes engraving a plurality of first features (e.g., circular features) on the work piece, wherein the plurality of first features are arranged in a first pattern. The method also includes engraving a plurality of second features (e.g., rings) on the work piece within a selected one of the plurality of first features. The plurality of second features are arranged in a second pattern according to a data encoding schema such as binary code or code 39.

15 Claims, 161 Drawing Sheets

Related U.S. Application Data

(60) Provisional application No. 62/059,692, filed on Oct. 3, 2014.

(51) Int. Cl.

| | |
|---|---|
| *G03B 11/06* | (2006.01) |
| *G03B 17/56* | (2006.01) |
| *G06K 7/10* | (2006.01) |
| *G05B 19/18* | (2006.01) |
| *G05B 19/00* | (2006.01) |

(52) U.S. Cl.

CPC ......... *G05B 19/182* (2013.01); *G05B 19/401* (2013.01); *G06K 7/10564* (2013.01); *G06K 7/10881* (2013.01); *G05B 2219/37555* (2013.01); *G05B 2219/45212* (2013.01); *G05B 2219/50042* (2013.01)

(58) Field of Classification Search

USPC .......................................................... 33/18.1

See application file for complete search history.

(56) References Cited

U.S. PATENT DOCUMENTS

| | | | | |
|---|---|---|---|---|
| 3,915,061 | A * | 10/1975 | Stockman | B44B 3/00 409/84 |
| 4,254,552 | A * | 3/1981 | Samis | B41C 1/02 318/568.1 |
| 4,317,287 | A | 3/1982 | Sauslele | |
| 4,687,390 | A | 8/1987 | Samis | |
| 4,752,166 | A | 6/1988 | Lehmkuhl | |
| 4,834,595 | A | 5/1989 | Cacciotti | |
| 5,339,188 | A | 8/1994 | Fritzel | |
| 5,731,881 | A | 3/1998 | Beuchler | |
| 5,775,215 | A | 7/1998 | Hirate | |
| 6,032,861 | A * | 3/2000 | Lemelson | G06K 7/14 235/456 |
| 6,059,702 | A | 5/2000 | Winkler | |
| 6,095,723 | A * | 8/2000 | Reynolds | B23B 51/00 407/54 |
| 6,099,177 | A | 8/2000 | Ito | |
| 6,172,328 | B1 * | 1/2001 | Jones | A24C 1/42 219/121.68 |
| 6,322,296 | B1 * | 11/2001 | Wetli | B23C 3/30 407/42 |
| 6,407,361 | B1 * | 6/2002 | Williams | B44C 1/228 219/121.69 |
| 6,478,232 | B1 * | 11/2002 | Dowling | G06K 19/06037 235/454 |
| 6,533,181 | B1 | 3/2003 | Roxby | |
| 6,663,008 | B1 * | 12/2003 | Pettersson | G06F 3/03545 235/494 |
| 6,681,055 | B1 * | 1/2004 | Sato | G06K 1/121 235/494 |
| 6,796,750 | B2 * | 9/2004 | Men | B23C 5/2221 407/102 |
| 6,802,128 | B1 | 10/2004 | Yang | |
| 7,093,368 | B1 | 8/2006 | Nelson | |
| 7,143,489 | B1 | 12/2006 | Giebmanns | |
| 7,191,529 | B2 | 3/2007 | Phipps | |
| 7,270,277 | B1 * | 9/2007 | Koziol | G06K 19/06037 235/494 |
| 7,423,734 | B1 | 9/2008 | Lulk | |
| 7,854,068 | B2 * | 12/2010 | Di Benedetto | B23Q 15/14 33/18.1 |
| 7,866,641 | B1 | 1/2011 | Switzer | |
| 8,021,085 | B1 * | 9/2011 | Nelson | B23C 5/10 407/54 |
| 8,096,736 | B2 | 1/2012 | Migliore | |
| 8,262,000 | B2 * | 9/2012 | Denniston, Jr. | G06K 7/10722 235/435 |
| 8,336,215 | B2 * | 12/2012 | Hoshiyama | B44B 3/02 33/18.1 |
| 8,539,683 | B2 * | 9/2013 | Kuno | B44B 3/063 101/3.1 |
| 8,953,034 | B1 | 2/2015 | Milosevic | |
| 9,573,181 | B2 | 2/2017 | Costa | |
| 9,931,681 | B2 * | 4/2018 | Costa | B21C 51/005 |
| 10,112,241 | B2 * | 10/2018 | Lee | B23C 5/207 |
| 10,335,842 | B2 * | 7/2019 | Costa | |
| 10,350,689 | B2 * | 7/2019 | Takahashi | |
| 2002/0002885 | A1 | 1/2002 | Lulk | |
| 2004/0022430 | A1 | 2/2004 | Franssen | |
| 2005/0079812 | A1 | 4/2005 | Bechtold | |
| 2006/0077471 | A1 * | 4/2006 | Wang | H04N 1/405 358/3.29 |
| 2006/0174531 | A1 * | 8/2006 | Lizotte | F41A 21/12 42/1.01 |
| 2007/0033816 | A1 * | 2/2007 | Zeng | B44B 3/009 33/18.1 |
| 2007/0128739 | A1 | 6/2007 | Wilson | |
| 2008/0061473 | A1 | 3/2008 | Laracey | |
| 2009/0263199 | A1 | 10/2009 | Wang | |
| 2009/0283199 | A1 | 10/2009 | Wang | |
| 2010/0028097 | A1 | 2/2010 | Luepke | |
| 2010/0051683 | A1 | 3/2010 | Kudo | |
| 2010/0054873 | A1 * | 3/2010 | Men | B23C 5/202 407/42 |
| 2010/0095534 | A1 * | 4/2010 | Saiz | B24B 23/005 30/272.1 |
| 2010/0096460 | A1 | 4/2010 | Carlson | |
| 2011/0297749 | A1 * | 12/2011 | Lezhnev | B05D 5/06 235/488 |
| 2011/0305535 | A1 * | 12/2011 | Jansson | B23C 5/06 407/103 |
| 2012/0010039 | A1 * | 1/2012 | Sappenfield | F16H 37/0806 475/331 |
| 2012/0010040 | A1 * | 1/2012 | Sappenfield | F16H 37/0806 475/331 |
| 2012/0121355 | A1 * | 5/2012 | Adamson | B27C 5/10 409/181 |
| 2012/0028097 | A1 | 12/2012 | Gneiting | |
| 2012/0321401 | A1 | 12/2012 | Johnson | |
| 2012/0325781 | A1 | 12/2012 | Gneiting | |
| 2014/0134932 | A1 | 5/2014 | Nusslein | |
| 2014/0178135 | A1 * | 6/2014 | Yamamoto | B23C 5/109 407/42 |
| 2014/0220865 | A1 * | 8/2014 | Glaser | B24B 41/066 451/28 |
| 2015/0073584 | A1 | 3/2015 | Goodale | |
| 2015/0094844 | A1 | 4/2015 | Kim | |
| 2015/0172520 | A1 | 6/2015 | Lindman | |
| 2016/0097967 | A1 | 4/2016 | Costa | |
| 2016/0219192 | A1 | 7/2016 | Rosenberry | |
| 2016/0243689 | A1 * | 8/2016 | Romagnoli | B25D 16/006 |
| 2016/0271668 | A1 * | 9/2016 | Costa | B21C 51/005 |
| 2018/0147642 | A1 * | 5/2018 | Takahashi | B23C 5/06 |

FOREIGN PATENT DOCUMENTS

| | | |
|---|---|---|
| JP | 2000153698 | 6/2000 |
| JP | 2002263976 | 9/2002 |
| JP | 2002347394 | 12/2002 |
| JP | 2008269219 | 11/2008 |
| JP | 2009196003 | 9/2009 |

OTHER PUBLICATIONS

Notification of Transmittal of the International Search Report and the Written Opinion of the International Searching Authority, or the Declaration, issued by the Korean Intellectual Property Office for PCT/US2015/054041 dated Dec. 23, 2015, 11 pages.

Notification of Transmittal of the International Search Report and the Written Opinion of the International Searching Authority, or the Declaration, issued by the Korean Intellectual Property Office for PCT/US2015/054044 dated Jan. 18, 2016, 14 pages.

Notification of Transmittal of the International Search Report and Written Opinion of the International Searching Authority, or the

(56) References Cited

OTHER PUBLICATIONS

Declaration, issued by the Korean Intellectual Property Office for PCT/US2017/026460 dated Aug. 11, 2017, 9 pages.
Wordupmag. "3-axis Synchronous Belt Drive Carbon Fiber Camera Mount with GS-9257MG Servos" YourTube (https//www.youtub.com/watch?v=jCeMGGZ17Pk>).

* cited by examiner

CONTINUED ON FIG.1B

20-Bit Land Pattern for the Round Hole Land Encoding via the Concentric Ring Patterns for the Encoded

| Total Encoded Data Patterns | Encoded Land Location in the | | Inner Periphery | | | | | | | |
|---|---|---|---|---|---|---|---|---|---|---|
| 262,144 | Stylus's Encoding Land Pattern > | | 19 | 18 | 17 | 16 | 15 | 14 | 13 | 12 |
| Encoded Land Data Pattern Reference Number | Total Number of Encoded Lands in the Encoding Land Pattern | Encoded Land's Decimal Value of the Lands' Binary Positions | Encoded Data "End Bracket Frame" Validation Reference | 131072 | 65536 | 32768 | 16384 | 8192 | 4096 | 2048 |
| 1 | 0 | - | 1 | 0 | 0 | 0 | 0 | 0 | 0 | 0 |
| 2 | 1 | 1 | 1 | 0 | 0 | 0 | 0 | 0 | 0 | 0 |
| 3 | 1 | 2 | 1 | 0 | 0 | 0 | 0 | 0 | 0 | 0 |
| 4 | 2 | 3 | 1 | 0 | 0 | 0 | 0 | 0 | 0 | 0 |
| 5 | 1 | 4 | 1 | 0 | 0 | 0 | 0 | 0 | 0 | 0 |
| 6 | 2 | 5 | 1 | 0 | 0 | 0 | 0 | 0 | 0 | 0 |
| 7 | 2 | 6 | 1 | 0 | 0 | 0 | 0 | 0 | 0 | 0 |
| 8 | 3 | 7 | 1 | 0 | 0 | 0 | 0 | 0 | 0 | 0 |
| 9 | 1 | 8 | 1 | 0 | 0 | 0 | 0 | 0 | 0 | 0 |

CONTINUED FROM FIG.1A

Land's Position representing Binary and Decimal Values

| Encoded Land's Encoded Data Location and Binary Value | | | | | | | | | | | Outer Periphery |
|---|---|---|---|---|---|---|---|---|---|---|---|
| 11 | 10 | 9 | 8 | 7 | 6 | 5 | 4 | 3 | 2 | 1 | 0 |
| 1024 | 512 | 256 | 128 | 64 | 32 | 16 | 8 | 4 | 2 | 1 | Encoded Data "End Bracket Frame" Validation Reference |
| 0 | 0 | 0 | 0 | 0 | 0 | 0 | 0 | 0 | 0 | 0 | 1 |
| 0 | 0 | 0 | 0 | 0 | 0 | 0 | 0 | 0 | 0 | 1 | 1 |
| 0 | 0 | 0 | 0 | 0 | 0 | 0 | 0 | 0 | 1 | 0 | 1 |
| 0 | 0 | 0 | 0 | 0 | 0 | 0 | 0 | 0 | 1 | 1 | 1 |
| 0 | 0 | 0 | 0 | 0 | 0 | 0 | 0 | 1 | 0 | 0 | 1 |
| 0 | 0 | 0 | 0 | 0 | 0 | 0 | 0 | 1 | 0 | 1 | 1 |
| 0 | 0 | 0 | 0 | 0 | 0 | 0 | 0 | 1 | 1 | 0 | 1 |
| 0 | 0 | 0 | 0 | 0 | 0 | 0 | 0 | 1 | 1 | 1 | 1 |
| 0 | 0 | 0 | 0 | 0 | 0 | 0 | 1 | 0 | 0 | 0 | 1 |

CONTINUED FROM FIG.1A

| | | | | | | | | | | |
|---|---|---|---|---|---|---|---|---|---|---|
| 10 | 2 | 9 | 1 | 0 | 0 | 0 | 0 | 0 | 0 | 0 |
| 11 | 2 | 10 | 1 | 0 | 0 | 0 | 0 | 0 | 0 | 0 |
| 12 | 3 | 11 | 1 | 0 | 0 | 0 | 0 | 0 | 0 | 0 |
| 13 | 2 | 12 | 1 | 0 | 0 | 0 | 0 | 0 | 0 | 0 |
| 14 | 3 | 13 | 1 | 0 | 0 | 0 | 0 | 0 | 0 | 0 |
| 15 | 3 | 14 | 1 | 0 | 0 | 0 | 0 | 0 | 0 | 0 |
| 262,130 | 15 | 262,129 | 1 | 1 | 1 | 1 | 1 | 1 | 1 | 1 |
| 262,131 | 15 | 262,130 | 1 | 1 | 1 | 1 | 1 | 1 | 1 | 1 |
| 262,132 | 16 | 262,131 | 1 | 1 | 1 | 1 | 1 | 1 | 1 | 1 |
| 262,133 | 15 | 262,132 | 1 | 1 | 1 | 1 | 1 | 1 | 1 | 1 |
| 262,134 | 16 | 262,133 | 1 | 1 | 1 | 1 | 1 | 1 | 1 | 1 |
| 262,135 | 16 | 262,134 | 1 | 1 | 1 | 1 | 1 | 1 | 1 | 1 |
| 262,136 | 17 | 262,135 | 1 | 1 | 1 | 1 | 1 | 1 | 1 | 1 |
| 262,137 | 15 | 262,136 | 1 | 1 | 1 | 1 | 1 | 1 | 1 | 1 |
| 262,138 | 16 | 262,137 | 1 | 1 | 1 | 1 | 1 | 1 | 1 | 1 |
| 262,139 | 16 | 262,138 | 1 | 1 | 1 | 1 | 1 | 1 | 1 | 1 |

CONTINUED FROM FIG.1B

| | | | | | | | | | | | |
|---|---|---|---|---|---|---|---|---|---|---|---|
| 0 | 0 | 0 | 0 | 0 | 0 | 0 | 1 | 0 | 0 | 1 | 1 |
| 0 | 0 | 0 | 0 | 0 | 0 | 0 | 1 | 0 | 1 | 0 | 1 |
| 0 | 0 | 0 | 0 | 0 | 0 | 0 | 1 | 0 | 1 | 1 | 1 |
| 0 | 0 | 0 | 0 | 0 | 0 | 0 | 1 | 1 | 0 | 0 | 1 |
| 0 | 0 | 0 | 0 | 0 | 0 | 0 | 1 | 1 | 0 | 1 | 1 |
| 0 | 0 | 0 | 0 | 0 | 0 | 0 | 1 | 1 | 1 | 0 | 1 |
| 1 | 1 | 1 | 1 | 1 | 1 | 1 | 0 | 0 | 0 | 1 | 1 |
| 1 | 1 | 1 | 1 | 1 | 1 | 1 | 0 | 0 | 1 | 0 | 1 |
| 1 | 1 | 1 | 1 | 1 | 1 | 1 | 0 | 0 | 1 | 1 | 1 |
| 1 | 1 | 1 | 1 | 1 | 1 | 1 | 0 | 1 | 0 | 0 | 1 |
| 1 | 1 | 1 | 1 | 1 | 1 | 1 | 0 | 1 | 0 | 1 | 1 |
| 1 | 1 | 1 | 1 | 1 | 1 | 1 | 0 | 1 | 1 | 0 | 1 |
| 1 | 1 | 1 | 1 | 1 | 1 | 1 | 0 | 1 | 1 | 1 | 1 |
| 1 | 1 | 1 | 1 | 1 | 1 | 1 | 1 | 0 | 0 | 0 | 1 |
| 1 | 1 | 1 | 1 | 1 | 1 | 1 | 1 | 0 | 0 | 1 | 1 |
| 1 | 1 | 1 | 1 | 1 | 1 | 1 | 1 | 0 | 1 | 0 | 1 |

CONTINUED FROM FIG.1C

CONTINUED FROM FIG.1C

| | | | | | | | | | | |
|---|---|---|---|---|---|---|---|---|---|---|
| 262,140 | 17 | 262,139 | 1 | 1 | 1 | 1 | 1 | 1 | 1 | 1 |
| 262,141 | 16 | 262,140 | 1 | 1 | 1 | 1 | 1 | 1 | 1 | 1 |
| 262,142 | 17 | 262,141 | 1 | 1 | 1 | 1 | 1 | 1 | 1 | 1 |
| 262,143 | 17 | 262,142 | 1 | 1 | 1 | 1 | 1 | 1 | 1 | 1 |
| 262,144 | 18 | 262,143 | 1 | 1 | 1 | 1 | 1 | 1 | 1 | 1 |

| | |
|---|---|
| Total Encoding Lands | 20 |
| Data Validation End Reference Lands | -2 |
| Data Encoding Lands | 18 |
| Data Encoding Land Combinations | 262,144 |
| Styluses for the 5 Stylus MOSET | 5 |
| | 1.23794E+27 = |
| Styluses for the 15 Stylus MOSET | 15 |
| | 1.89714E+81 = |

CONTINUED FROM FIG.1D

| | | | | | | | | | | | |
|---|---|---|---|---|---|---|---|---|---|---|---|
| 1 | 1 | 1 | 1 | 1 | 1 | 1 | 1 | 0 | 1 | 1 | 1 |
| 1 | 1 | 1 | 1 | 1 | 1 | 1 | 1 | 1 | 0 | 0 | 1 |
| 1 | 1 | 1 | 1 | 1 | 1 | 1 | 1 | 1 | 0 | 1 | 1 |
| 1 | 1 | 1 | 1 | 1 | 1 | 1 | 1 | 1 | 1 | 0 | 1 |
| 1 | 1 | 1 | 1 | 1 | 1 | 1 | 1 | 1 | 1 | 1 | 1 |

Total Unique Combinations for the 5 Stylus MOSET Engraving Tool = Location of the Encoded Stylus ^ Encoded Land's Value 1,237,940,039,285,380,000,000,000,000

Total Unique Combinations for the 15 Stylus MOSET Engraving Tool = Location of the Encoded Stylus ^ Encoded Land's Value 1,897,137,590,064,190,000,000,000,000,000,000,000,000,000,000,000,000,000,000,000,000,000,000,000,000,000,000,000,000,000,00

FIG.1F

CONTINUED FROM FIG.1E

3X5 MSOET'S 5 ROUND HOLES OF THE CHARACTER "1"
HAVING 20 ENCODED LANDS HAVING THE 2 END LANDS' BRACKETING THE CENTER 18 LANDS'
WITH EACH OF THE ROUND ENGRAVED HOLES HAVING AN 18 BIT EQUIVALENT DATA VALUE

DETAIL A

DETAIL
SCALE 32:1

3X5 MSOET'S 13 ROUND HOLES OF THE CHARACTER "8"
HAVING 20 ENCODED LANDS HAVING THE 2 END LANDS' BRACKETING THE CENTER 18 LANDS'
WITH EACH OF THE ROUND ENGRAVED HOLES HAVING AN 18 BIT EQUIVALENT DATA VALUE

PART-77 .262129 VALUE OF THE ENCODED LAND FOR THE Ø0.8 SINGLE FLUTE STYLUS

PART-77 .262130 VALUE OF THE ENCODED LAND FOR THE Ø0.8 SINGLE FLUTE STYLUS

PART-77 .262131 VALUE OF THE ENCODED LAND FOR THE Ø0.8 SINGLE FLUTE STYLUS

PART-77 .262132 VALUE OF THE ENCODED LAND FOR THE Ø0.8 SINGLE FLUTE STYLUS

PART-77 .282133 VALUE OF THE ENCODED LAND FOR THE Ø0.8 SINGLE FLUTE STYLUS

PART-77 .282134 VALUE OF THE ENCODED LAND FOR THE Ø0.8 SINGLE FLUTE STYLUS

PART-77.262136 VALUE OF THE ENCODED LAND FOR THE Ø0.8 SINGLE FLUTE STYLUS

PART-77.282136 VALUE OF THE ENCODED LAND FOR THE Ø0.8 SINGLE FLUTE STYLUS

PART-77 .282137 VALUE OF THE ENCODED LAND FOR THE Ø0.8 SINGLE FLUTE STYLUS

PART-77.262138 VALUE OF THE ENCODED LAND FOR THE Ø0.8 SINGLE FLUTE STYLUS

PART-77 .282139 VALUE OF THE ENCODED LAND FOR THE Ø0.8 SINGLE FLUTE STYLUS

PART-77 .262140 VALUE OF THE ENCODED LAND FOR THE Ø0.8 SINGLE FLUTE STYLUS

PART-77.262142 VALUE OF THE ENCODED LAND FOR THE Ø0.8 SINGLE FLUTE STYLUS

PART-77.262143 VALUE OF THE ENCODED LAND FOR THE Ø0.8 SINGLE FLUTE STYLUS

CODE 39 Encodation Patterns for 44 alphabetic, numeric, and graphic characters

| Symbol Cell # | | 1 | | | | 2 | | | | 3 | | | | 4 | | | | 5 | | | | 6 | | | | |
|---|---|---|---|---|---|---|---|---|---|---|---|---|---|---|---|---|---|---|---|---|---|---|---|---|---|---|
| | | OUTER Land Ring # | | | | | | | | | | | | | | | | | | | | | | | INNER Land Ring # | Total Rings |
| Character # | Character | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | |
| 1 | 1 | 1 | 2 | 3 | 4 | | | 7 | 8 | | | | | 13 | 14 | | | 17 | 18 | | | 21 | 22 | 23 | 24 | 14 |
| 2 | 2 | 1 | 2 | | | 5 | 6 | 7 | 8 | | | | | 13 | 14 | | | 17 | 18 | | | 21 | 22 | 23 | 24 | 14 |
| 3 | 3 | 1 | 2 | 3 | 4 | | | 7 | 8 | 9 | 10 | | | | | 15 | 16 | | | 19 | 20 | | | 23 | 24 | 14 |
| 4 | 4 | 1 | 2 | | | 5 | 6 | | | | | 11 | 12 | 13 | 14 | | | 17 | 18 | | | 21 | 22 | 23 | 24 | 14 |
| 5 | 5 | 1 | 2 | 3 | 4 | | | 7 | 8 | | | | | 13 | 14 | 15 | 16 | | | 19 | 20 | | | 23 | 24 | 14 |
| 6 | 6 | 1 | 2 | | | 5 | 6 | 7 | 8 | | | | | 13 | 14 | 15 | 16 | | | 19 | 20 | | | 23 | 24 | 14 |
| 7 | 7 | 1 | 2 | | | 5 | 6 | | | | | 11 | 12 | | | 15 | 16 | 17 | 18 | | | 21 | 22 | 23 | 24 | 14 |

CONTINUED FROM FIG.19A

CONTINUED FROM FIG.19B

CONTINUED FROM FIG.19C

CONTINUED FROM FIG.19D

CONTINUED FROM FIG.19E

Notes:

a. The CODE 39 Symbol Data set starts and stops using the asterisk character " * ".

b. The FULL ASCII featue of CODE 39 uses the 4 symbols $ / + or % preceeding the 26 alphabetic symbols for the all of the 128 ASCII characters.

3X5 MSOET'S 13 ROUND HOLES OF THE CHARACTER "8"
USING 15 CODE 39 ENCODED LAND STYLUSES HAVING 3 CHARACTER STRINGS BEING ONE FOR EACH OF THE "LONG PATHS" OF ROUND ENGRAVED HOLES CONSISTING OF THE * C 3 9 * , * A – Z * , AND * . SPACE % * CHARACTER STRING COLUMNS

3X5 MSOET'S 5 ROUND HOLES OF THE CHARACTER "1"
USING 15 CODE 39 ENCODED LAND STYLUSES HAVING 3 CHARACTER STRINGS BEING ONE FOR EACH OF THE "LONG PATHS" OF ROUND ENGRAVED HOLES CONSISTING OF THE * C 3 9 * , * A – Z * , AND * . SPACE % * CHARACTER STRING COLUMNS

1X5 MSOET'S 5 ROUND HOLES OF THE BINARY = 31
USING 5 CODE 39 ENCODED LAND STYLUSES HAVING A CHARACTER STRING BEING THE "LONG PATH" OF ROUND ENGRAVED HOLES CONSISTING OF THE * A – Z * CHARACTER STRING COLUMN

PART-77 CODE 39 . "1" CHARACTER ENCODED LAND FOR THE Ø0.8 SINGLE FLUTE STYLUS

PART-77.CODE 38 . "Z" CHARACTER ENCODED LAND FOR THE Ø0.8 SINGLE FLUTE STYLUS

PART-77.CODE 39 . "3" CHARACTER ENCODED LAND FOR THE Ø0.8 SINGLE FLUTE STYLUS

PART-77.CODE 39 . "4" CHARACTER ENCODED LAND FOR THE Ø0.8 SINGLE FLUTE STYLUS

PART-77.CODE 39. "5" CHARACTER ENCODED LAND FOR THE Ø0.8 SINGLE FLUTE STYLUS

PART-77.CODE 39 . "8" CHARACTER ENCODED LAND FOR THE Ø0.8 SINGLE FLUTE STYLUS

PART-77.CODE 39 . "7" CHARACTER ENCODED LAND FOR THE Ø0.8 SINGLE FLUTE STYLUS

PART-77.CODE 38 . "8" CHARACTER ENCODED LAND FOR THE Ø0.8 SINGLE FLUTE STYLUS

PART-77.CODE 39 . "9" CHARACTER ENCODED LAND FOR THE Ø0.8 SINGLE FLUTE STYLUS

PART-77.CODE 39 . "0" CHARACTER ENCODED LAND FOR THE Ø0.8 SINGLE FLUTE STYLUS

PART-77.CODE 39 . "A" CHARACTER ENCODED LAND FOR THE Ø0.8 SINGLE FLUTE STYLUS

PART-77.CODE 39 . "B" CHARACTER ENCODED LAND FOR THE Ø0.8 SINGLE FLUTE STYLUS

PART-77.CODE 39 . "C" CHARACTER ENCODED LAND FOR THE Ø0.8 SINGLE FLUTE STYLUS

PART-77.CODE 39 . "D" CHARACTER ENCODED LAND FOR THE Ø0.8 SINGLE FLUTE STYLUS

PART-77.CODE 39 . "E" CHARACTER ENCODED LAND FOR THE Ø0.8 SINGLE FLUTE STYLUS

PART-77.CODE 39 . "F" CHARACTER ENCODED LAND FOR THE Ø0.8 SINGLE FLUTE STYLUS

PART-77.CODE 39 . "G" CHARACTER ENCODED LAND FOR THE Ø0.8 SINGLE FLUTE STYLUS

PART-77.CODE 39 . "H" CHARACTER ENCODED LAND FOR THE Ø0.8 SINGLE FLUTE STYLUS

PART-77.CODE 39 . "1" CHARACTER ENCODED LAND FOR THE Ø0.8 SINGLE FLUTE STYLUS

PART-77.CODE 39 , "J" CHARACTER ENCODED LAND FOR THE Ø0.9 SINGLE FLUTE STYLUS

PART-77.CODE 39 . "L" CHARACTER ENCODED LAND FOR THE Ø0.8 SINGLE FLUTE STYLUS

PART-77.CODE 39 . "M" CHARACTER ENCODED LAND FOR THE Ø0.8 SINGLE FLUTE STYLUS

PART-77.CODE 39 . "N" CHARACTER ENCODED LAND FOR THE Ø0.8 SINGLE FLUTE STYLUS

PART-77.CODE 39 . "O" CHARACTER ENCODED LAND FOR THE Ø0.8 SINGLE FLUTE STYLUS

PART-77.CODE 39 . "P" CHARACTER ENCODED LAND FOR THE Ø0.8 SINGLE FLUTE STYLUS

PART-77.CODE 39 . "Q" CHARACTER ENCODED LAND FOR THE Ø0.8 SINGLE FLUTE STYLUS

PART-77.CODE 39 . "R" CHARACTER ENCODED LAND FOR THE Ø0.8 SINGLE FLUTE STYLUS

PART-77.CODE 39 . "S" CHARACTER ENCODED LAND FOR THE Ø0.8 SINGLE FLUTE STYLUS

PART-77,CODE 39 , "T" CHARACTER ENCODED LAND FOR THE Ø0.8 SINGLE FLUTE STYLUS

PART-77, CODE 39 . "U" CHARACTER ENCODED LAND FOR THE Ø0.8 SINGLE FLUTE STYLUS

PART-77.CODE 39 . "V" CHARACTER ENCODED LAND FOR THE Ø0.8 SINGLE FLUTE STYLUS

PART-77.CODE 39 . "W" CHARACTER ENCODED LAND FOR THE Ø0.8 SINGLE FLUTE STYLUS

PART-77.CODE 39 . "X" CHARACTER ENCODED LAND FOR THE Ø0.8 SINGLE FLUTE STYLUS

PART-77.CODE 39 . "Y" CHARACTER ENCODED LAND FOR THE Ø0.8 SINGLE FLUTE STYLUS

PART-77.CODE 39 , "Z" CHARACTER ENCODED LAND FOR THE Ø0.8 SINGLE FLUTE STYLUS

PART-77.CODE 39 , "-" MINUS CHARACTER ENCODED LAND FOR THE Ø0.8 SINGLE FLUTE STYLUS

PART-77.CODE 38 " . " PERIOD CHARACTER ENCODED LAND FOR THE Ø0.8 SINGLE FLUTE STYLUS

PART-77.CODE 39 . " " SPACE CHARACTER ENCODED LAND FOR THE Ø0.8 SINGLE FLUTE STYLUS

PART-77 CODE 39 . "$" US DOLLAR CHARACTER ENCODED LAND FOR THE Ø0.8 SINGLE FLUTE STYLUS

PART-77.CODE 39 . "/" DIVIDE CHARACTER ENCODED LAND FOR THE Ø0.8 SINGLE FLUTE STYLUS

PART-77.CODE 39 . "+" PLUS CHARACTER ENCODED LAND FOR THE Ø0.8 SINGLE FLUTE STYLUS

PART-77.CODE 39 , "%" PERCENT CHARACTER ENCODED LAND FOR THE Ø0.8 SINGLE FLUTE STYLUS

CONTINUED ON FIG.67B

9-Bit Land Pattern for the Round Hole Land Encoding via the Concentric Ring Patterns for the Encoded Land's Position representing Binary and Decimal Values

| Total Encoded Data Patterns | Encoded Land Location in the | | Inner Periphery | Encoded Land's Encoded | | |
|---|---|---|---|---|---|---|
| 128 | Stylus's Encoding Land Pattern > | | 8 | 7 | 6 | 5 |
| Encoded Land Data Pattern Reference Number | Total Number of Encoded Lands in the Encoding Land Pattern | Encoded Land's Decimal Value of the Lands' Binary Positions | Encoded Data "End Bracket Frame" Validation Reference | 64 | 32 | 16 |
| 1 | 0 | - | 1 | 0 | 0 | 0 |
| 2 | 1 | 1 | 1 | 0 | 0 | 0 |
| 3 | 1 | 2 | 1 | 0 | 0 | 0 |
| 4 | 2 | 3 | 1 | 0 | 0 | 0 |
| 5 | 1 | 4 | 1 | 0 | 0 | 0 |
| 6 | 2 | 5 | 1 | 0 | 0 | 0 |
| 7 | 2 | 6 | 1 | 0 | 0 | 0 |
| 8 | 3 | 7 | 1 | 0 | 0 | 0 |
| 107 | 4 | 106 | 1 | 1 | 1 | 0 |

CONTINUED FROM FIG.67A

| Data Location and Binary Value | | | | Outer Periphery |
|---|---|---|---|---|
| 4 | 3 | 2 | 1 | 0 |
| 8 | 4 | 2 | 1 | Encoded Data "End Bracket Frame" Validation Reference |
| 0 | 0 | 0 | 0 | 1 |
| 0 | 0 | 0 | 1 | 1 |
| 0 | 0 | 1 | 0 | 1 |
| 0 | 0 | 1 | 1 | 1 |
| 0 | 1 | 0 | 0 | 1 |
| 0 | 1 | 0 | 1 | 1 |
| 0 | 1 | 1 | 0 | 1 |
| 0 | 1 | 1 | 1 | 1 |
| 1 | 0 | 1 | 0 | 1 |

CONTINUED FROM FIG.67A

CONTINUED ON FIG.67D

| | | | | | | |
|---|---|---|---|---|---|---|
| 108 | 5 | 107 | 1 | 1 | 1 | 0 |
| 109 | 4 | 108 | 1 | 1 | 1 | 0 |
| 110 | 5 | 109 | 1 | 1 | 1 | 0 |
| 111 | 5 | 110 | 1 | 1 | 1 | 0 |
| 112 | 6 | 111 | 1 | 1 | 1 | 0 |
| 113 | 3 | 112 | 1 | 1 | 1 | 1 |
| 114 | 4 | 113 | 1 | 1 | 1 | 1 |
| 115 | 4 | 114 | 1 | 1 | 1 | 1 |
| 116 | 5 | 115 | 1 | 1 | 1 | 1 |
| 117 | 4 | 116 | 1 | 1 | 1 | 1 |
| 118 | 5 | 117 | 1 | 1 | 1 | 1 |
| 119 | 5 | 118 | 1 | 1 | 1 | 1 |
| 120 | 6 | 119 | 1 | 1 | 1 | 1 |
| 121 | 4 | 120 | 1 | 1 | 1 | 1 |
| 122 | 5 | 121 | 1 | 1 | 1 | 1 |

CONTINUED FROM FIG.67B

CONTINUED FROM FIG.67C

| | | | | |
|---|---|---|---|---|
| 1 | 0 | 1 | 1 | 1 |
| 1 | 1 | 0 | 0 | 1 |
| 1 | 1 | 0 | 1 | 1 |
| 1 | 1 | 1 | 0 | 1 |
| 1 | 1 | 1 | 1 | 1 |
| 0 | 0 | 0 | 0 | 1 |
| 0 | 0 | 0 | 1 | 1 |
| 0 | 0 | 1 | 0 | 1 |
| 0 | 0 | 1 | 1 | 1 |
| 0 | 1 | 0 | 0 | 1 |
| 0 | 1 | 0 | 1 | 1 |
| 0 | 1 | 1 | 0 | 1 |
| 0 | 1 | 1 | 1 | 1 |
| 1 | 0 | 0 | 0 | 1 |
| 1 | 0 | 0 | 1 | 1 |

CONTINUED FROM FIG.67C

| | | | | | | |
|---|---|---|---|---|---|---|
| 123 | 5 | 122 | 1 | 1 | 1 | 1 |
| 124 | 6 | 123 | 1 | 1 | 1 | 1 |
| 125 | 5 | 124 | 1 | 1 | 1 | 1 |
| 126 | 6 | 125 | 1 | 1 | 1 | 1 |
| 127 | 6 | 126 | 1 | 1 | 1 | 1 |
| 128 | 7 | 127 | 1 | 1 | 1 | 1 |

CONTINUED FROM FIG.67D

| | | | | |
|---|---|---|---|---|
| 1 | 0 | 1 | 0 | 1 |
| 1 | 0 | 1 | 1 | 1 |
| 1 | 1 | 0 | 0 | 1 |
| 1 | 1 | 0 | 1 | 1 |
| 1 | 1 | 1 | 0 | 1 |
| 1 | 1 | 1 | 1 | 1 |

FIG.67F

CONTINUED FROM FIG.67E

CONTINUED ON FIG.68B

CONTINUED FROM FIG.68A

CONTINUED FROM FIG.68A

Part 77X0.2X9 Encoded Value = 127

Data Encoded Lands ϕ 0.8mm 2 Flute 0.2 Orbiting Drill Point to Stylus Shaft Axial Offset
for the Selectable Character Multiple Stylus Orbital Engraving Tool
having a Standard Straight 2 Flute Drill Point Geometry CONTINUED FROM FIG.68B
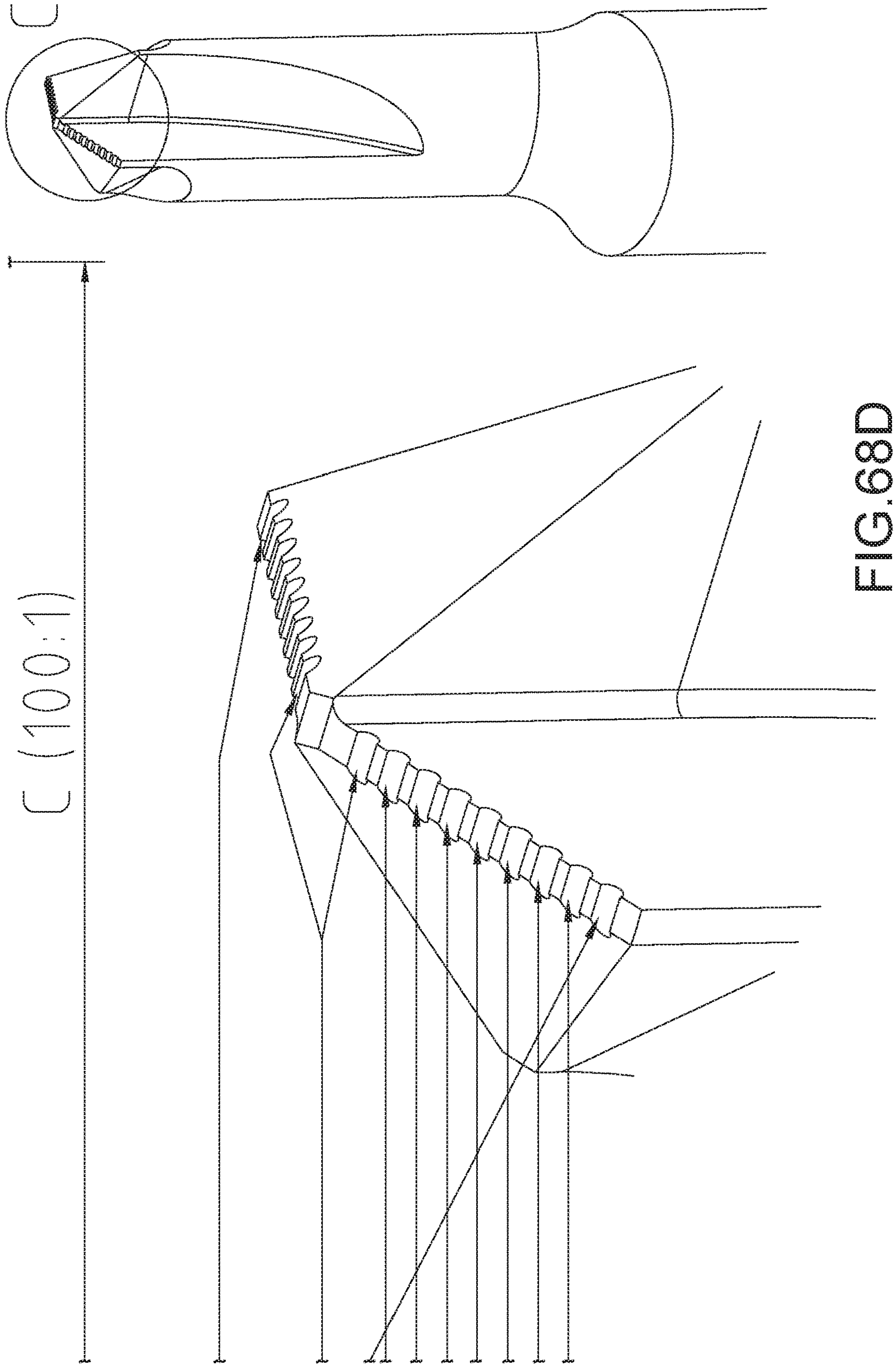
FIG.68D
CONTINUED FROM FIG.68C

CONTINUED ON FIG.69B

CONTINUED FROM FIG.69A

CONTINUED ON FIG.69D

CONTINUED FROM FIG.69A

Part 277X9 Encoded Value = 127

Data Encoded Lands ϕ 0.8mm 2 Flute Straight Drill having a Standard Straight 2 Flute Drill Point Geometry CONTINUED FROM FIG.69B
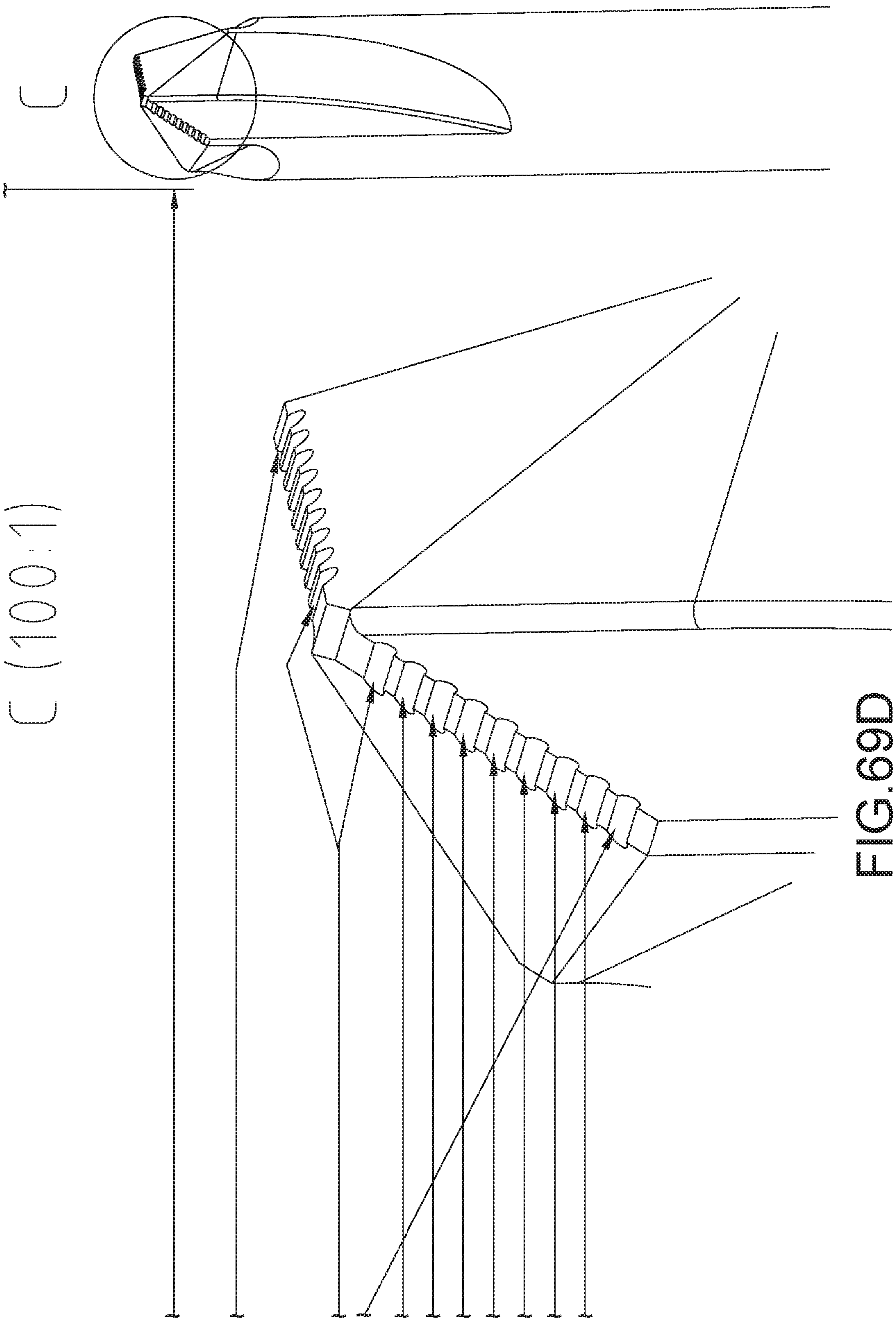
FIG.69D
CONTINUED FROM FIG.69C

CONTINUED ON FIG.71B

Drill Hole Identification Table for the 52-Bit Encoded Land's Binary and Decimal Values

| Total Encoded Data Patterns | Encoded Land Location in the Stylus's Encoding | | Inner Periphery | | | | |
|---|---|---|---|---|---|---|---|
| 1,125,899,906,842,620 | | Land Pattern > | 51 | 50 | 49 | 48 | 47 |
| Encoded Land Data Pattern Reference Number | Exponential Number of Encoded Lands in the Encoding Land Pattern | Encoded Land's Decimal Value of the Lands' Binary Positions | Encoded Data "End Bracket Frame" Validation Reference | 5.6295E+14 | 2.8147E+14 | 1.4074E+14 | 7.0369E+13 |
| 1 | 0 | - | 1 | 0 | 0 | 0 | 0 |
| 3 | 1 | 2 | 1 | 0 | 0 | 0 | 0 |
| 5 | 2 | 4 | 1 | 0 | 0 | 0 | 0 |
| 9 | 3 | 8 | 1 | 0 | 0 | 0 | 0 |
| 17 | 4 | 16 | 1 | 0 | 0 | 0 | 0 |
| 33 | 5 | 32 | 1 | 0 | 0 | 0 | 0 |
| 65 | 6 | 64 | 1 | 0 | 0 | 0 | 0 |
| 129 | 7 | 128 | 1 | 0 | 0 | 0 | 0 |
| 257 | 8 | 256 | 1 | 0 | 0 | 0 | 0 |
| 513 | 9 | 512 | 1 | 0 | 0 | 0 | 0 |
| 1,025 | 10 | 1,024 | 1 | 0 | 0 | 0 | 0 |
| 2,049 | 11 | 2,048 | 1 | 0 | 0 | 0 | 0 |

CONTINUED FROM FIG.71A

| 46 | 45 | 44 | 43 | 42 | 41 | 40 | 39 | 38 | 37 | 36 |
|---|---|---|---|---|---|---|---|---|---|---|
| 3.5184E+13 | 1.7592E+13 | 8.7961E+12 | 4.398E+12 | 2.199E+12 | 1.0995E+12 | 5.4976E+11 | 2.7488E+11 | 1.3744E+11 | 6.8719E+10 | 3.436E+10 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |

Encoded Land's Encoded Data Location and Binary Value

| 35 | 34 | 33 | 32 | 31 | 30 | 29 | 28 | 27 | 26 | 25 |
|---|---|---|---|---|---|---|---|---|---|---|
| 1.718E+10 | 8589934592 | 4294967296 | 2147483648 | 1073741824 | 536870912 | 268435456 | 134217728 | 67108864 | 33554432 | 16777216 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |

CONTINUED FROM FIG.71B

CONTINUED FROM FIG.71C

| 24 | 23 | 22 | 21 | 20 | 19 | 18 | 17 | 16 | 15 | 14 |
|---|---|---|---|---|---|---|---|---|---|---|
| 8388608 | 4194304 | 2097152 | 1048576 | 524288 | 262144 | 131072 | 65536 | 32768 | 16384 | 8192 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |

| 13 | 12 | 11 | 10 | 9 | 8 | 7 | 6 | 5 | 4 |
|---|---|---|---|---|---|---|---|---|---|
| 4096 | 2048 | 1024 | 512 | 256 | 128 | 64 | 32 | 16 | 8 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 1 |
| 0 | 0 | 0 | 0 | 0 | 0 | 0 | 0 | 1 | 0 |
| 0 | 0 | 0 | 0 | 0 | 0 | 0 | 1 | 0 | 0 |
| 0 | 0 | 0 | 0 | 0 | 0 | 1 | 0 | 0 | 0 |
| 0 | 0 | 0 | 0 | 0 | 1 | 0 | 0 | 0 | 0 |
| 0 | 0 | 0 | 0 | 1 | 0 | 0 | 0 | 0 | 0 |
| 0 | 0 | 0 | 1 | 0 | 0 | 0 | 0 | 0 | 0 |
| 0 | 0 | 1 | 0 | 0 | 0 | 0 | 0 | 0 | 0 |
| 0 | 1 | 0 | 0 | 0 | 0 | 0 | 0 | 0 | 0 |

CONTINUED FROM FIG.71D

CONTINUED FROM FIG.71E

| | | | Outer Periphery |
|---|---|---|---|
| 3 | 2 | 1 | 0 |
| 4 | 2 | 1 | Encoded Data "End Bracket Frame" Validation Reference |
| 0 | 0 | 0 | 1 |
| 0 | 1 | 0 | 1 |
| 1 | 0 | 0 | 1 |
| 0 | 0 | 0 | 1 |
| 0 | 0 | 0 | 1 |
| 0 | 0 | 0 | 1 |
| 0 | 0 | 0 | 1 |
| 0 | 0 | 0 | 1 |
| 0 | 0 | 0 | 1 |
| 0 | 0 | 0 | 1 |
| 0 | 0 | 0 | 1 |
| 0 | 0 | 0 | 1 |

CONTINUED FROM FIG.71A

| | | | | | | | |
|---|---|---|---|---|---|---|---|
| 4,097 | 12 | 4,096 | 1 | 0 | 0 | 0 | 0 |
| 8,193 | 13 | 8,192 | 1 | 0 | 0 | 0 | 0 |
| 16,385 | 14 | 16,384 | 1 | 0 | 0 | 0 | 0 |
| 32,769 | 15 | 32,768 | 1 | 0 | 0 | 0 | 0 |
| 65,537 | 16 | 65,536 | 1 | 0 | 0 | 0 | 0 |
| 131,073 | 17 | 131,072 | 1 | 0 | 0 | 0 | 0 |
| 262,145 | 18 | 262,144 | 1 | 0 | 0 | 0 | 0 |
| 524,289 | 19 | 524,288 | 1 | 0 | 0 | 0 | 0 |
| 1,048,577 | 20 | 1,048,576 | 1 | 0 | 0 | 0 | 0 |
| 2,097,153 | 21 | 2,097,152 | 1 | 0 | 0 | 0 | 0 |
| 4,194,305 | 22 | 4,194,304 | 1 | 0 | 0 | 0 | 0 |
| 8,388,609 | 23 | 8,388,608 | 1 | 0 | 0 | 0 | 0 |
| 16,777,217 | 24 | 16,777,216 | 1 | 0 | 0 | 0 | 0 |
| 33,554,433 | 25 | 33,554,432 | 1 | 0 | 0 | 0 | 0 |
| 67,108,865 | 26 | 67,108,864 | 1 | 0 | 0 | 0 | 0 |
| 134,217,729 | 27 | 134,217,728 | 1 | 0 | 0 | 0 | 0 |
| 268,435,457 | 28 | 268,435,456 | 1 | 0 | 0 | 0 | 0 |
| 536,870,913 | 29 | 536,870,912 | 1 | 0 | 0 | 0 | 0 |
| 1,073,741,825 | 30 | 1,073,741,824 | 1 | 0 | 0 | 0 | 0 |

CONTINUED FROM FIG.71B

| | | | | | | | | | | |
|---|---|---|---|---|---|---|---|---|---|---|
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |

CONTINUED FROM FIG.71G

CONTINUED FROM FIG.71C

CONTINUED FROM FIG.71H

| | | | | | | | | | | |
|---|---|---|---|---|---|---|---|---|---|---|
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 1 |
| 0 | 0 | 0 | 0 | 0 | 0 | 0 | 0 | 0 | 1 | 0 |
| 0 | 0 | 0 | 0 | 0 | 0 | 0 | 0 | 1 | 0 | 0 |
| 0 | 0 | 0 | 0 | 0 | 0 | 0 | 1 | 0 | 0 | 0 |
| 0 | 0 | 0 | 0 | 0 | 0 | 1 | 0 | 0 | 0 | 0 |
| 0 | 0 | 0 | 0 | 0 | 1 | 0 | 0 | 0 | 0 | 0 |
| 0 | 0 | 0 | 0 | 1 | 0 | 0 | 0 | 0 | 0 | 0 |

CONTINUED FROM FIG.71D

| | | | | | | | | | | |
|---|---|---|---|---|---|---|---|---|---|---|
| 0 | 0 | 0 | 0 | 0 | 0 | 0 | 0 | 0 | 0 | 0 |
| 0 | 0 | 0 | 0 | 0 | 0 | 0 | 0 | 0 | 0 | 1 |
| 0 | 0 | 0 | 0 | 0 | 0 | 0 | 0 | 0 | 1 | 0 |
| 0 | 0 | 0 | 0 | 0 | 0 | 0 | 0 | 1 | 0 | 0 |
| 0 | 0 | 0 | 0 | 0 | 0 | 0 | 1 | 0 | 0 | 0 |
| 0 | 0 | 0 | 0 | 0 | 0 | 1 | 0 | 0 | 0 | 0 |
| 0 | 0 | 0 | 0 | 0 | 1 | 0 | 0 | 0 | 0 | 0 |
| 0 | 0 | 0 | 0 | 1 | 0 | 0 | 0 | 0 | 0 | 0 |
| 0 | 0 | 0 | 1 | 0 | 0 | 0 | 0 | 0 | 0 | 0 |
| 0 | 0 | 1 | 0 | 0 | 0 | 0 | 0 | 0 | 0 | 0 |
| 0 | 1 | 0 | 0 | 0 | 0 | 0 | 0 | 0 | 0 | 0 |
| 1 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |

CONTINUED FROM FIG.71I

CONTINUED FROM FIG.71E

| | | | | | | | | | |
|---|---|---|---|---|---|---|---|---|---|
| 1 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |

CONTINUED FROM FIG.71J

CONTINUED FROM FIG.71F

| | | | |
|---|---|---|---|
| 0 | 0 | 0 | 1 |
| 0 | 0 | 0 | 1 |
| 0 | 0 | 0 | 1 |
| 0 | 0 | 0 | 1 |
| 0 | 0 | 0 | 1 |
| 0 | 0 | 0 | 1 |
| 0 | 0 | 0 | 1 |
| 0 | 0 | 0 | 1 |
| 0 | 0 | 0 | 1 |
| 0 | 0 | 0 | 1 |
| 0 | 0 | 0 | 1 |
| 0 | 0 | 0 | 1 |
| 0 | 0 | 0 | 1 |
| 0 | 0 | 0 | 1 |
| 0 | 0 | 0 | 1 |
| 0 | 0 | 0 | 1 |
| 0 | 0 | 0 | 1 |
| 0 | 0 | 0 | 1 |
| 0 | 0 | 0 | 1 |

CONTINUED FROM FIG.71K

CONTINUED ON FIG.71N

CONTINUED FROM FIG.71G

| | | | | | | | |
|---|---|---|---|---|---|---|---|
| 2,147,483,649 | 31 | 2,147,483,648 | 1 | 0 | 0 | 0 | 0 |
| 4,294,967,297 | 32 | 4,294,967,296 | 1 | 0 | 0 | 0 | 0 |
| 8,589,934,593 | 33 | 8,589,934,592 | 1 | 0 | 0 | 0 | 0 |
| 17,179,869,185 | 34 | 17,179,869,184 | 1 | 0 | 0 | 0 | 0 |
| 34,359,738,369 | 35 | 34,359,738,368 | 1 | 0 | 0 | 0 | 0 |
| 68,719,476,737 | 36 | 68,719,476,736 | 1 | 0 | 0 | 0 | 0 |
| 137,438,953,473 | 37 | 137,438,953,472 | 1 | 0 | 0 | 0 | 0 |
| 274,877,906,945 | 38 | 274,877,906,944 | 1 | 0 | 0 | 0 | 0 |
| 549,755,813,889 | 39 | 549,755,813,888 | 1 | 0 | 0 | 0 | 0 |
| 1,099,511,627,777 | 40 | 1,099,511,627,776 | 1 | 0 | 0 | 0 | 0 |
| 2,199,023,255,553 | 41 | 2,199,023,255,552 | 1 | 0 | 0 | 0 | 0 |
| 4,398,046,511,105 | 42 | 4,398,046,511,104 | 1 | 0 | 0 | 0 | 0 |
| 8,796,093,022,209 | 43 | 8,796,093,022,208 | 1 | 0 | 0 | 0 | 0 |
| 17,592,186,044,417 | 44 | 17,592,186,044,416 | 1 | 0 | 0 | 0 | 0 |
| 35,184,372,088,833 | 45 | 35,184,372,088,832 | 1 | 0 | 0 | 0 | 0 |
| 70,368,744,177,665 | 46 | 70,368,744,177,664 | 1 | 0 | 0 | 0 | 1 |
| 140,737,488,355,329 | 47 | 140,737,488,355,328 | 1 | 0 | 0 | 1 | 0 |
| 281,474,976,710,657 | 48 | 281,474,976,710,656 | 1 | 0 | 1 | 0 | 0 |
| 562,949,953,421,313 | 49 | 562,949,953,421,312 | 1 | 1 | 0 | 0 | 0 |
| 1,125,899,906,842,620 | 50 | 1,125,899,906,842,620 | 1 | 1 | 1 | 1 | 1 |

CONTINUED FROM FIG.71H

| | | | | | | | | | | |
|---|---|---|---|---|---|---|---|---|---|---|
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 1 |
| 0 | 0 | 0 | 0 | 0 | 0 | 0 | 0 | 0 | 1 | 0 |
| 0 | 0 | 0 | 0 | 0 | 0 | 0 | 0 | 1 | 0 | 0 |
| 0 | 0 | 0 | 0 | 0 | 0 | 0 | 1 | 0 | 0 | 0 |
| 0 | 0 | 0 | 0 | 0 | 0 | 1 | 0 | 0 | 0 | 0 |
| 0 | 0 | 0 | 0 | 0 | 1 | 0 | 0 | 0 | 0 | 0 |
| 0 | 0 | 0 | 0 | 1 | 0 | 0 | 0 | 0 | 0 | 0 |
| 0 | 0 | 0 | 1 | 0 | 0 | 0 | 0 | 0 | 0 | 0 |
| 0 | 0 | 1 | 0 | 0 | 0 | 0 | 0 | 0 | 0 | 0 |
| 0 | 1 | 0 | 0 | 0 | 0 | 0 | 0 | 0 | 0 | 0 |
| 1 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 1 | 1 | 1 | 1 | 1 | 1 | 1 | 1 | 1 | 1 | 1 |

FIG.71N

CONTINUED FROM FIG.71M

CONTINUED ON FIG.71P

CONTINUED FROM FIG.71I

| | | | | | | | | | | |
|---|---|---|---|---|---|---|---|---|---|---|
| 0 | 0 | 0 | 1 | 0 | 0 | 0 | 0 | 0 | 0 | 0 |
| 0 | 0 | 1 | 0 | 0 | 0 | 0 | 0 | 0 | 0 | 0 |
| 0 | 1 | 0 | 0 | 0 | 0 | 0 | 0 | 0 | 0 | 0 |
| 1 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 1 | 1 | 1 | 1 | 1 | 1 | 1 | 1 | 1 | 1 | 1 |

FIG.71O

CONTINUED FROM FIG.71N

CONTINUED FROM FIG.71J

CONTINUED ON FIG.71Q

| | | | | | | | | | | |
|---|---|---|---|---|---|---|---|---|---|---|
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 1 | 1 | 1 | 1 | 1 | 1 | 1 | 1 | 1 | 1 | 1 |

CONTINUED FROM FIG.71O

FIG.71P

CONTINUED FROM FIG.71K

| | | | | | | | | | |
|---|---|---|---|---|---|---|---|---|---|
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 1 | 1 | 1 | 1 | 1 | 1 | 1 | 1 | 1 | 1 |

FIG.71Q

CONTINUED FROM FIG.71P

CONTINUED ON FIG.71R

CONTINUED FROM FIG.71L

| | | | |
|---|---|---|---|
| 0 | 0 | 0 | 1 |
| 0 | 0 | 0 | 1 |
| 0 | 0 | 0 | 1 |
| 0 | 0 | 0 | 1 |
| 0 | 0 | 0 | 1 |
| 0 | 0 | 0 | 1 |
| 0 | 0 | 0 | 1 |
| 0 | 0 | 0 | 1 |
| 0 | 0 | 0 | 1 |
| 0 | 0 | 0 | 1 |
| 0 | 0 | 0 | 1 |
| 0 | 0 | 0 | 1 |
| 0 | 0 | 0 | 1 |
| 0 | 0 | 0 | 1 |
| 0 | 0 | 0 | 1 |
| 0 | 0 | 0 | 1 |
| 0 | 0 | 0 | 1 |
| 0 | 0 | 0 | 1 |
| 0 | 0 | 0 | 1 |
| 1 | 1 | 1 | 1 |

FIG.71R

CONTINUED FROM FIG.71Q

ø 5.00MM ENCODED LAND MULTIPLE FLUTE–LAND DRILL
HAVING 52 ENCODED LANDS WITH THE 2 END LANDS' BRACKETING
THE CENTER 50 LANDS' FOR THE ROUND HOLE HAVING AN 50 BIT EQUIVALENT VALUE

ø 5.00MM DETAILS OF THE ENCODED LAND MULTIPLE FLUTE–LAND DRILL
HAVING 52 ENCODED LANDS WITH THE 2 END LANDS' BRACKETING
THE CENTER 50 LANDS' FOR THE ROUND HOLE HAVING AN 50 BIT
EQUIVALENT VALUE OF 1,125,899,906,842,620

1X5 MSOET'S 5 ROUND HOLES OF THE BINARY = 31
HAVING 20 ENCODED LANDS HAVING THE 2 END LANDS' BRACKETING THE CENTER 18 LANDS' WITH EACH OF THE ROUND ENGRAVED HOLES HAVING AN 18 BIT EQUIVALENT DATA VALUE

EXAMPLE OF A WORN CUTTING LAND BETWEEN THE OUTER REFERENCE BIT TO BIT-2 FOR PART-77.282134 VALUE OF THE ENCODED LAND FOR THE Ø20.9 SINGLE FLUTE STYLUS

WORN CUTTING LAND BETWEEN THE OUTER REFERENCE BIT TO BIT-2

1X5 MSOET'S 5 ROUND HOLES OF THE BINARY = 31
EXAMPLE OF A WORN CUTTING LAND BETWEEN THE OUTER REFERENCE–BIT TO BIT–2 FOR THE THE 20 ENCODED LANDS HAVING THE 2 END LANDS' BRACKETING THE CENTER 18 LANDS' WITH EACH OF THE ROUND ENGRAVED HOLES HAVING AN 18 BIT EQUIVALENT DATA VALUE

DETAIL A

3X5 MSOET'S 5 ROUND HOLES OF THE CHARACTER "1"
EXAMPLE OF A WORN CUTTING LAND BETWEEN THE OUTER REFERENCE–BIT TO BIT–2 FOR THE THE 20 ENCODED LANDS HAVING THE 2 END LANDS' BRACKETING THE CENTER 18 LANDS' WITH EACH OF THE ROUND ENGRAVED HOLES HAVING AN 18 BIT EQUIVALENT DATA VALUE

DETAIL A

EXAMPLE OF A WORN CUTTING LAND BETWEEN BIT-3 TO BIT-5 FOR
PART-77.282134 VALUE OF THE ENCODED LAND FOR THE Ø0.8 SINGLE FLUTE STYLUS

3X5 MSOET'S 5 ROUND HOLES OF THE CHARACTER "1"
EXAMPLE OF WORN CUTTING LAND BETWEEN THE BIT-3 TO BIT-5 FOR THE 20 ENCODED LANDS HAVING THE 2 END LANDS' BRACKETING THE CENTER 18 LANDS' WITH EACH OF THE ROUND ENGRAVED HOLES HAVING AN 18 BIT EQUIVALENT DATA VALUE

DETAIL A

EXAMPLE OF A WORN CUTTING LAND BETWEEN THE OUTER REFERENCE BIT TO BIT-2 AND BIT-3 TO BIT-5 FOR PART-77.262134 VALUE OF THE ENCODED LAND FOR THE Ø0.8 SINGLE FLUTE STYLUS

3X5 MSOET'S 5 ROUND HOLES OF THE CHARACTER "1"
EXAMPLE OF WORN CUTTING LANDS BETWEEN THE OUTER REFERENCE-BIT TO BIT-2 AND BIT-3 TO BIT-5 FOR THE 20 ENCODED LANDS HAVING THE 2 END LANDS' BRACKETING THE CENTER 18 LANDS' WITH EACH OF THE ROUND ENGRAVED HOLES HAVING AN 18 BIT EQUIVALENT DATA VALUE

DETAIL A

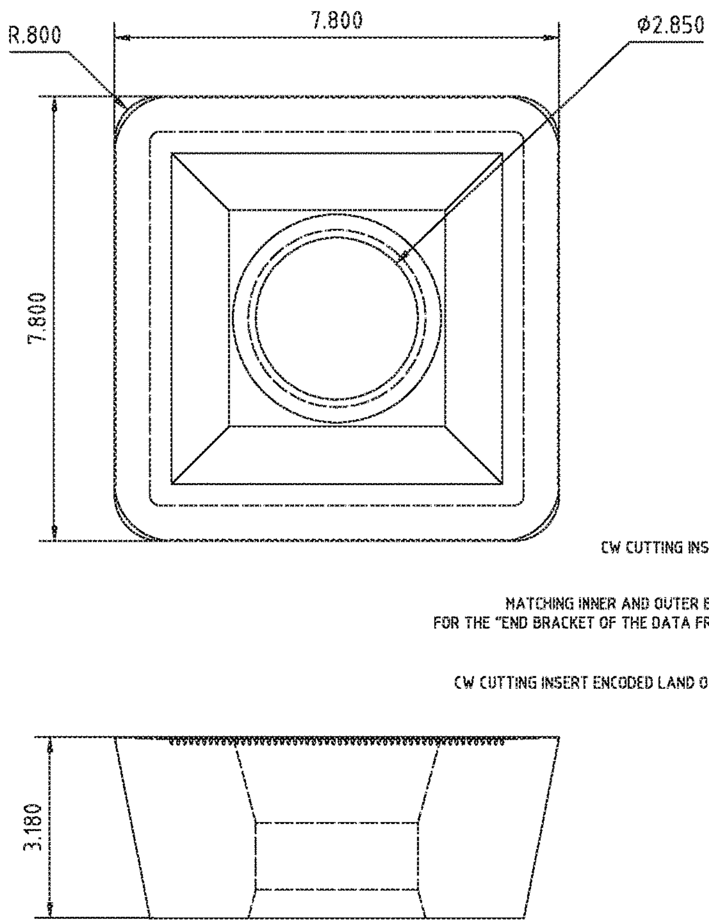
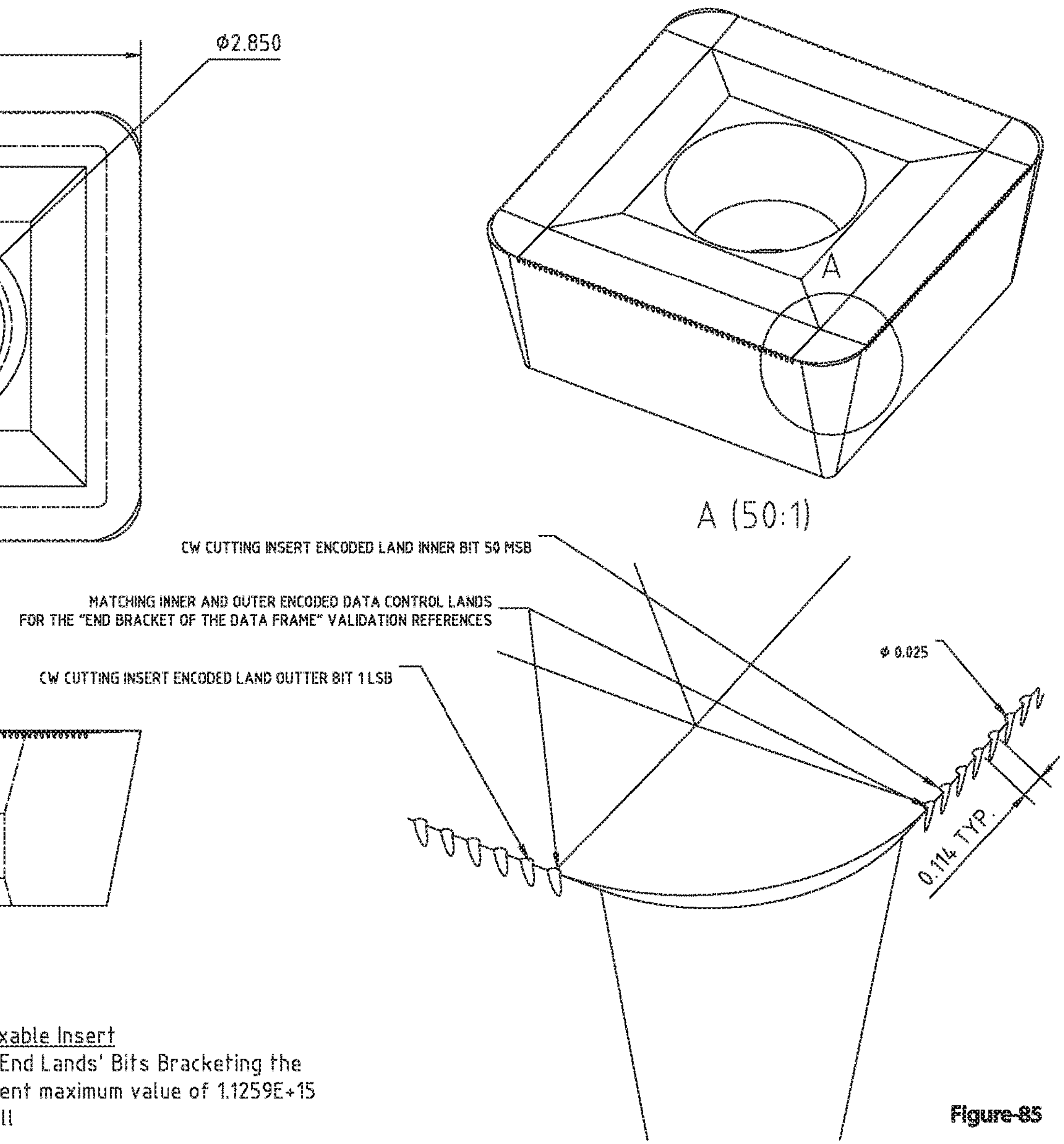
52-BIT SPGX070308HP Encoded Land Indexable Insert
Having 52 Data Encoded Lands with the 2 End Lands' Bits Bracketing the
Center 50 Lands' Bits for a 50 Bit equivalent maximum value of 1.1259E+15
For use in a standard Indexable Insert Drill
Figure-85

| Item | Qty | Name |
|---|---|---|
| 1 | 1 | 52-BIT ENCODED LAND SPGX070308HP-INSERT |
| 2 | 1 | DFT05T308GD-INSERT |
| 3 | 1 | 25MM INDEXABLE DRILL BODY |
| 4 | 1 | SCREW - ISO - M2.5X5 |
| 5 | 1 | SCREW - ISO - M3X6 |

Φ25.0mm Indexable Insert Drill having the 52-BIT SPGX070308HP Encoded Land Indexable Insert
Having 52 Data Encoded Lands with the 2 End Lands' Bits Bracketing the
Center 50 Lands' Bits for a 50 Bit equivalent maximum value of 1.1259E+15
and an indexable center cutting insert.

FULL ARC ENCODATION OF THE ROUND HOLE'S ENCODED LAND PATTERN FOR THE CODE 39 "*" ASTERISK
WORK PIECE / ARTICLE'S ENCODED LAND RING PATTERN CROSS-SECTION VIEW
VIA THE ENCODED LAND(S) OF THE SINGLE OR MULTIPLE FLUTE ENGRAVING STYLUS OR DRILL

RIDGED ENCODATION OF THE ROUND HOLE'S ENCODED LAND PATTERN FOR THE CODE 39 "*" ASTERISK
WORK PIECE / ARTICLE'S ENCODED LAND PATTERN CROSS-SECTION VIEW HAVING A PARTIAL ARC RIDGED ENCODATION PATTERN VIA THE 1ST PATH OF A SMOOTH CUTTING NON-ENCODED LAND(S) SINGLE OR MULTIPLE FLUTE ENGRAVING STYLUS OR DRILL AND A 2ND PATH TO A LESSER DEPTH FOR THE ENCODED LAND(S) SINGLE OR MULTIPLE FLUTE ENGRAVING STYLUS OR DRILL

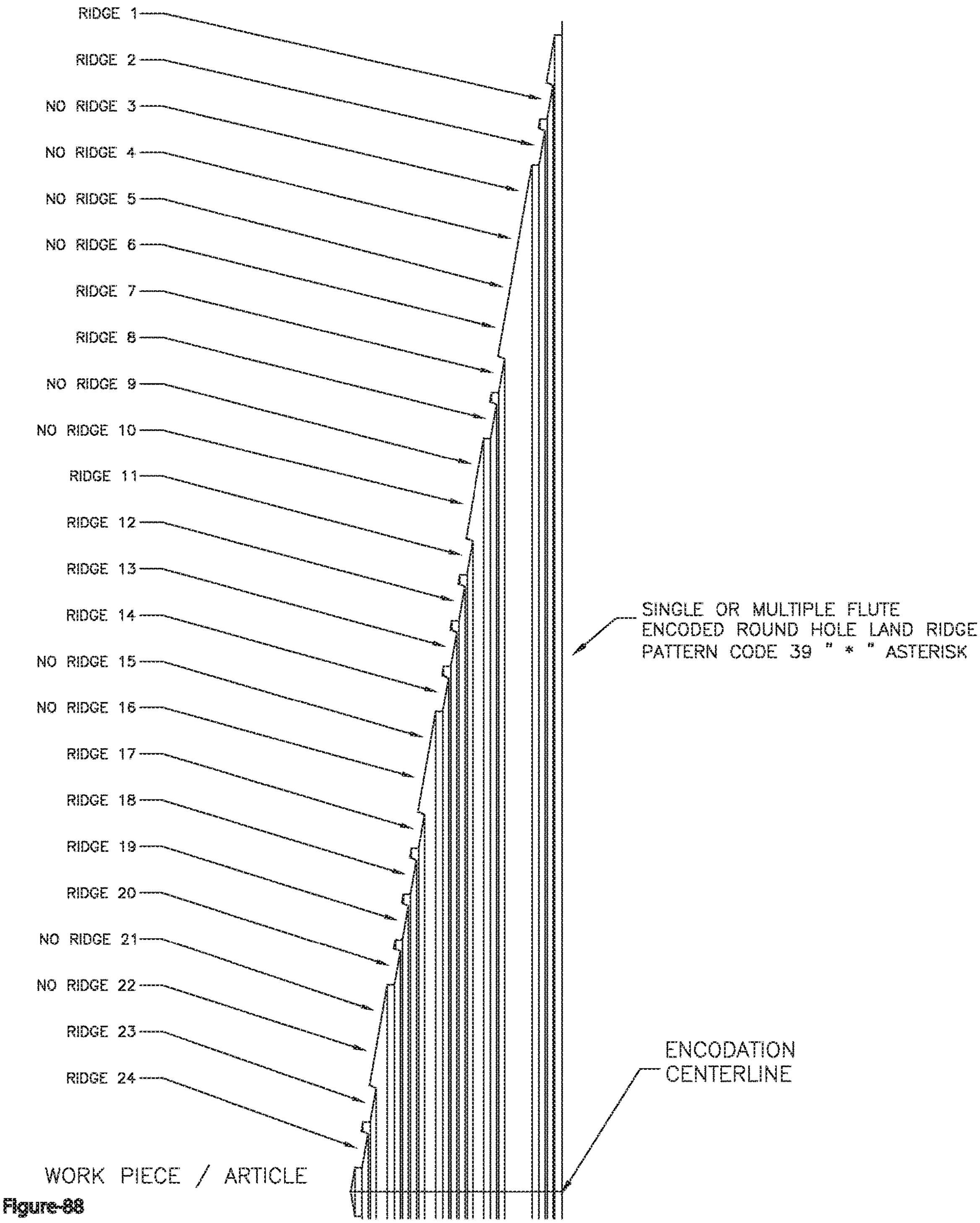

Figure-88

TYPICAL MOLDED RIDGED ENCODATION DETAIL OF THE ROUND HOLE'S ENCODED LAND PATTERN FOR THE CODE 39 "*" ASTERISK CASTING / MOLDING PATTERN AND CORRESPONDING WORK PIECE / ARTICLE'S ENCODED LAND RING PATTERN CROSS-SECTION VIEWS VIA THE 1ST PATH OF A SMOOTH CUTTING NON-ENCODED LAND(S) SINGLE OR MULTIPLE FLUTE ENGRAVING STYLUS OR DRILL AND A 2ND PATH TO A LESSER DEPTH FOR THE ENCODED CUTTING LAND(S) SINGLE OR MULTIPLE FLUTE ENGRAVING STYLUS OR DRILL BEING USED ON THE MOLDING/ CASTING PATTERN TOOLING TO CREATE THE CORRESPONDING ENCODED ROUND PROJECTION ON THE SUBSEQUENT WORK PIECE / ARTICLE

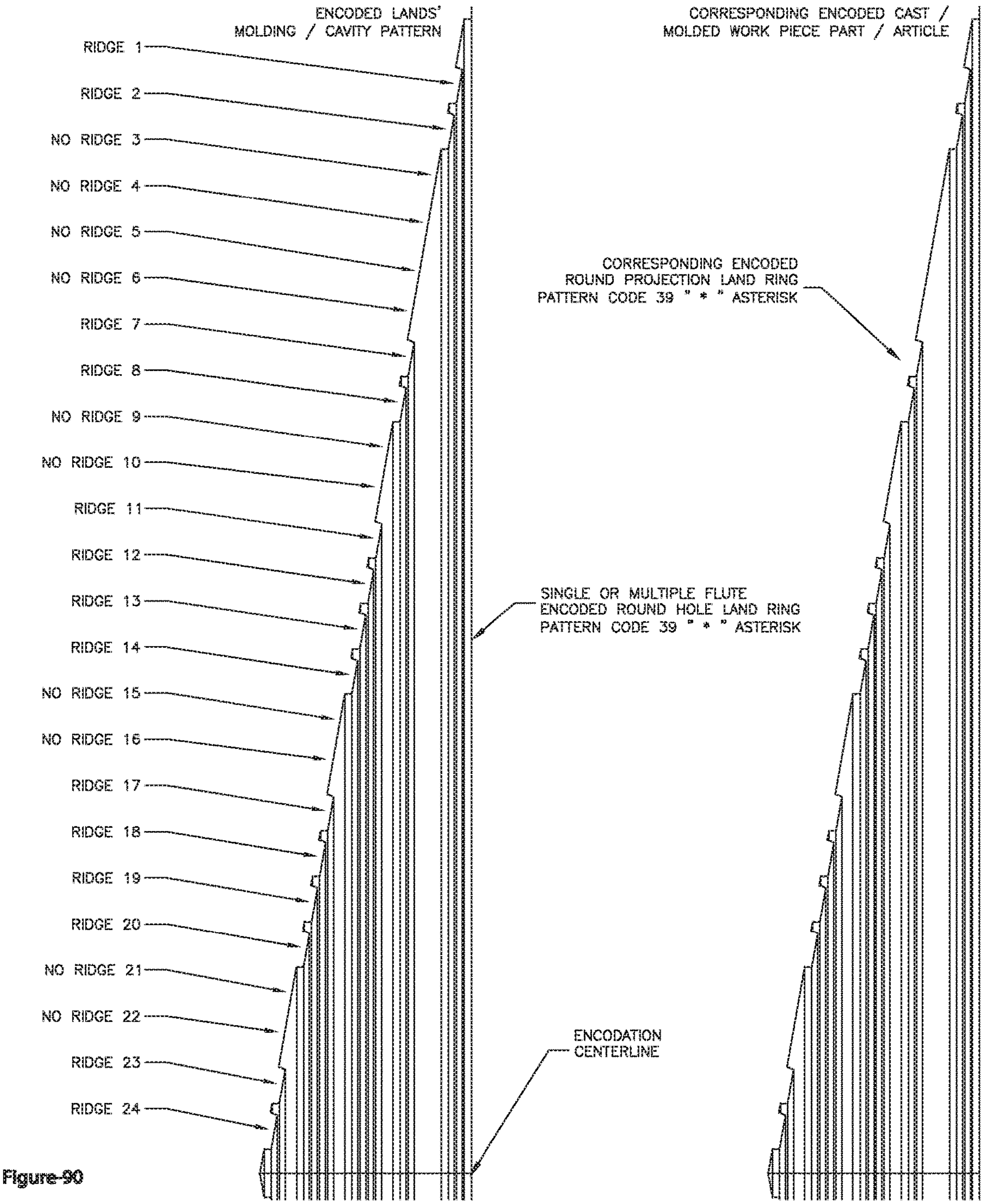

CONTINUED FROM FIG.91A

FIG.91D
CONTINUED FROM FIG.91B
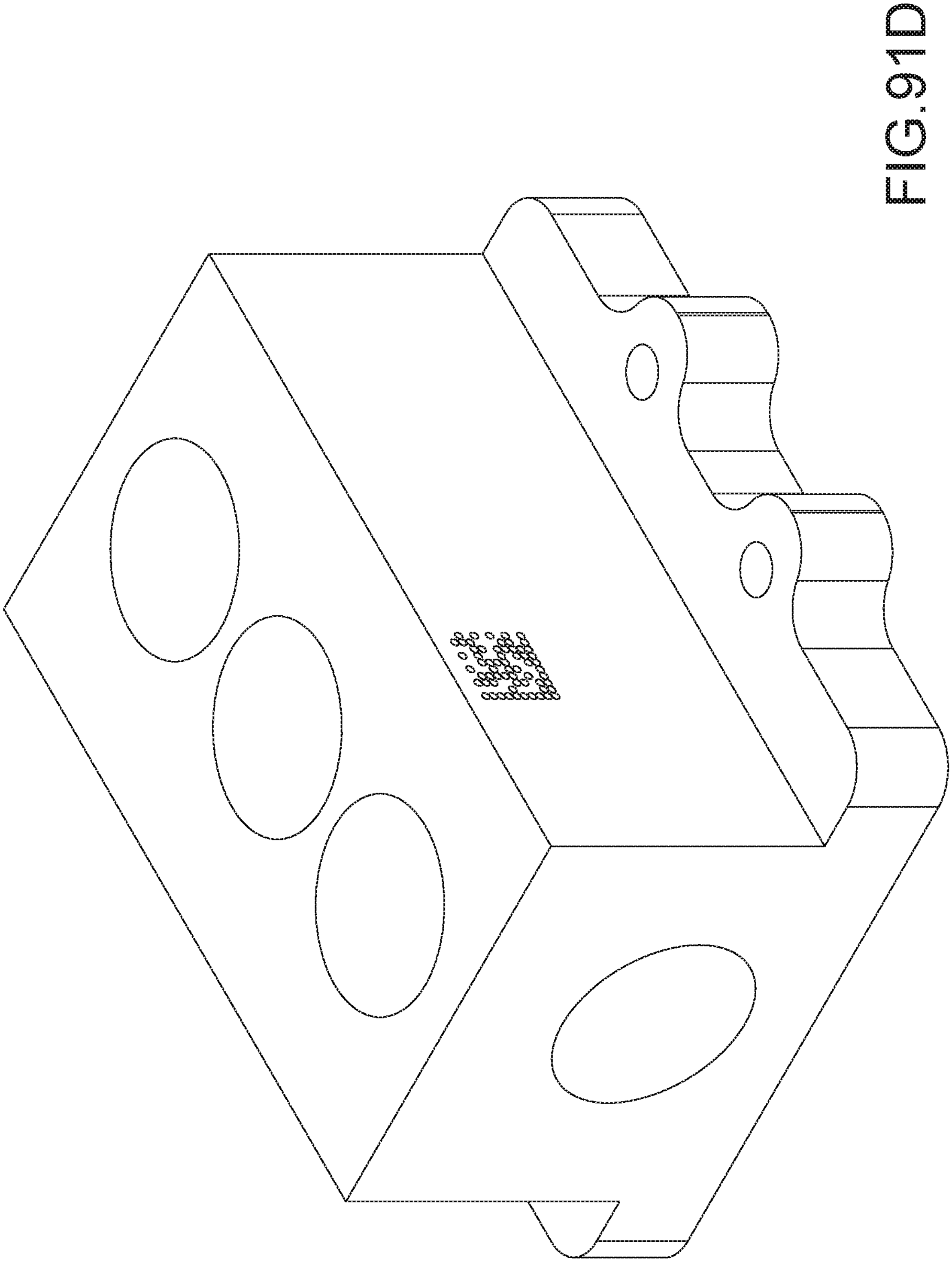
CONTINUED FROM FIG.91C

CONTINUED ON FIG.92B

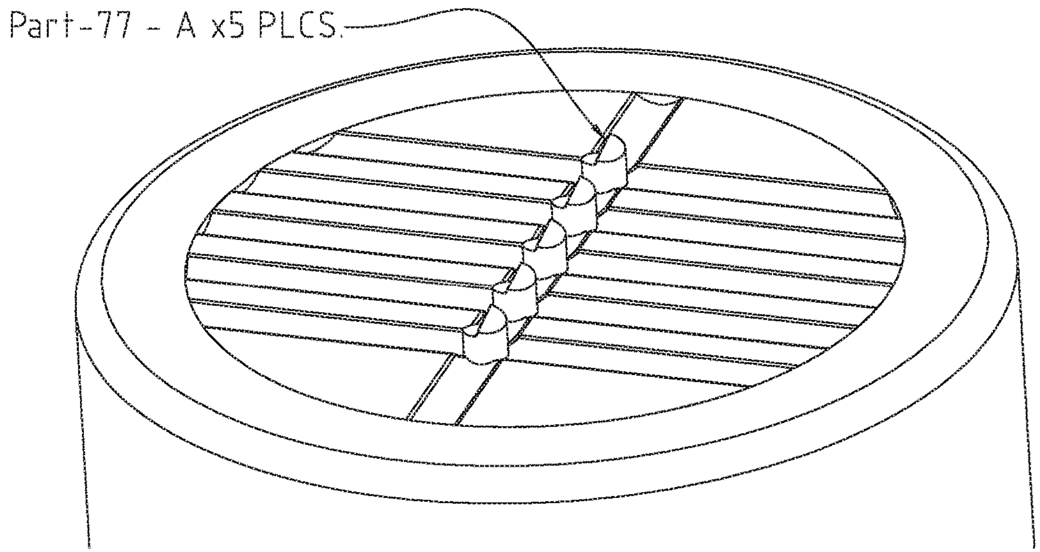

START POSITION OF ø 0.8 STYLUS FLUTE ROTATION
START STYLUS FLUTE POSN: TOP CENTER 12 O'CLOCK

COUNTER CLOCKWISE TOOL AND STYLUS FLUTE ROTATION
FOR ONE FULL CIRCLE ORBIT OF TOOL TO
ROTATE THE STYLUS ONE REVOLUTION
SINGLE ROTATION CNC COMMAND: G91 G03 J–.4
(FACING WORK PIECE)

OR VIA 4 SEQUENTIAL QUADRATURE SEGMENTS OF ROTATION
*1 OF 4 CNC COMMAND: G91 G03 X–.4 Y–.4 R.4
TOOL MOTION: 1ST QUARTER OF ROTATION CCW
(FACING WORK PIECE)

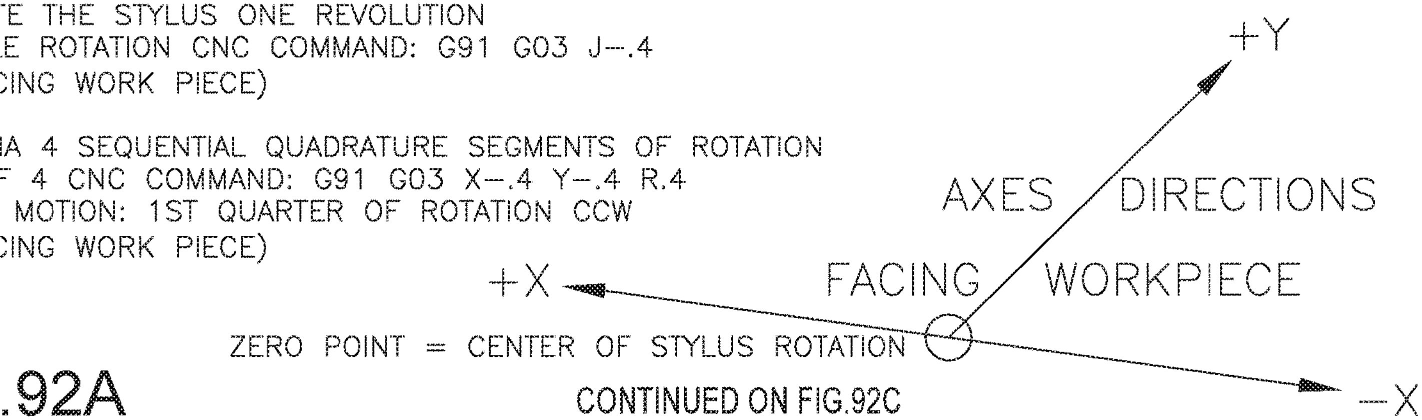

CONTINUED FROM FIG.92A

CONTINUED ON FIG.92D

CONTINUED FROM FIG.92A

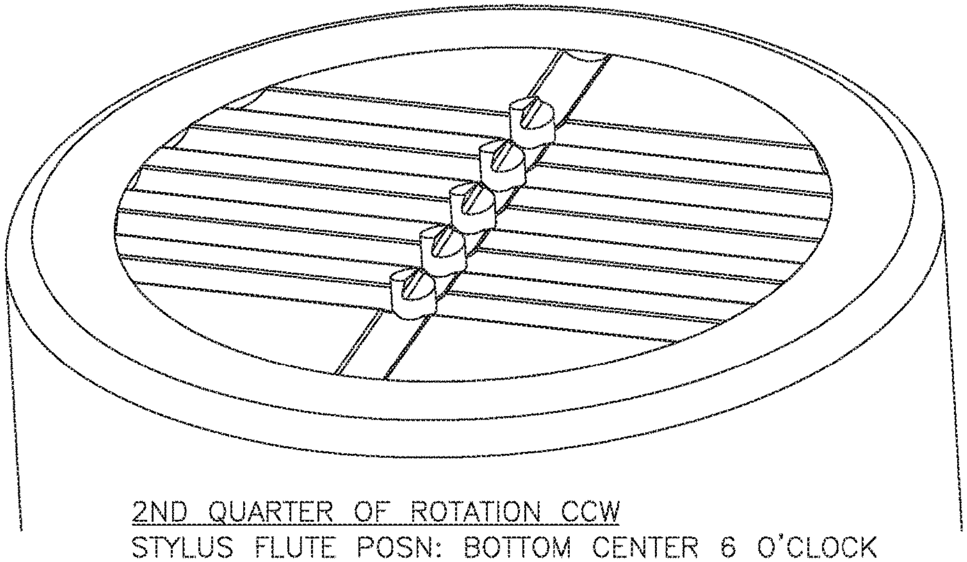

2ND QUARTER OF ROTATION CCW
STYLUS FLUTE POSN: BOTTOM CENTER 6 O'CLOCK

*3 OF 4 CNC COMMAND: G91 G03 X+.4 Y+.4 R.4
TOOL MOTION: 3RD QUARTER OF ROTATION CCW
(FACING WORK PIECE)

Spindle Selectable Single Flute 1X5 Binary Characters Detachable Stylus Guide
(ϕ 0.8mm Multiple Single Flute Stylus Round Hole)
Binary = 31 Single Group Character Pattern for the Selectable Character
Multiple Stylus Orbital Engraving Tool's Typical Components and Assembly

FIG.92C

CONTINUED FROM FIG.92B
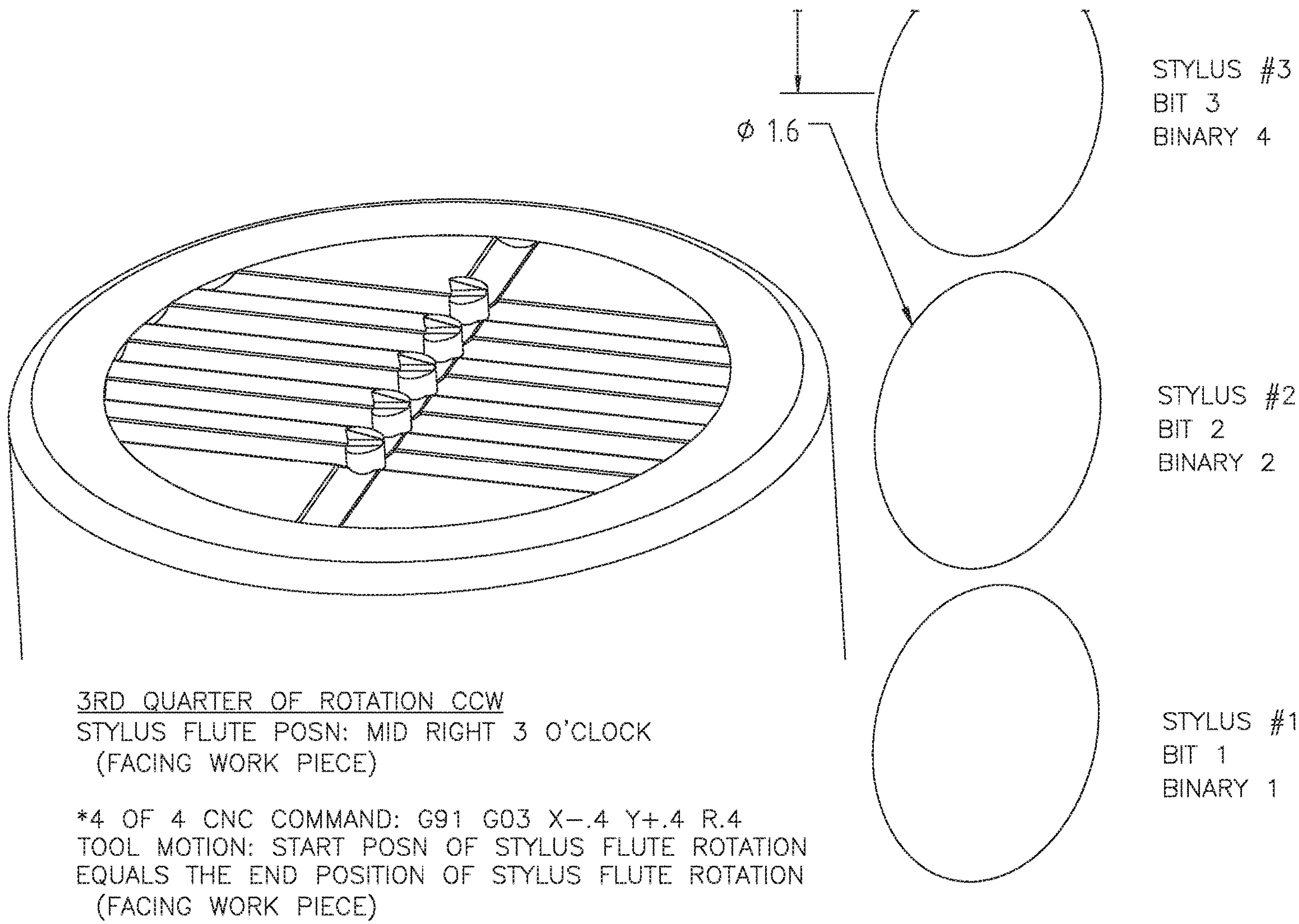
FIG.92D
CONTINUED FROM FIG.92C

CONTINUED FROM FIG.93A

CONTINUED ON FIG.93D

CONTINUED FROM FIG.93A

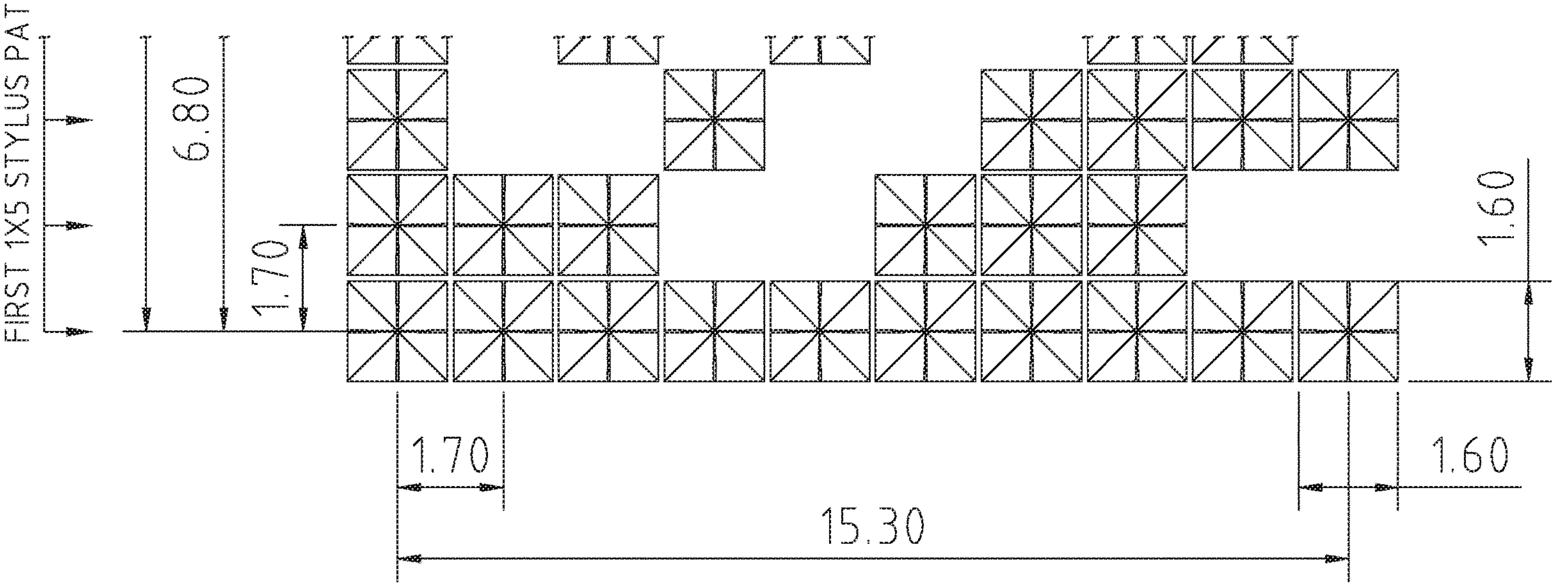

ORTHOGONAL HOLE 10 X 10 2D BARCODE PATTERN
DATA MATRIX ECC200 10X10 FORMAT ASCII ENCODING TEXT "10X10"
VIA 20 CYCLES OF THE ø0.8 SINGLE-FLUTE STYLUS 1X5 32 CHARACTER SET-POSITION MSOET

Spindle Selectable Single Flute 1X5 Binary 32 Position-MOSET
10X10 2D Barcode Orthogonal Hole Pattern
(2D-Barcode Ø 0.8mm Multiple Single Flute Stylus Orthogonal Hole)
Via 20 Cycles of the 1X5 Binary Character Patterns for the Selectable Character Multiple Stylus Orbital Engraving Tool's Typical Components and Assembly

FIG.93C

CONTINUED FROM FIG.93B
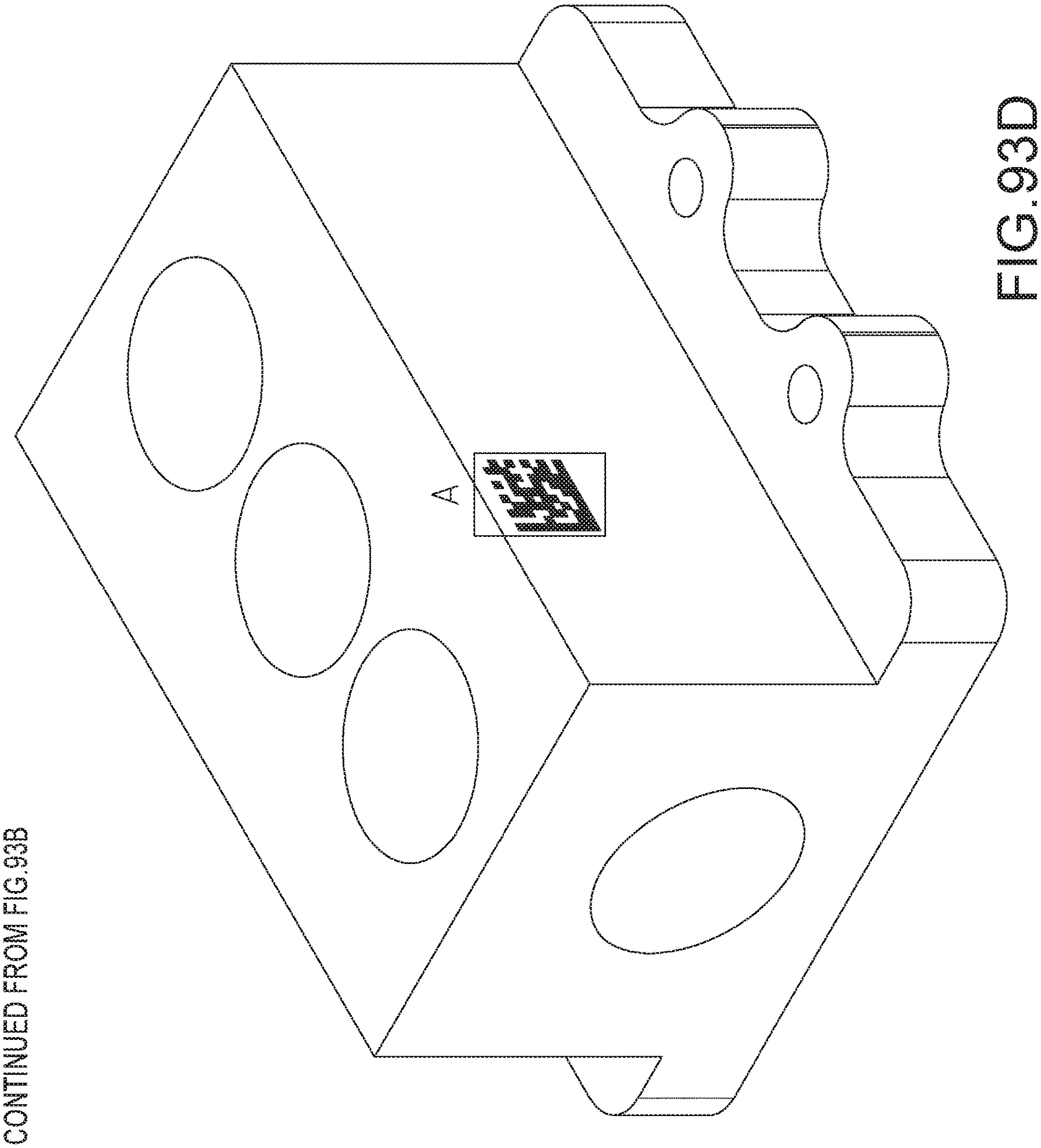
FIG.93D
CONTINUED FROM FIG.93C

CONTINUED ON FIG.94B

CONTINUED FROM FIG.94A

CONTINUED FROM FIG.94A

Part-6.95.8
Two Flute Ø0.8 1X5 Binary Detachable Stylus Guide component for the 32 Position - 32 Binary Selectable Character Configuration of the Multiple Stylus Orbital Engraving Tool

CONTINUED ON FIG.95B

CONTINUED FROM FIG.95A
FIG.95B
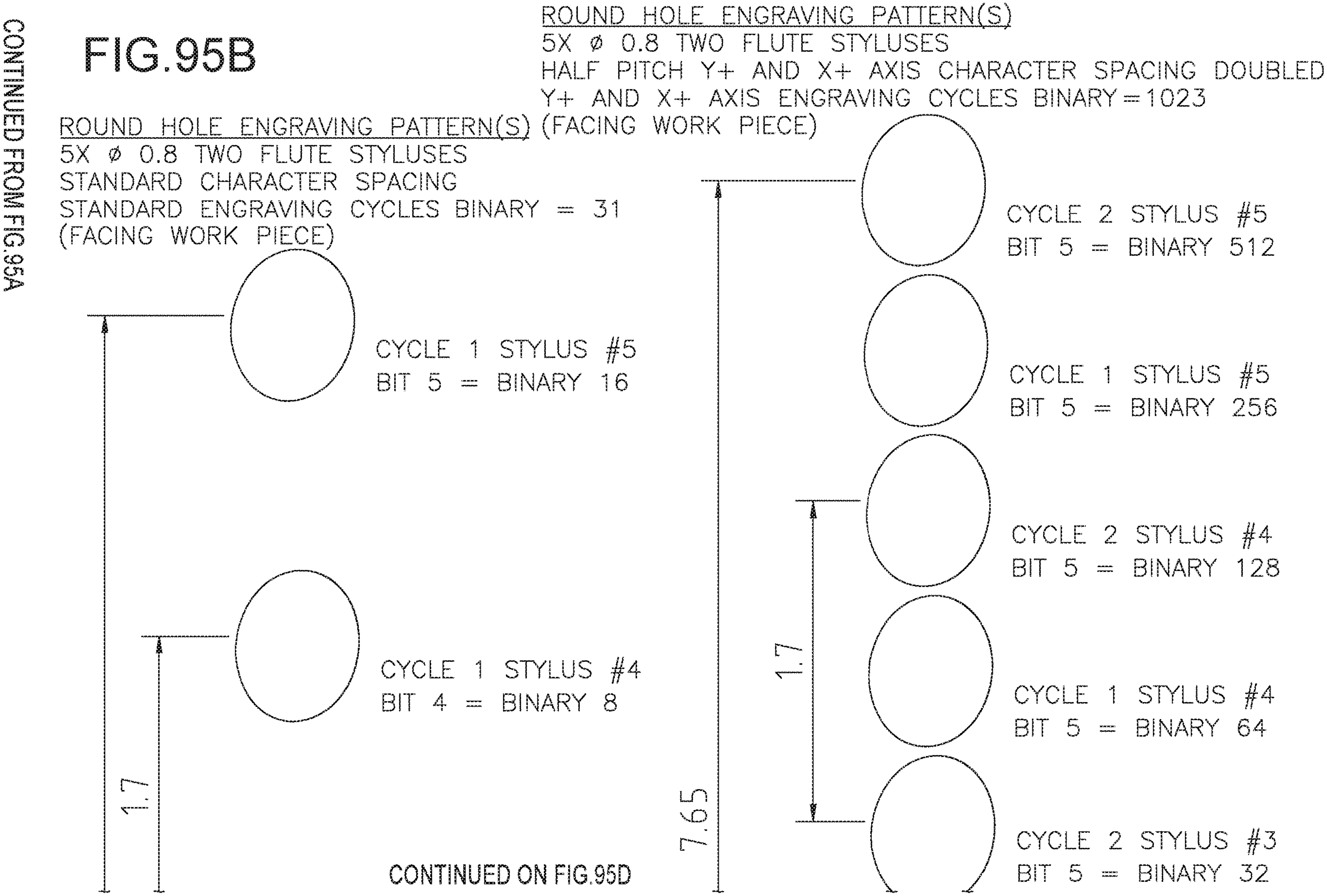
CONTINUED ON FIG.95D

CONTINUED ON FIG.95D

CONTINUED FROM FIG.95A

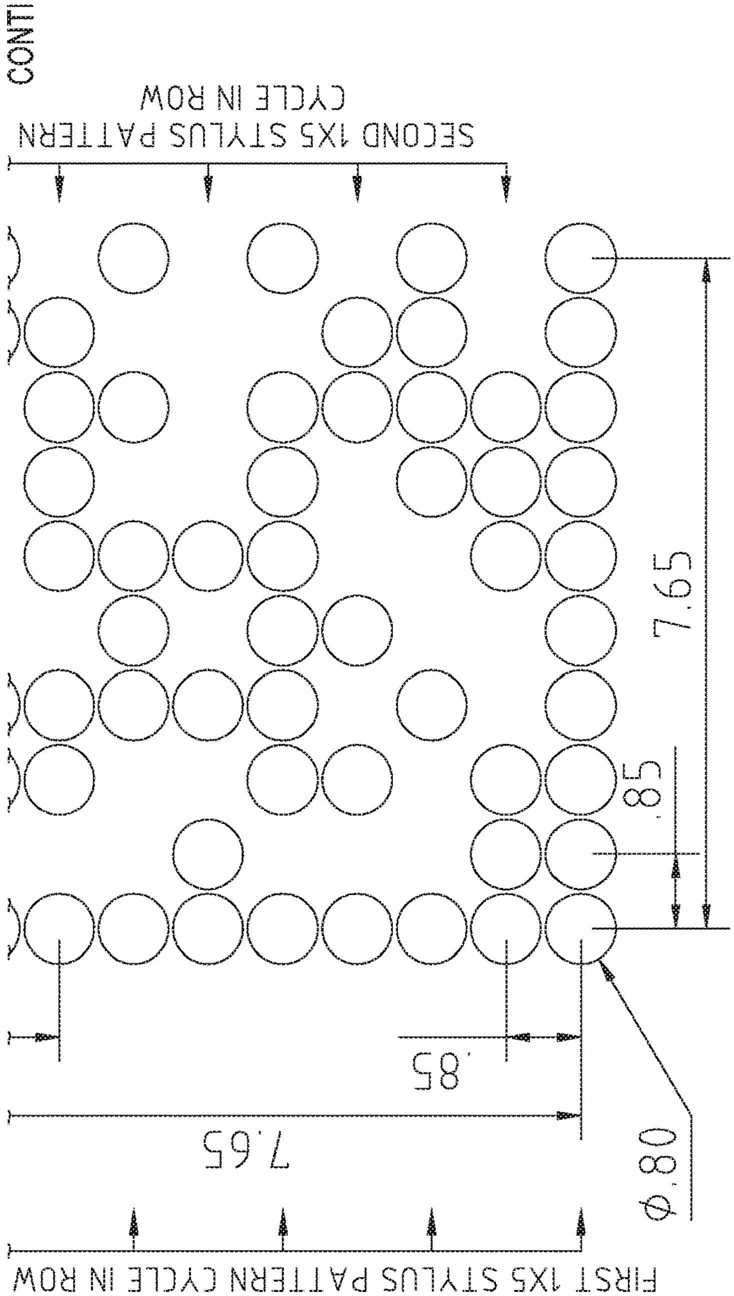

10 X 10 2D BARCODE PATTERN
DATA MATRIX ECC200 10X10 FORMAT ASCII ENCODING TEXT "10X10"
VIA 20 CYCLES OF THE Ø0.8 TWO-FLUTE STYLUS 1X5 32
CHARACTER SET-POSITION MSOET

Spindle Selectable Two Flute 1X5 Binary 32 Position-Characters Detachable Stylus Guide
(2D-Barcode Ø 0.8mm Multiple Two Flute Stylus Round Hole)
Binary = 31 and = 1023 Single Group Character Patterns for the Selectable Character
Multiple Stylus Orbital Engraving Tool's Typical Components and Assembly

FIG.95C

CONTINUED FROM FIG.95B
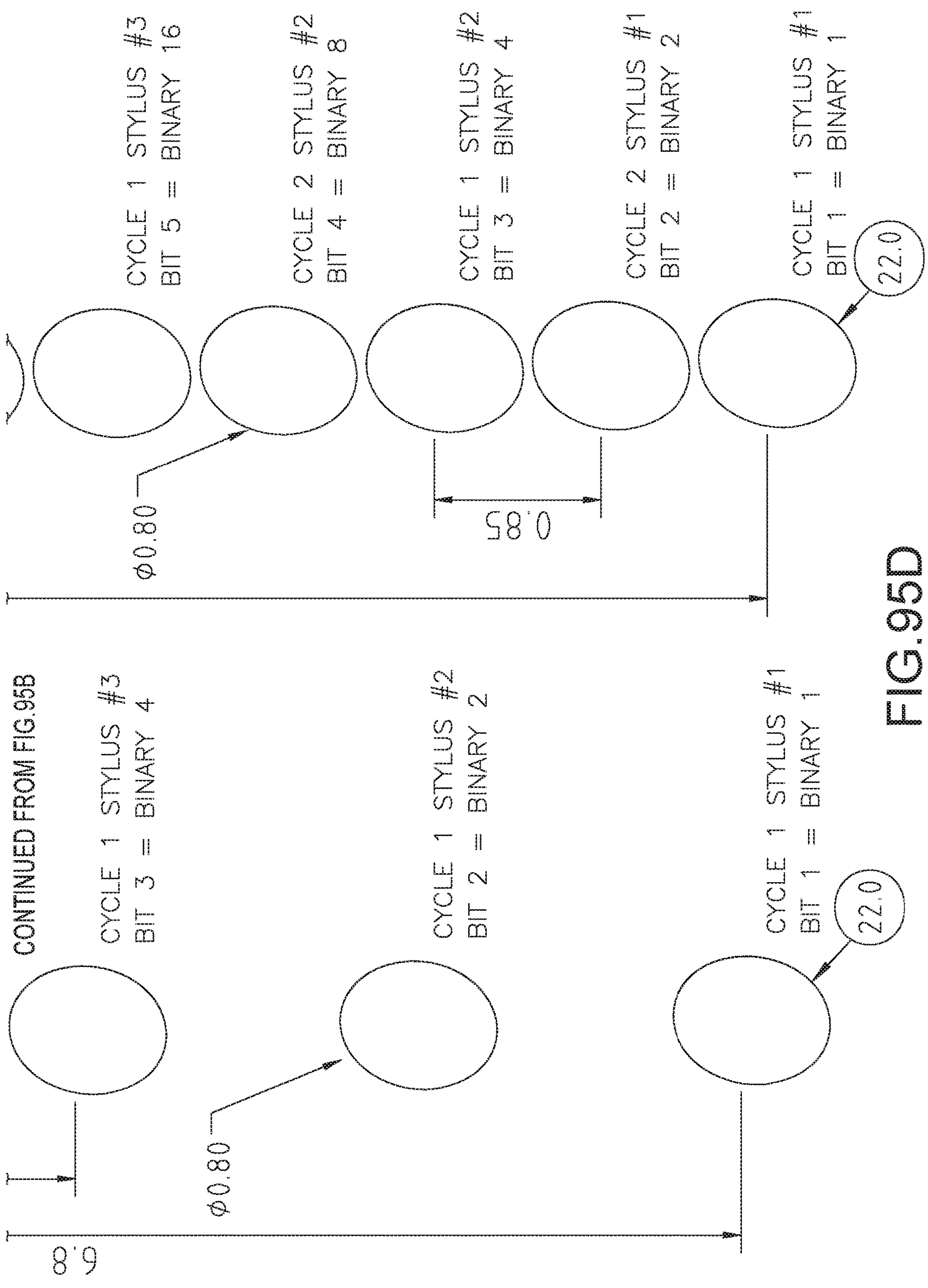
FIG.95D
CONTINUED FROM FIG.95C

Part-6.95
Two Flute ϕ0.8 5X Squared Detachable Stylus Guide component for the
32 Position – 32 Binary Selectable Character Configuration of the Multiple Stylus Orbital Engraving Tool

CONTINUED ON FIG.97B

CONTINUED FROM FIG.97A

CONTINUED ON FIG.97D

CONTINUED FROM FIG.97A

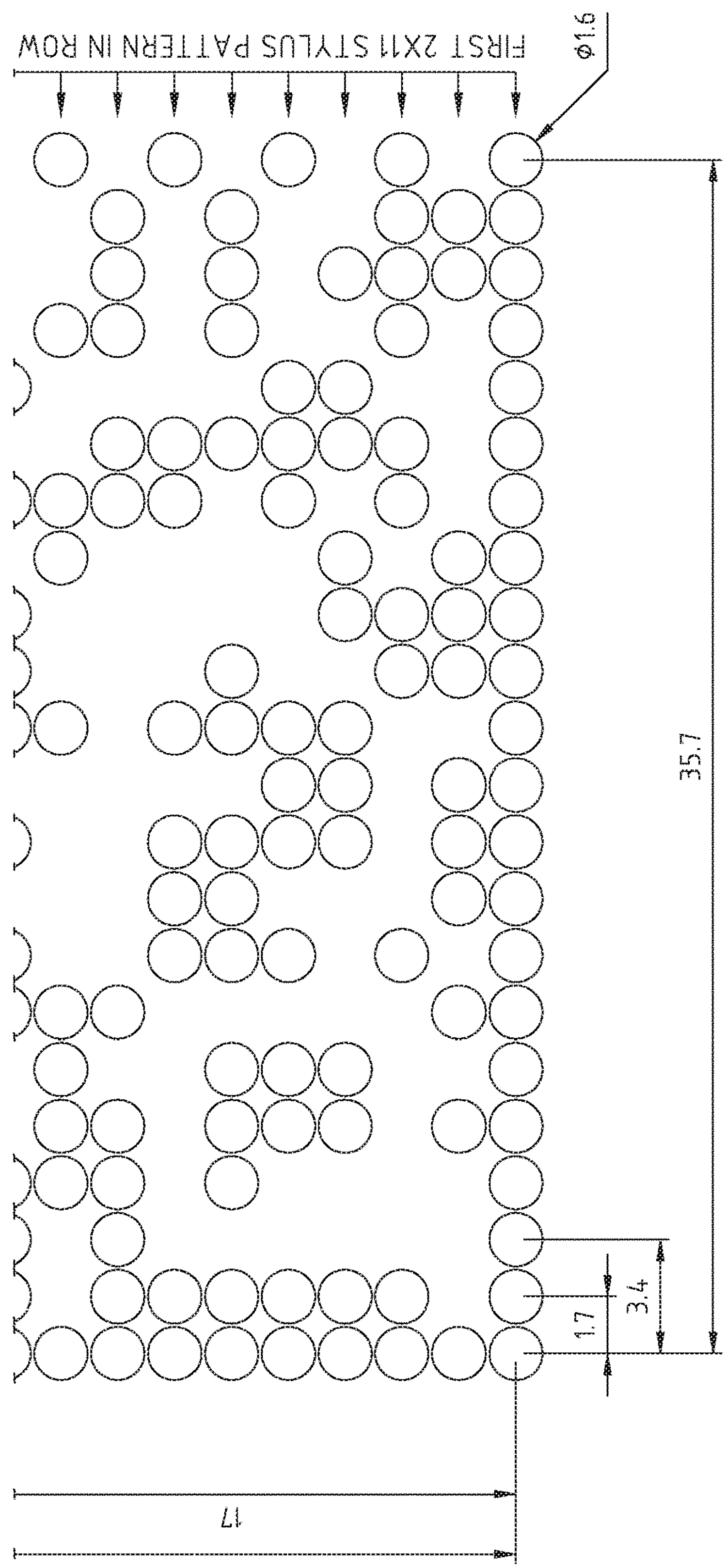

ROUND HOLE 22 X 22 2D BARCODE PATTERN
DATA MATRIX ECC200 22X22 FORMAT ASCII ENCODING TEXT "22X22"
VIA Φ0.8 SINGLE-FLUTE PROGRAMMABLE 2X11 STYLUSES PMSOET

Programmable 2X11 Stylus PMSOET 22X22 2D Barcode Round Hole Pattern
(Round Hole 2D-Barcode Φ 0.8mm Multiple Single Flute Stylus)
Via 22 Cycles of 2X11 Binary Character Patterns for the Selectable Character
Multiple Stylus Orbital Engraving Tool's Typical Components and Assembly

FIG.97C

CONTINUED FROM FIG.97B
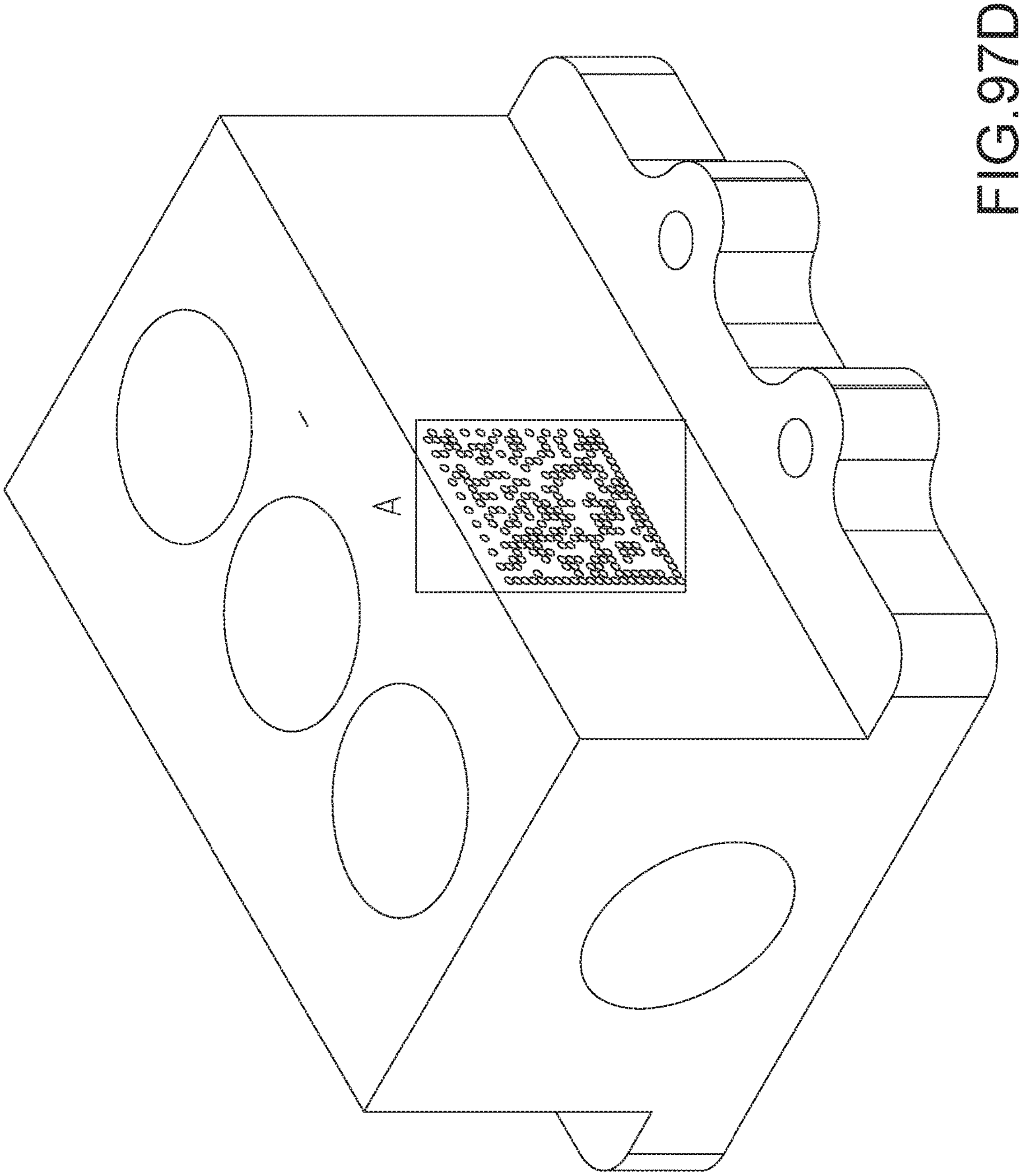
FIG.97D
CONTINUED FROM FIG.97C

CONTINUED FROM FIG.98A

CONTINUED FROM FIG.98B
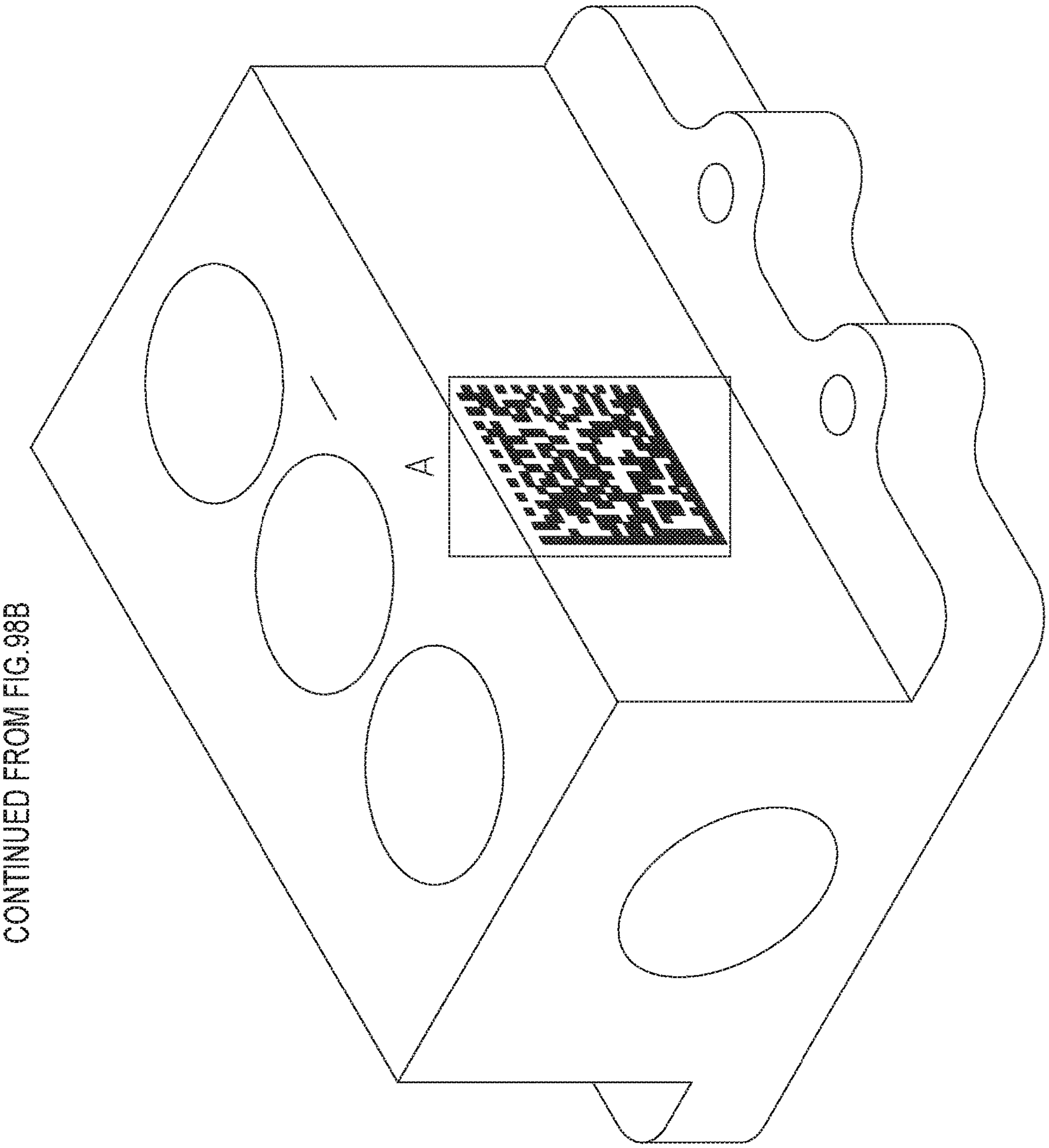
FIG.98D
CONTINUED FROM FIG.98C

CONTINUED FROM FIG.99A

CONTINUED ON FIG.99D

CONTINUED FROM FIG.99A

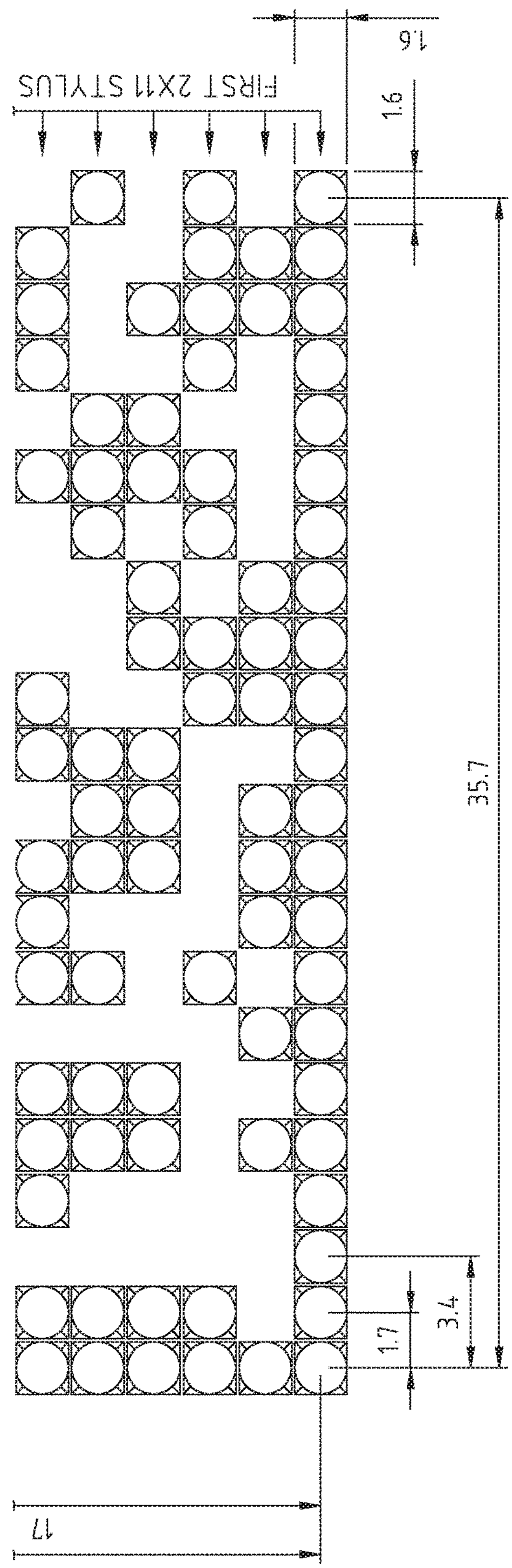

ORTHOGONAL HOLE 22 X 22 2D BARCODE PATTERN
DATA MATRIX ECC200 22X22 FORMAT ASCII ENCODING TEXT "22X22"
VIA ⌀0.8 SINGLE-FLUTE PROGRAMMABLE 2X11 STYLUSES PMSOET

Programmable 2X11 Stylus PMSOET 22X22 2D Barcode Round and Orthogonal Pattern
(Round and Orthogonal Hole 2D-Barcode ⌀ 0.8mm Multiple Single Flute Stylus)
Via 22 Cycles of 2X11 Binary Character Patterns for the Selectable Character Multiple Stylus
Orbital Engraving Tool's Typical Components and Assembly

FIG.99C

CONTINUED FROM FIG.99B
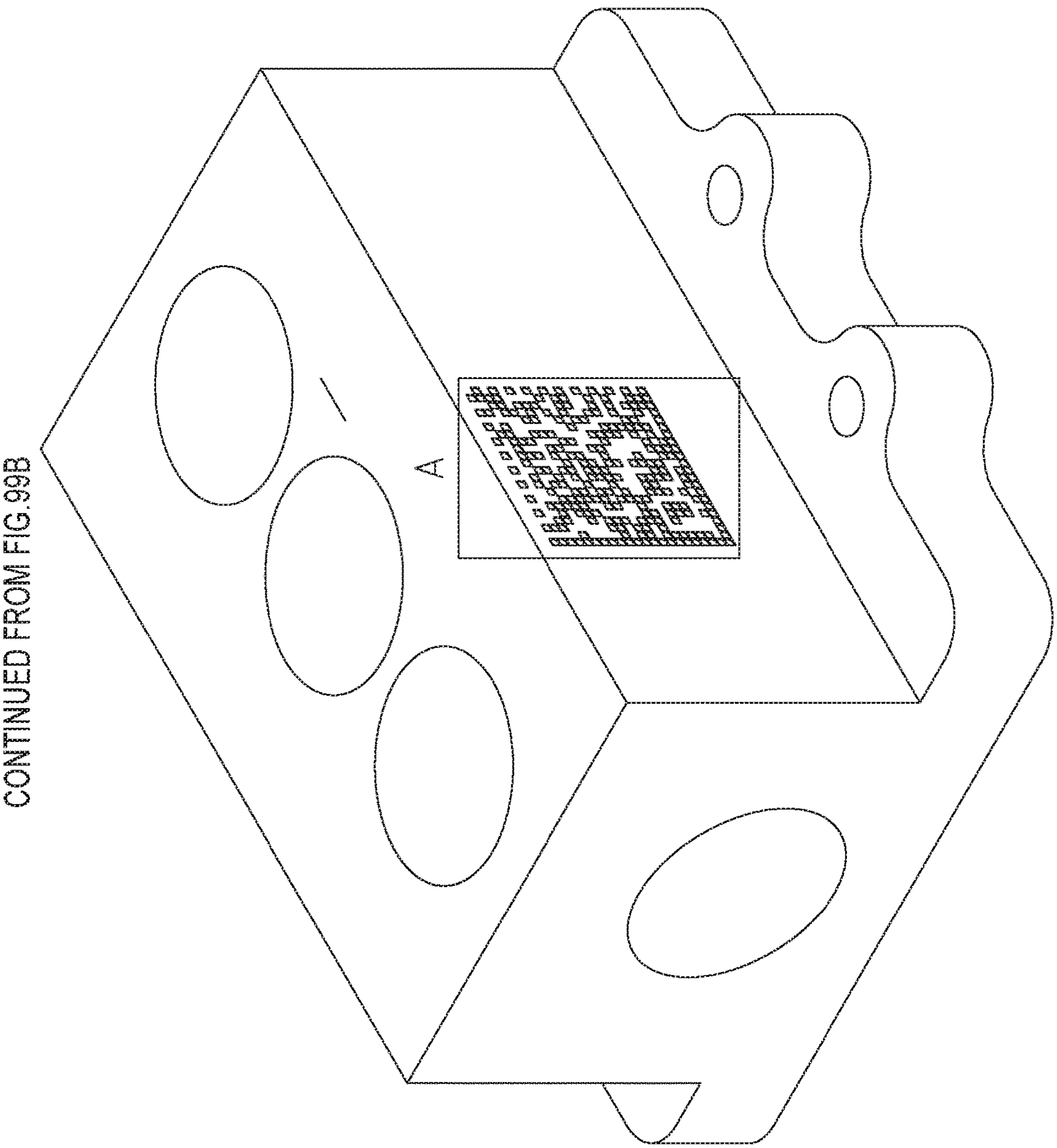
FIG.99D
CONTINUED FROM FIG.99C

Figure-100

METHOD AND APPARATUS FOR ENCODING DATA ON A WORK PIECE

CROSS-REFERENCE TO RELATED APPLICATIONS

This application is a divisional of U.S. patent application Ser. No. 14/875,284, filed Oct. 5, 2015, which claims the benefit of U.S. Provisional Application No. 62/059,692, filed Oct. 3, 2014, the disclosure of which is hereby incorporated by reference in its entirety. This application is related to U.S. patent application Ser. No. 14/875,239, titled "MULTI-STYLUS ORBITAL ENGRAVING TOOL," filed Oct. 5, 2015, and which is hereby incorporated by reference in its entirety. This application is related to U.S. patent application Ser. No. 14/875,317, titled "SPINDLE MOUNTABLE CAMERA SYSTEM," filed Oct. 5, 2015, and which is hereby incorporated by reference in its entirety.

BACKGROUND

The identification means of work pieces utilized for its identification and traceability throughout the manufacturing process and product life cycle has become a necessity for the high productivity required by the increasingly competitive global manufacturing operations having multiple part variants within a products' family, using multiple work-piece part work holding fixtures, and at multiple manufacturing locations, being produced via sequential machining-manufacturing operations, and manufacturing processes. As the work-piece part's identification data is frequently required by the Manufacturer's Quality Plan, Industrial Standards Organizations, Regulatory Agencies, customer(s) specifications, etc., such as for patient specific replacement(s), the work-piece part's design revisions, the product's assembly of multiple work-piece parts having a combined tolerance stack-up, a work-piece part's/Article's certificate of origin, Department of Defense components, product recall campaigns, forensic identification, etc.

Traditional Direct Part Marking Via the Manual Direct Work-Piece Marking and Identification via Impacting Stamps Manual work-piece direct part marking may not be desirable, and or suitable, for most modern manufacturing processes. Because it is susceptible to human error(s) for correctly marking the work-piece part/article, with errors negating the intended purpose of the work-piece parts'/articles' identification, and potentially injurious to personnel, via using a hammer to impact the hardened steel character forming stamp(s) onto the work piece's surface, to a semi-controlled depth, to indent and displace the surface material of the work-piece part/article to create a readable character and or symbol causing the displaced material to project above the previously smooth surface.

As a Secondary Operation via the Semi-Automatic Direct Work-Piece Marking and Identification Semi-automatic work-piece direct part marking can be done as a secondary operation to the primary manufacturing process that may not be desirable, and or suitable, for manufacturing processes that requires integrity of the data because it is susceptible to error(s) for correctly marking the corresponding work-piece part/article with the required data, with errors negating the intended purpose of the work-piece part's/article's identification.

Automatic Point-of-Manufacture Work-Piece Marking and Identification

Automatic point-of-manufacture work-piece part/article engraving for marking/identification minimizes the opportunities for data error(s) and eliminates the potential for injuring personnel.

Automatic point-of-manufacture Work-piece Engraving is desirable at the point of manufacturing the work-piece part/article because of its being an integral operation of the production process to ensure the product's work-piece part/article marking and identification data integrity.

Automatic Work-piece Engraving is desirable to reduce the operator's potential for injury by eliminating the use of having to manually impact the hardened character forming stamp(s) against the work-piece part/article.

Existing Engraving Methods:

Currently, there are two common methodologies for Automatic point-of-manufacture direct work-piece marking spindle tooling used within Computer Numerically Controlled (CNC) Machine Tools, both having a different single point tool for either cutting material from the work-piece surface or impacting the work-piece part/article to indent and displace the work-piece part's/article's base material to create a readable character and or symbol:

Single Point Cutting Tools:

Cutting material from the work-piece surface using one rotating fluted cutting tool being plunged into the work-piece to a specific depth for the tool's cutting land(s) to remove the material from the work-piece surface while it's being moved parallel to the work-piece part's/article's surface by the motion of the CNC machine tool, to "write" the segments of a character via the removed material of the work piece's cutout profile cross section at specific location(s) and or along a path of lines and or curves on the work-piece part's surface to engrave a readable character and or symbol.

Single Point Impacting Tools:

Impacting via the "dot-peen" or scribing via the "Square-Dot" methodologies onto the work-piece part to indent and displace the work-piece material using a percussion motion to plunge a single point stylus into the work-piece to a depth to displace the material of the work piece's surface with the tool being lifted from the work-piece part's/article's surface as the tool is being moved parallel to the work-piece surface by the CNC machine tool to the next specific location(s) to "write" the character via the visually contiguous/adjacent pointed stylus at a specific location(s) or along a path of lines and or curves on the work-piece part's surface making a readable character and or symbol.

Multiple Point Impacting Tools:

Impacting the work-piece to indent and displace the work-piece material using a percussion motion to plunge multiple single point styluses into the work-piece to a depth to displace the material of the work piece's surface with the tool being lifted from the work-piece surface to "write" the next character via the visually contiguous/adjacent multiple pointed styluses impact "dots or dot-peen" at a specific location(s), or along a path of lines and or curves on the work-piece part's surface making a readable character and or symbol.

Disadvantages of the Existing Work-Piece Part Engraving Methods:

Both of the single stylus direct part marking processes described above have the same initial limitation for the Automatic point-of-manufacture work-piece direct part marking and identification operation, as that of being a time consuming operation for an expensive machine tool and manufacturing process via being constrained by their respective single point tooling for the work-piece part's surface material displacement.

The higher manufacturing costs and reduced tool life for the rotating Cutting tool method of engraving are comparable to the standard single point CNC cutting tools.

The Impacting pointed stylus direct part marking devices are more expensive and potentially damaging to the CNC machine tool's precision spindle bearings. While the smoothness of the work-piece surface is disrupted by the impacting of the pointed stylus potentially affecting its assembly to an adjacent work-piece part, while the displaced work-piece surface material can become a source of contamination in the application of the work-piece part(s) in its assembly.

Disadvantages of Marking Inks and Printed Labels:

The use of a "permanent" marking pens and inks to mark/identify the work-piece has multiple limitations such as:

A) The manual method of pen marking the readable character and or symbol to the corresponding work-piece part is subject to human operator error and the readers' interpretation of the data.

B) The marking ink may not adhere to the machined work-piece part's surface because of the machine tool's cutting fluid and or protective coating on the work-piece part.

C) The vibratory fluidic and or aggregate stone processes used to de-burr/remove the sharp edges of the machined work-piece part can also remove the marking ink from the work piece, requiring the remarking of the work-piece after its de-burring operation.

D) The agitated and or high pressure washing and rinsing processing operation(s) of the machined work-piece part can remove the marking ink from the work-piece part.

E) The corrosion resistant/preservative coating fluid used for storing and shipping the work-piece part can remove the marking ink from the work-piece part.

F) The marking ink may need to be removed from the work-piece part at the components' assembly point to prevent contamination of the assembled product.

G) The marking ink would not be readily detectable on the work-piece part beneath the assembled components' painted surface.

H) The initial marking ink's information prior to the machining operation may be critical to the documentation required for the traceability of the work-piece part and its data that may need to be captured before its removal from the work-piece part.

I) The marking ink's information after the machining operation may be critical to the documentation required for the traceability of the work-piece part and its data that may need to be captured before its removal from the work-piece part.

The use of an adhesive backed printed label to mark/identify the work-piece has multiple limitations such as:

A) The manual application of the correct adhesive backed printed label to the corresponding work-piece part is subject to human operator error.

B) The adhesive backed printed label may not adhere to the machined work-piece part because of the machine tool's cutting fluid on the work-piece part.

C) The vibratory fluidic and or aggregate stone processes used to de-burr/remove the sharp edges of the machined work-piece part can also remove the adhesive backed printed label from the work-piece part.

D) The agitated and or high pressure washing and rinsing processing operation(s) of the machined work-piece part can also remove the adhesive backed printed label from the work-piece part.

E) The corrosion resistant/preservative coating fluid used for storing and shipping the work-piece part can remove the adhesive backed printed label from the work-piece part.

F) The adhesive backed printed label may need to be removed from the work-piece part for the assembly of the components as required to prevent contamination of the assembled product part.

G) The adhesive backed printed label may need to be removed from the work-piece part for the assembly of the components as required for the proper fit-up with the adjacent components.

H) The adhesive backed printed label may need to be removed from the work-piece part after the components' assembly to facilitate painting.

I) The adhesive backed printed label would not be readily detectable beneath the surface of the components' painted surface.

J) The initial printed label's information prior to the machining operation may be critical to the documentation required for the traceability of the work-piece part and its data that may need to be captured before its removal from the work-piece part.

K) The printed label's information after the machining operation may be critical to the documentation required for the traceability of the work-piece part and its data that may need to be captured before its removal from the work-piece part.

Considerations for the productive machining of work piece parts and the increased necessity for the automatic point-of-manufacture Direct Work-piece Marking and Identification:

The automatic point-of-manufacture direct work-piece part marking operation is an additional machining operation that requires its minimization to reduce the CNC machine's overall cycle time to a minimum, as the cost basis for CNC Machining is a combination of cost effective equipment utilization, the quality, and the quantity of work-piece parts/articles being produced in the shortest time possible.

A. The higher quantity of work-piece parts increases the opportunities for manual work-piece part marking operation errors and operator injuries using impacting stamps.

B. The higher productivity of the high speed/high production output advanced machine tools' increases the opportunities for manufacturing defects via increasing the quantity of defective work-piece parts that could be produced in a shorter time span.

C. The higher productivity of machine tools increases the quantity of work-piece parts that need to be identified via the work-piece part marking operation of the manufacturing process.

D. The higher productivity of the high speed machining for advanced machine tools can be attributed to a combination of advances in (a) cutting tool technologies (materials, designs, & coatings) to facilitate rough machining in only one pass for the maximum work-piece material stock removal and then using the same cutting tool for the finishing pass for a "mirror like" surface finish or one pass for the maximum work-piece material stock removal and simultaneously producing a "mirror like" surface finish, (b) the higher speed computer processors, digital inputs, and outputs directly increasing the speed of the machine tools' driven axes and spindles, (c) the improved machine tool designs' utilization of full-time pressure lubricated recirculating bearings ways, ceramic elements, closed loop liquid temperature management, and thermal compensating algorithms to manage its heat generating mechanisms, (d) the machine tools' NC-Programming productivity simulation software and "chip thinning" machining methodologies being utilized to increase cutting feed rates within a tool's operational machining path, etc.

E. The high speed machining of multiple work-piece parts causes heating of the work-piece part that in turn causes dimensional changes from work-piece to work-piece over a period of time and or within a group of multiple work-piece parts being machined via the same machining cycle.

F. The machining of work pieces, especially at high speed, causes heating of the work-piece that causes dimensional changes from work-piece to work-piece over a period of time being caused by changing ambient and work-piece temperatures and the stress-relief/normalization caused by the removal of the raw work-piece material. This can necessitate the Coordinate Measurement Machine's dimensional inspection of the machined work-piece part being delayed, 22 hours or more for some applications.

G. The higher productivity of high speed machining increases the opportunities for manufacturing defects via increasing the thermal dimensional changes of the finished work pieces. These errors are corrected by the Coordinate Measurement Machine's dimensional inspection of the work-piece part(s) having been machined at a specific time and fixture location(s), then using the corresponding work piece's CMM inspection data for correcting the corresponding machine tools' work-piece part machining NC-Program as required. The improved high speed machining of aluminum work-piece parts has resulted in the machining cycle time for 4 parts being machined in one operation on 2 sides being reduced from 97 minutes when the manufacturing operations were developed in the 1990s, to 9:36 minutes in 2013 via the NC-Program 00602.

H. The dimensional changes of the finished work-piece part caused by thermal changes during machining can be combined with those caused by the stress-relief/normalization of the raw work-piece material that are then corrected by the Coordinate Measurement Machine's dimensional inspection of the work-piece part having been machined at a specific time and fixture location(s), then using the corresponding work piece's CMM inspection data for correcting the corresponding machine tools' work-piece part machining NC-Program as required. The improved high speed 6 sided machining of one cast iron work-piece part "317" has resulted in the machining cycle time being reduced from 390 minutes being done via 4 machining operations on a 4 work-piece part locating fixtures on 3 different CNC machines when the manufacturing process was developed in the 1990s, to 112 minutes on 2 work-piece part locating fixtures on 1 CNC machine in 2011 via the NC-Programs O3170, O3171, and O3173.

I. The specific work-piece part being sequentially machined at specific location(s) of a high density multiple position work-piece holding fixture need to be uniquely and correctly identified to facilitate that work-piece parts' correct sequential transfer to the next subsequent machining location(s) of the fixture and for the appropriate and corresponding corrective action(s).

J. The multiple sources and suppliers for the incoming raw work-piece parts to be machined increases the opportunities for manufacturing defects via the increasing variability of the raw work-piece parts coming from multiple casting patterns and or suppliers such as those having a specific date stamp identification for a specific group of raw work-piece parts and or having various suppliers for those work-piece parts.

K. Multiple work-piece parts having been potentially machined at numerous locations of a multiple position work-piece holding fixture, having the variables as in paragraph J above, will need to be uniquely and correctly identified to facilitate the corresponding work-piece parts' correlation to the specific machine tool(s) used for machining, the cutting tool(s) that were used, and the specific location(s) of the work holding fixture(s) for the corresponding corrective action(s) that may be required for that specific work-piece part.

L. The cell of multiple automatic machine tools, which includes the transferring of multiple pre-loaded work pieces pallets, and the machine tools' specific pre-installed initial and sometimes multiple backup tools that are automatically selected after the initial tools' specific operational usage limit is reached to facilitate automated manufacturing operations, relies on the tracking and serialization data of the work-piece parts for the traceability of defects and for the corresponding corrective action(s).

M. The automatic point-of-manufacture direct work-piece part marking/engraving operation within the machine tool becomes a portion of the machine's cycle time, increasing the machine's overall cycle time, and increases the machining cost of the work-piece part/article.

However, the total manufacturing costs for the high productivity sequential machining of multiple work-piece parts will increase when the shorter cycle time of not marking the work-piece parts causes the erroneous sequential transferring of work-piece parts between the sequential machining operations and the increased difficulty for the root cause defect analysis and the corresponding corrective action required for eliminating defective and out of tolerance work pieces. The sequential machining of multiple work-piece parts, correctly via multiple operations, can be dependent upon using the same manual transfer sequence for the work-piece parts from one of the previous sequential work-piece parts' fixture location to the next sequential work-piece parts' fixture location for the next machining/manufacturing operation.

SUMMARY

This Summary is provided to introduce a selection of concepts in a simplified form that are further described below in the Detailed Description. This Summary, and the foregoing Background, is not intended to identify key aspects or essential aspects of the claimed subject matter. Moreover, this Summary is not intended for use as an aid in determining the scope of the claimed subject matter.

Methods for encoding data on a work piece are disclosed. In an embodiment, the method includes engraving a plurality of first features (e.g., circular features) on the work piece, wherein the plurality of first features are arranged in a first pattern (e.g., number or character). The method also includes engraving a plurality of second features (e.g., rings)

on the work piece within a selected one of the plurality of first features. The plurality of second features are arranged in a second pattern according to a data encoding schema such as binary code or code 39. Thus, a serial number can be engraved on a work piece in dot matrix format wherein each dot (i.e., circular feature) is encoded with a pattern of rings corresponding to encoded data.

Engraving tools for encoding data on a work piece are also disclosed. In an embodiment, the engraving tool includes an elongated shaft extending along a shaft axis between a first end portion and a second end portion. One or more cutting edges are disposed on the second end portion. Selected ones of the one or more cutting edges include a plurality of notches arranged to form a pattern on a work piece according to a data encoding schema when the one or more cutting edges are moved (e.g., rotated) against the work piece.

These and other aspects of the present system and method will be apparent after consideration of the Detailed Description and Figures herein. It is to be understood, however, that the scope of the invention shall be determined by the claims as issued and not by whether given subject matter addresses any or all issues noted in the Background or includes any features or aspects recited in this Summary.

DRAWINGS

Non-limiting and non-exhaustive embodiments of the present invention, including the preferred embodiment, are described with reference to the following figures, wherein like reference numerals refer to like parts throughout the various views unless otherwise specified.

FIGS. 1A-1F partial table for the 20-bit Binary land pattern for the round hole land encoding position-binary-and-decimal values.

FIG. 2 Work piece value-encoded-land round-hole engraved example MOSET-MSOET encoded 5 holes for the Character-1.

FIG. 3 value-encoded-land round-hole engraved example MOSET-MSOET encoded 13 holes for the Character-8.

FIG. 4 262129-value encoded land Ø0.8 single point stylus part-77.

FIG. 5 262130-value encoded land Ø0.8 single point stylus part-77.

FIG. 6 262131-value encoded land Ø0.8 single point stylus part-77.

FIG. 7 262132-value encoded land Ø0.8 single point stylus part-77.

FIG. 8 262133-value encoded land Ø0.8 single point stylus part-77.

FIG. 9 262134-value encoded land Ø0.8 single point stylus part-77.

FIG. 10 262135-value encoded land Ø0.8 single point stylus part-77.

FIG. 11 262136-value encoded land Ø0.8 single point stylus part-77.

FIG. 12 262137-value encoded land Ø0.8 single point stylus part-77.

FIG. 13 262138-value encoded land Ø0.8 single point stylus part-77.

FIG. 14 262139-value encoded land Ø0.8 single point stylus part-77.

FIG. 15 262140-value encoded land Ø0.8 single point stylus part-77.

FIG. 16 262141-value encoded land Ø0.8 single point stylus part-77.

FIG. 17 262142-value encoded land Ø0.8 single point stylus part-77.

FIG. 18 262143-value encoded land Ø0.8 single point stylus part-77.

For the encoded land detail Code 39 Encodation features as shown by:

FIGS. 19A-19F Code 39 Encodation patterns for 44 alphabetic, numeric, and graphic Characters.

FIG. 20 Code-39 encoded-land round-hole engraved example MOSET-MSOET encoded 13 holes for the Character-8.

FIG. 21 Code-39 encoded-land round-hole engraved example MOSET-MSOET encoded 5 holes for the Character-1.

FIG. 22 Code-39 encoded-land round-hole engraved example MOSET-MSOET encoded 5 holes for the binary-31.

FIG. 23 Code 39 encoded land Ø0.8 single point stylus part-77.

FIG. 24 Code 39 2 encoded land Ø0.8 single point stylus part-77.

FIG. 25 Code 39 3 encoded land Ø0.8 single point stylus part-77.

FIG. 26 Code 39 4 encoded land Ø0.8 single point stylus part-77.

FIG. 27 Code 39 5 encoded land Ø0.8 single point stylus part-77.

FIG. 28 Code 39 6 encoded land Ø0.8 single point stylus part-77.

FIG. 29 Code 39 7 encoded land Ø0.8 single point stylus part-77.

FIG. 30 Code 39 8 encoded land Ø0.8 single point stylus part-77.

FIG. 31 Code 39 9 encoded land Ø0.8 single point stylus part-77.

FIG. 32 Code 39 0 encoded land Ø0.8 single point stylus part-77.

FIG. 33 Code 39 A encoded land Ø0.8 single point stylus part-77.

FIG. 34 Code 39 B encoded land Ø0.8 single point stylus part-77.

FIG. 35 Code 39 C encoded land Ø0.8 single point stylus part-77.

FIG. 36 Code 39 D encoded land Ø0.8 single point stylus part-77.

FIG. 37 Code 39 E encoded land Ø0.8 single point stylus part-77.

FIG. 38 Code 39 F encoded land Ø0.8 single point stylus part-77.

FIG. 39 Code 39 G encoded land Ø0.8 single point stylus part-77.

FIG. 40 Code 39 H encoded land Ø0.8 single point stylus part-77.

FIG. 41 Code 39 I encoded land Ø0.8 single point stylus part-77.

FIG. 42 Code 39 J encoded land Ø0.8 single point stylus part-77.

FIG. 43 Code 39 K encoded land Ø0.8 single point stylus part-77.

FIG. 44 Code 39 L encoded land Ø0.8 single point stylus part-77.

FIG. 45 Code 39 M encoded land Ø0.8 single point stylus part-77.

FIG. 46 Code 39 N encoded land Ø0.8 single point stylus part-77.

FIG. 47 Code 39 O encoded land Ø0.8 single point stylus part-77.

FIG. 48 Code 39 P encoded land Ø0.8 single point stylus part-77.

FIG. 49 Code 39 Q encoded land Ø0.8 single point stylus part-77.

FIG. 50 Code 39 R encoded land Ø0.8 single point stylus part-77.

FIG. 51 Code 39 S encoded land Ø0.8 single point stylus part-77.

FIG. 52 Code 39 T encoded land Ø0.8 single point stylus part-77.

FIG. 53 Code 39 U encoded land Ø0.8 single point stylus part-77.

FIG. 54 Code 39 V encoded land Ø0.8 single point stylus part-77.

FIG. 55 Code 39 W encoded land Ø0.8 single point stylus part-77.

FIG. 56 Code 39 X encoded land Ø0.8 single point stylus part-77.

FIG. 57 Code 39 Y encoded land Ø0.8 single point stylus part-77.

FIG. 58 Code 39 Z encoded land Ø0.8 single point stylus part-77.

FIG. 59 Code 39 MINUS encoded land Ø0.8 single point stylus part-77.

FIG. 60 Code 39 PERIOD encoded land Ø0.8 single point stylus part-77.

FIG. 61 Code 39 SPACE encoded land Ø0.8 single point stylus part-77.

FIG. 62 Code 39 ASTERISK encoded land Ø0.8 single point stylus part-77.

FIG. 63 Code 39 $ USD encoded land Ø0.8 single point stylus part-77.

FIG. 64 Code 39 DIVIDE encoded land Ø0.8 single point stylus part-77.

FIG. 65 Code 39 PLUS encoded land Ø0.8 single point stylus part-77.

FIG. 66 Code 39 PERCENT encoded land Ø0.8 single point stylus part-77.

FIGS. 67A-67F partial table for the 9-bit land pattern for the round hole land encoding via the concentric ring pattern's binary and decimal values.

FIGS. 68A-68D for the Ø0.8 mm part-77×0.2×9 for the 9-bit land pattern 127-encoded-value for the 9-land encoded 2-flute offset-orbit stylus-drill.

FIGS. 69A-69D for the Ø0.8 mm drill part 277×9 for the 9-bit land pattern 127-encoded-value for the 9-land encoded 2-flute straight drill.

FIG. 70 Work piece—Article enclosure assembly using the encoded land drill point of a multiple flute drill for the bottom of the fastener hole detail for identification and traceability.

FIGS. 71A-71R partial table for the drill hole identification of the 52-bit encoded land's binary and decimal values.

FIG. 72 The Ø5.0 mm 52-bit encoded land multi flute drill orthogonal views.

FIG. 73 The 52-bit encoded land multi flute drill isometric views.

FIG. 74 The Ø5.0 mm 52-bit encoded land multi flute drill detail views.

FIG. 75 Work piece—Article having the MOSET-MSOET value-encoded-land's 5 round-holes for the binary-31.

FIG. 76 Detail of the worn outer-ref to bit-2 of the 262134-value encoded land Ø0.8 single point stylus part-77.

FIG. 77 Work piece—Article having the worn outer-ref to bit-2 lands of the value-encoded-land's stylus 5 of the 5 round-holes for the binary-31 via the MOSET-MSOET.

FIG. 78 Work piece—Article having the worn outer-ref to bit-2 lands of the value-encoded-land's stylus 5 of the 5 round-holes for the Character-1 via the MOSET-MSOET.

FIG. 79 Detail of the worn bit-3 to bit-5 of the 262134-value encoded land Ø0.8 single point stylus part-77.

FIG. 80 Work piece—Article having the worn bit-3 to bit-5 lands of the value-encoded-land's stylus 5 of the 5 round-holes for the binary-31 via the MOSET-MSOET.

FIG. 81 Work piece—Article having the worn bit-3 to bit-5 lands of the value-encoded-land's stylus 5 of the 5 round-holes for the Character-1 via the MOSET-MSOET.

FIG. 82 Detail of the worn outer-ref to bit-2 and bit-3 to bit-5 of the 262134-value encoded land Ø0.8 single point stylus part-77.

FIG. 83 Work piece—Article having the worn outer-ref to bit-2 and bit-3 to bit-5 lands of the value-encoded-land's stylus 5 of the 5 round-holes for the binary-31 via the MOSET-MSOET.

FIG. 84 Work piece—Article having the worn outer-ref to bit-2 and bit-3 to bit-5 lands of the value-encoded-land's stylus 5 of the 5 round-holes for the Character-1 via the MOSET-MSOET.

FIG. 85 Indexable insert part number SPGX070308hp having the 52-bit encoded land using the Encodation Table of FIGS. 71A-71R for Work piece—Article identification and traceability via an indexable drilling operation.

FIG. 86 Indexable drill using the indexable insert part number SPGX070308hp having the 52-bit encoded land using the Encodation Table of FIGS. 71A-71R for Work piece—Article identification and traceability via an indexable drilling operation.

FIG. 87 for the cross-section view of the encoded-land round-hole engraved example work piece/article for the Code 39's asterisk character having the encoded land's full arc ring details.

FIG. 88 for the cross-section view of the encoded-land round-hole engraved example work piece/article for the Code 39's asterisk character having the encoded land's partial-arc/"flat" ridged details.

FIG. 89 for the cross-section views of the casting/molding pattern having the engraved encoded-land round-hole for the encoded land's full arc ring details and the corresponding cast/molded example work piece/article for the Code 39's asterisk character having the encoded land's full arc ring details.

FIG. 90 for the cross-section views of the casting/molding pattern having the engraved encoded-land round-hole for the encoded land's partial-arc/"flat" ridged ring details and the corresponding cast/molded example work piece/article for the Code 39's asterisk character having the encoded land's partial-arc/"flat" ridged ring details.

FIGS. 91A-91D Data Matrix 2D barcode via the 1×5 single-flute stylus MOSET-MSOET using the round-hole binary characters to engrave a 10×10 barcode symbol encoding the text "10×10".

FIGS. 92A-92D Encodation of the binary-31 character pattern via the 1×5 single-flute stylus detachable MOSET-MSOET using the 5 round-holes.

FIGS. 93A-93D Data Matrix 2D barcode via the 1×5 single-flute stylus MOSET-MSOET using the orthogonal-hole binary characters to engrave a 10×10 barcode symbol encoding the text "10×10".

FIGS. 94A-94C Component part 6.95—Ø0.8 detachable stylus guide for the 1×5 binary Ø0.8 single-flute stylus MOSET-MSOET.

FIGS. 95A-95D Data Matrix 2D barcode via the 1×5 2-flute offset-orbit stylus-drill stylus MOSET-MSOET using the round-hole binary characters to engrave a 10×10 barcode symbol encoding the text "10×10".

FIG. 96 Component part 6.95 detachable stylus guide for the 1×5 binary 2-flute offset-orbit stylus-drill.

FIGS. 97A-97D Data Matrix 2D barcode via the Programmable 2×11 single-flute stylus MOSET-MSOET using the round-hole binary characters to engrave a 22×22 barcode symbol encoding the text "22×22".

FIGS. 98A-98D Data Matrix 2D barcode via the Programmable 2×11 single-flute stylus MOSET-MSOET using the orthogonal-hole binary characters to engrave a 22×22 barcode symbol encoding the text "22×22".

FIGS. 99A-99D Data Matrix 2D barcode via the Programmable 2×11 single-flute stylus MOSET-MSOET using the combination round and orthogonal-hole binary characters to engrave a 22×22 barcode symbol encoding the text "22×22".

FIG. 100 is a character pattern example for the 2D Barcode using the Data Matrix ECC 200 format for the character string ABCDEFGHIJKLMNOPQRSTUVW using a 20×20 point pattern for 18×18 data points.

DETAILED DESCRIPTION

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense.

Methods for Encoding Data on a Work Piece:

With reference to FIGS. 2 and 3, methods for encoding data on a work piece are described according to a representative embodiment. In the depicted embodiment, a plurality of first features (e.g., circular features) are engraved on the work piece. In some embodiments, the circular features are concave or conical, e.g., corresponding to a point of a drill or an engraving tool. The circular features can be arranged in a first pattern (e.g., number or character). In some embodiments, the first pattern is a dot-matrix pattern used to form various numbers, characters, or symbols. For example, FIG. 2 illustrates a 3×5 dot-matrix numeral "1" and FIG. 3 illustrates a dot-matrix numeral "8". Each numeral can be part of a serial number engraved on the work piece. For example, FIG. 2 depicts a work piece engraved with serial number "+12345". Each dot or circular feature of the number pattern can be engraved with a plurality of second features (e.g., rings or ridges) on the work piece within a selected one of the plurality of first features. In some embodiments, each circular feature of the first pattern includes a set of rings. Each plurality of rings is arranged in a second pattern according to a data encoding schema such as binary code or code 39. For example, the top circular feature of numeral "1" shown in FIG. 2 is encoded with a value of 262,134 using a 20-bit data encoding schema (see FIGS. 1A-1F). Thus, a serial number can be engraved on a work piece in dot matrix format wherein each dot (i.e., circular feature) is encoded with a pattern of rings (also referred to herein as ring lands) corresponding to additional encoded data. Detail A illustrates that each ridge or ring corresponds to a bit in the 20-bit data encoding schema.

Engraving Tools for Encoding Data on a Work Piece:

With reference to FIGS. 4-18, engraving tools for encoding data on a work piece are described. In an embodiment, the engraving tool includes an elongated shaft extending along a shaft axis between a first end portion and a second end portion. One or more cutting edges are disposed on the second end portion. In the embodiment of FIG. 4, for example, the engraving tool is in the form of a single flute orbital stylus having one cutting edge. Selected ones of the one or more cutting edges include a plurality of notches arranged to form a pattern on a work piece according to a data encoding schema when the one or more cutting edges are moved (e.g., rotated) against a work piece. For example, the cutting edge of FIG. 4 includes a plurality of notches corresponding to the value 262,129 using the 20-bit data encoding schema shown in FIGS. 1A-1F. In other embodiments, the plurality of notches can correspond to a Code 39 encoding schema (see FIGS. 19A-66). In still other embodiments, the plurality of notches can correspond to a 9-bit encoding schema (see FIGS. 67A-67F).

As shown in FIGS. 68A-68D, for example, some embodiments include two cutting edges. In the embodiment of FIGS. 68A-68D, the engraving tool is in the form of a two-flute orbital stylus, wherein the two cutting edges are arranged at an angle with respect to the shaft axis whereby the cutting edges form a conical feature (e.g., drill point) when rotated against the work piece. In this embodiment, the drill point is axially offset from the axis of the shaft for use with an orbital engraving tool. It should be appreciated that the plurality of notches are arranged to form a pattern of ring lands within the conical feature. It should also be appreciated that engraving the ring lands and the conical feature occurs substantially simultaneously as they are both formed with a single tool. However, in other embodiments, separate tools can be used to form the circular features and the ring lands.

The disclosed engraving tools can be used with a Multiple Orbital Stylus Engraving Tool (MOSET), also referred to as a Multiple Stylus Orbital Engraving Tool (MSOET). The Selectable Character Multiple Stylus Orbital Engraving Tool is a multiple stylus engraving device, with the styluses being individually selectable, and operatively coupled to an orbital motion of the machine tool causing the selected stylus(es) to engrave in either a dot or dot-matrix pattern of alpha numeric and or symbol and or machine readable characters and or code.

The MOSET includes a housing that supports an array of the engraving tools described above (e.g., orbital styluses). A pattern disk is rotatably supported in the housing and is connectable to a spindle of the CNC machine. The pattern disk includes a plurality of hole patterns, each selectable via rotation of the spindle and including one or more clearance holes corresponding to a symbol. The array of styluses is positioned to confront a selected one of the plurality of hole patterns such that styluses corresponding to the clearance holes are retracted and the remaining styluses are extended. The extended styluses are operative to engrave the symbol corresponding to the selected hole pattern in a work piece via orbiting about a virtual axis of rotation when the selectable character engraving tool is moved in a circular motion by the CNC machine (see FIGS. 92A-92D). The MOSET is described further in U.S. patent application Ser. No. 14/875,239, titled "MULTI-STYLUS ORBITAL ENGRAVING TOOL," filed concurrently herewith, and which is hereby incorporated by reference in its entirety.

In at least one embodiment, the engraving tool can be in the form of a conventional drill bit or end mill that includes a plurality of notches that are arranged to form a pattern of ring lands according to binary code, code 39, or other code schema as explained herein. In some embodiments, such as shown in FIGS. 85 and 86, the engraving tool can include drill insert 1 mounted in an indexable drill body 3.

Machine Readable 2D Barcode:

Via either the Round or Orthogonal Hole Details using the 32 Character sets using 5 selectable styluses via 32 Pattern Disk Positions for an unlimited programmable dot-matrix pattern of machine readable characters creating a 2D Bar Code using the Pattern Disk Part 68.5 as shown in FIGS. 91A-96.

FIG. 100 is a character pattern example for the 2D Barcode using the Data Matrix ECC 200 format for the character string ABCDEFGHIJKLMNOPQRSTUVW using a 20×20 point pattern for 18×18 data points.

FIGS. 97A-97D shows the work piece's twenty-two by twenty-two 2-D barcode format consisting of the pattern for the round-hole engraved symbols being engraved by the multiple stylus orbital engraving tool of the previously incorporated U.S. patent application Ser. No. 14/875,239, titled "MULTI-STYLUS ORBITAL ENGRAVING TOOL," for the 2×11 programmable multiple stylus orbital engraving tool, via the engraving tool being sequentially operated in a sequential 22 engraving cycle pattern consisting of 11 columns and 2 rows.

FIGS. 98A-98D shows the work piece's twenty-two by twenty-two 2-D barcode format consisting of the pattern for the orthogonal-hole engraved symbols being engraved by the multiple stylus orbital engraving tool of the previously incorporated "MULTI-STYLUS ORBITAL ENGRAVING TOOL," for the 2×11 programmable multiple stylus orbital engraving tool, via the engraving tool being sequentially operated in a sequential 22 engraving cycle pattern consisting of 11 columns and 2 rows.

FIGS. 99A-99D shows the work piece's twenty-two by twenty-two 2-D barcode format consisting of the pattern for the combination round-hole and orthogonal-hole engraved symbols being engraved by the multiple stylus orbital engraving tool of the previously incorporated "MULTI-STYLUS ORBITAL ENGRAVING TOOL," for the 2×11 programmable multiple stylus orbital engraving tool, via the engraving tool being sequentially operated in a sequential 22 engraving cycle pattern consisting of 11 columns and 2 rows. With the capability for alternating the use of the round-hole and orthogonal-hole engraved symbols within the 2-D barcode for additional identification and/or differentiation.

Figure 20:
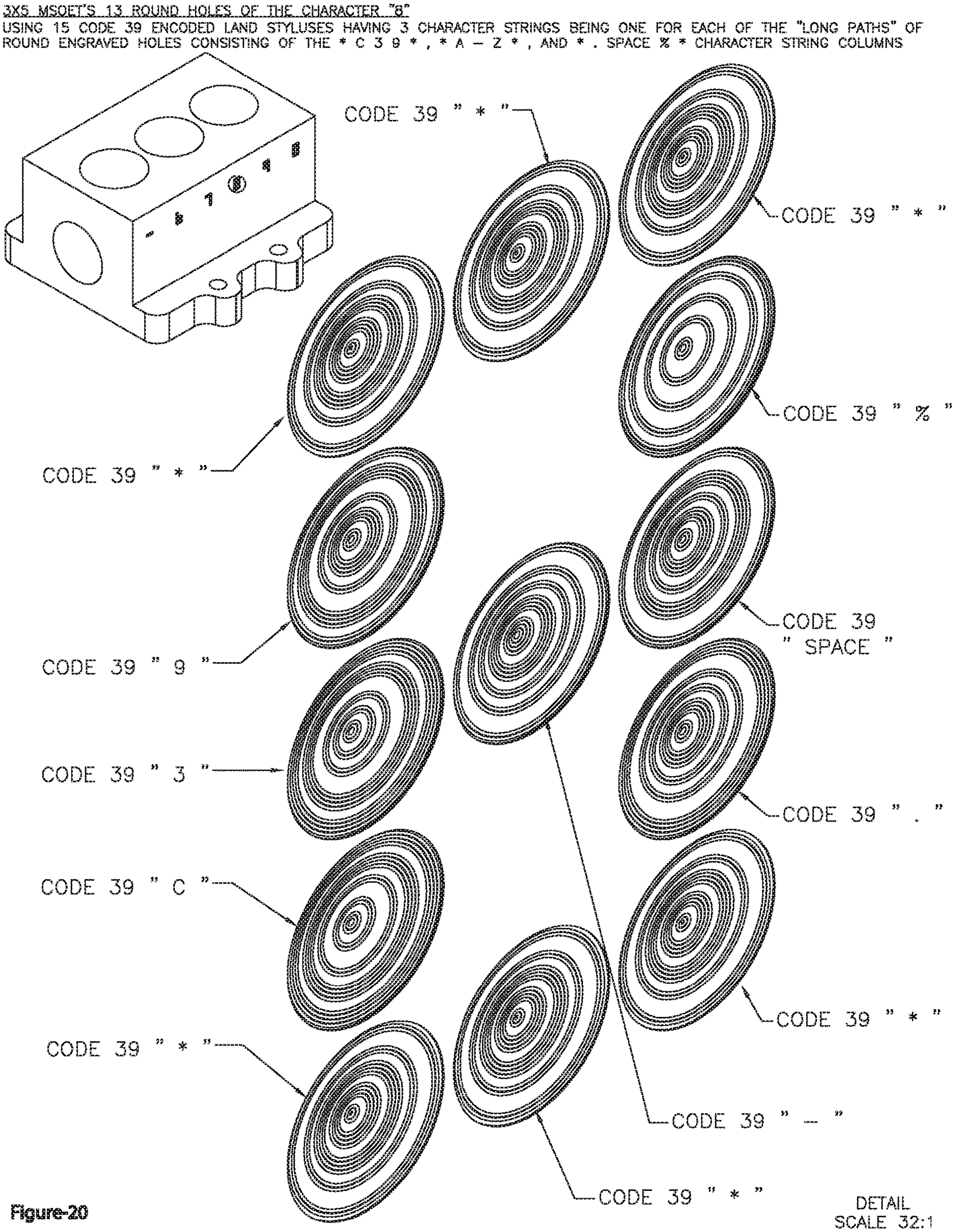
Figure 21:
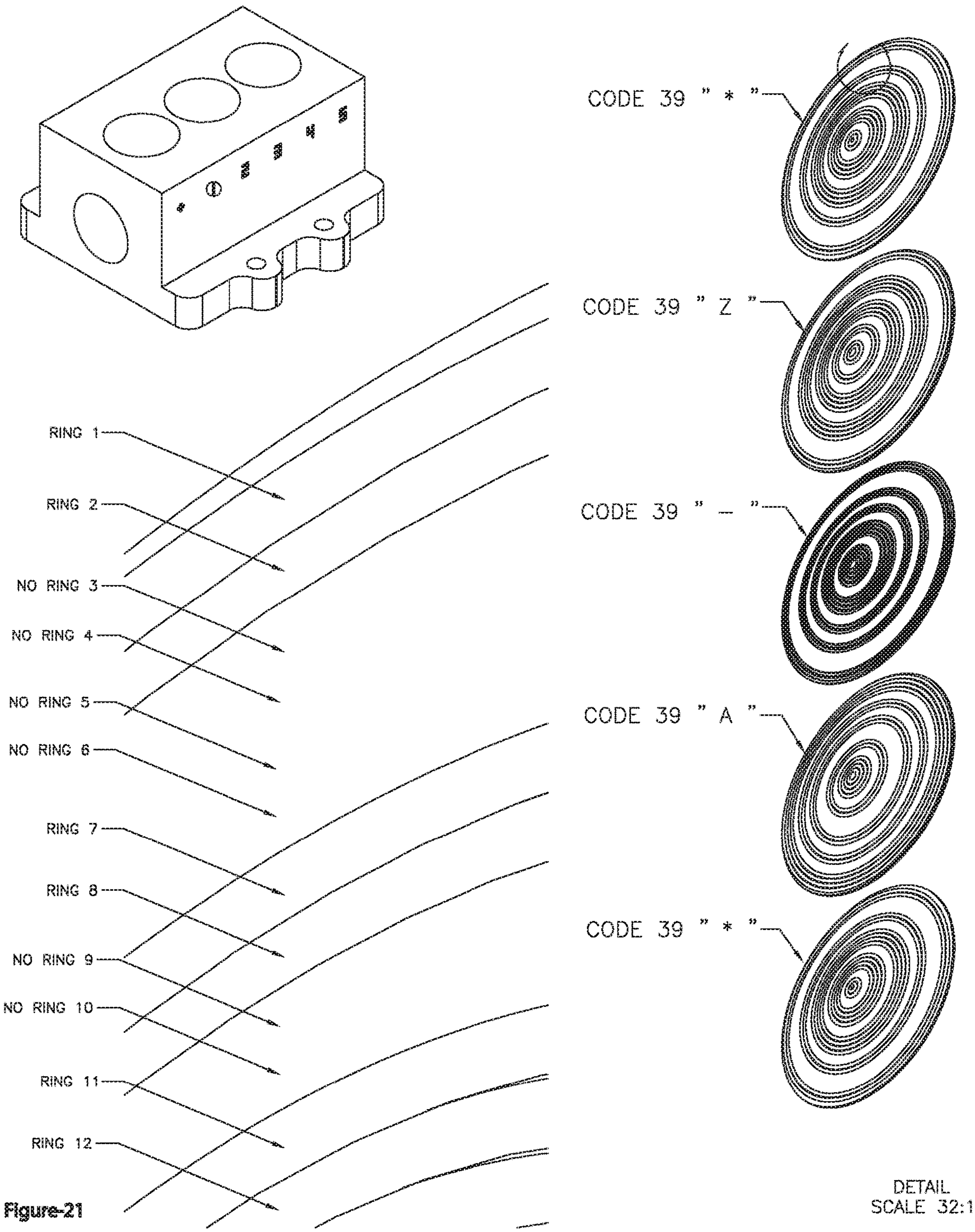
Figure 22:
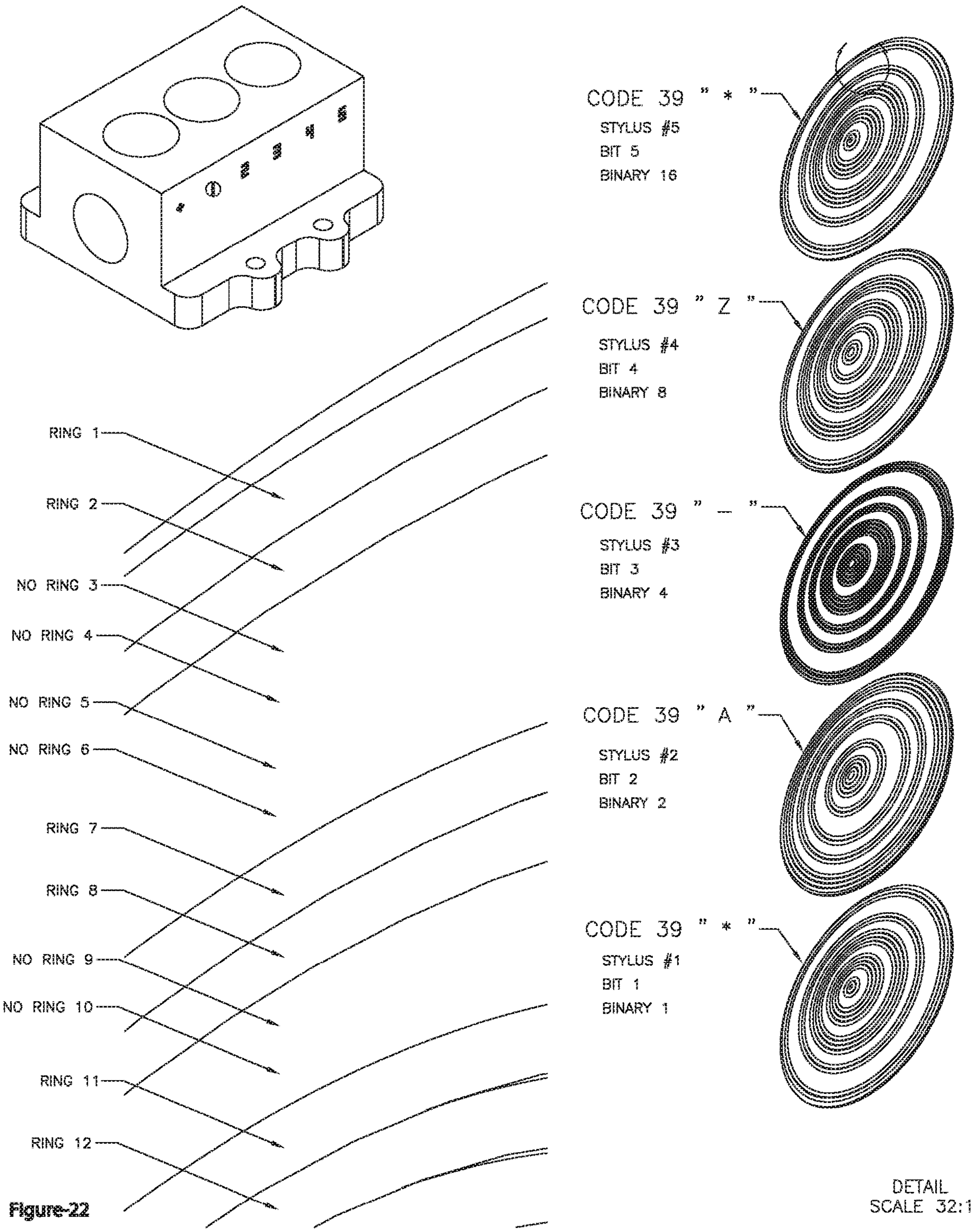
Figure 23:
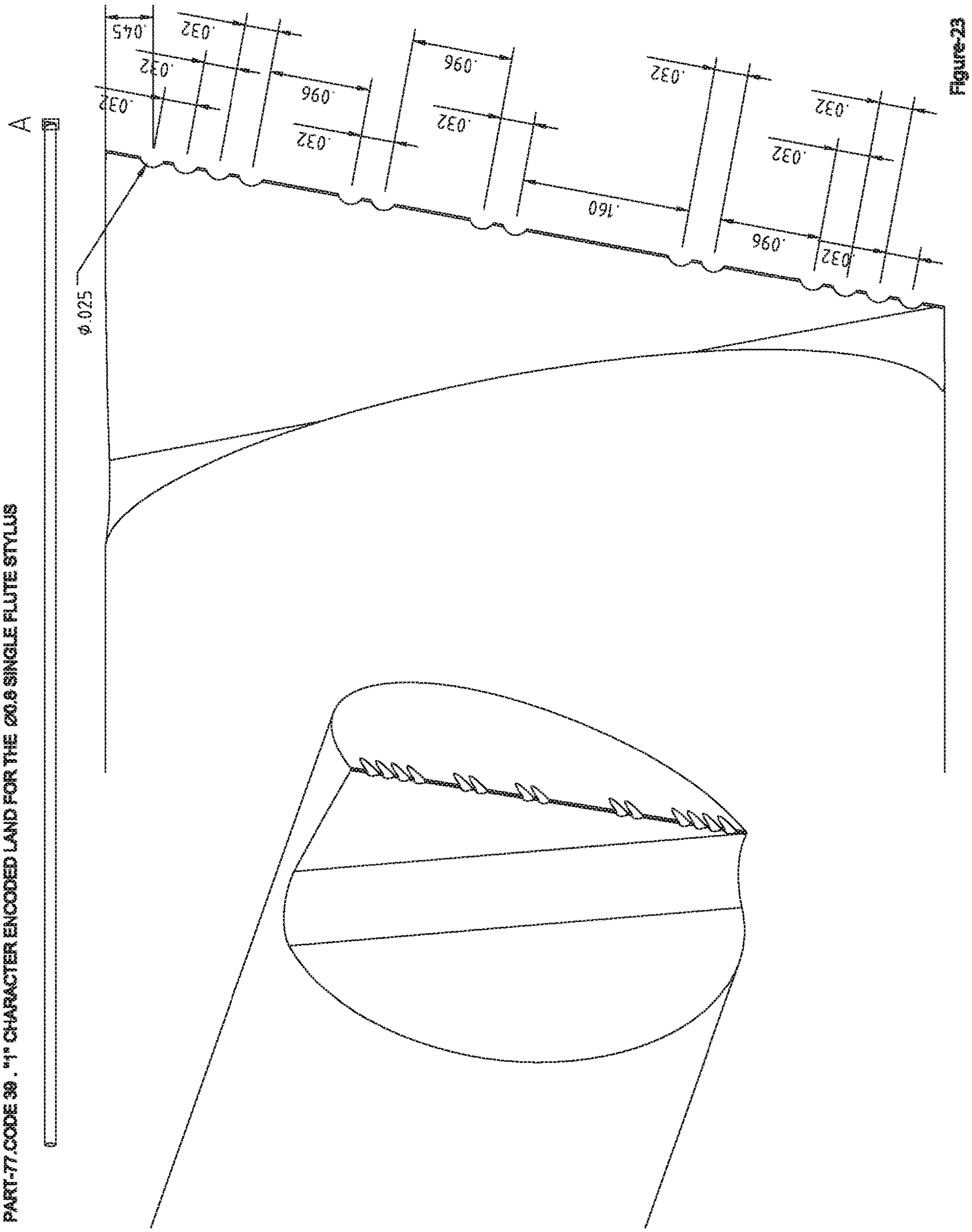
Figure 24:
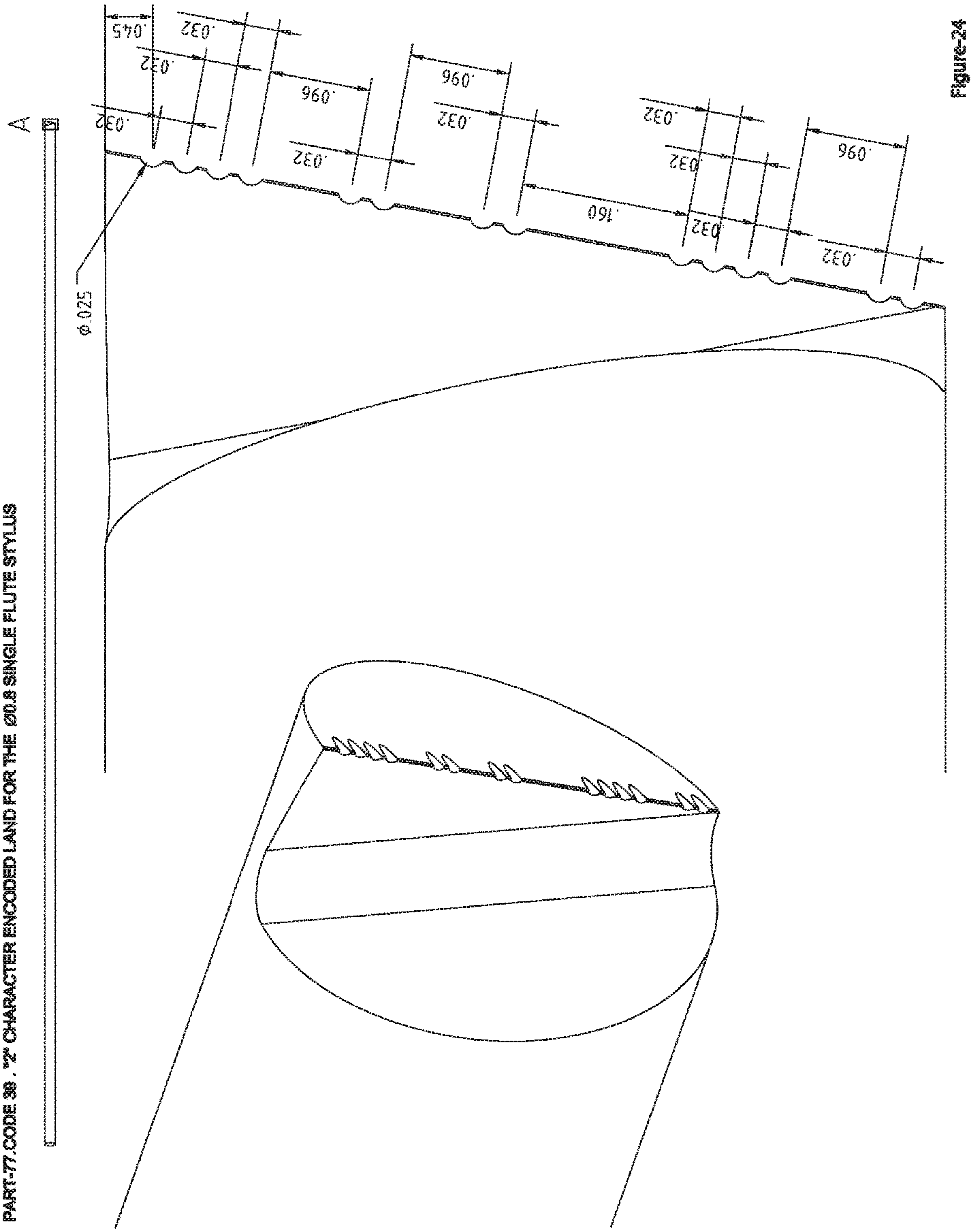
Figure 25:
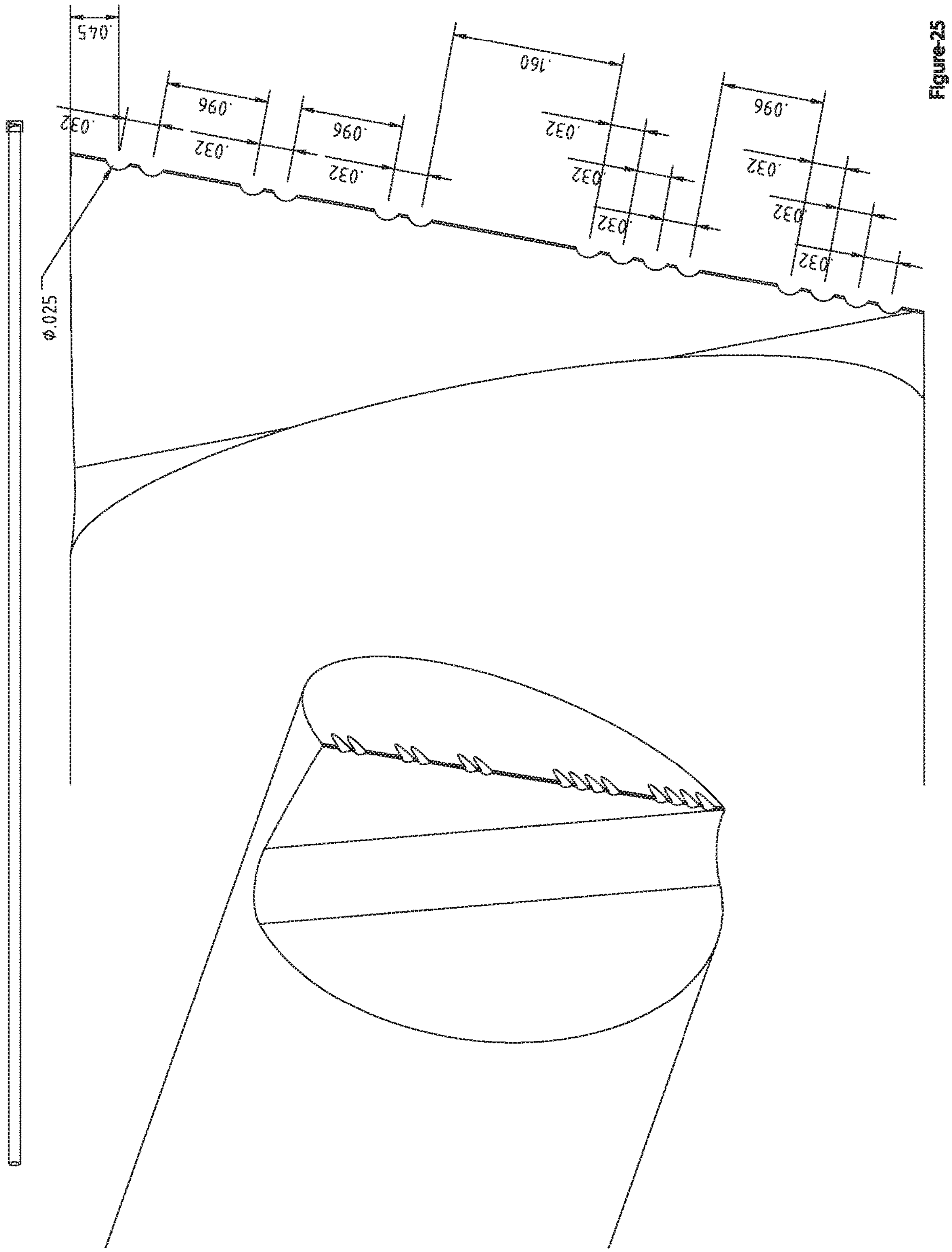
Figure 26:
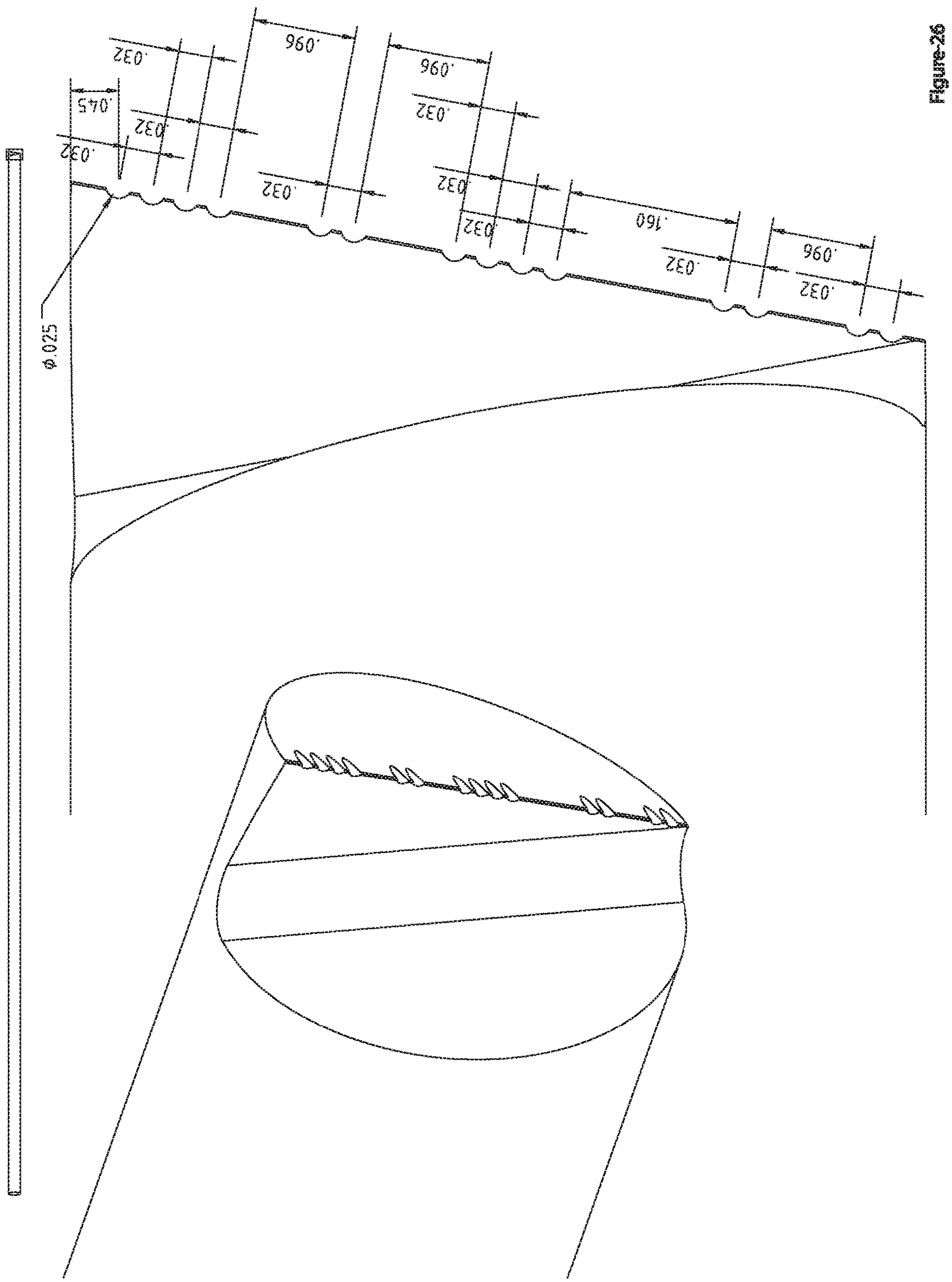
Figure 27:
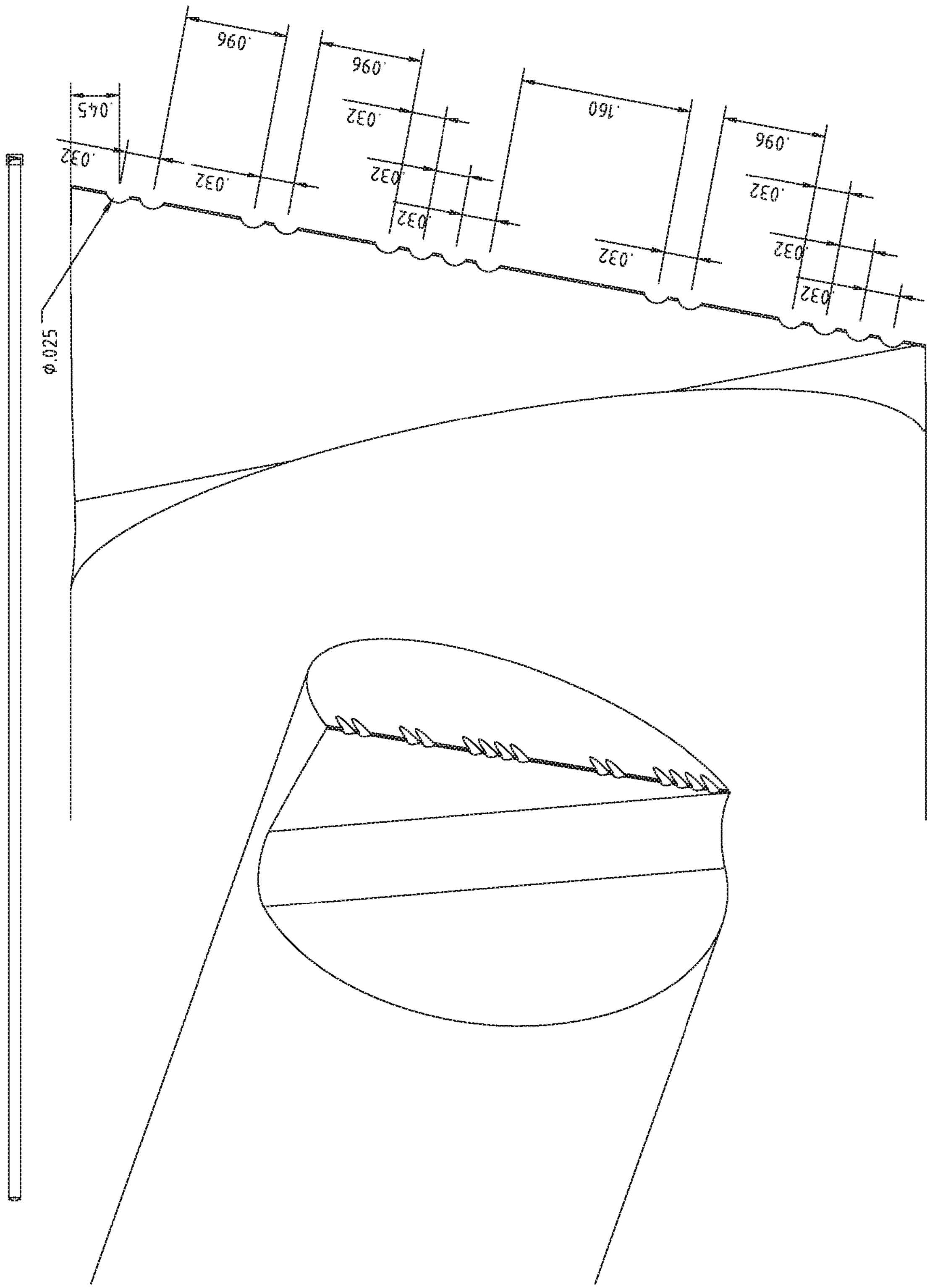
Figure 28:
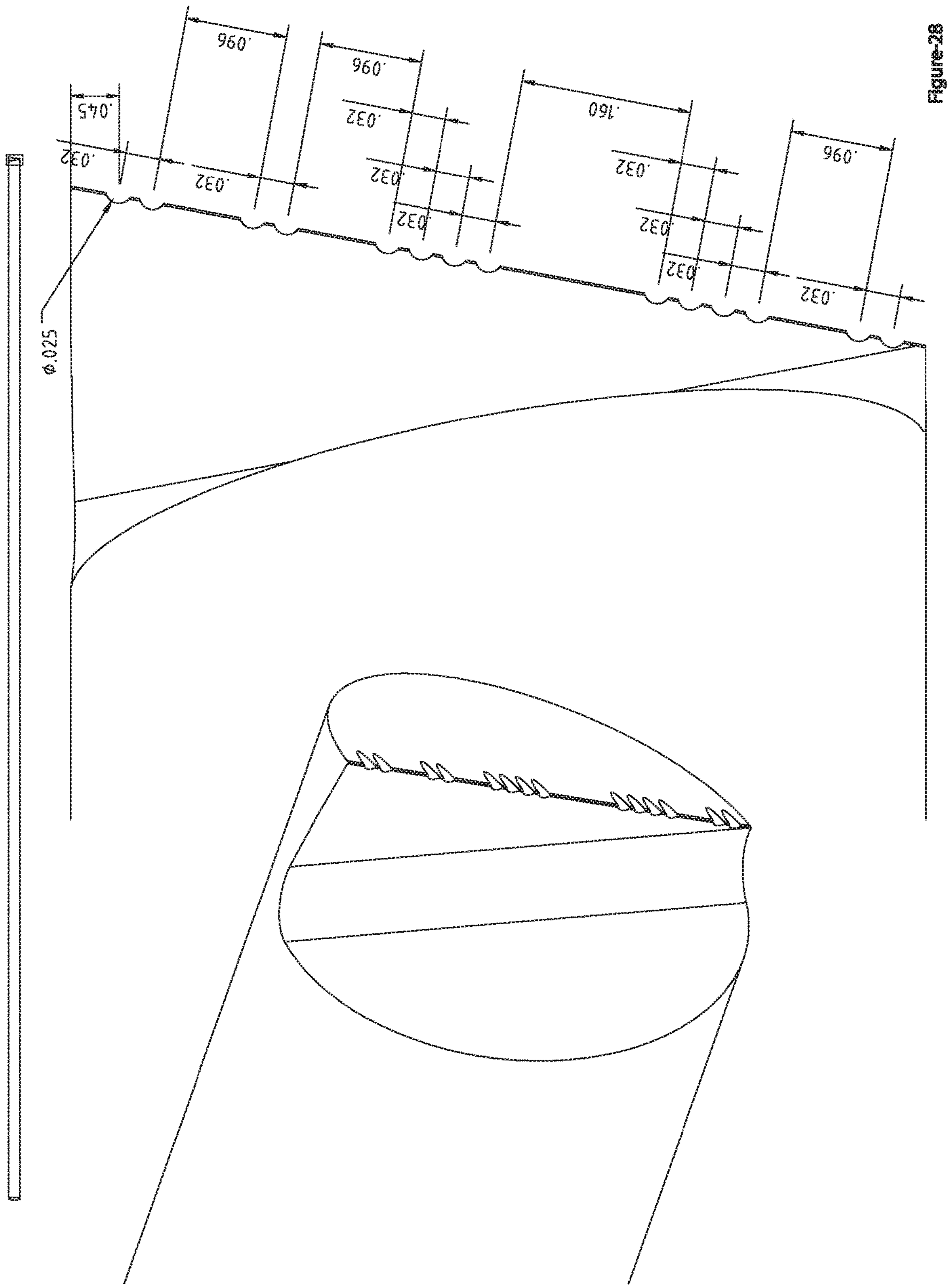
Figure 29:
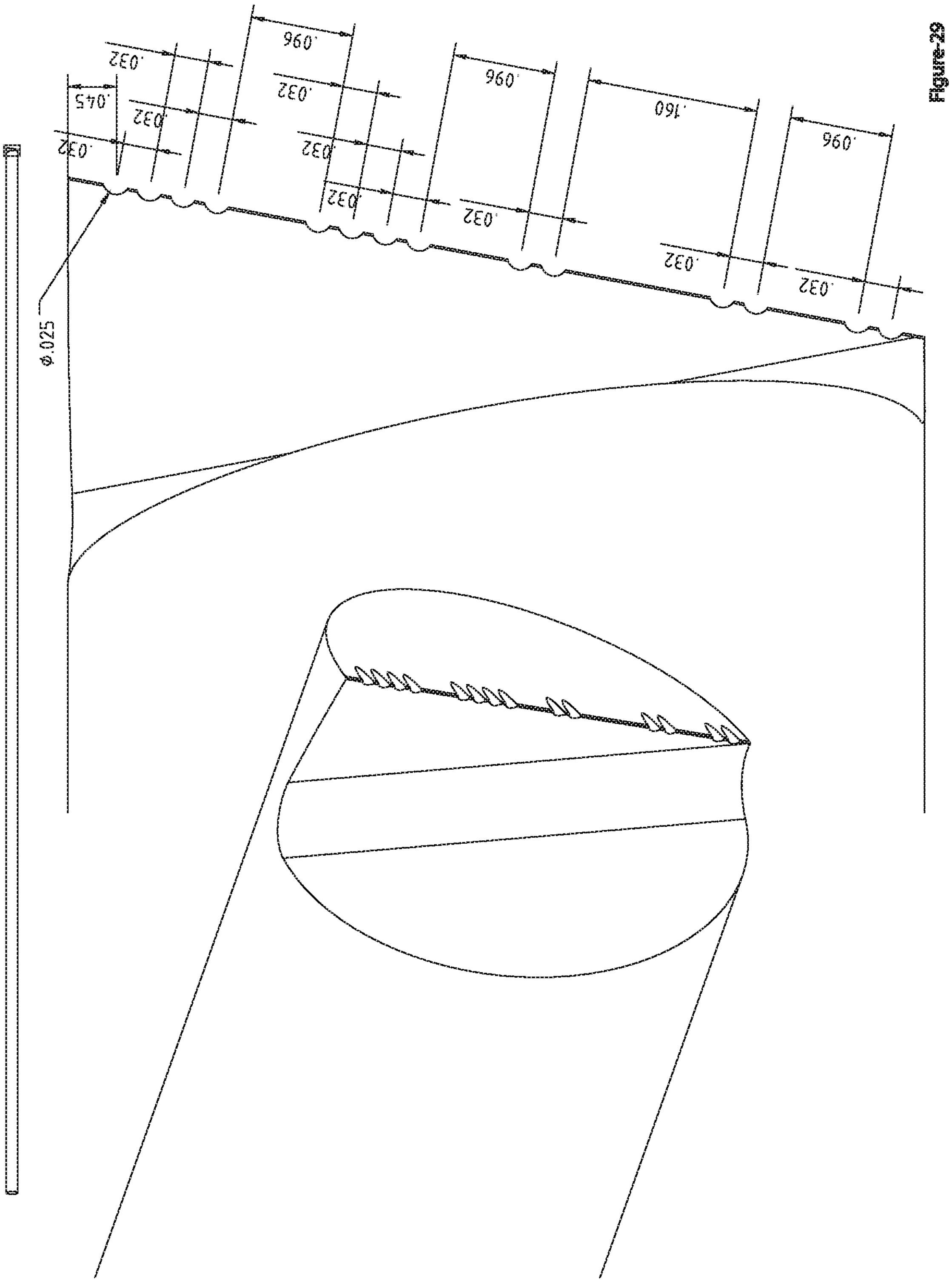
Figure 30:
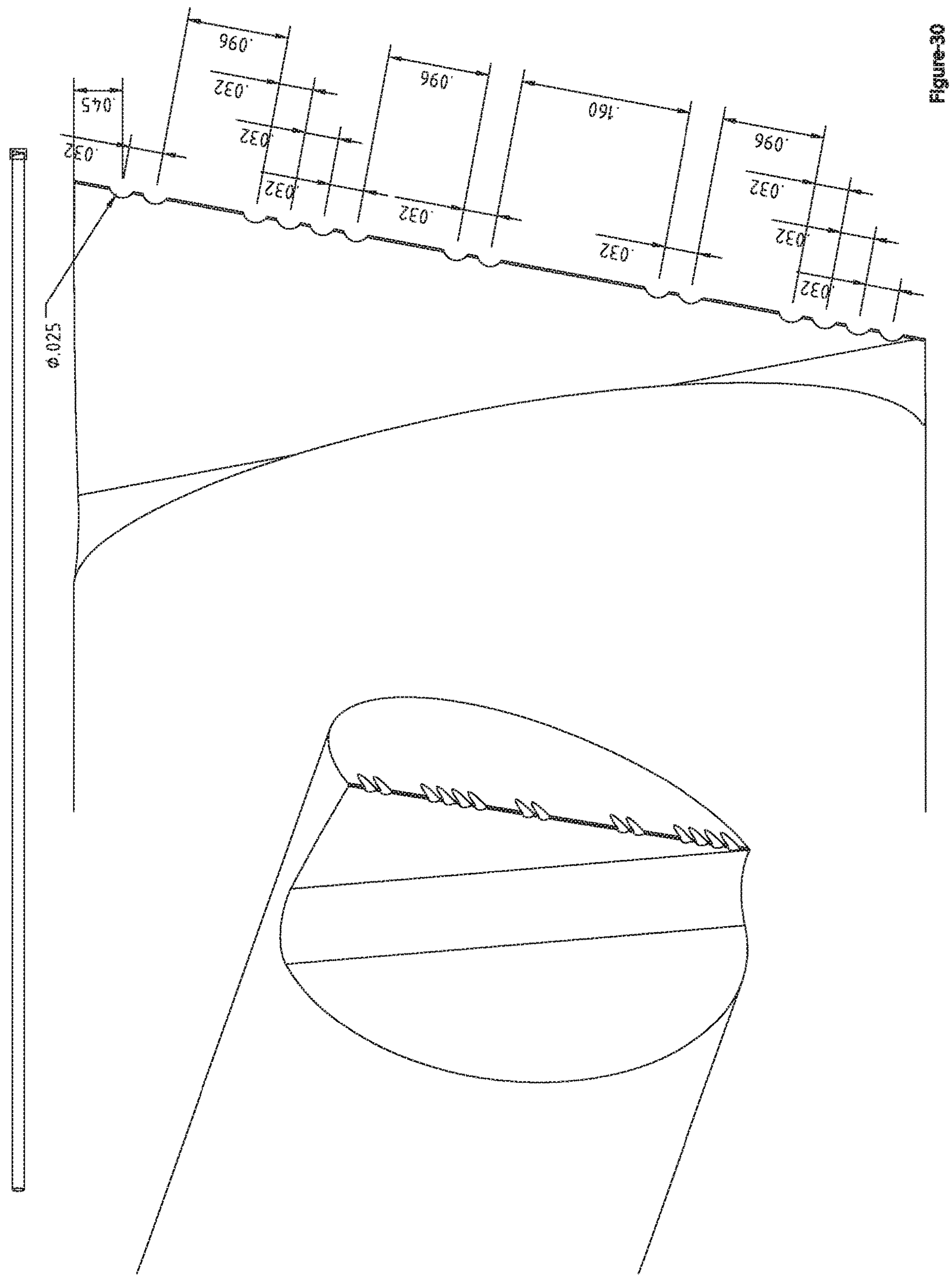
Figure 31:
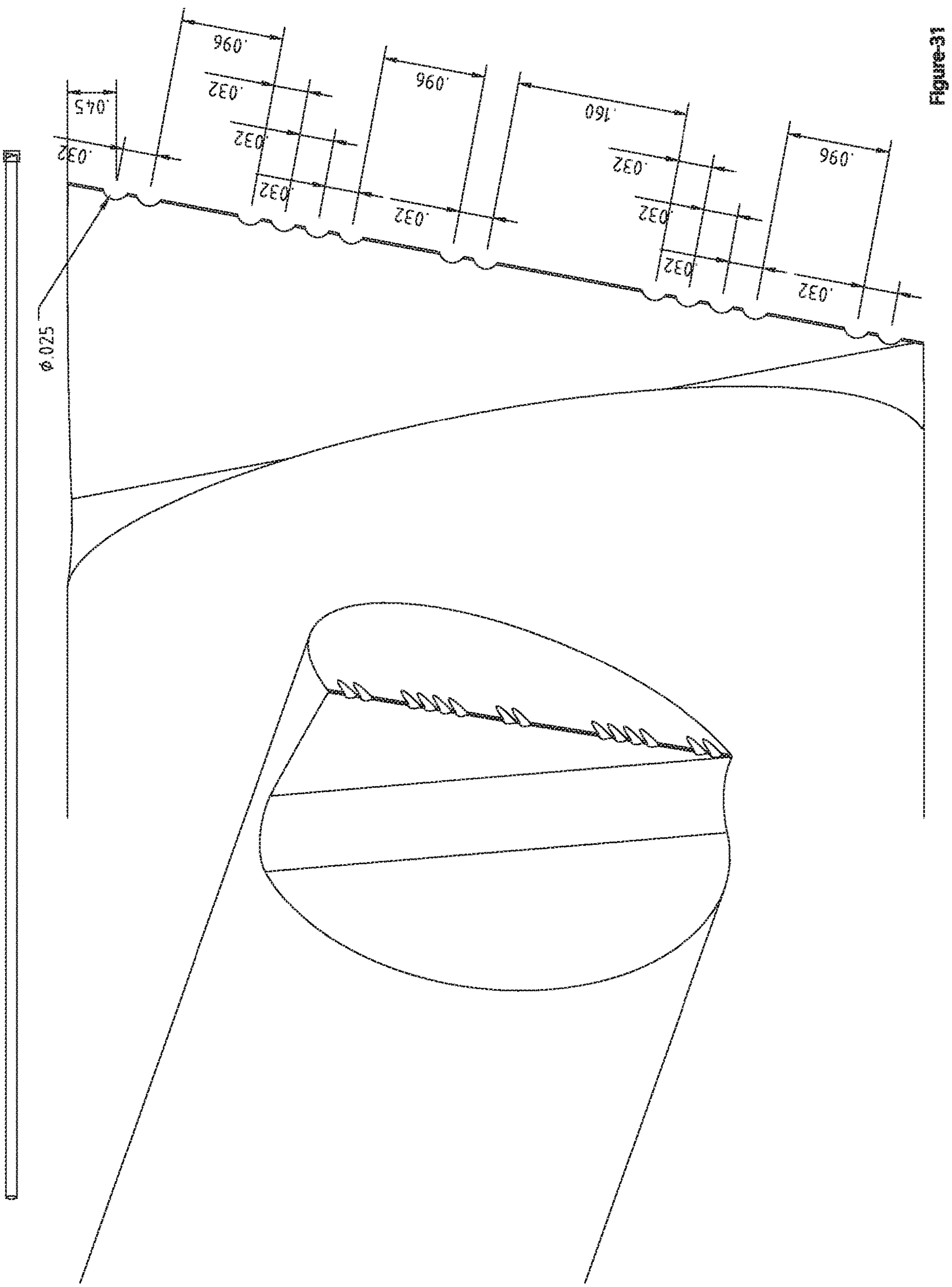
Figure 32:
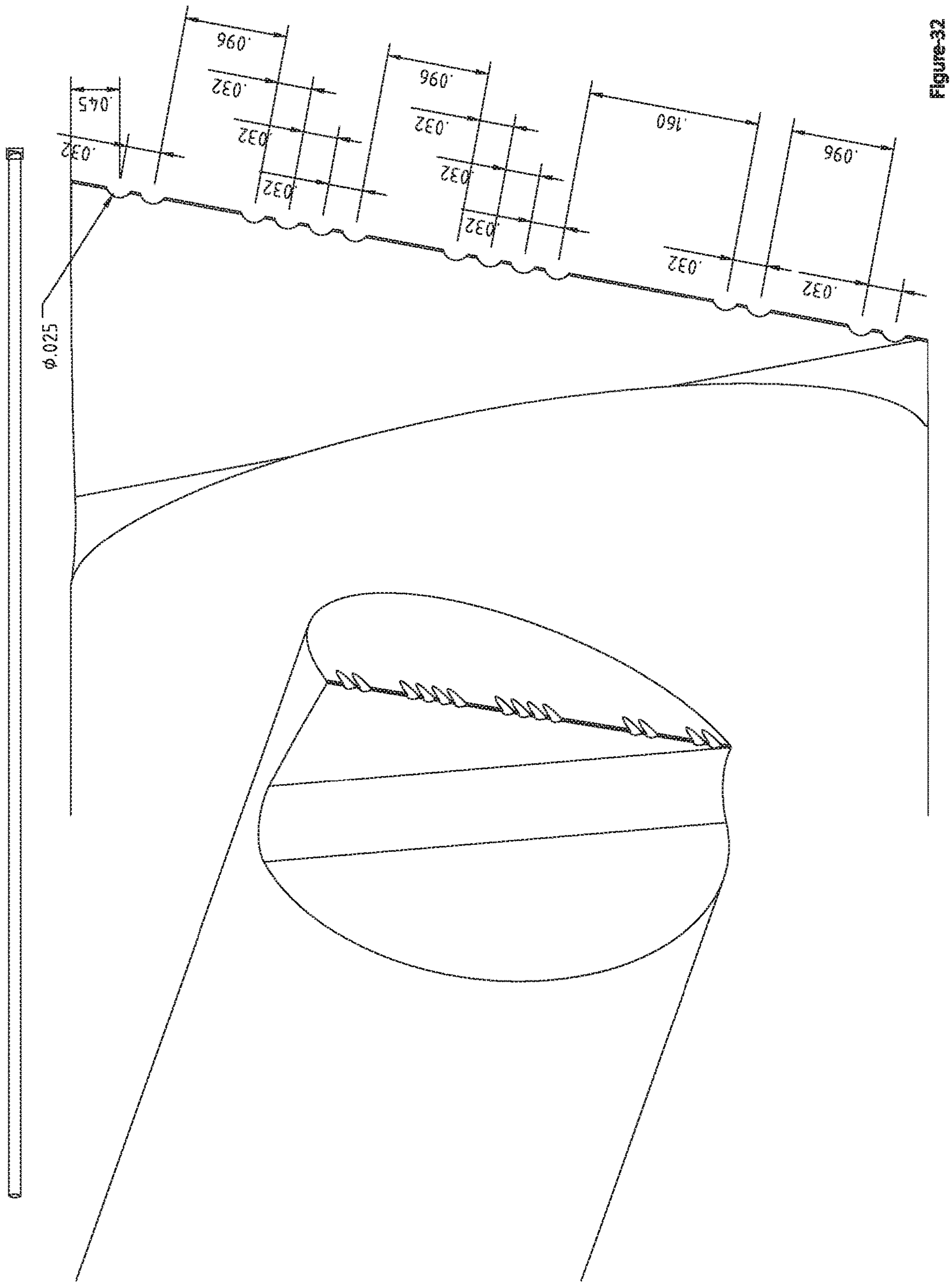
Figure 33:
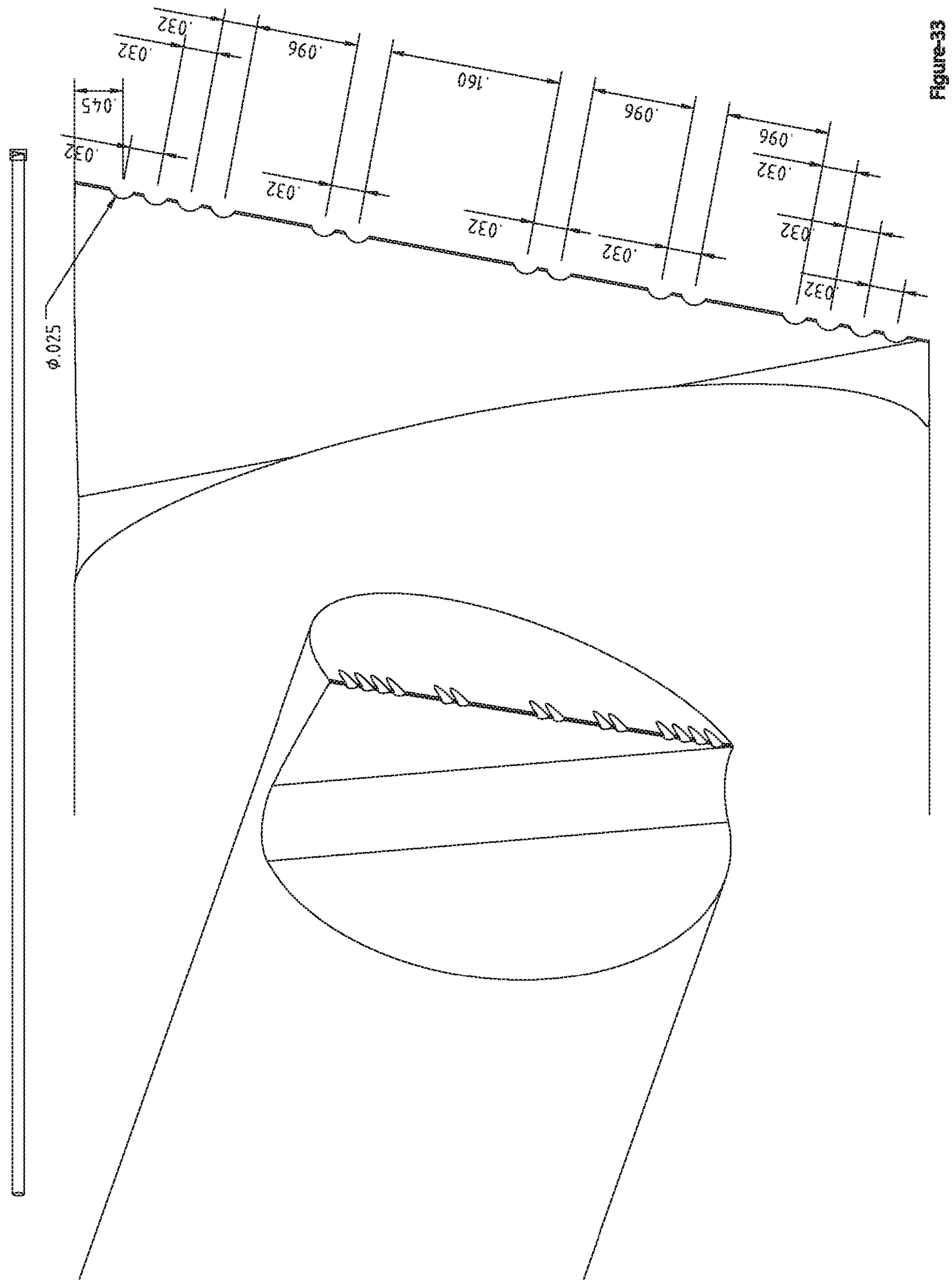
Figure 34:
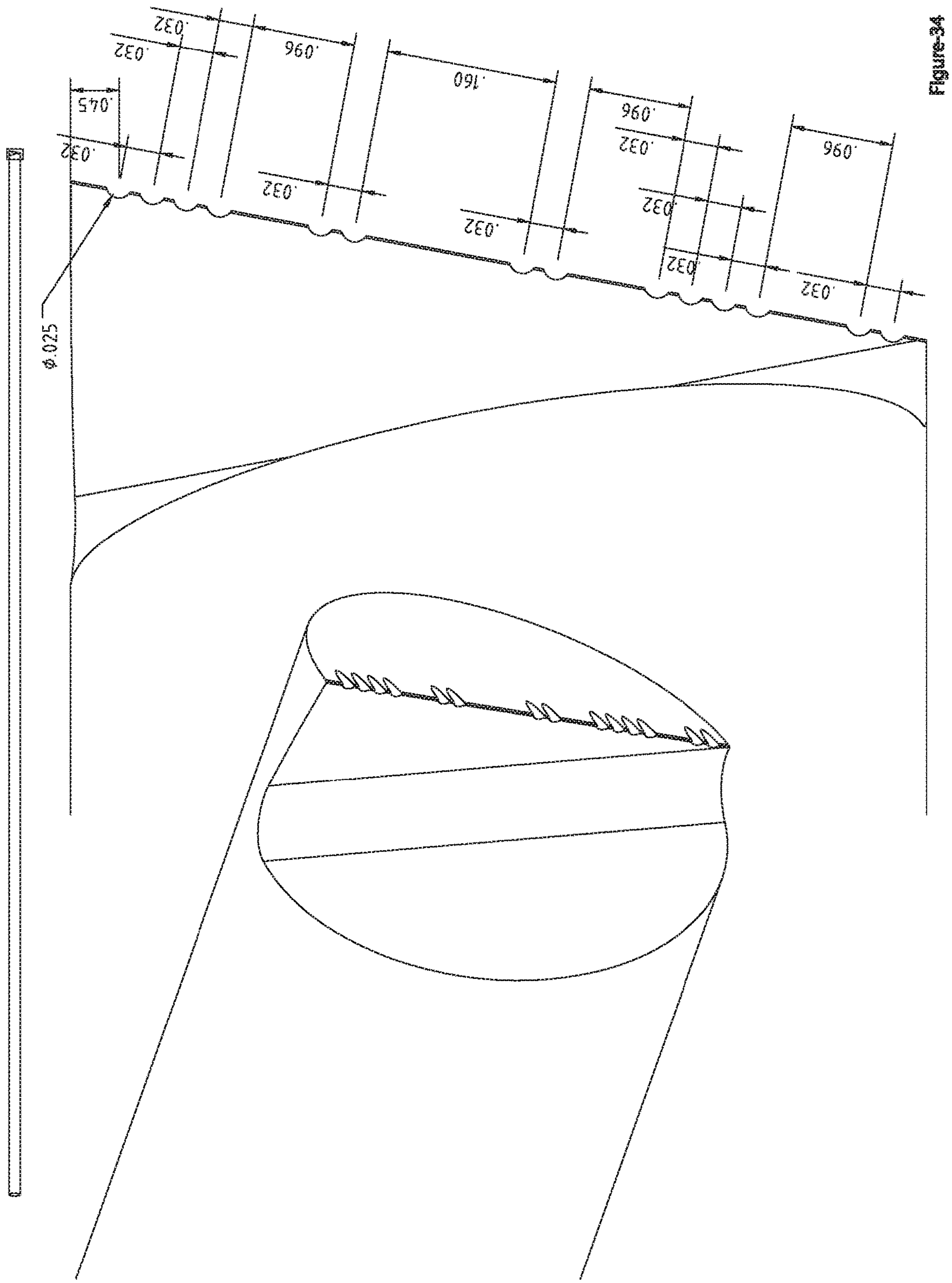
Figure 35:
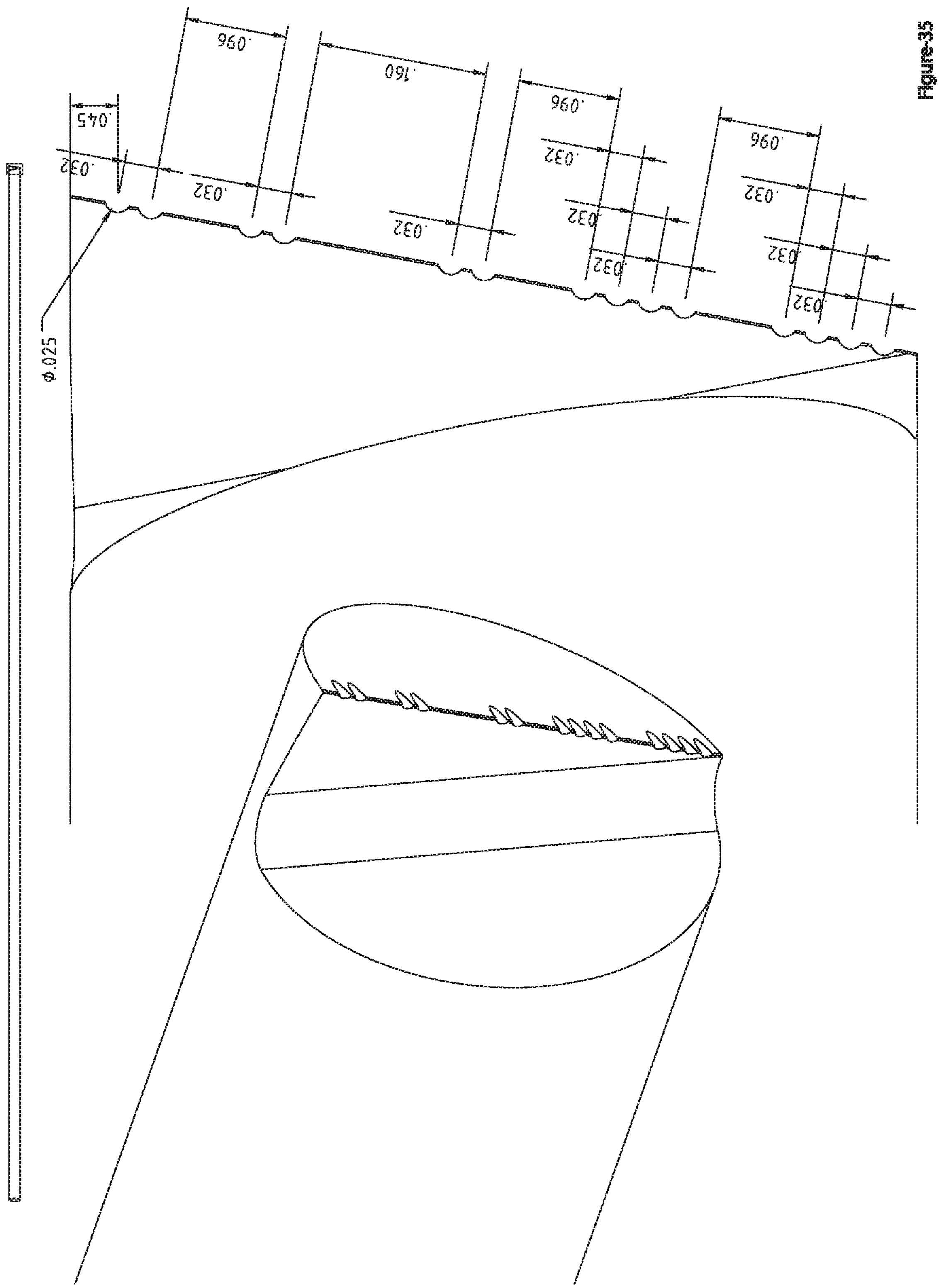
Figure 36:
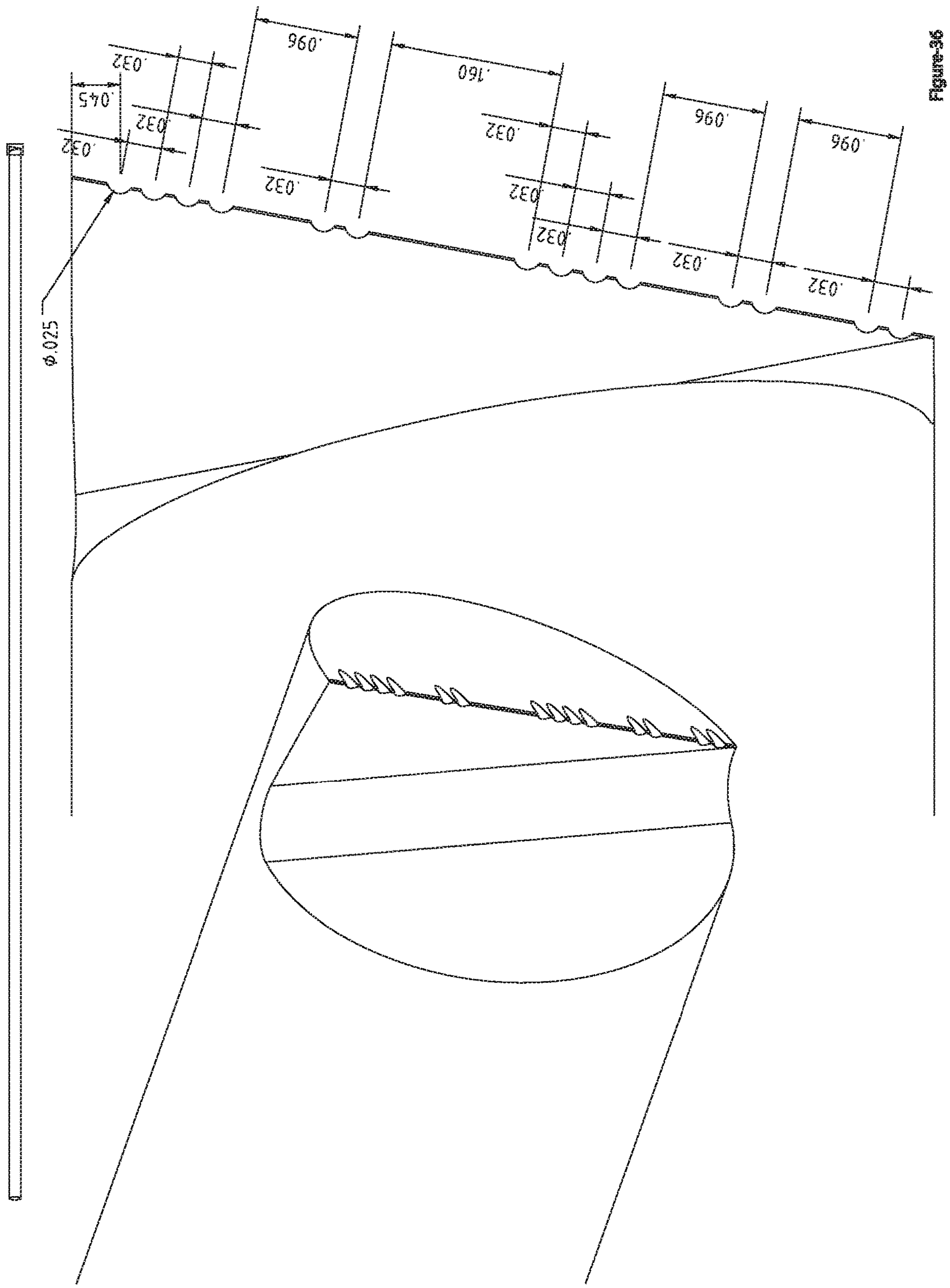
Figure 37:
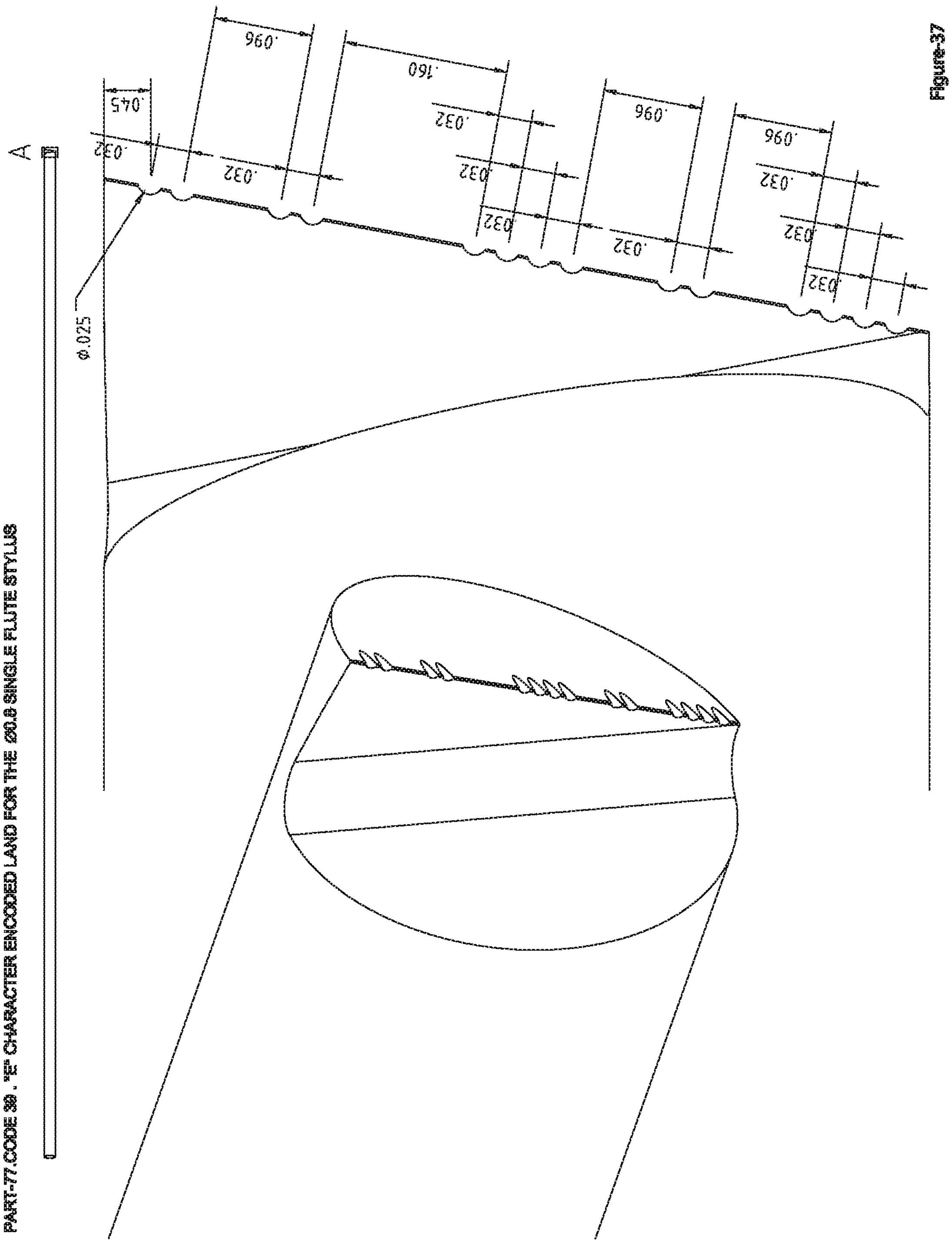
Figure 38:
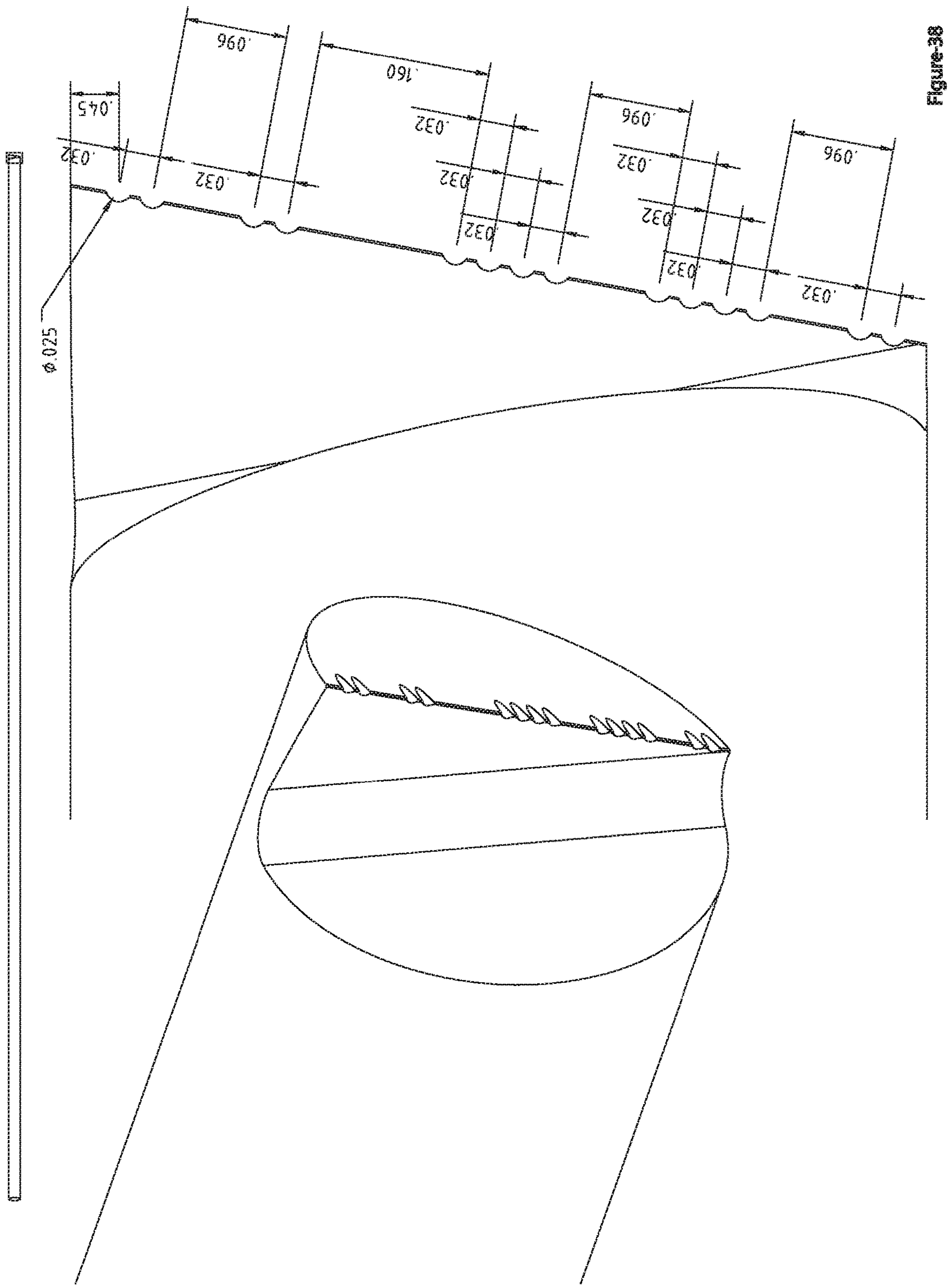
Figure 39:
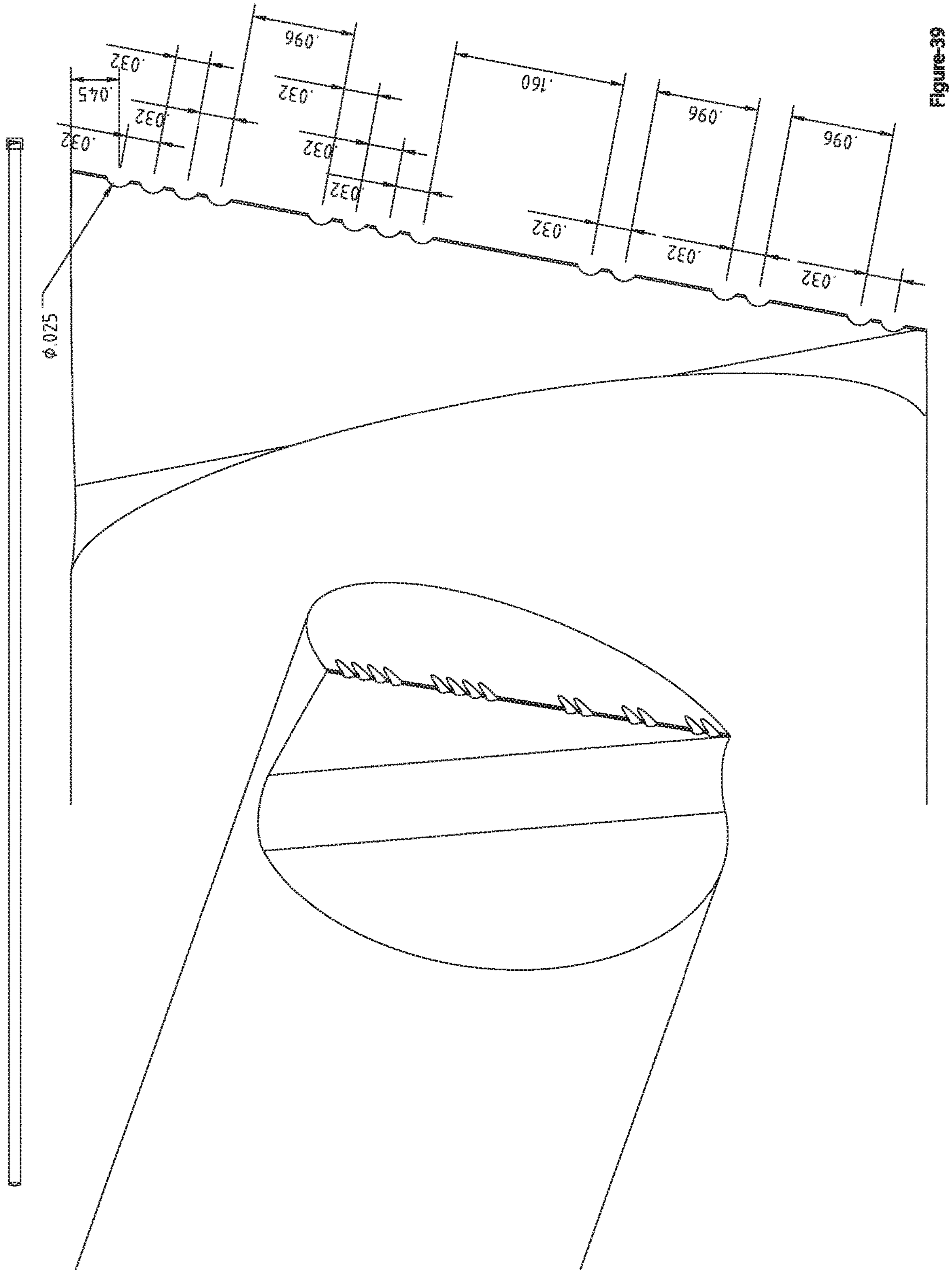
Figure 40:
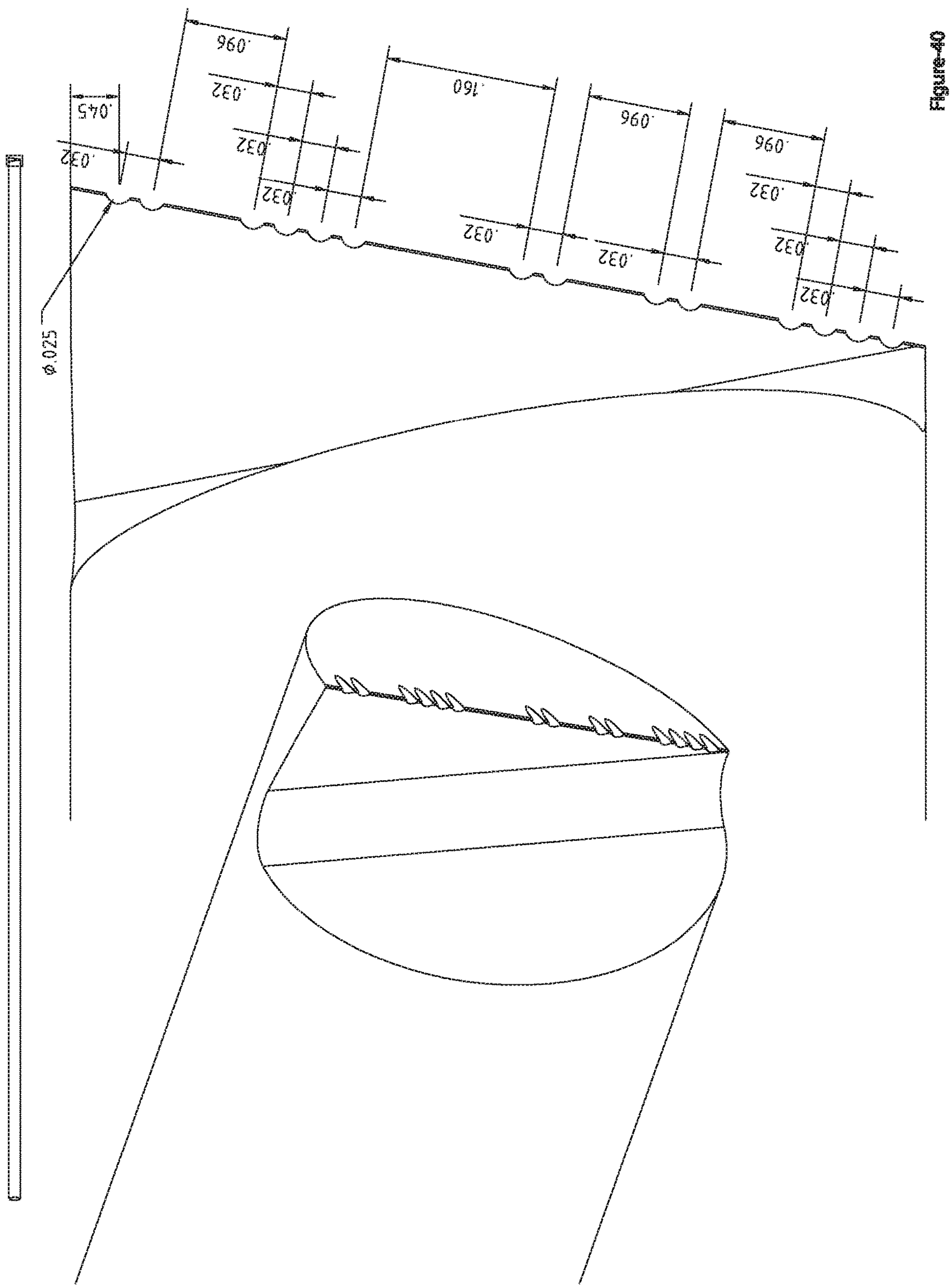
Figure 41:
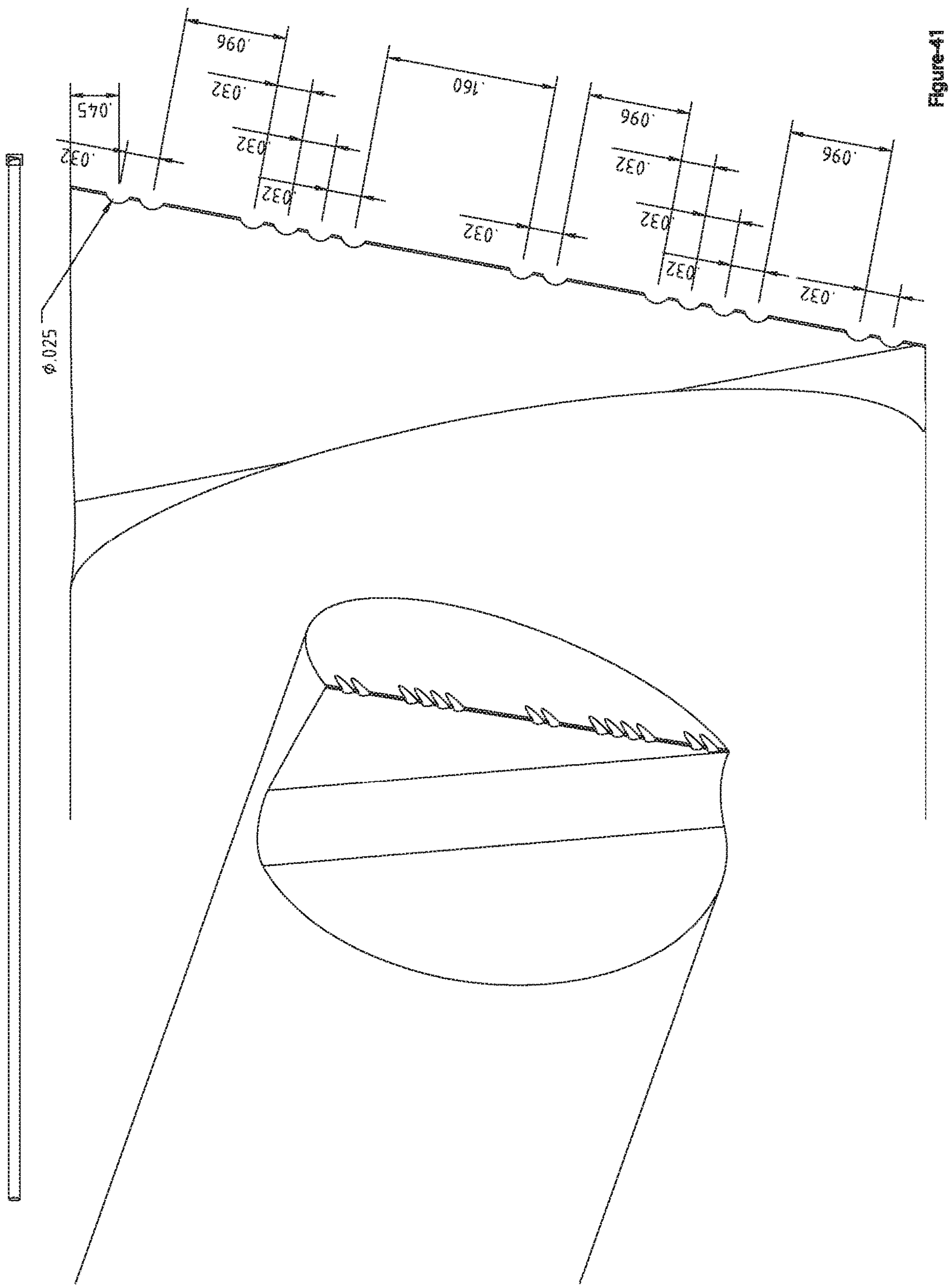
Figure 42:
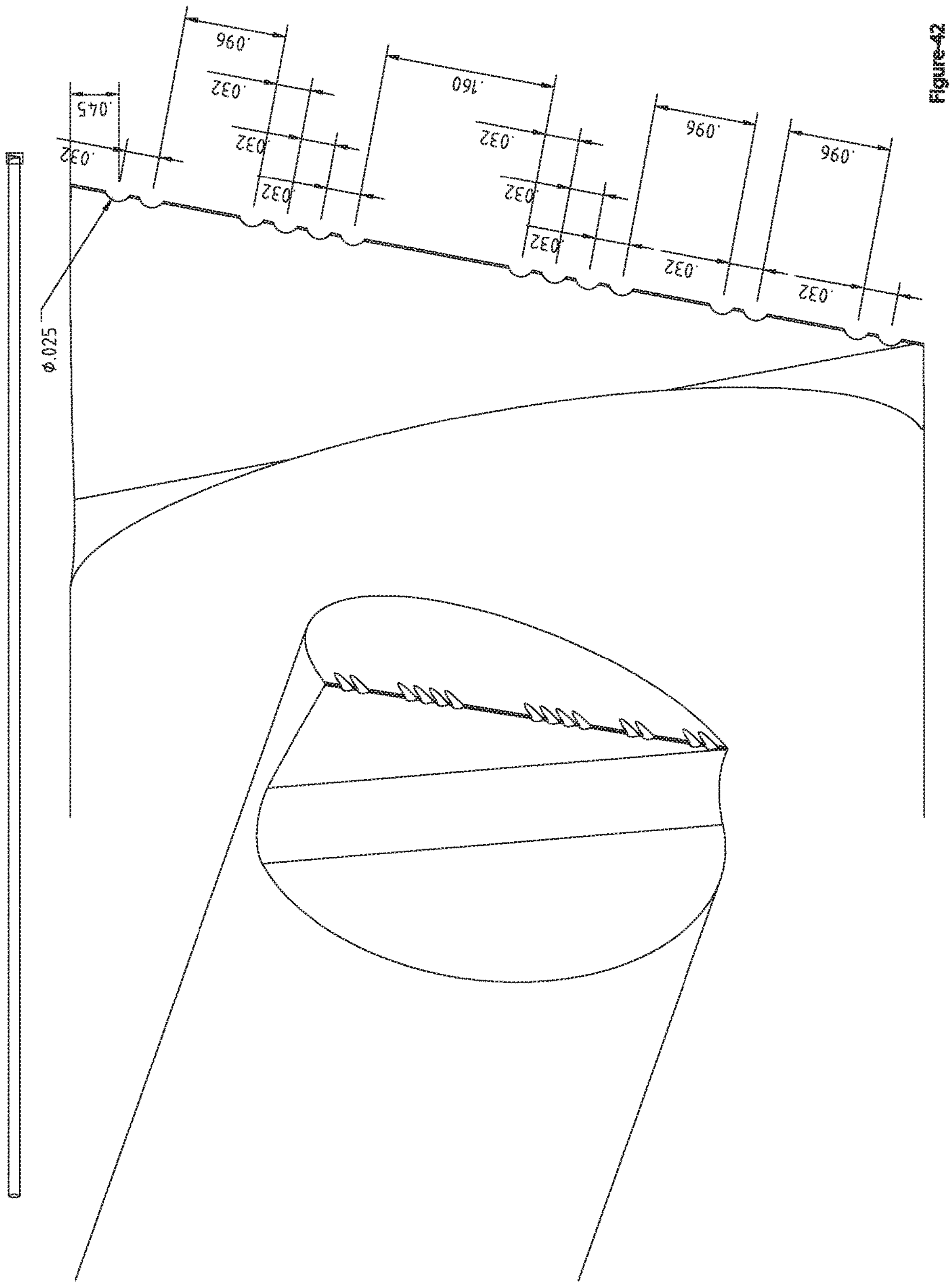
Figure 43:
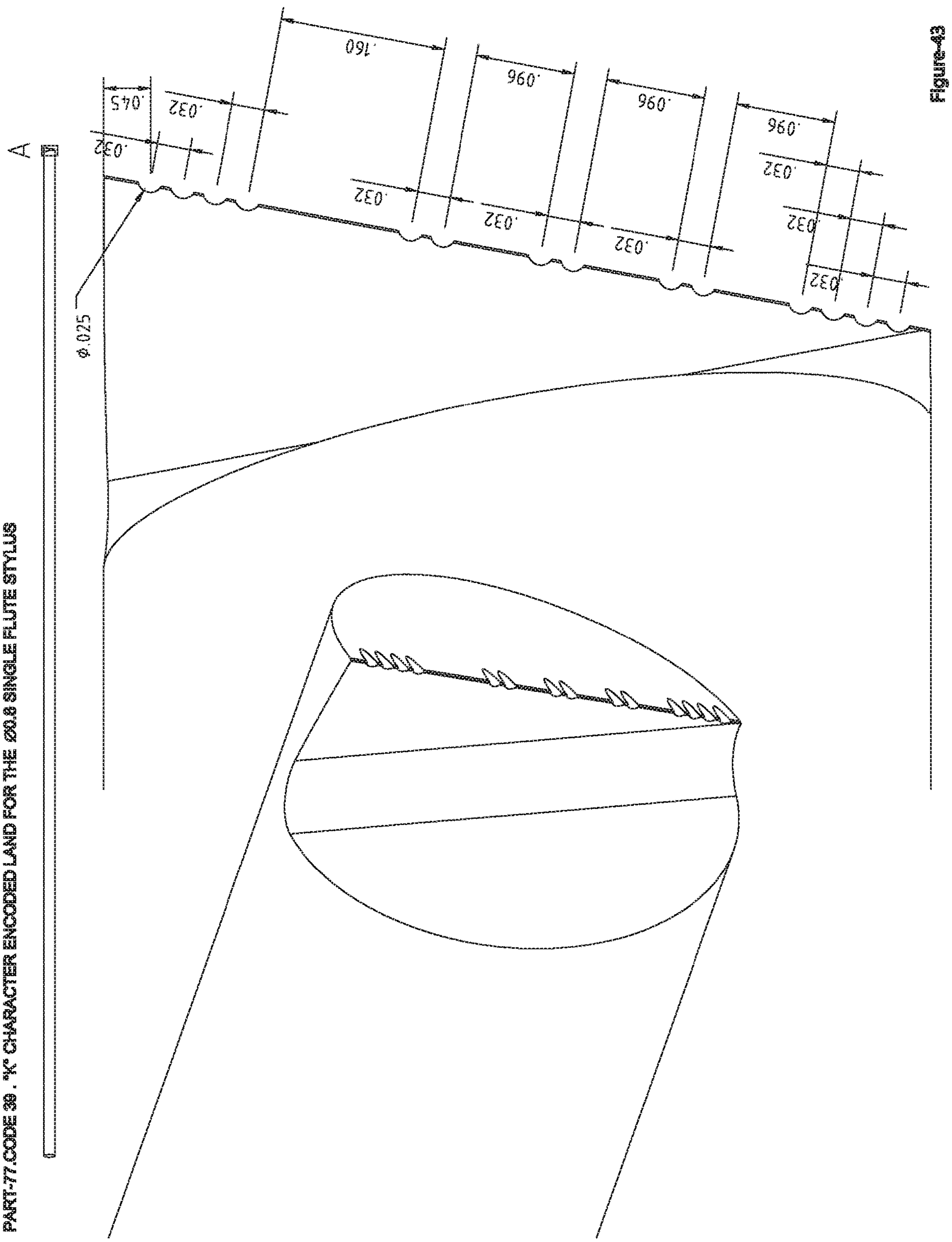
Figure 44:
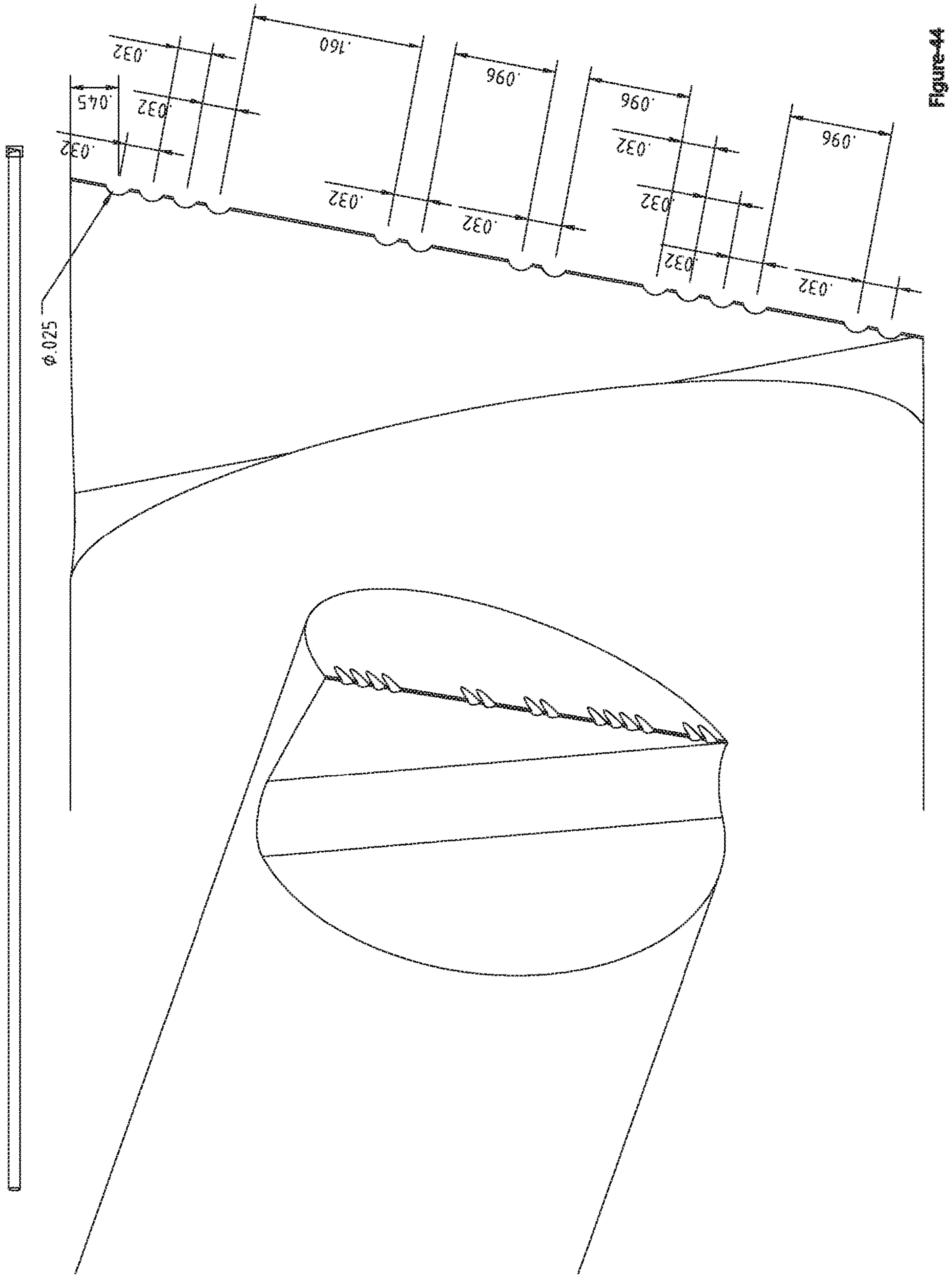
Figure 45:
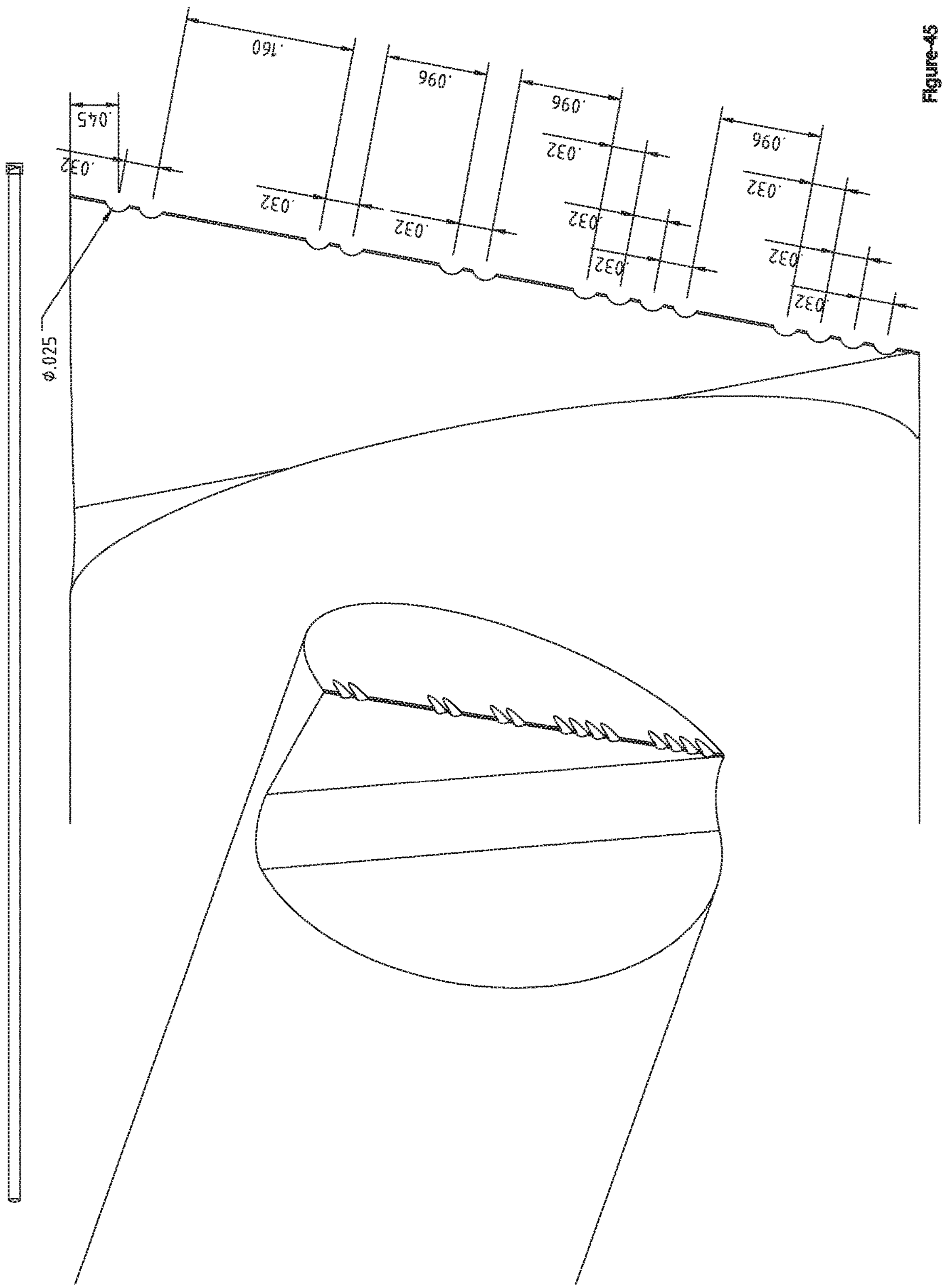
Figure 46:
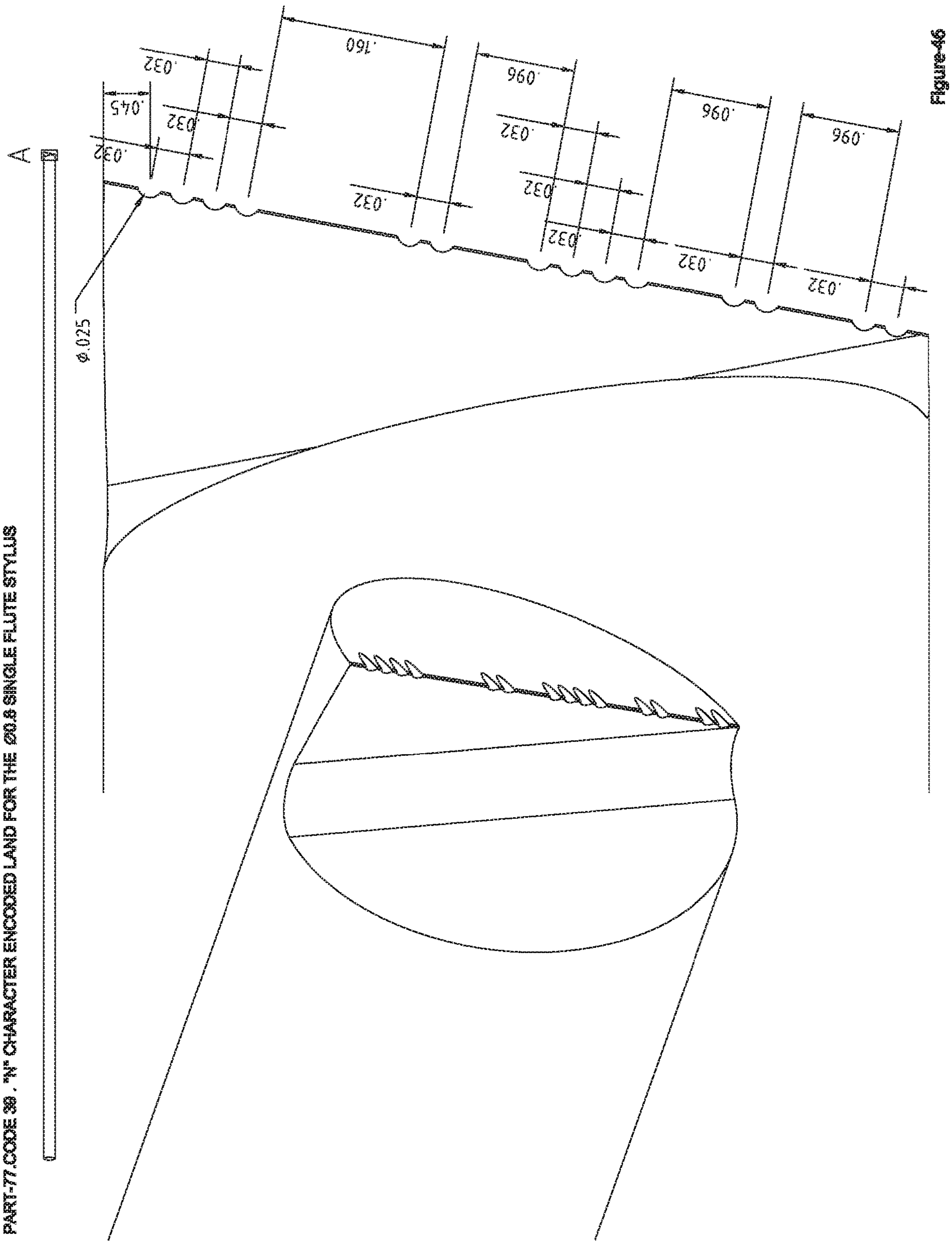
Figure 47:
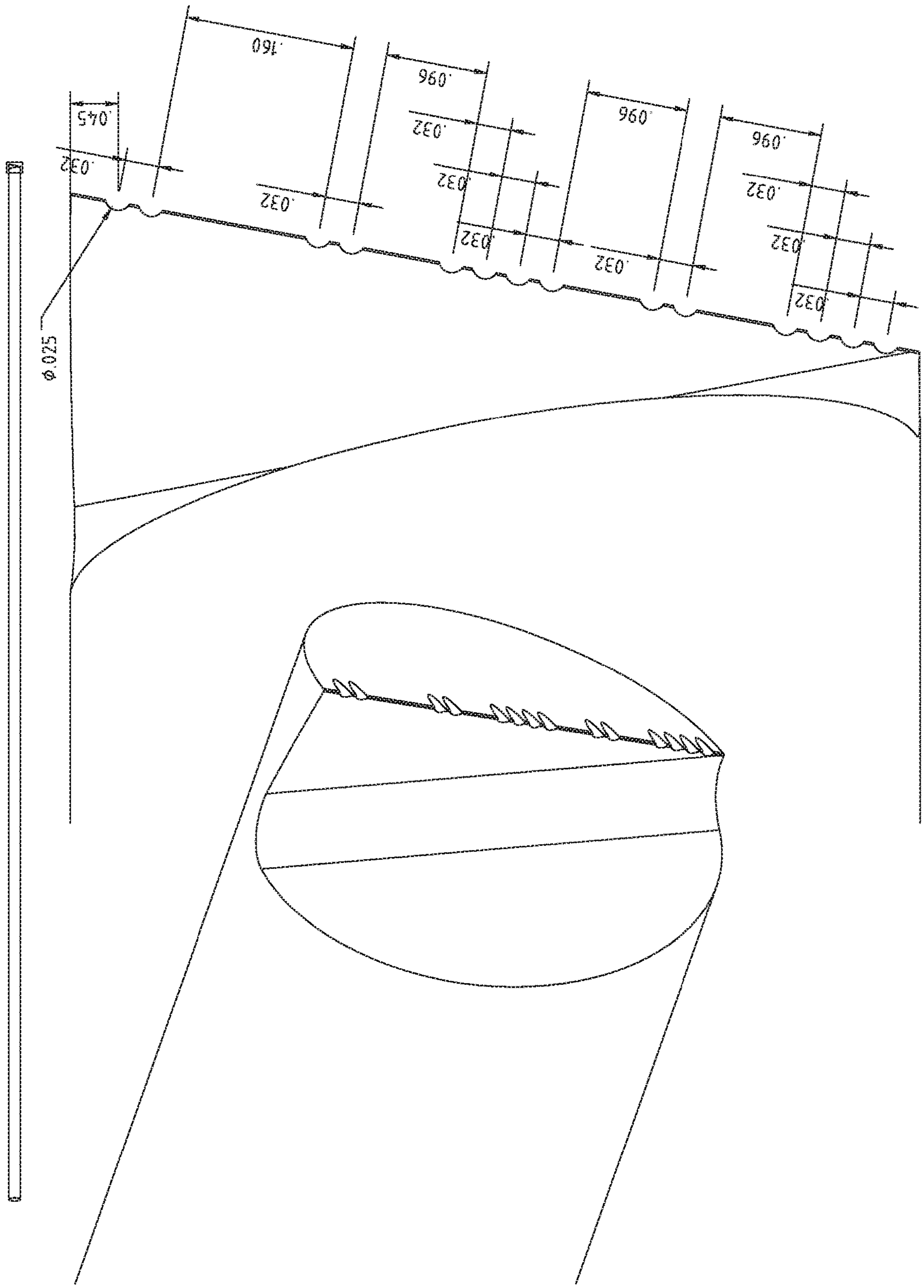
Figure 48:
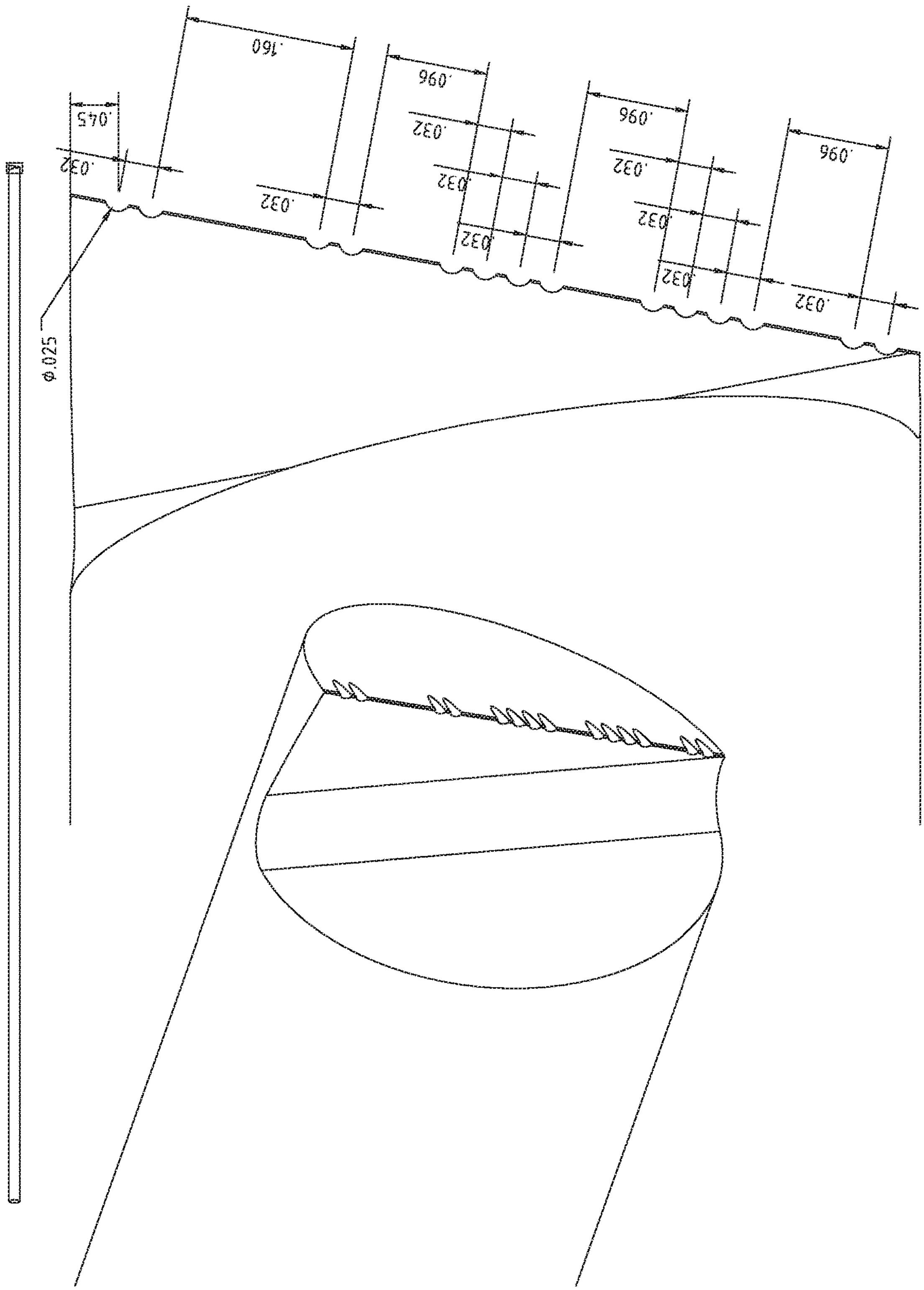
Figure 49:
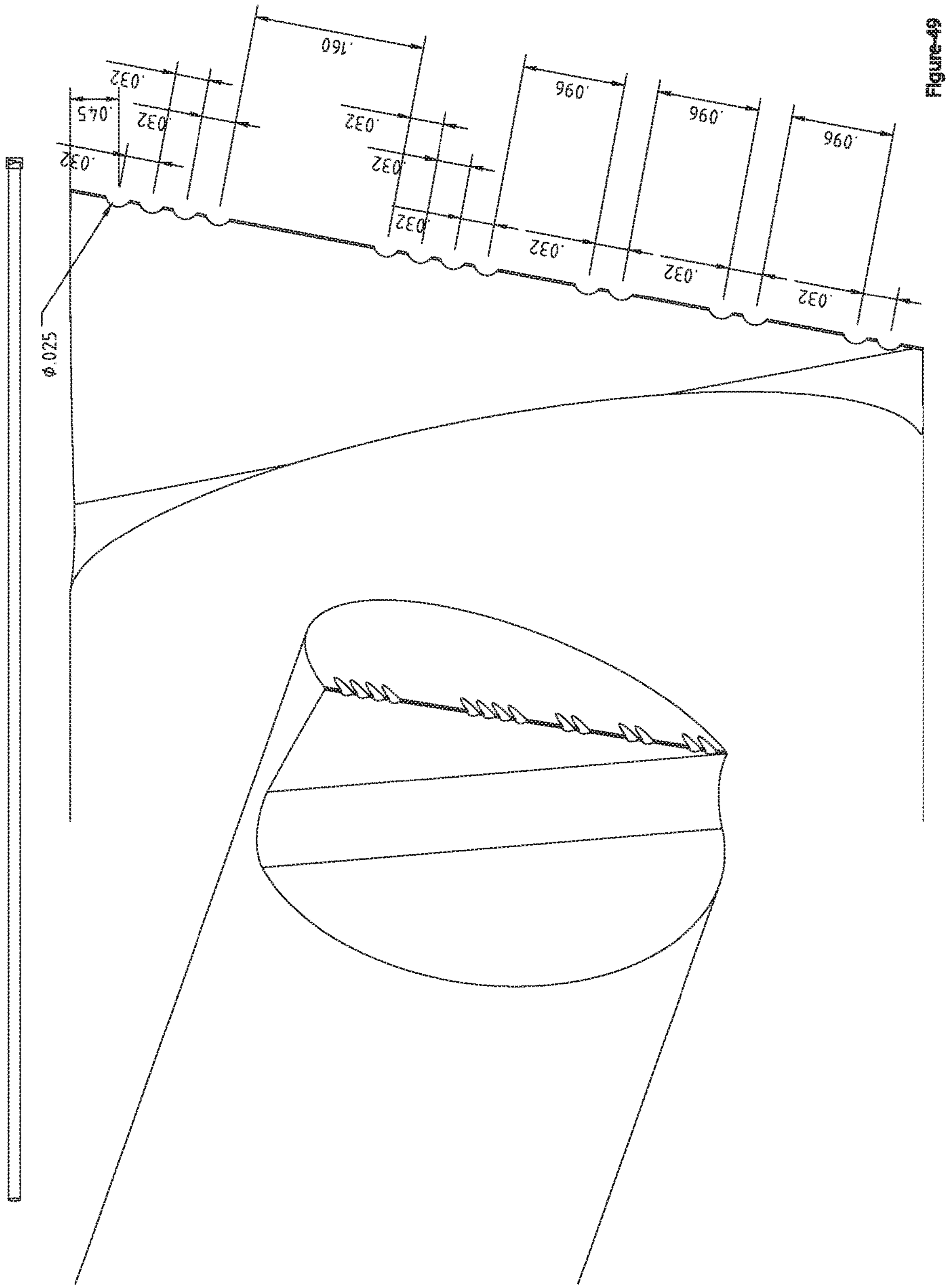
Figure 50:
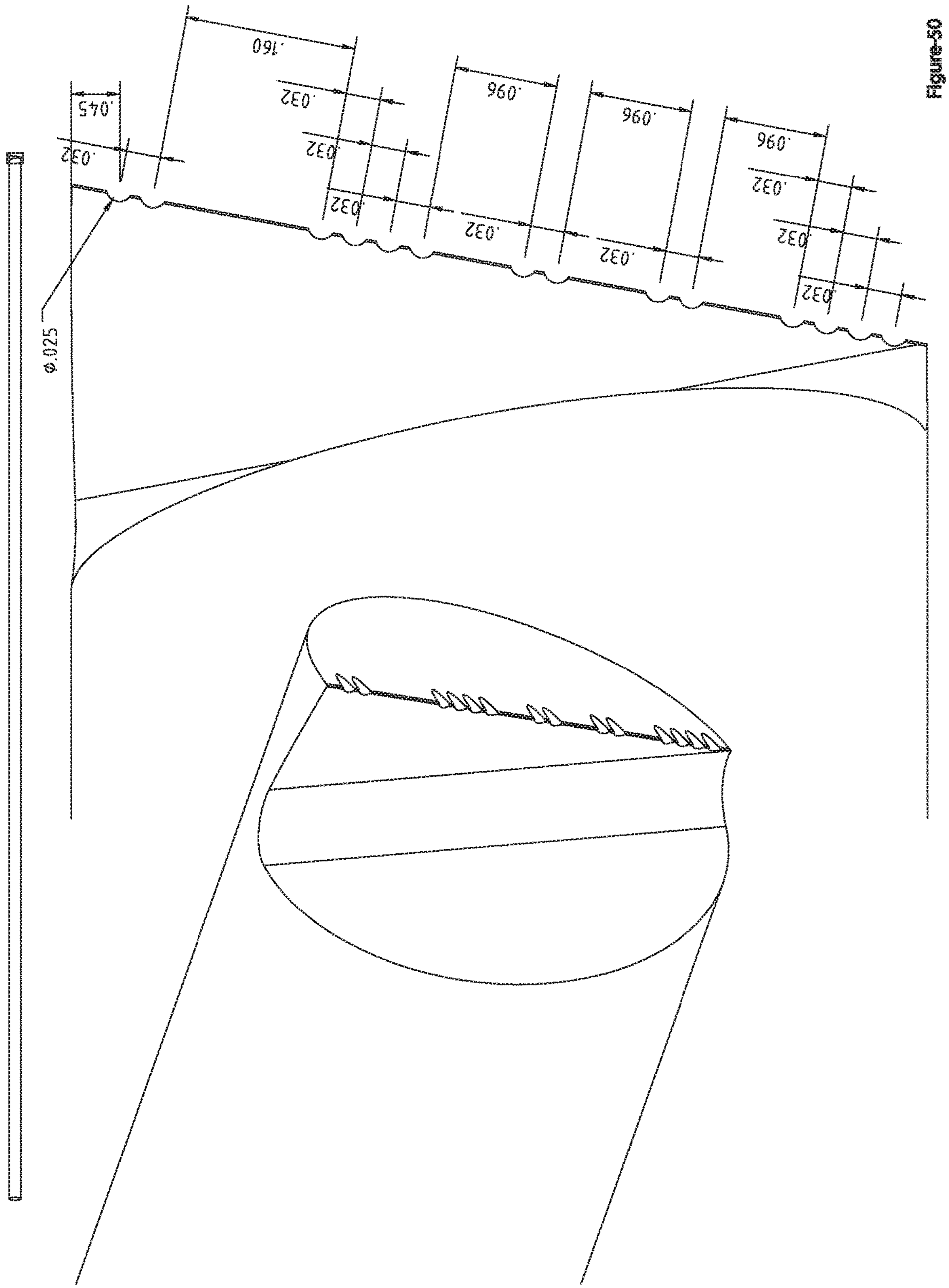
Figure 51:
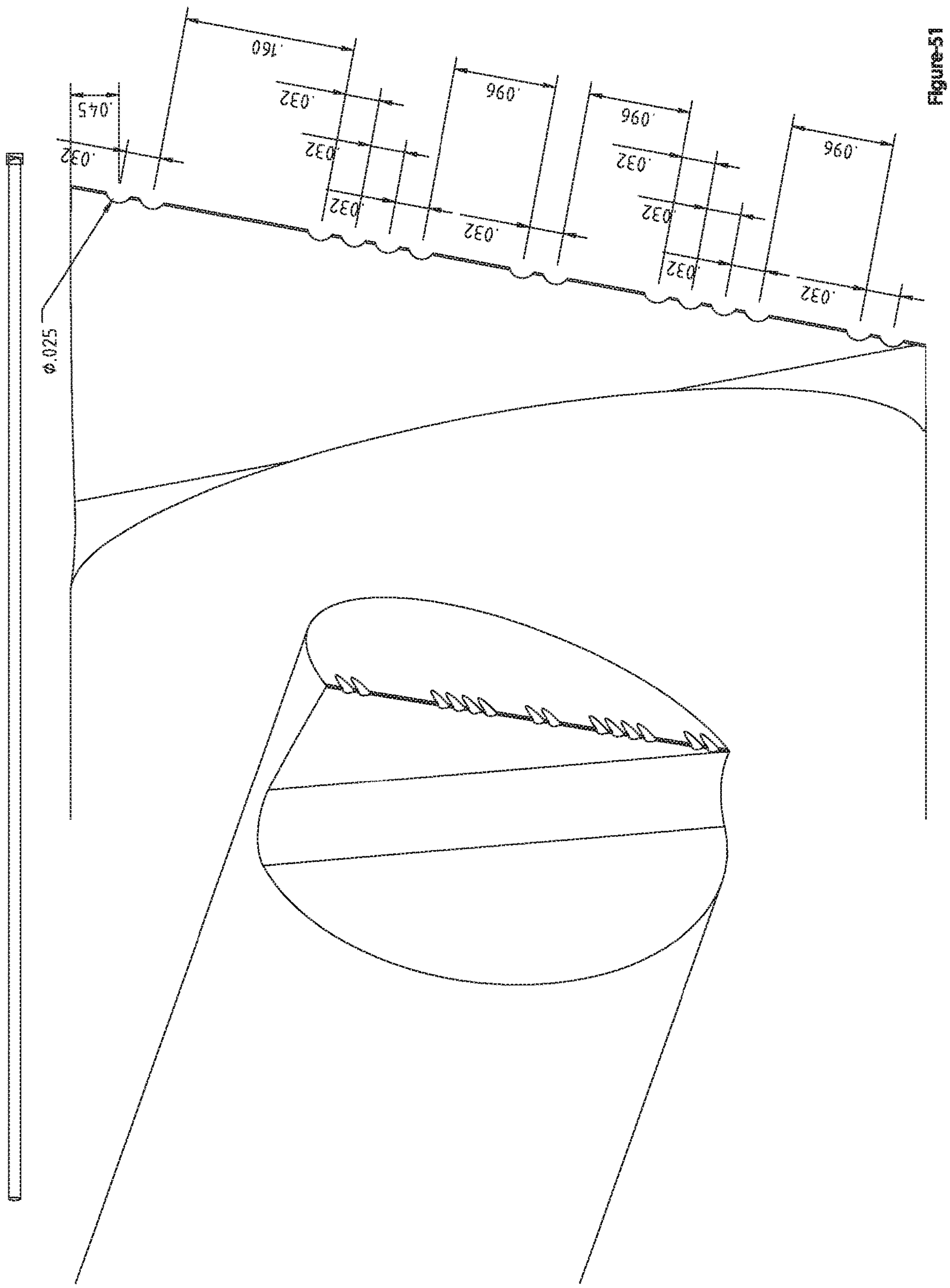
Figure 52:
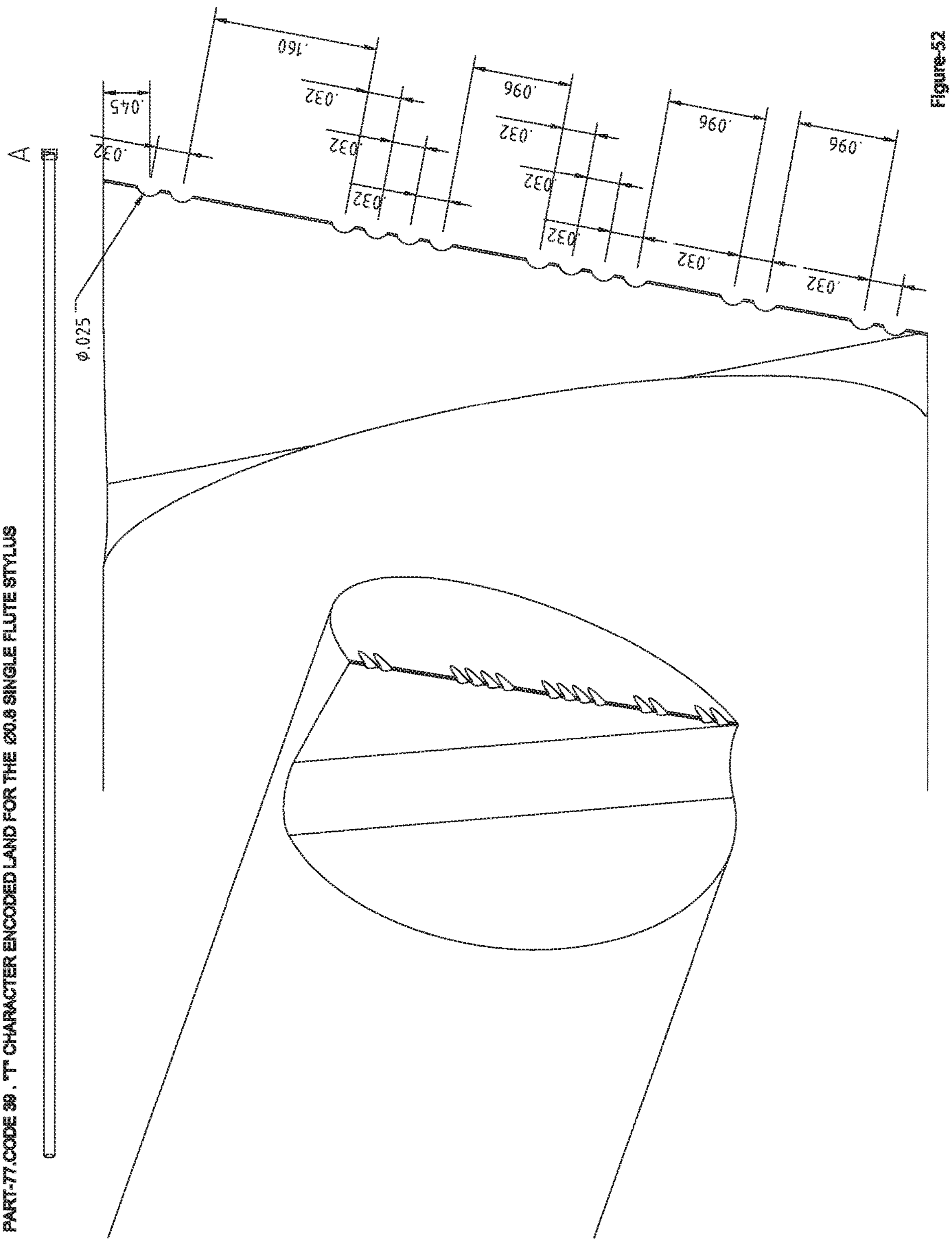
Figure 53:
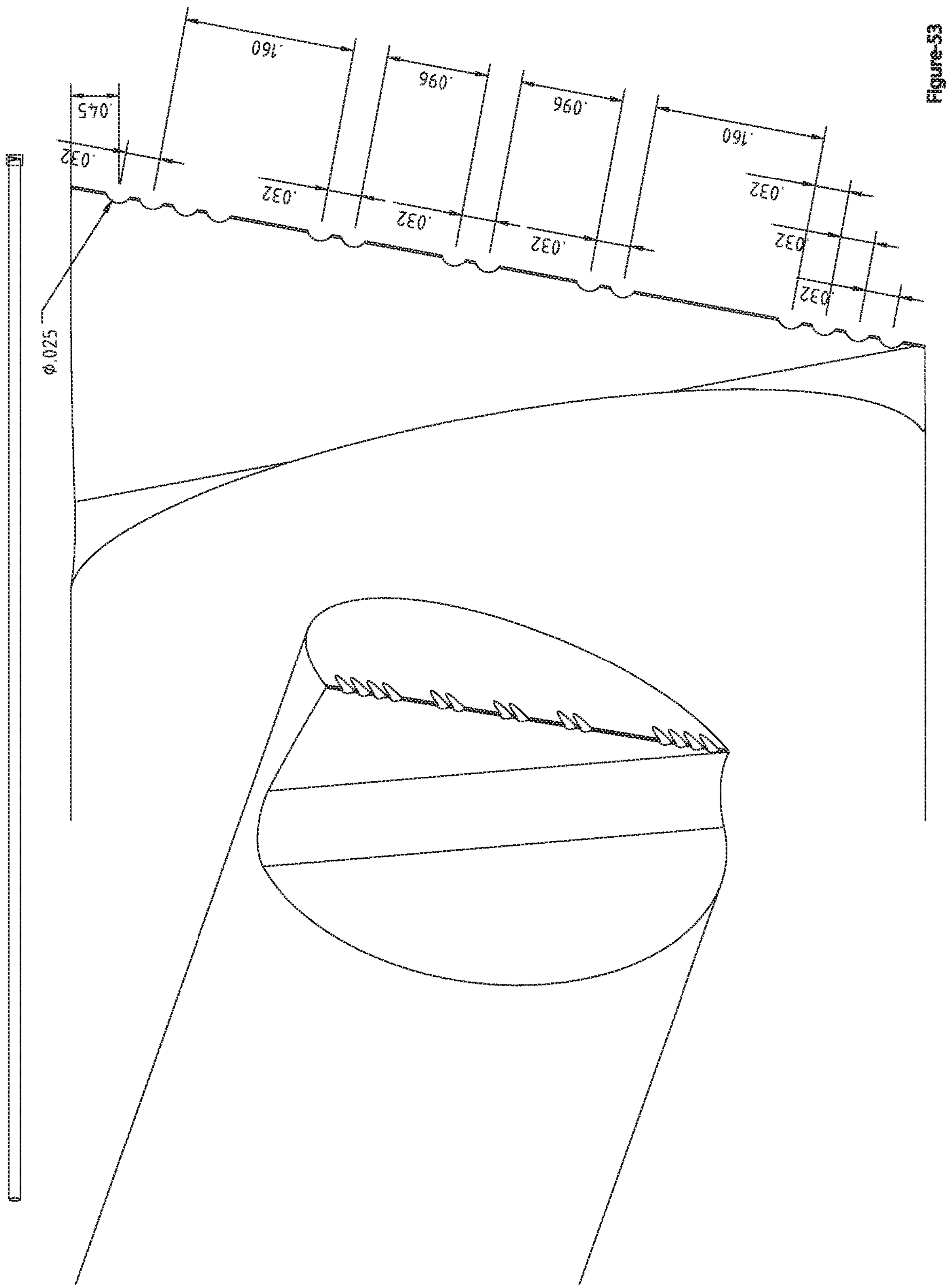
Figure 54:
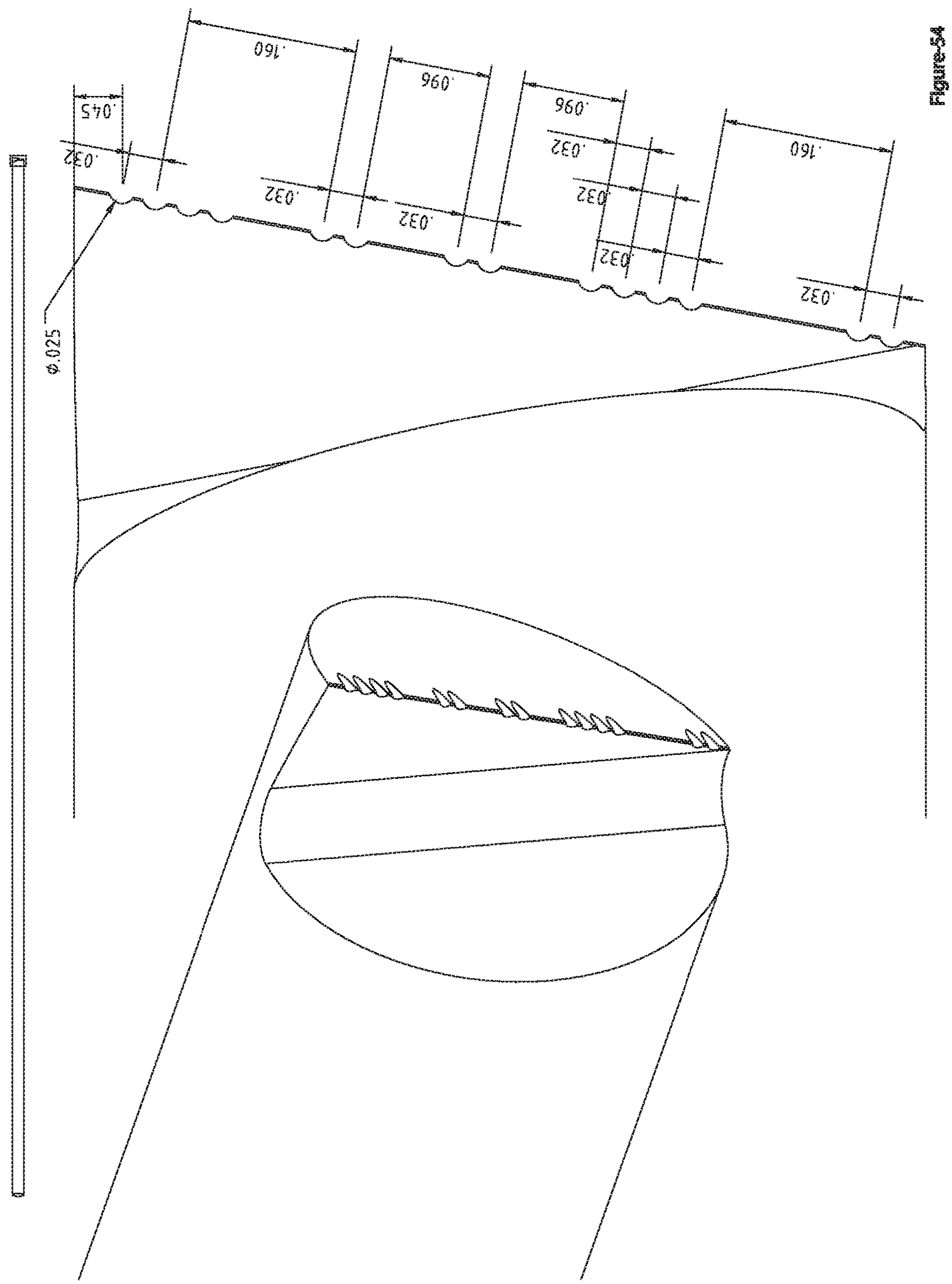
Figure 55:
Figure 56:
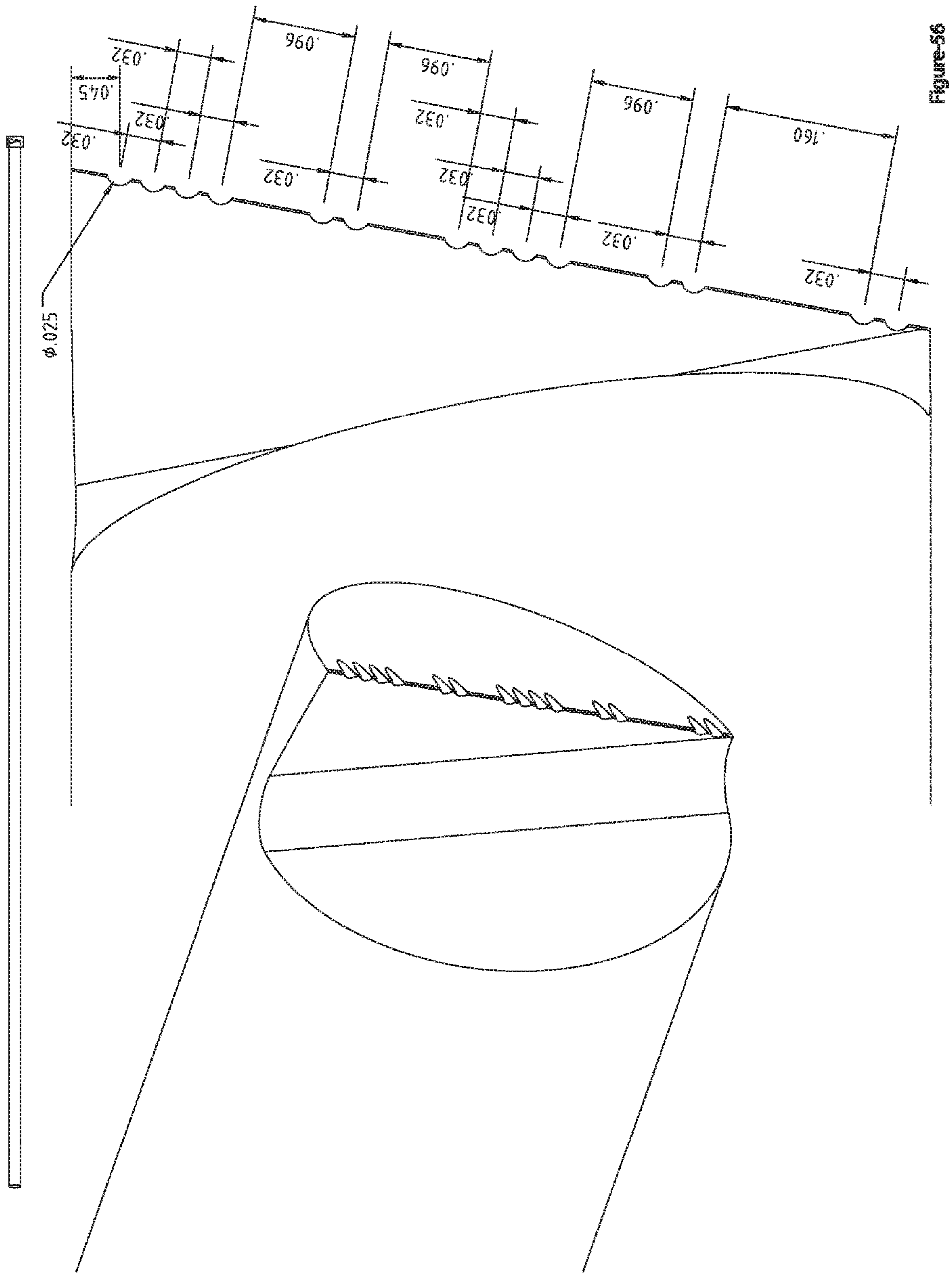
Figure 57:
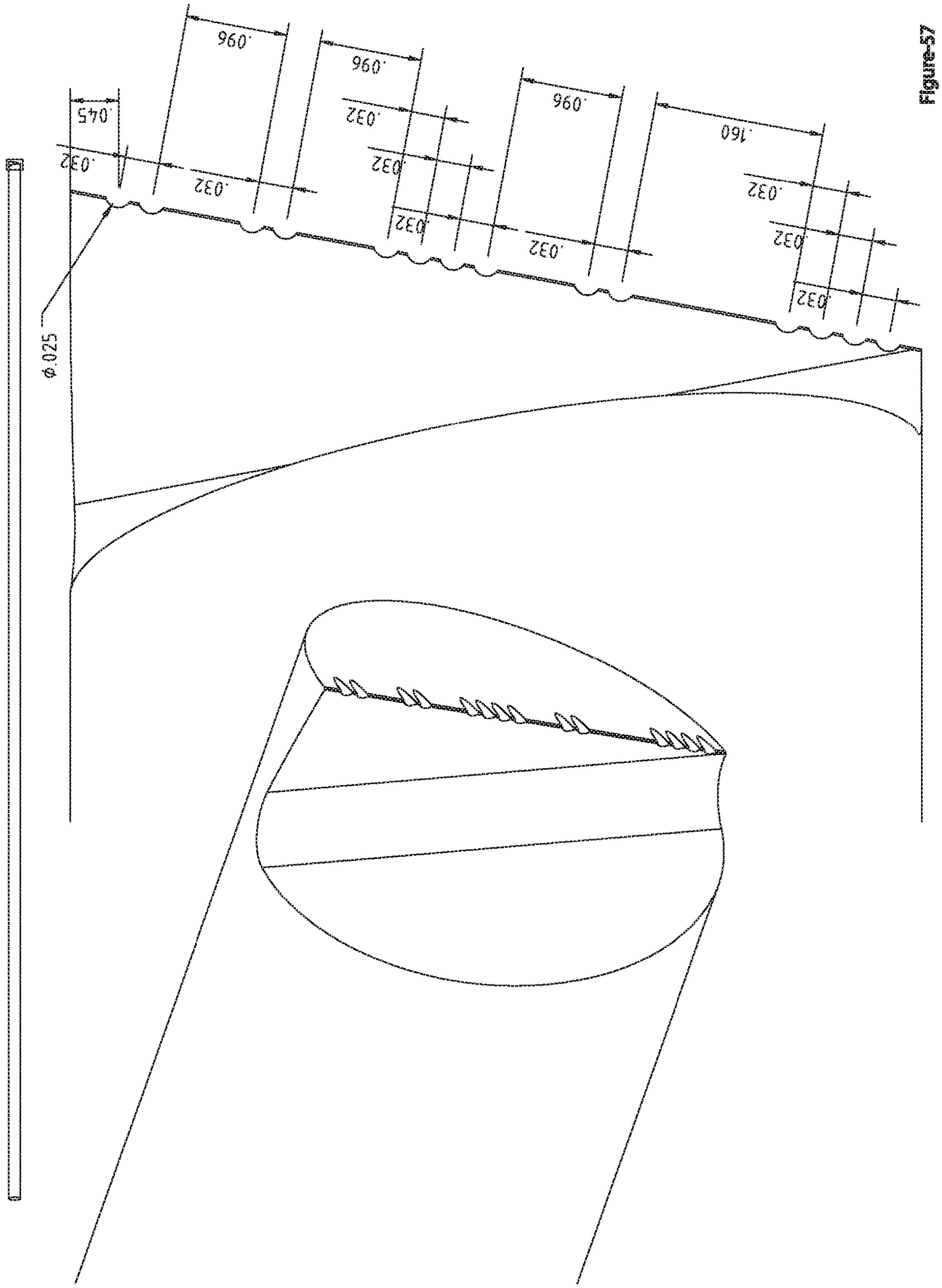
Figure 58:
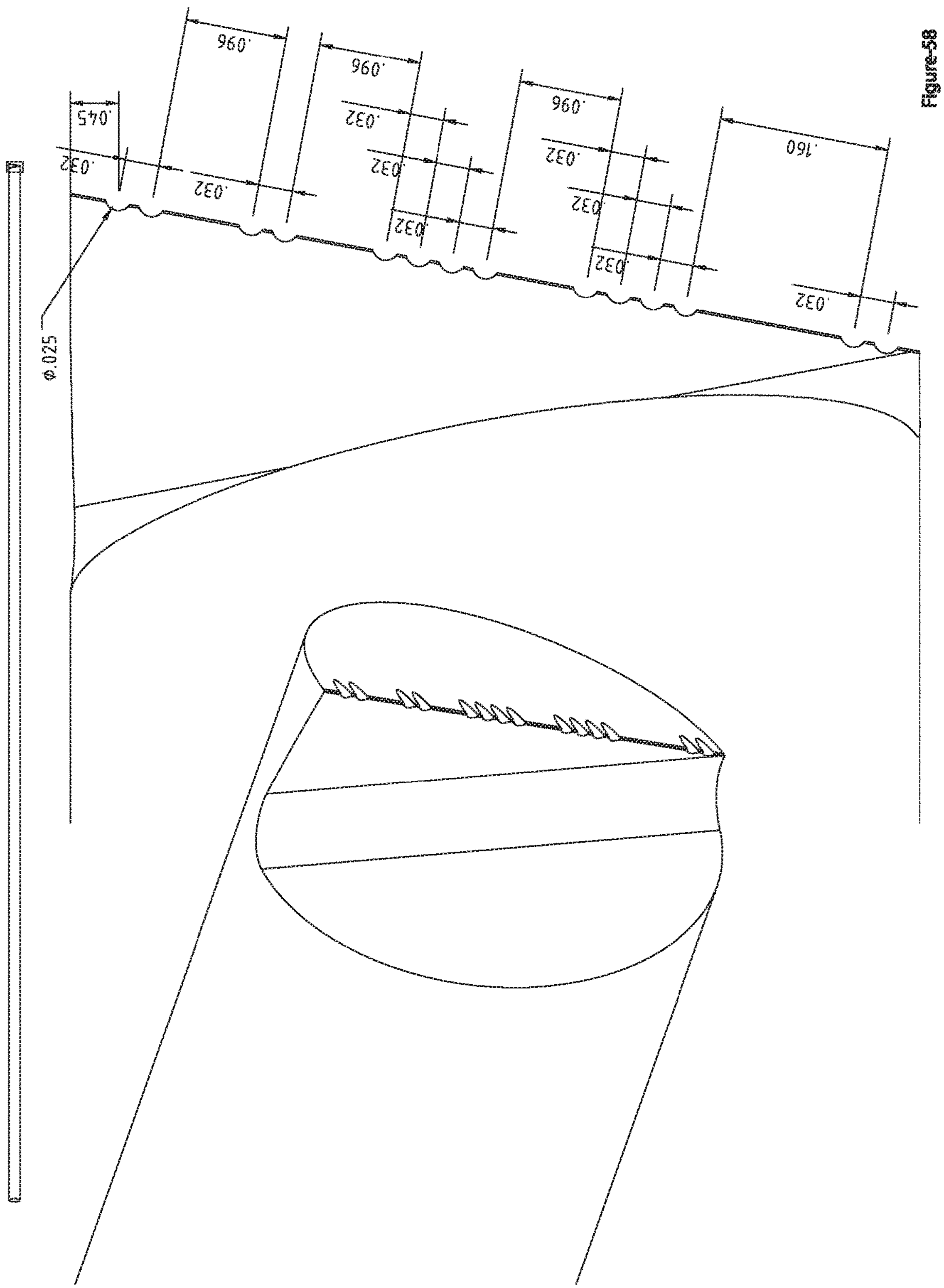
Figure 59:
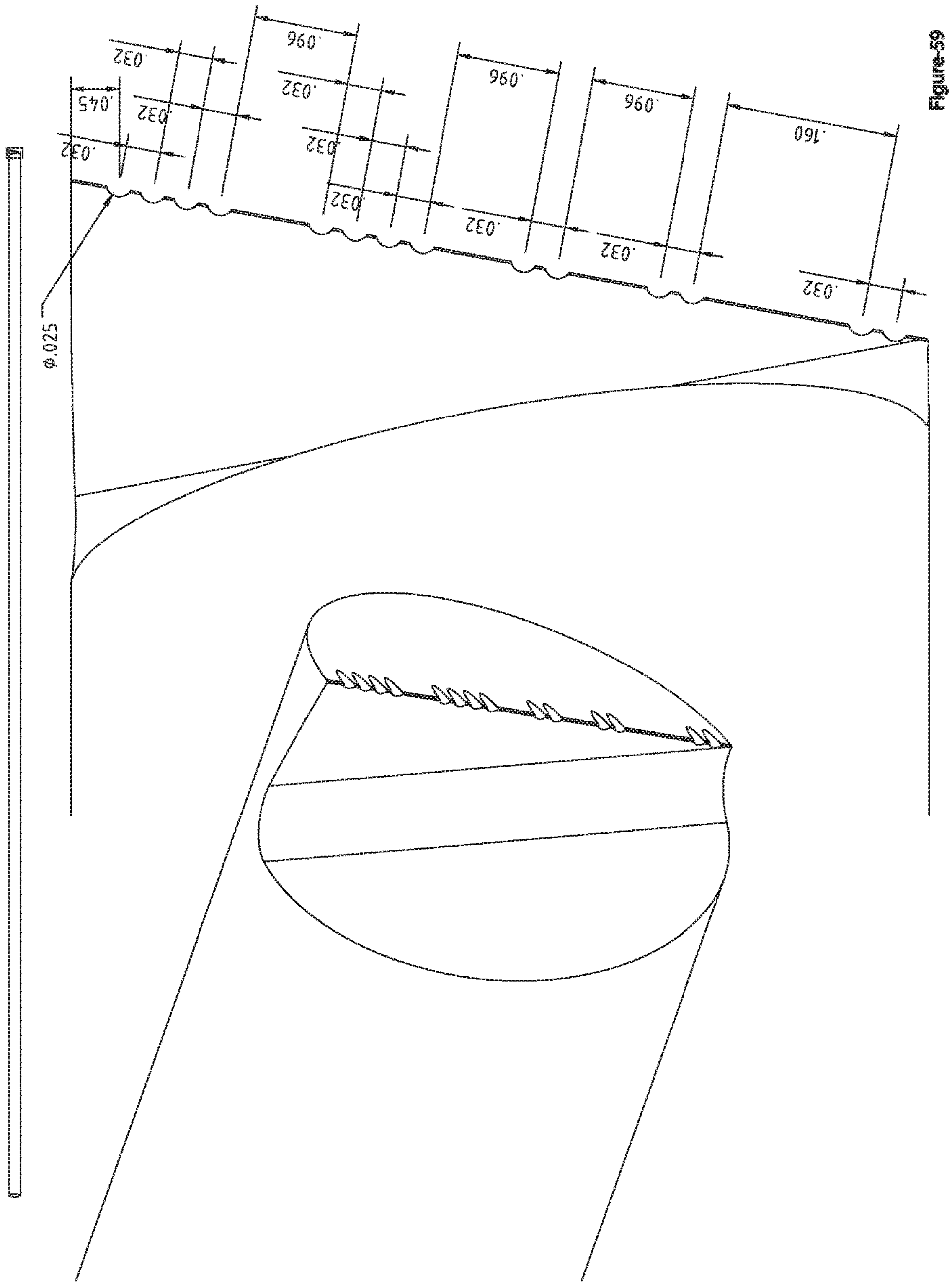
Figure 60:
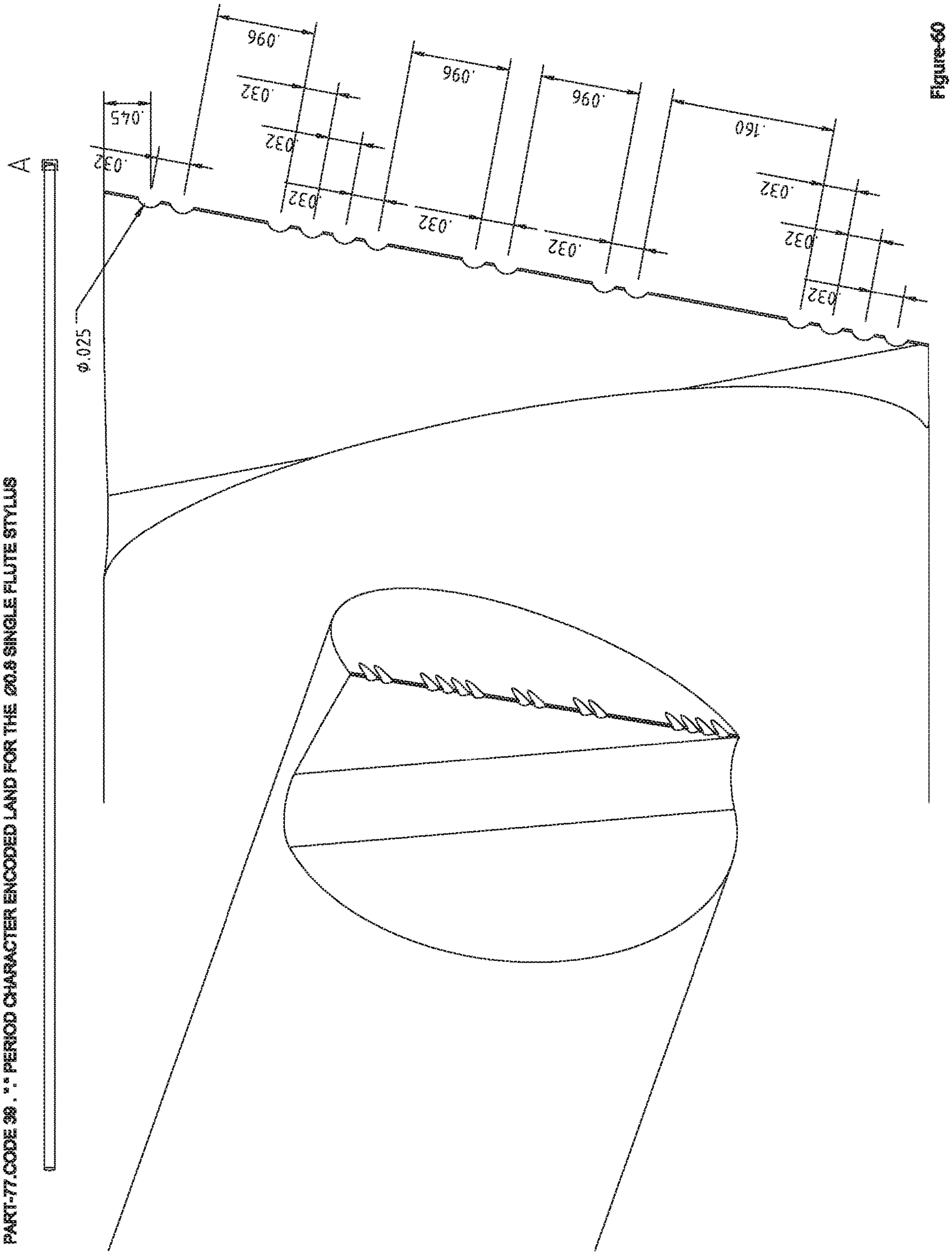
Figure 61:
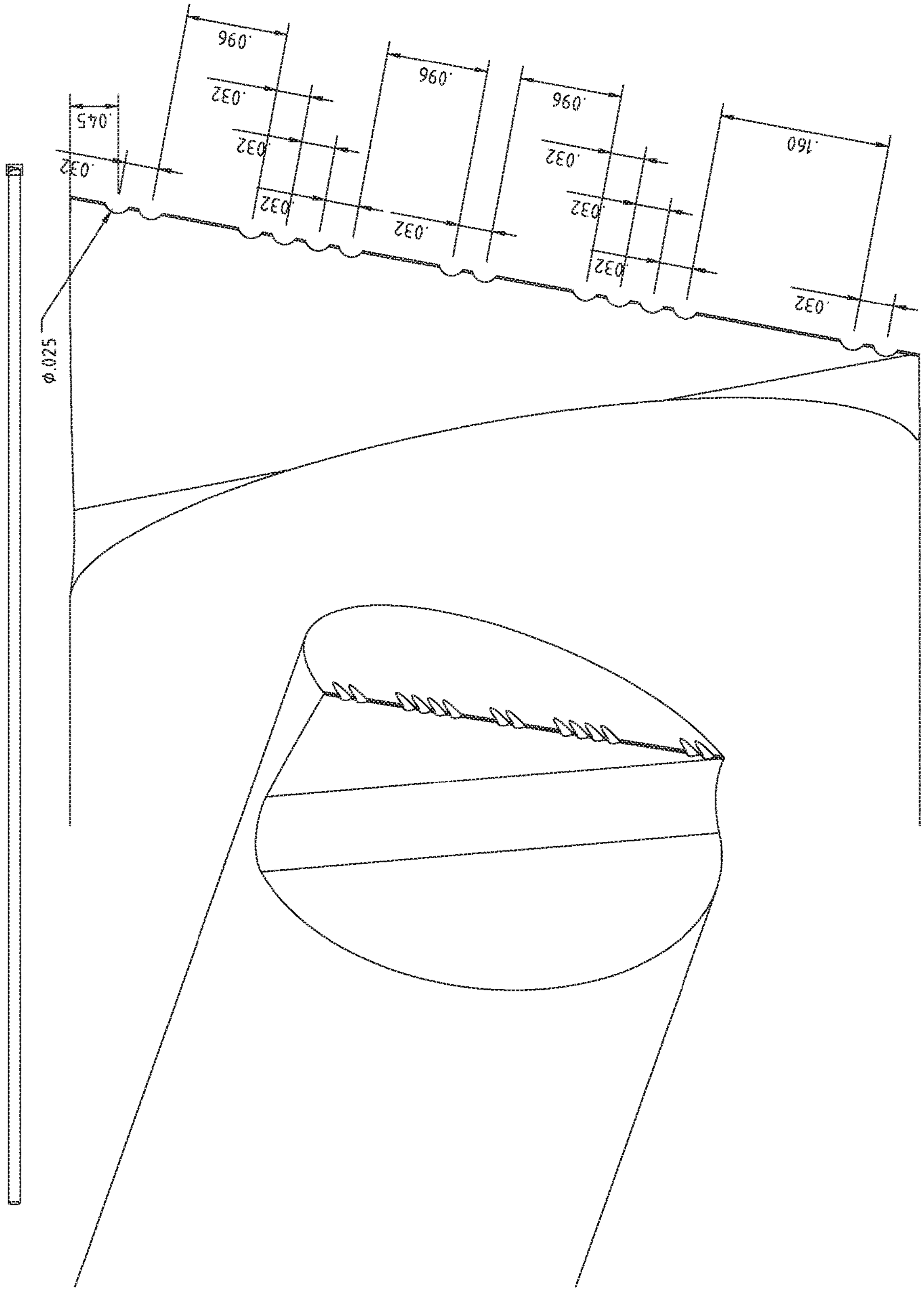
Figure 62:
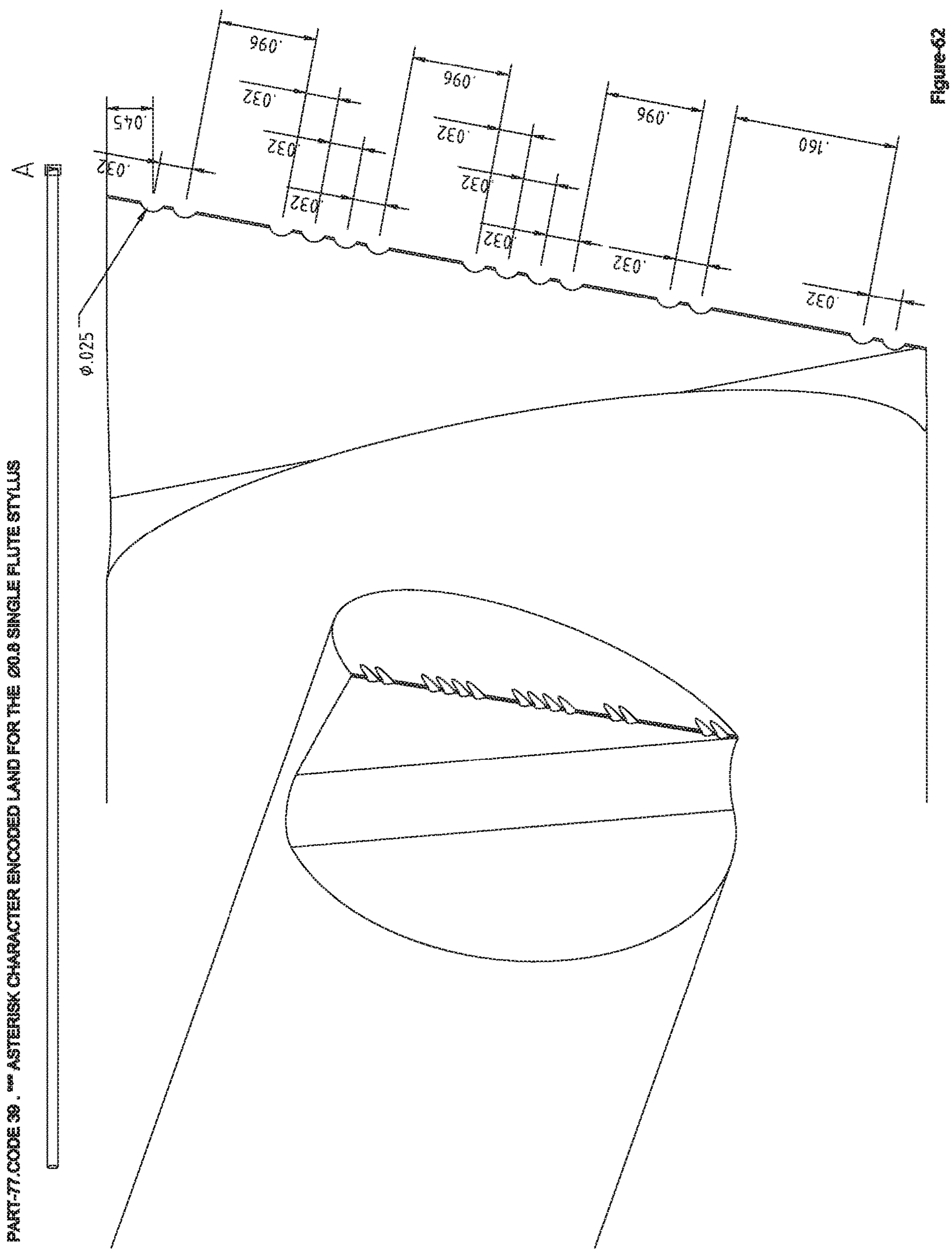
Figure 63:
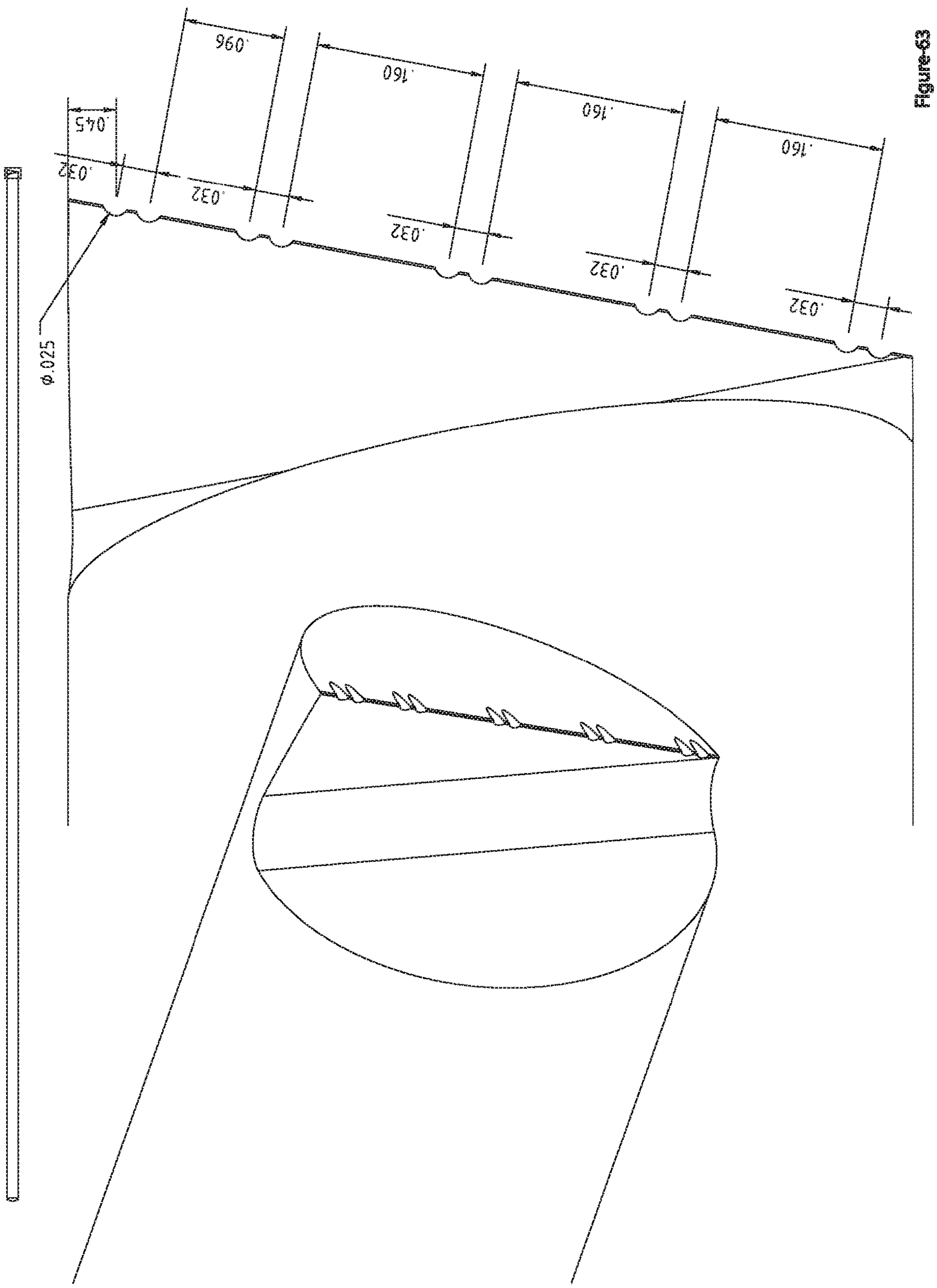
Figure 64:
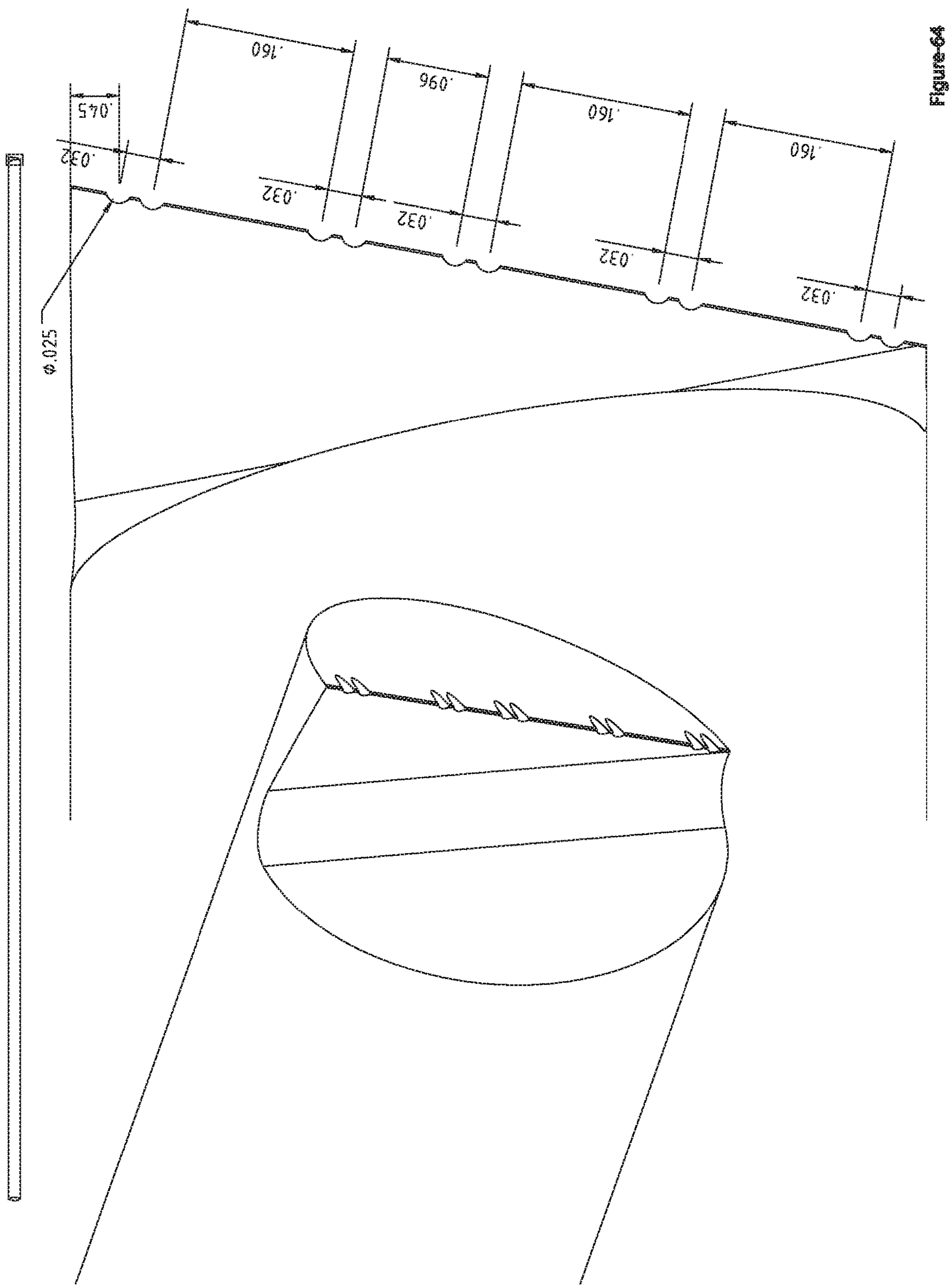
Figure 65:
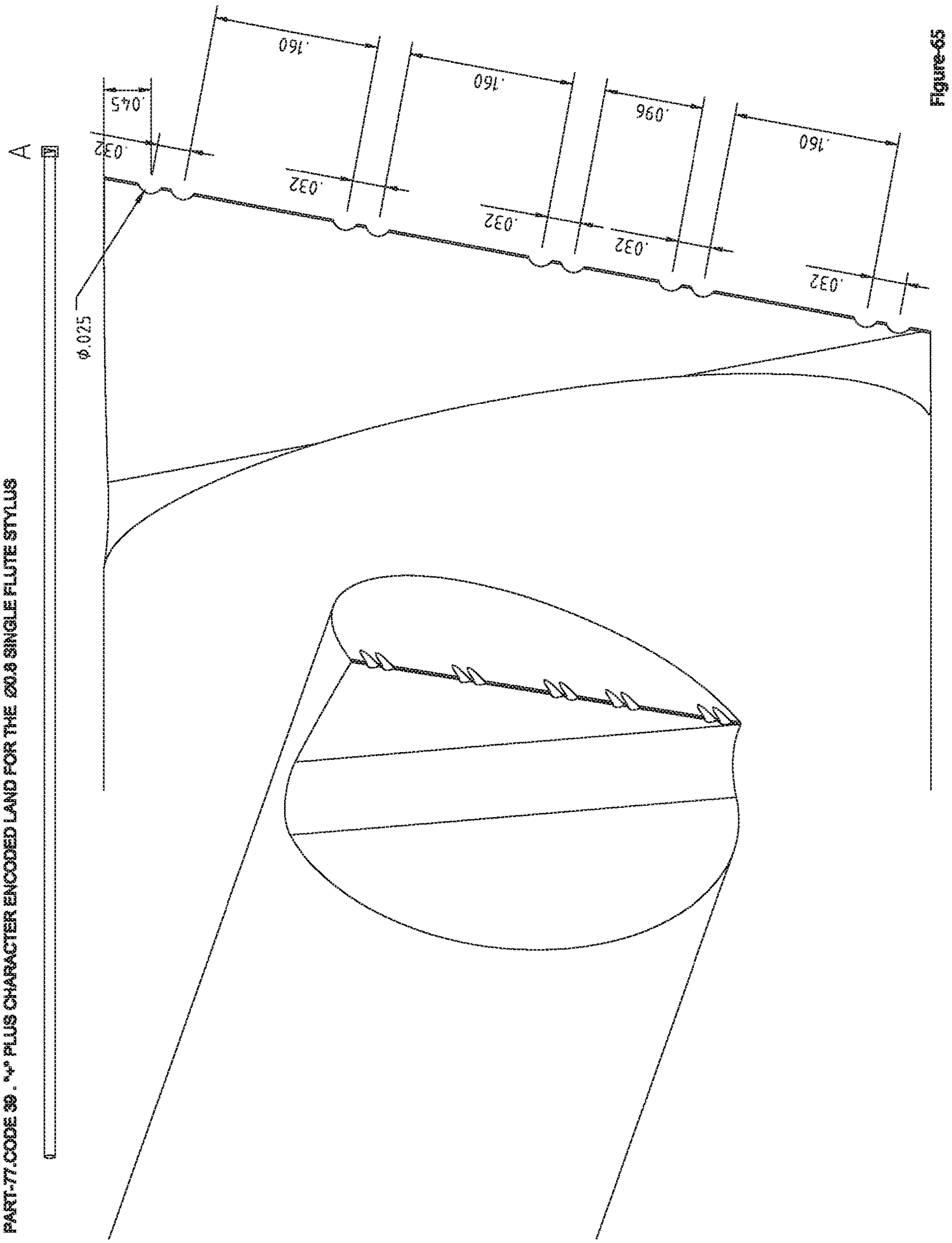
Figure 66:
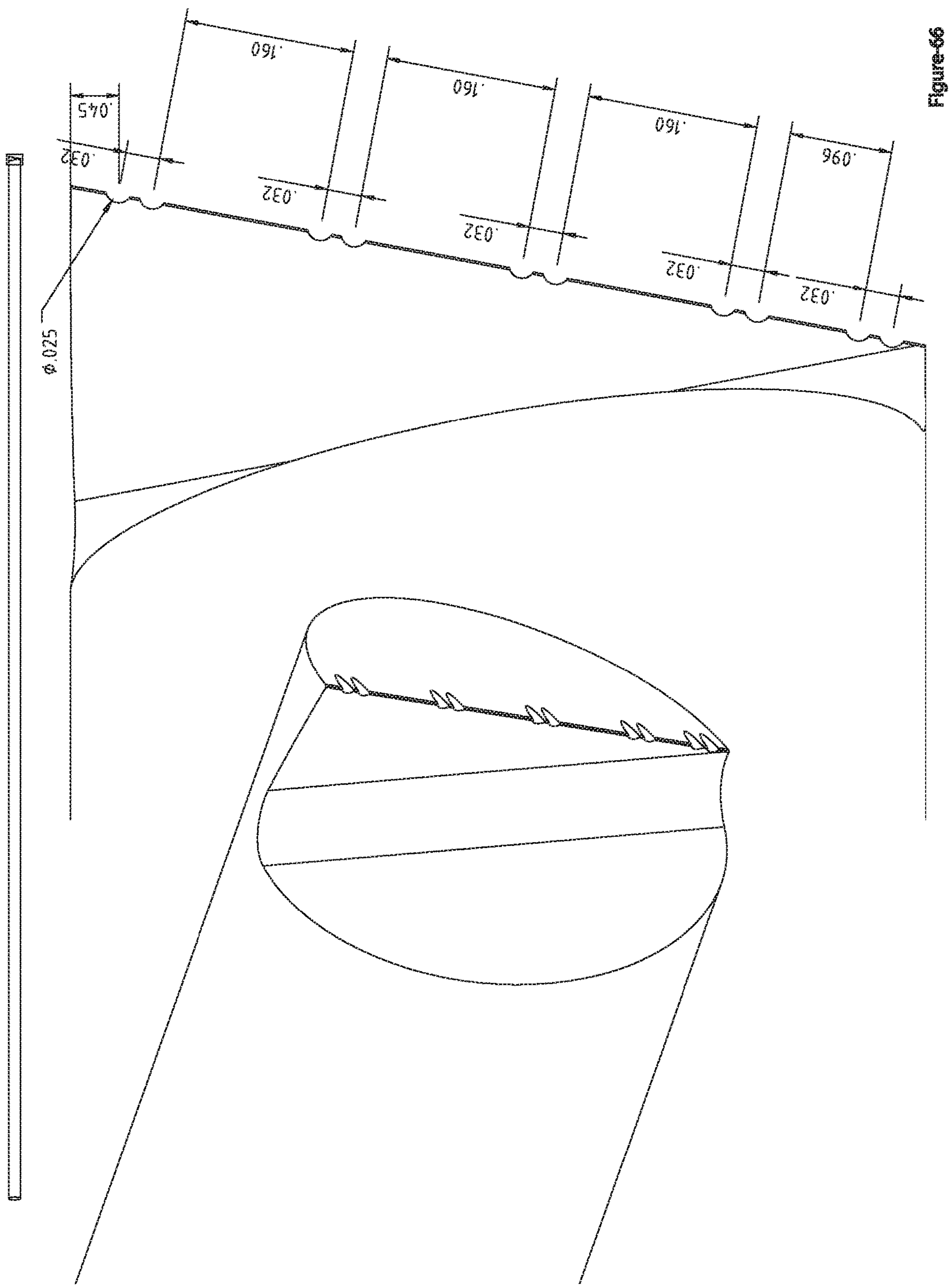
Figure 68A:
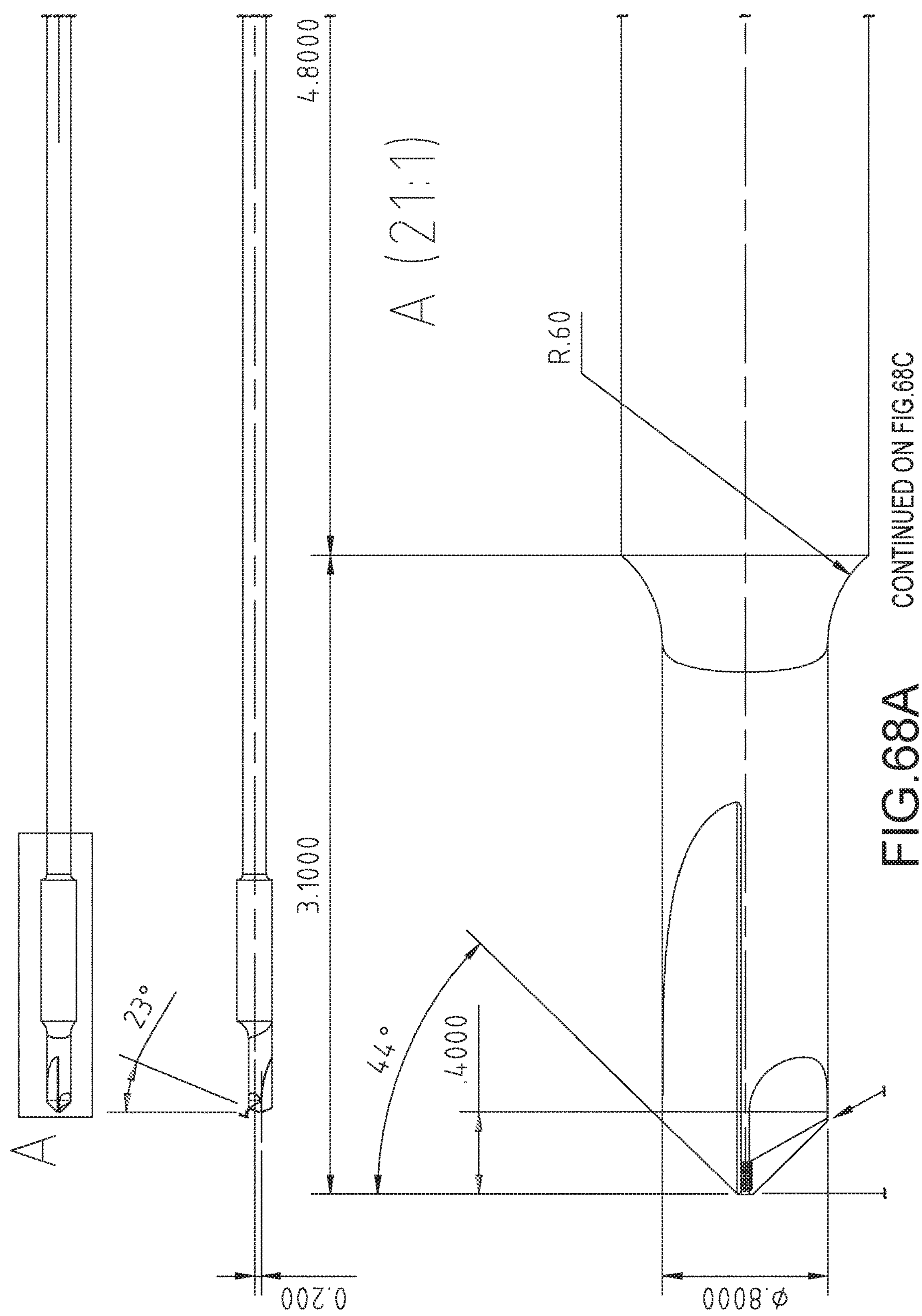
Figure 68B:
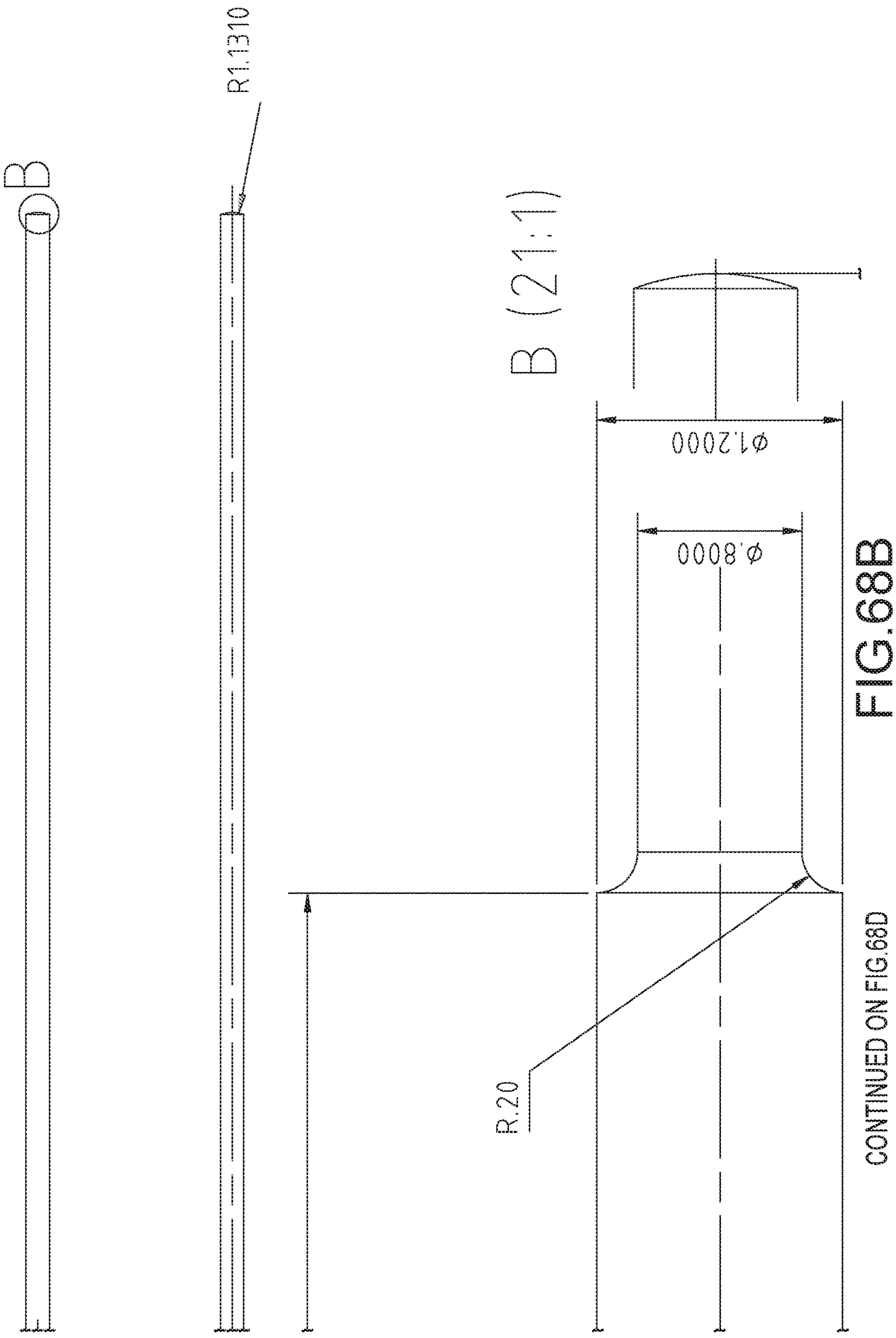
Figure 68C:
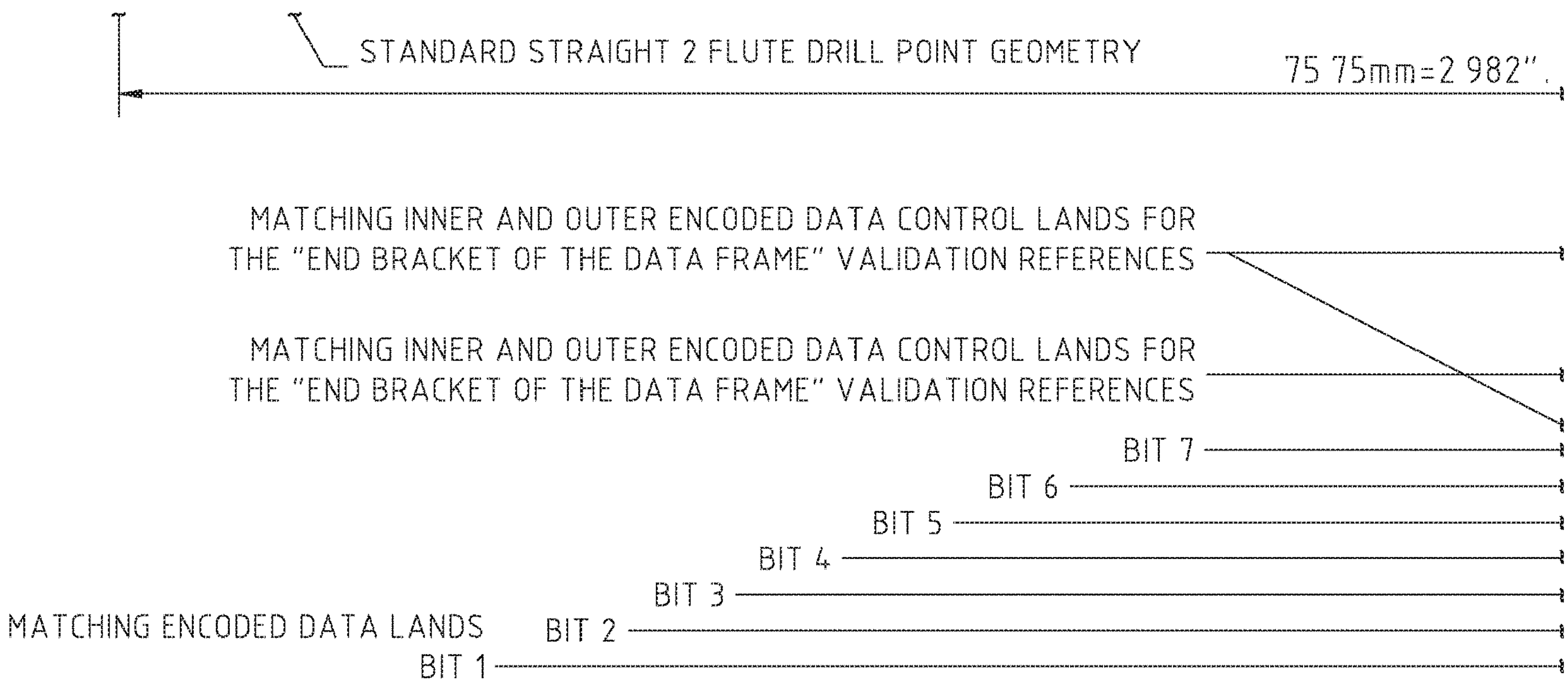
Figure 69A:
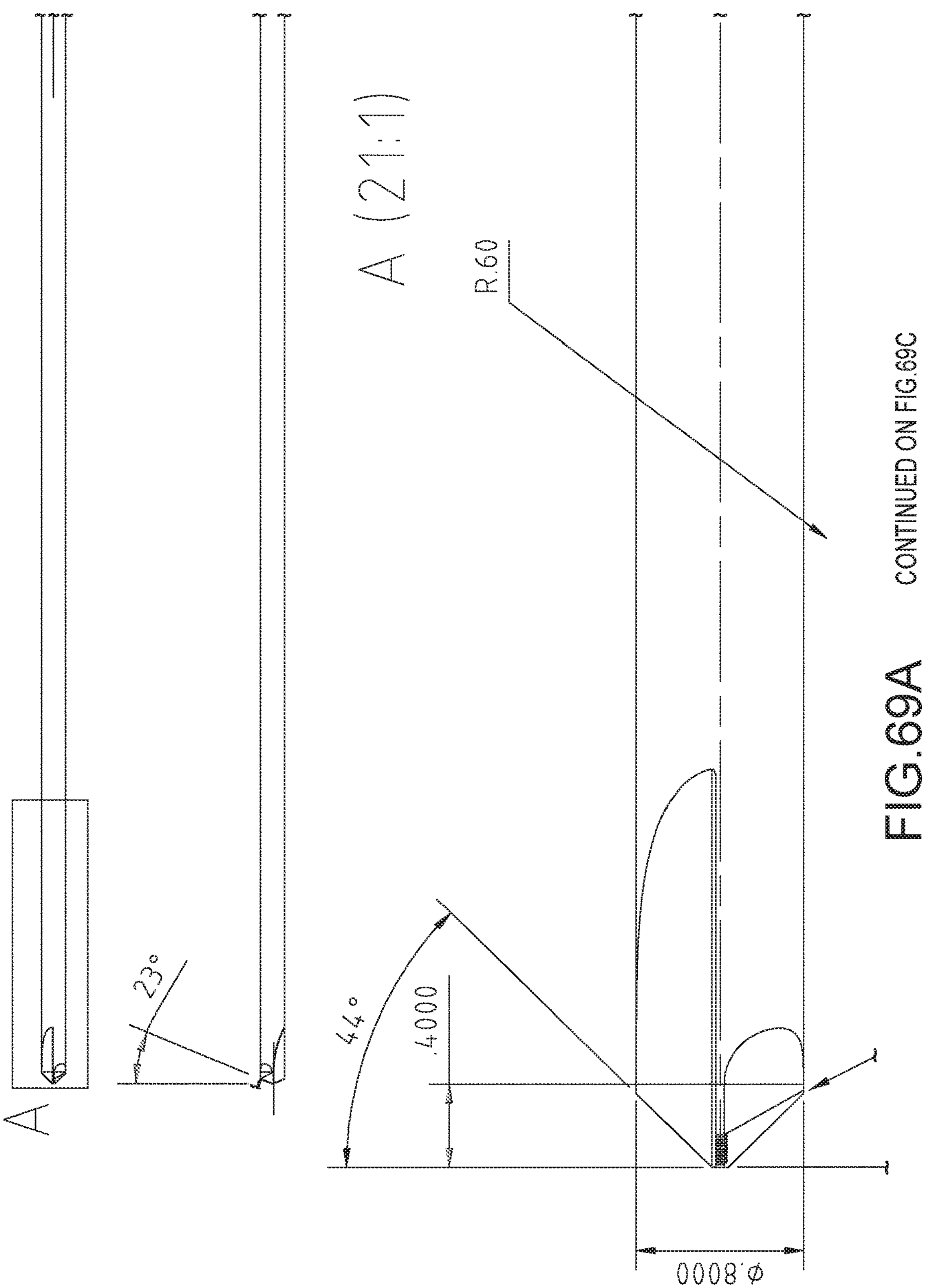
Figure 69B:
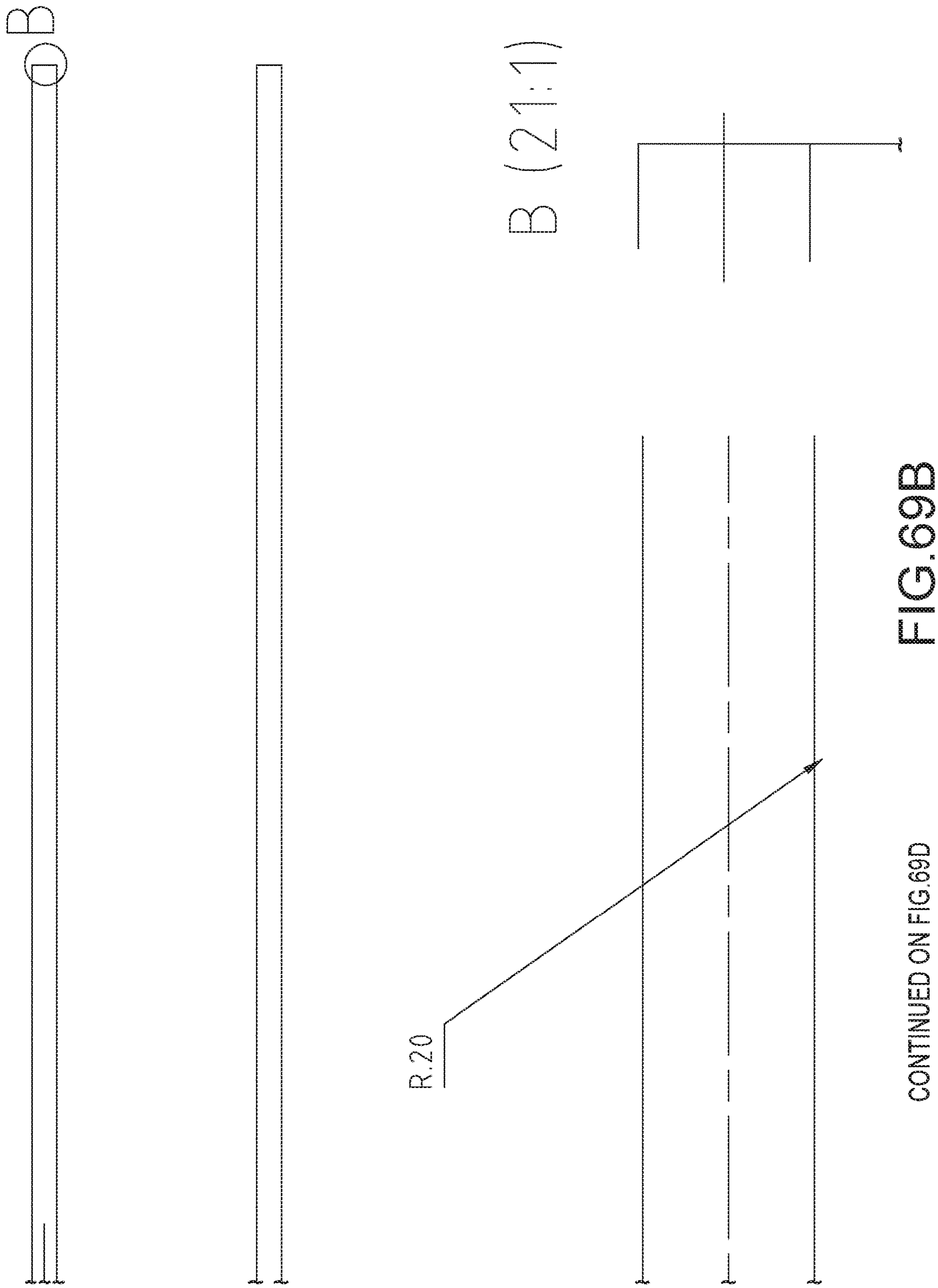
Figure 69C:
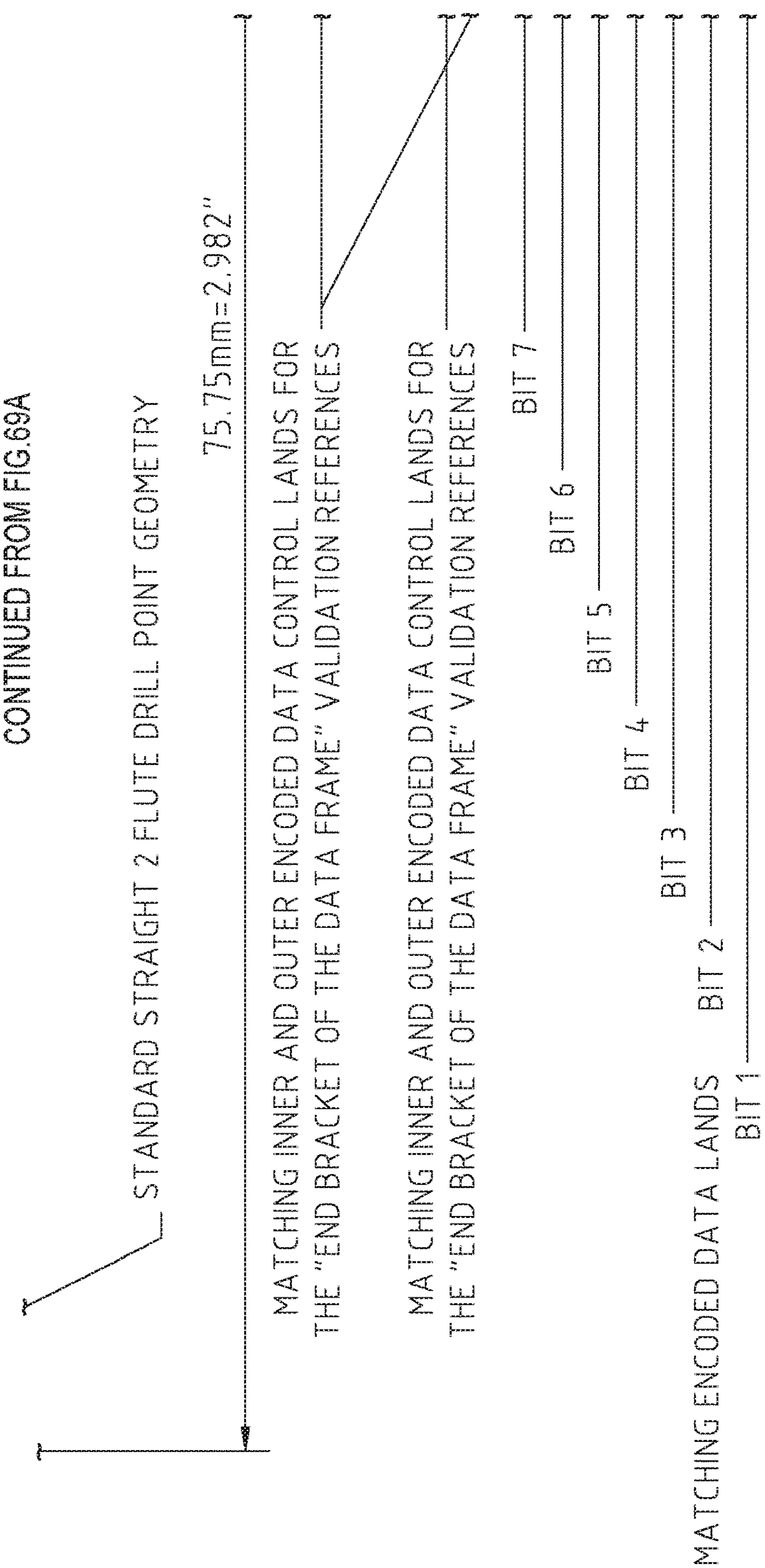

Code 39 Encoded Land Pattern:

Via the Cutting Land's Detail having a sequence of raised and or lowered rings creating a 3d barcode pattern being machine readable similar to the circular "Bull's-Eye Code" or "SureShot™" barcode using the Code 39 Encodation patterns as shown in FIGS. 19A-19F below for engraving work-piece articles as shown in FIGS. 20-22 via the forty four Code 39 encoded land engraving styluses as shown in FIGS. 23-66, or other existing 1d barcode Encodation patterns, or new circular 3d barcode Encodation schemas. The methods and engraving tools disclosed herein can be used to encode data according to various known data encoding schema such as those described in *The Bar Code Book 5th* Edition ISBN: 978-1-4251-3374-0, pgs. 29, 76, the disclosure of which is incorporated herein by reference in its entirety.

20-Bit Encoded Land Pattern:

As an example, the Selectable Character Multiple Stylus Orbital Engraving Tool having the Stylus Pattern Disk Part 68.12 has the following encoded data table for the Ø0.8 mm single point engraving stylus as shown having a maximum binary value of 262,143 for the 18 raised encoded lands being bracketed between two Validation Reference lands created by the single point cutting edge engraving stylus.

When combined with the combinations of the 15 specific individual stylus locations for the 12 character Part-68.12 Stylus Pattern Disk, this can potentially create 1.89714E+81 unique encoded combinations that are capable of being shown with the engraving of the #1 and #8 characters to utilize all of the 15 styluses.

When combined with the combinations of the 5 specific individual stylus locations for the 32 position Part-68.5 Stylus Pattern Disk, this can potentially create 1.23794E+27 unique encoded combinations capable of being shown with the engraving of the #31 binary character to utilize all of the 5 styluses.

Figure 2:
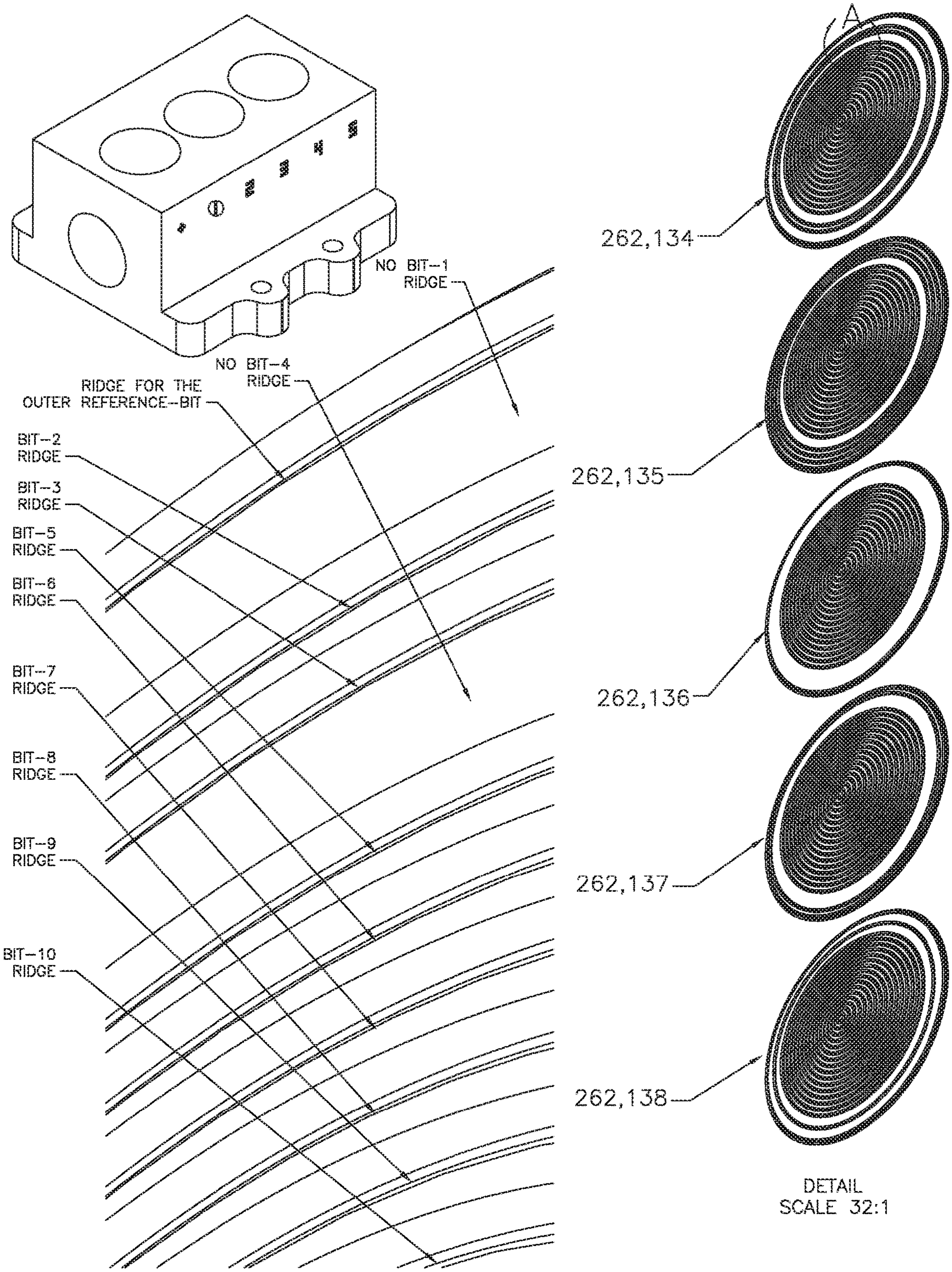
Figure 3:
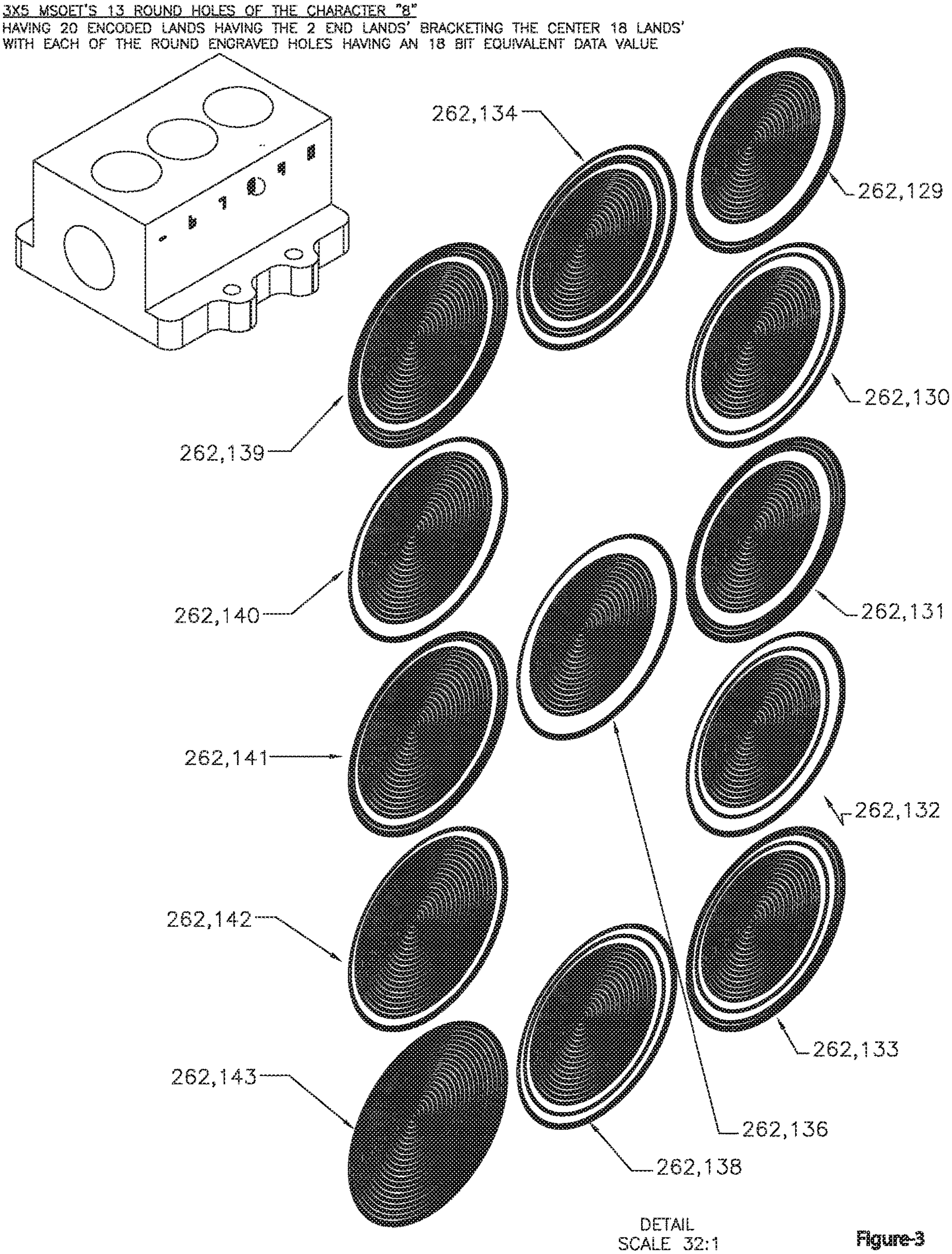
Figure 4:
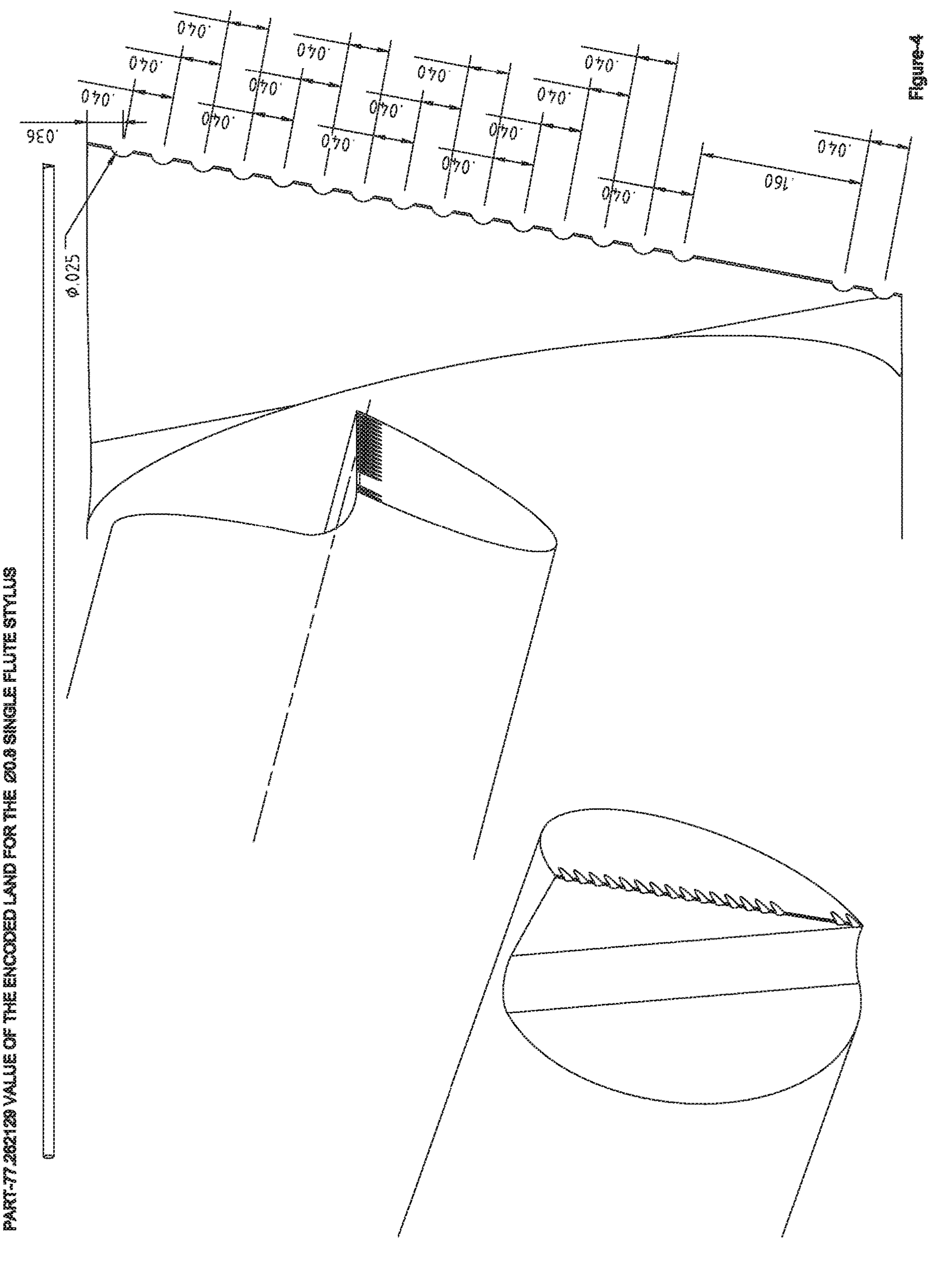
Figure 5:
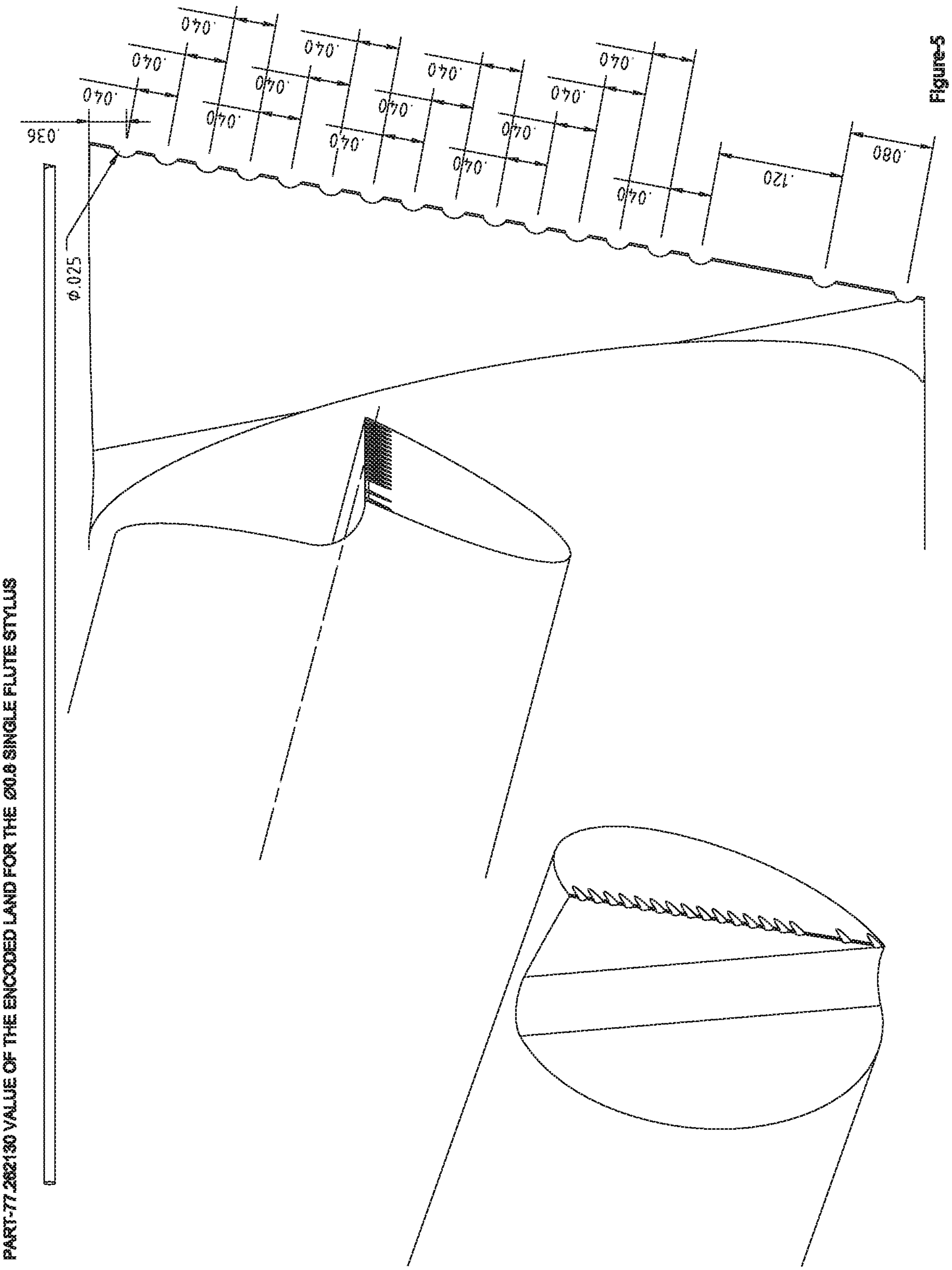
Figure 6:
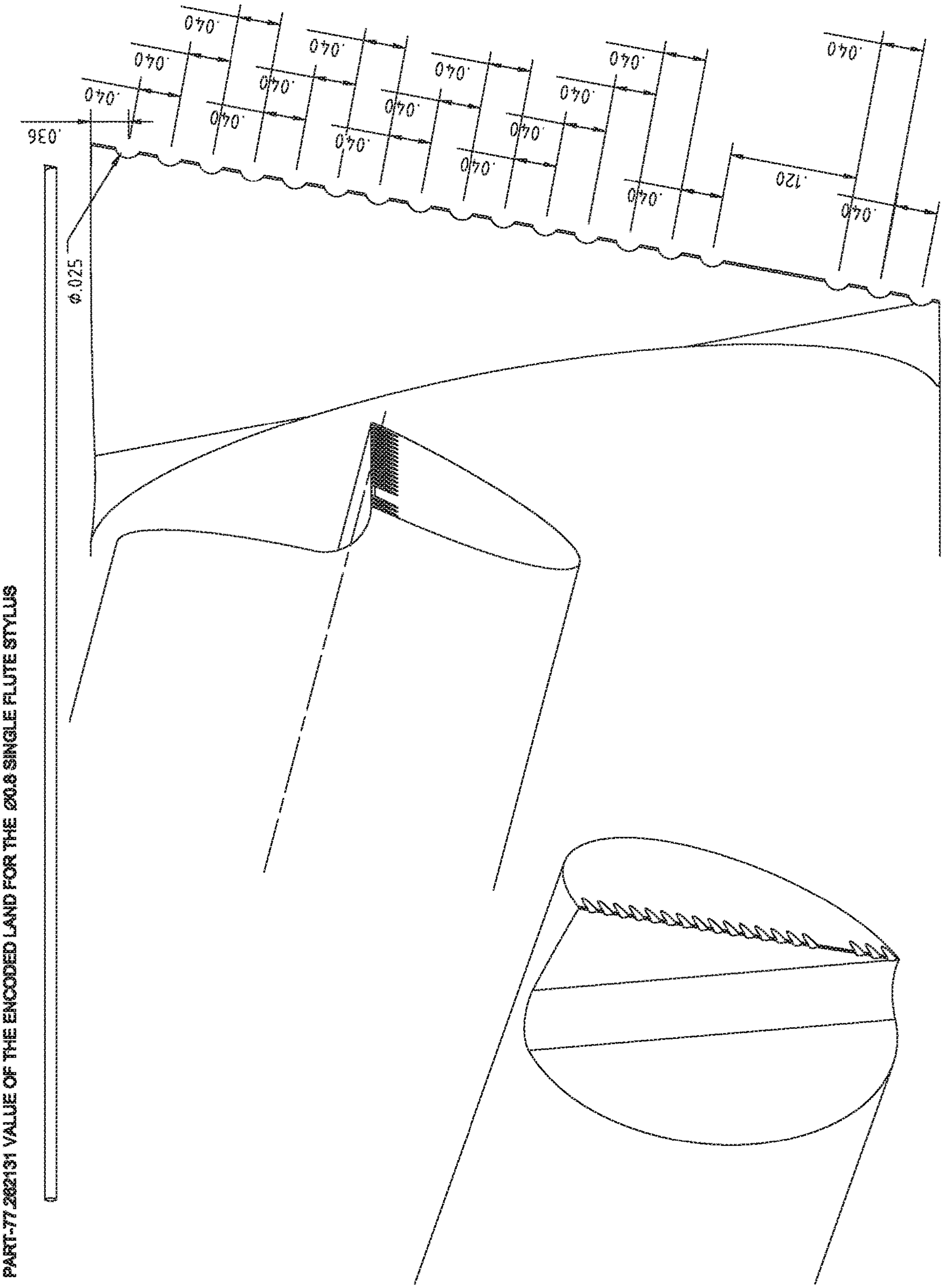
Figure 7:
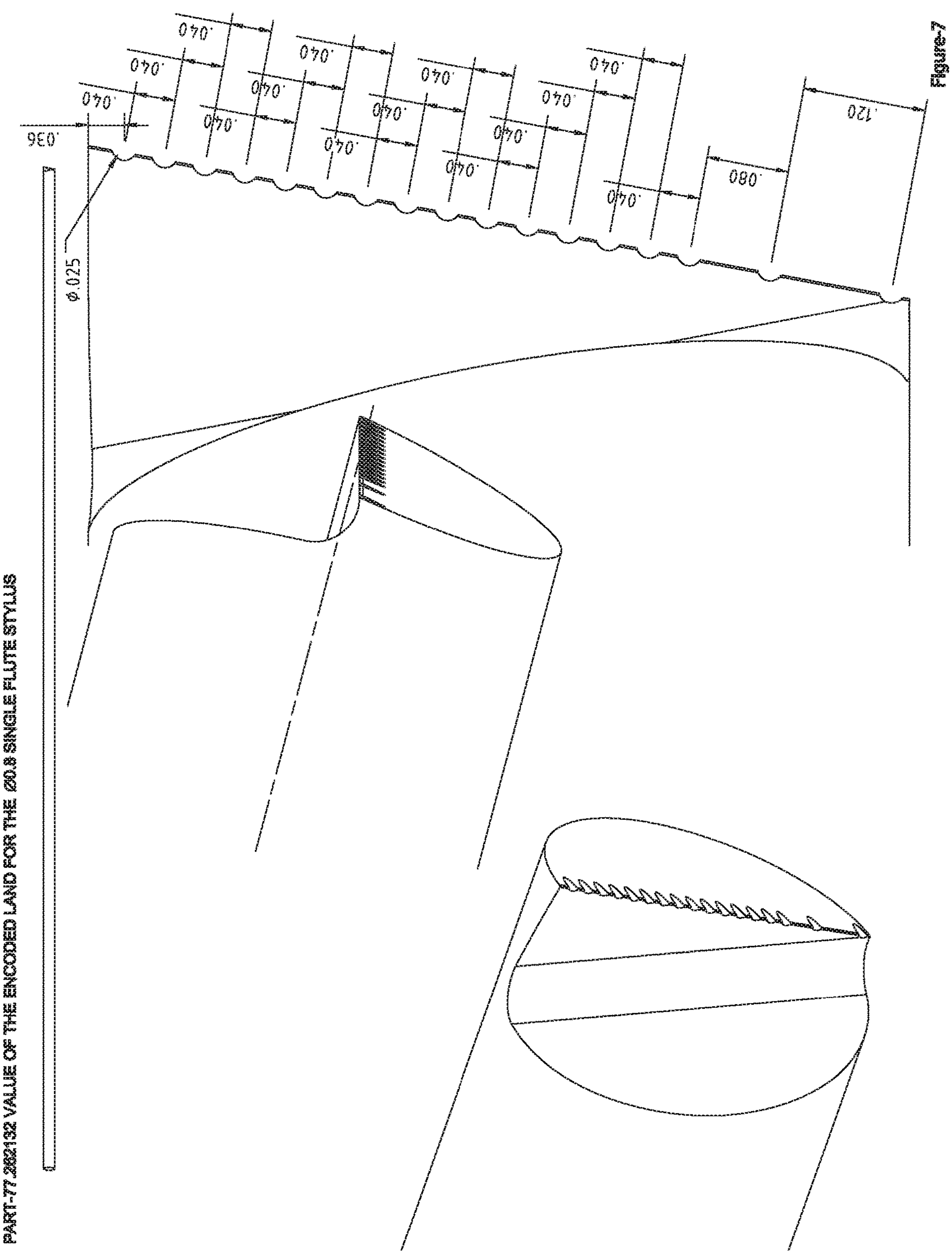
Figure 8:
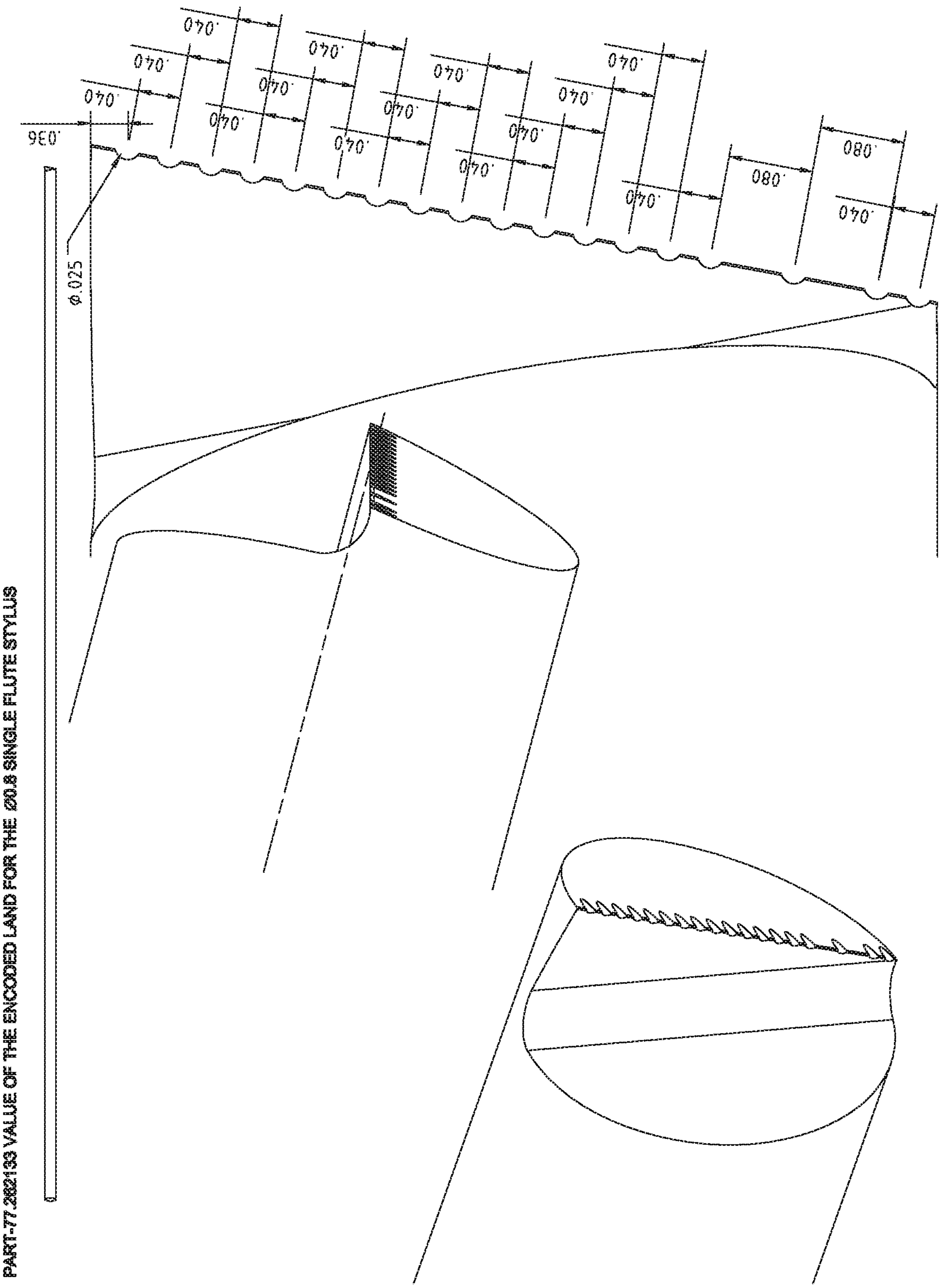
Figure 9:
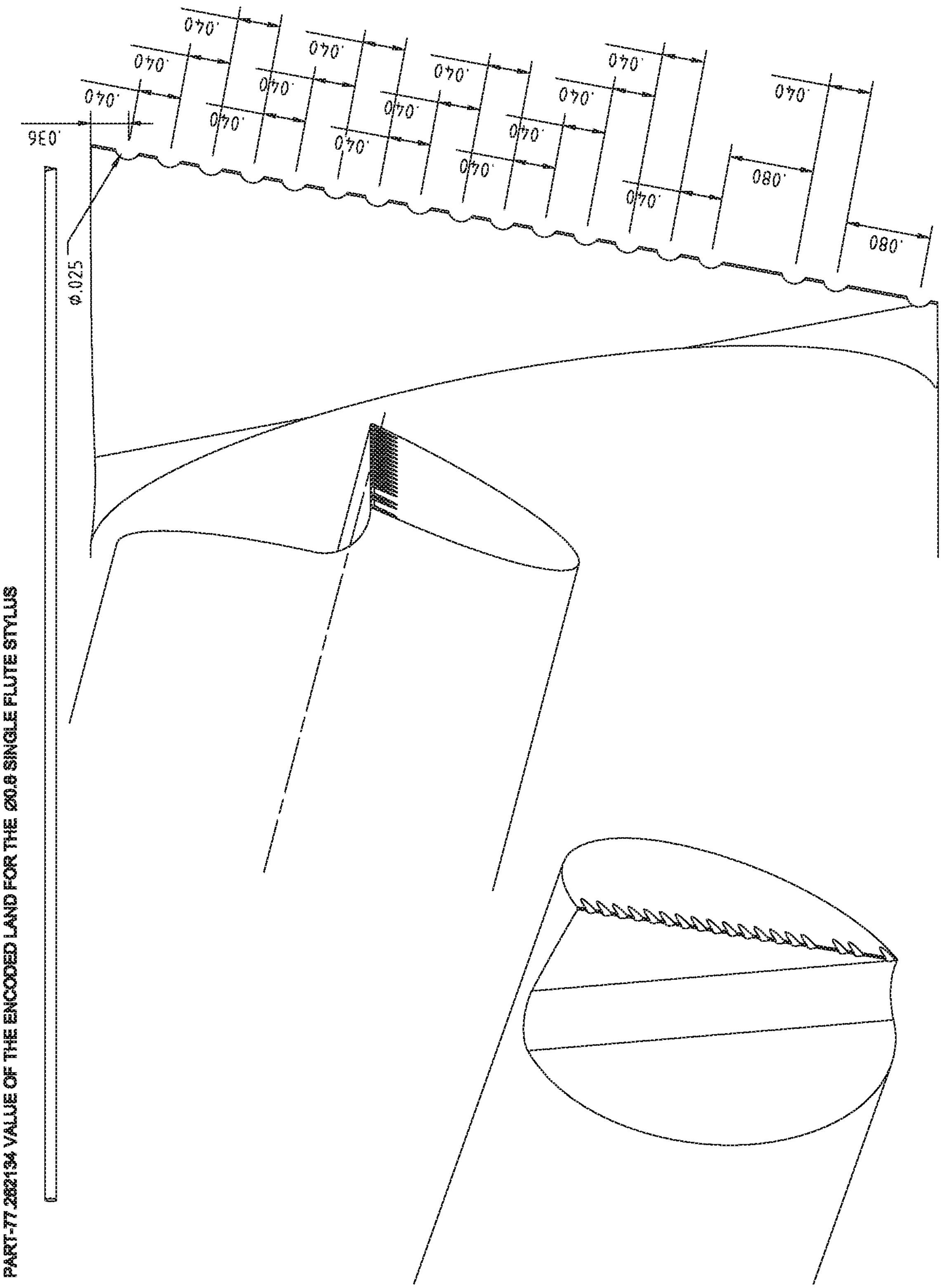
Figure 10:
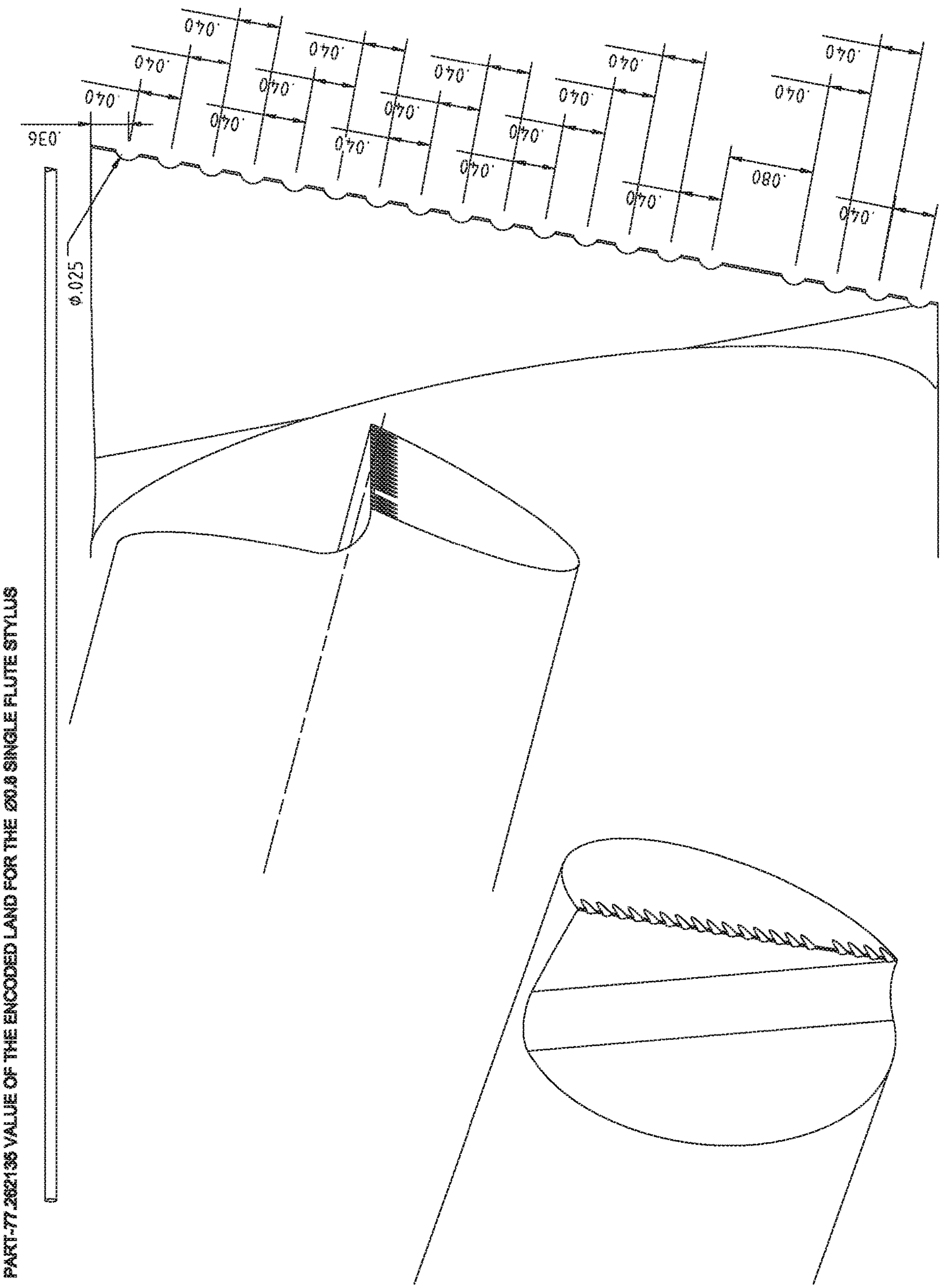
Figure 11:
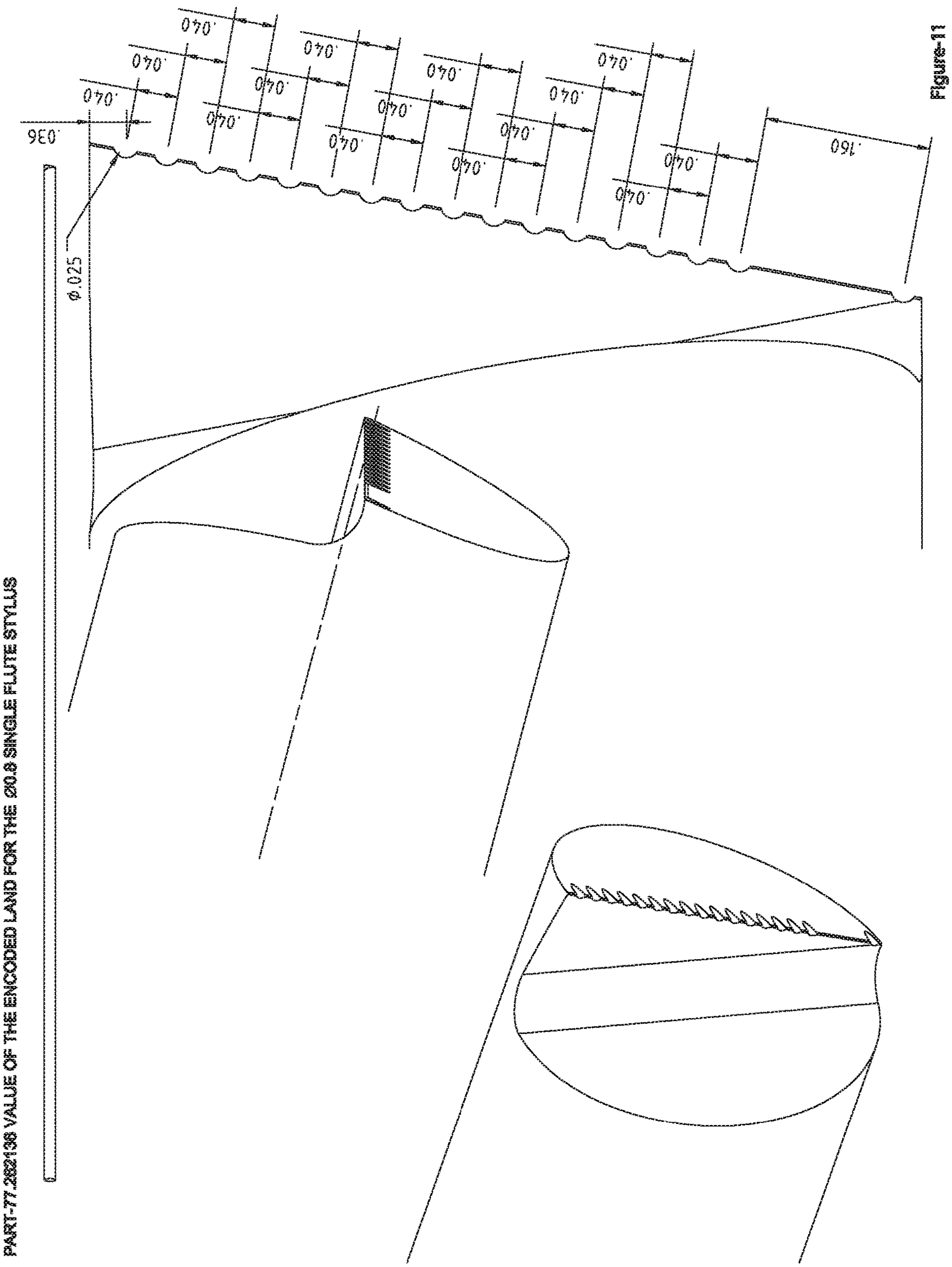
Figure 12:
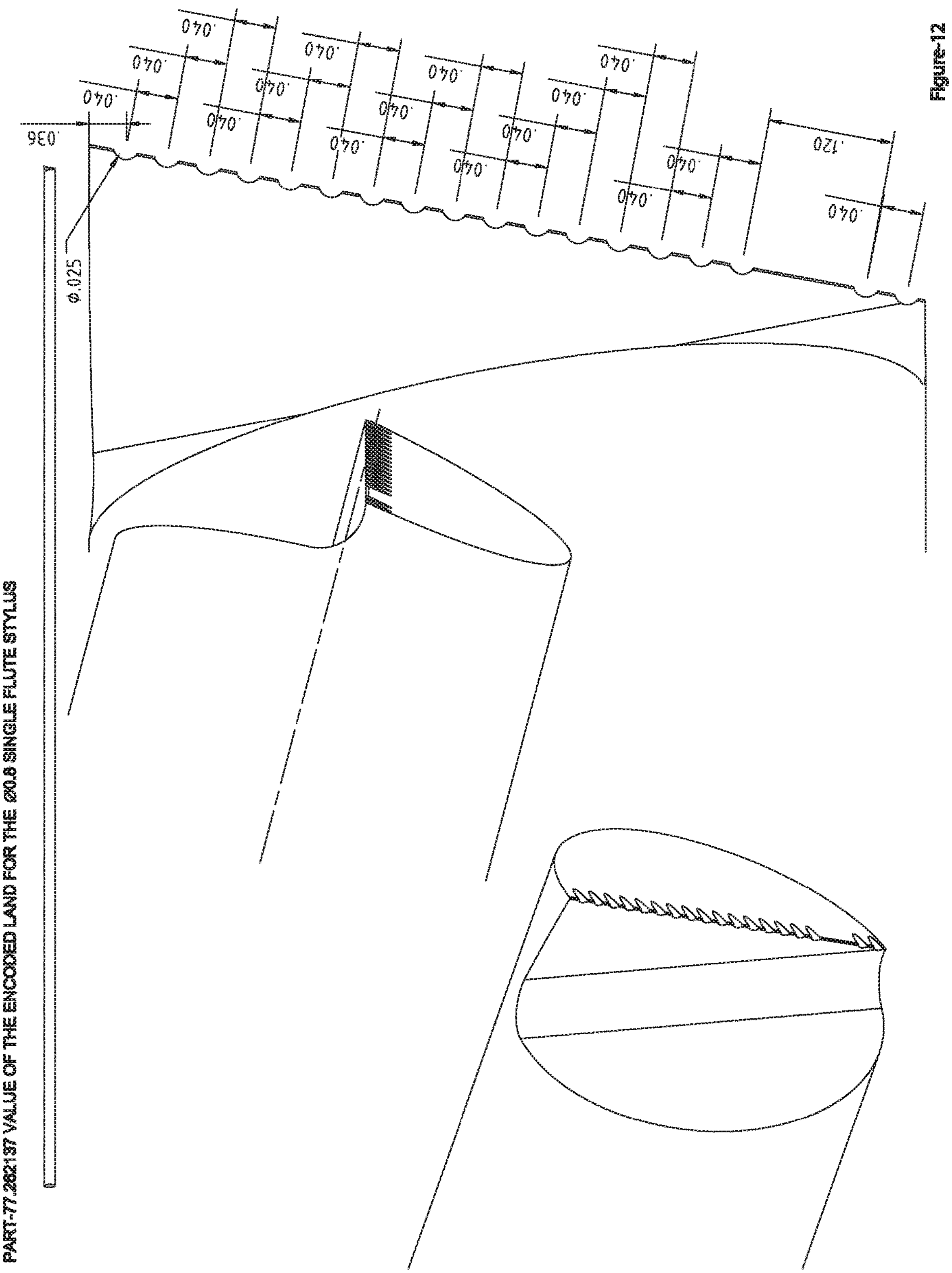
Figure 13:
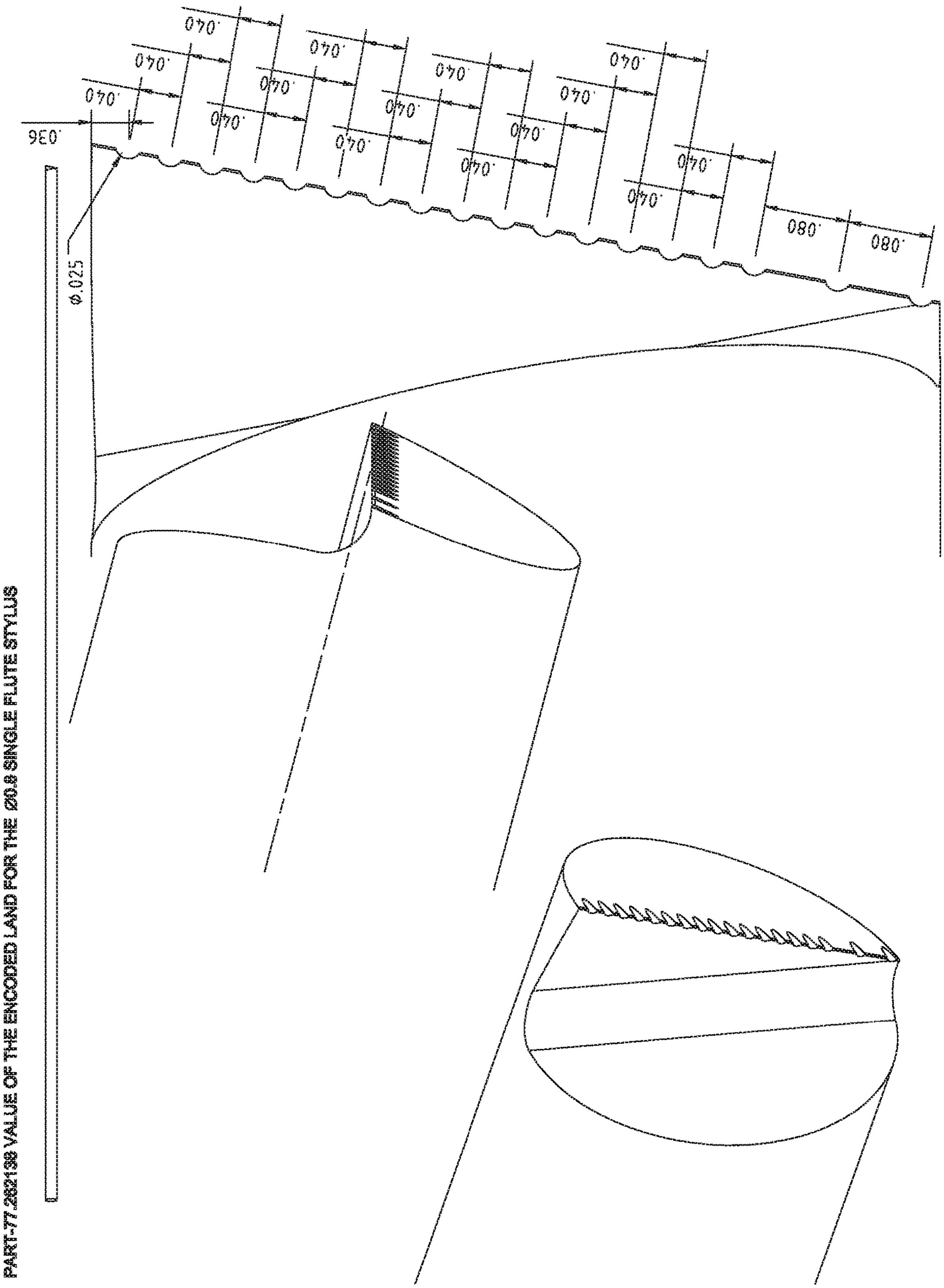
Figure 14:
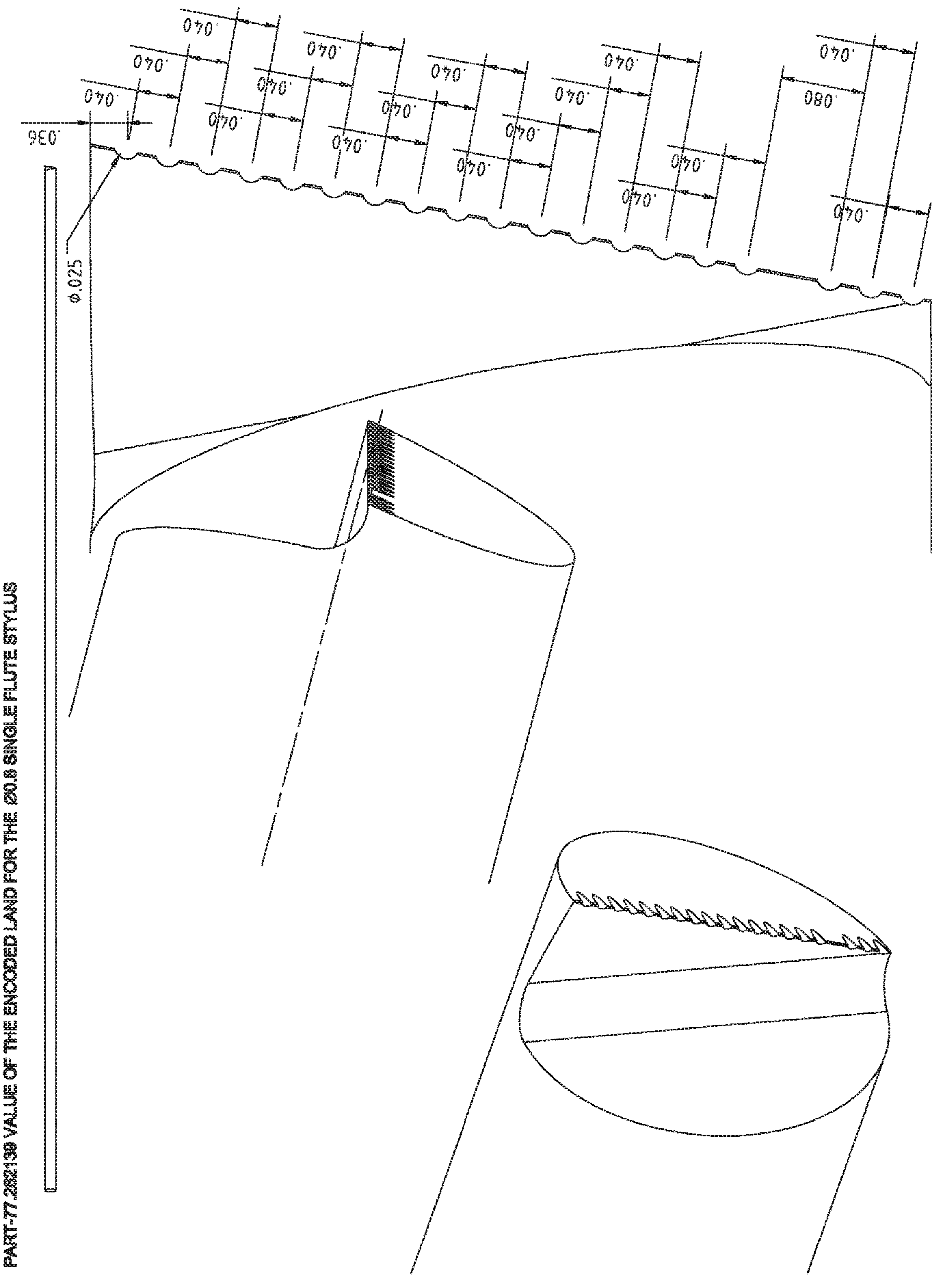
Figure 15:
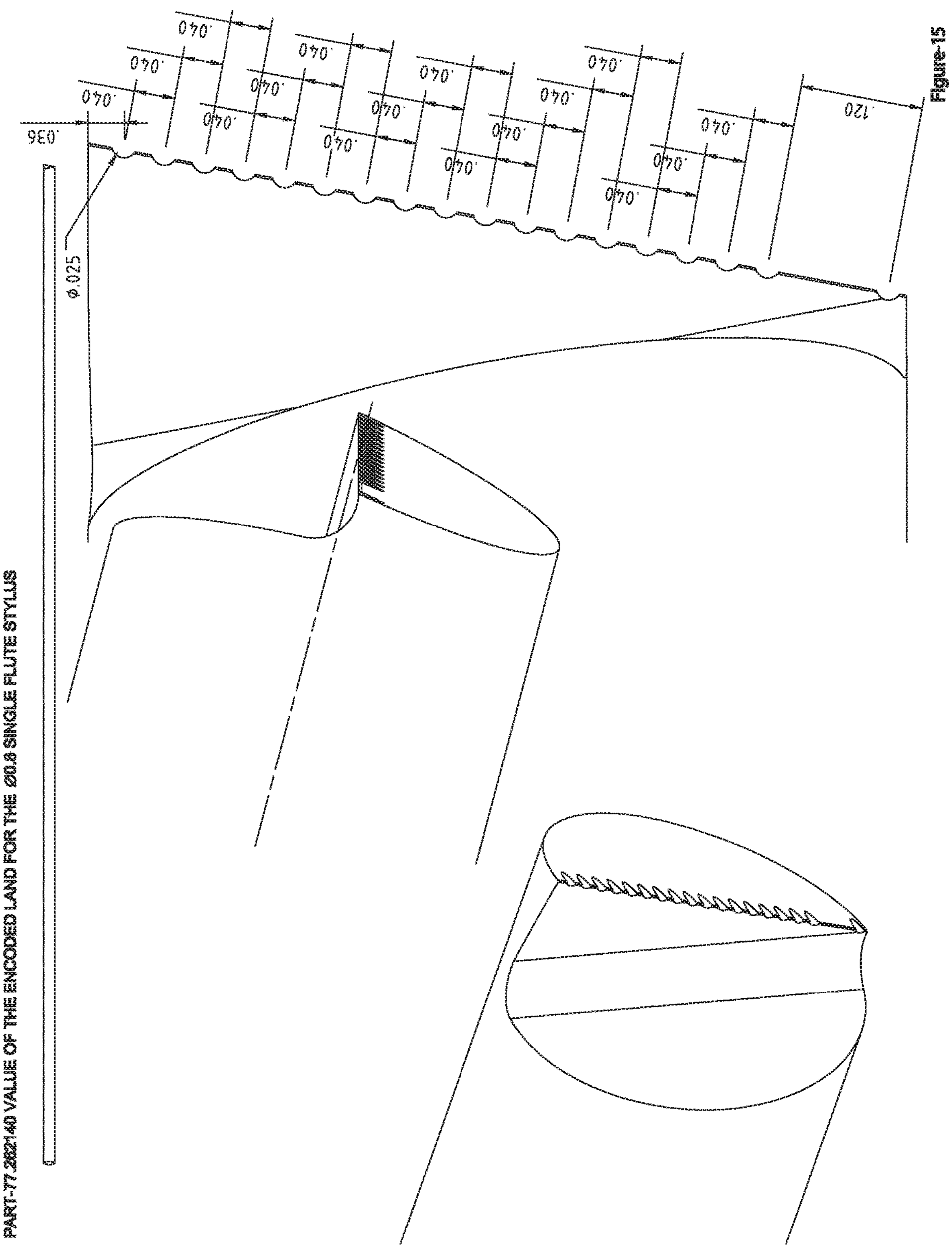
Figure 16:
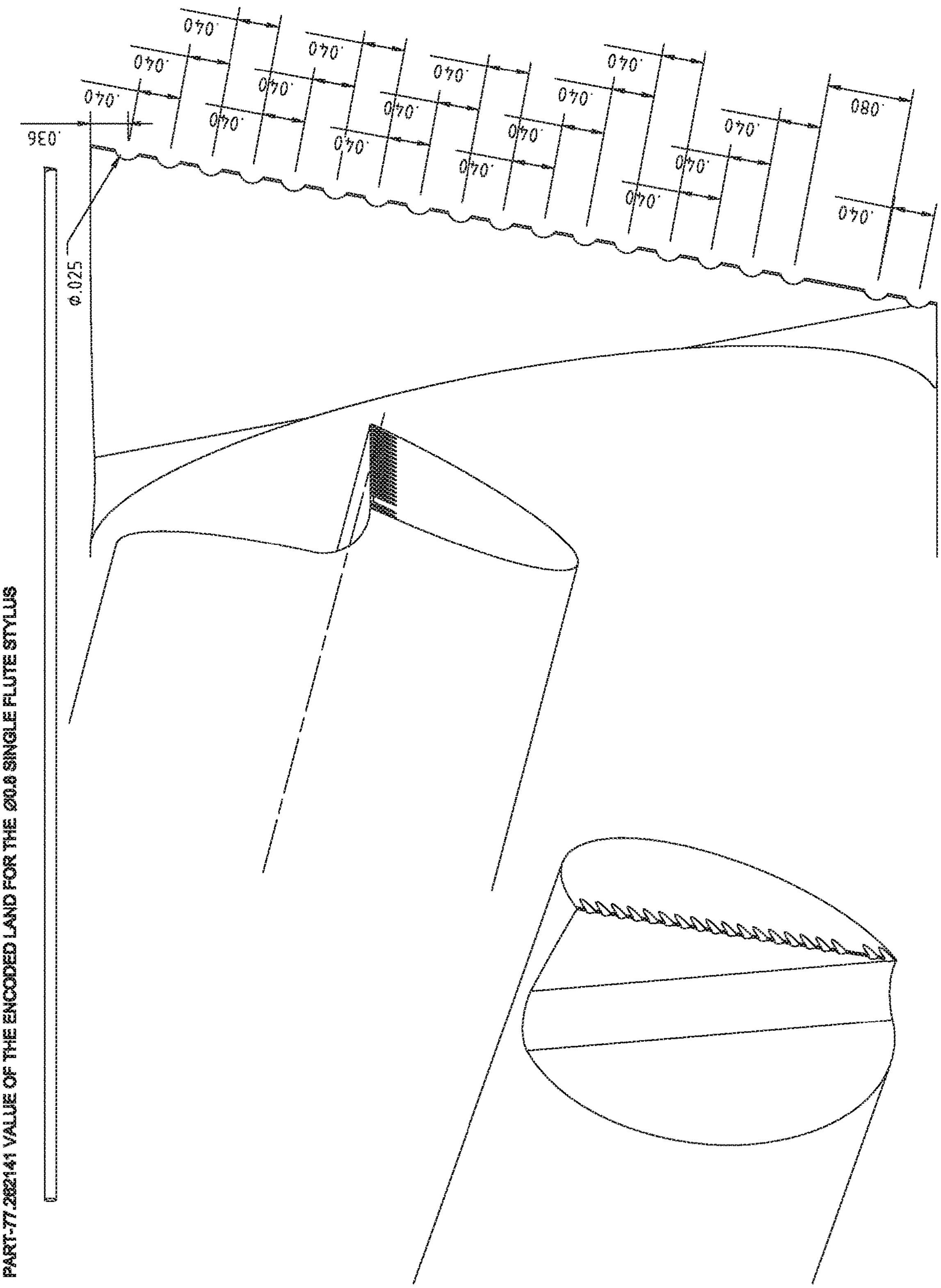
Figure 17:
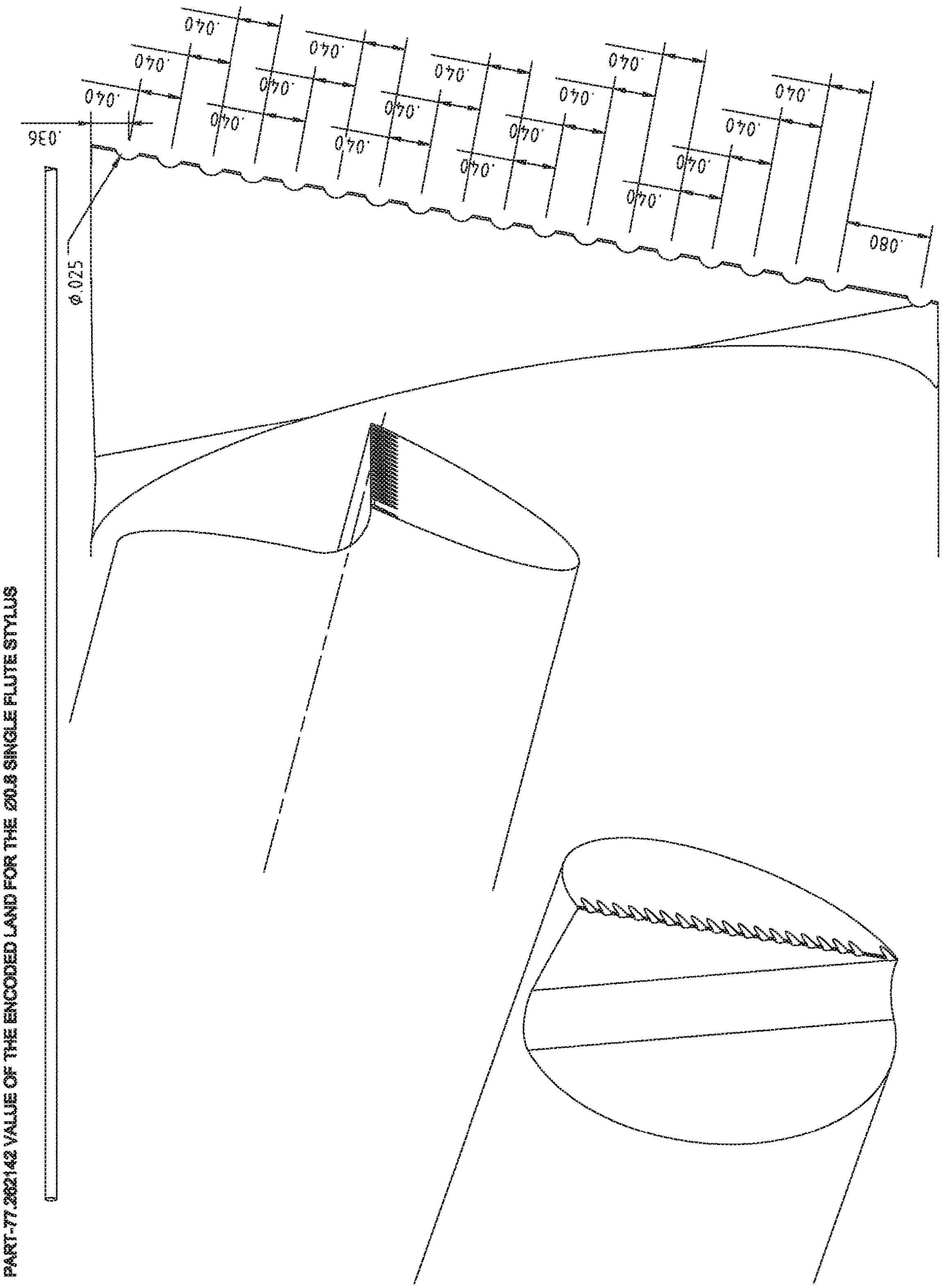
Figure 18:
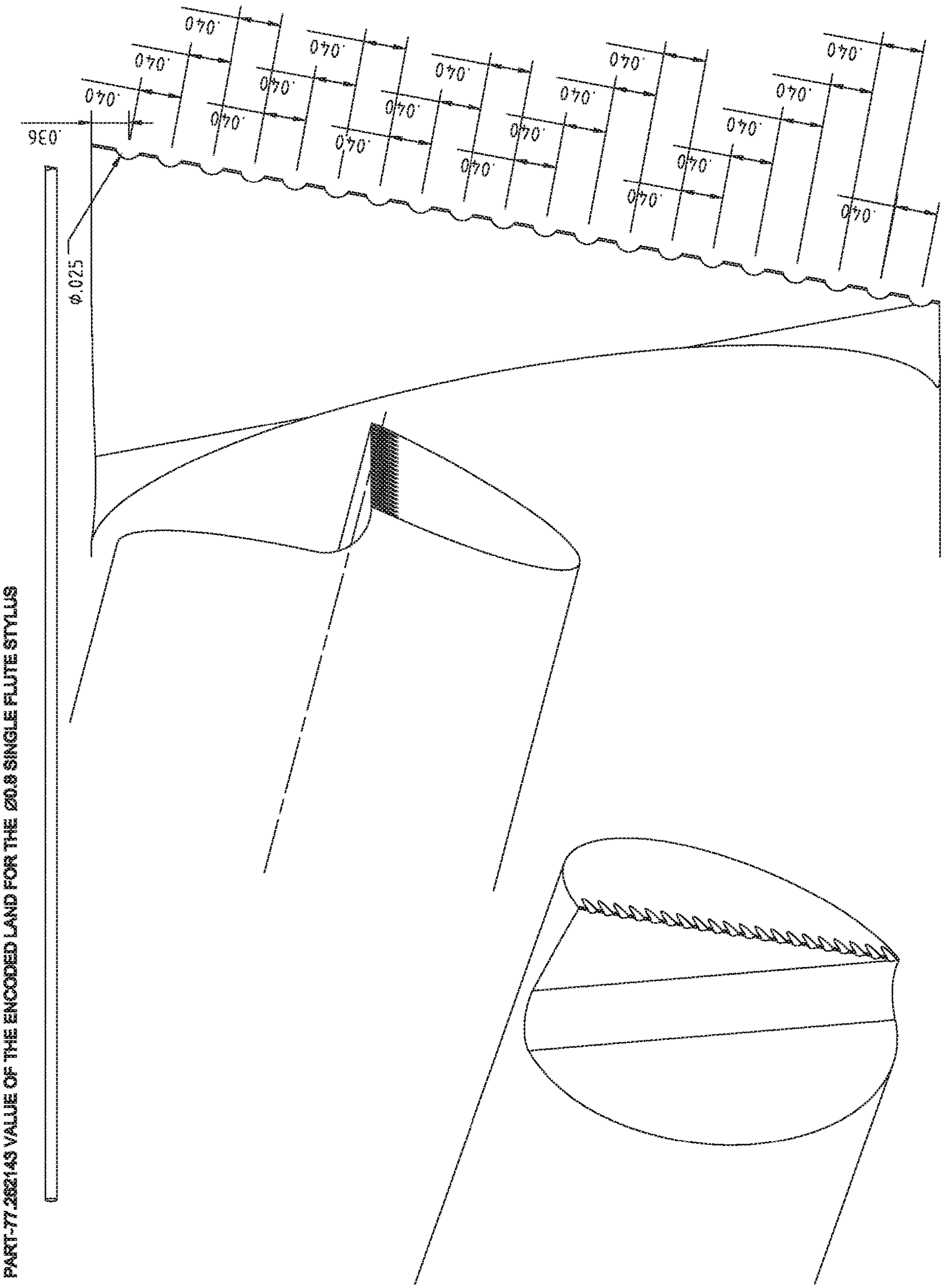
Figure 19B:
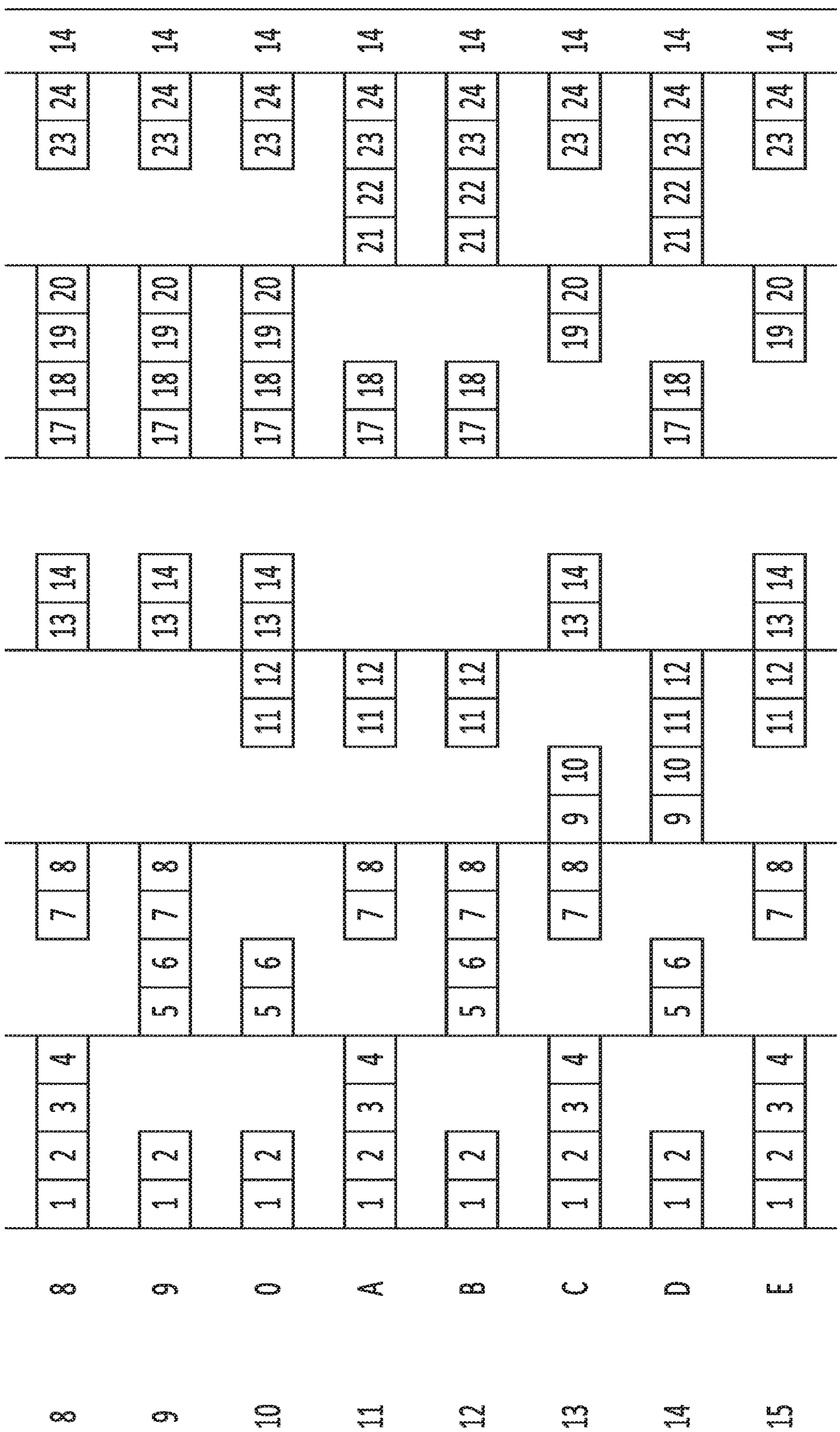
Figure 19C:
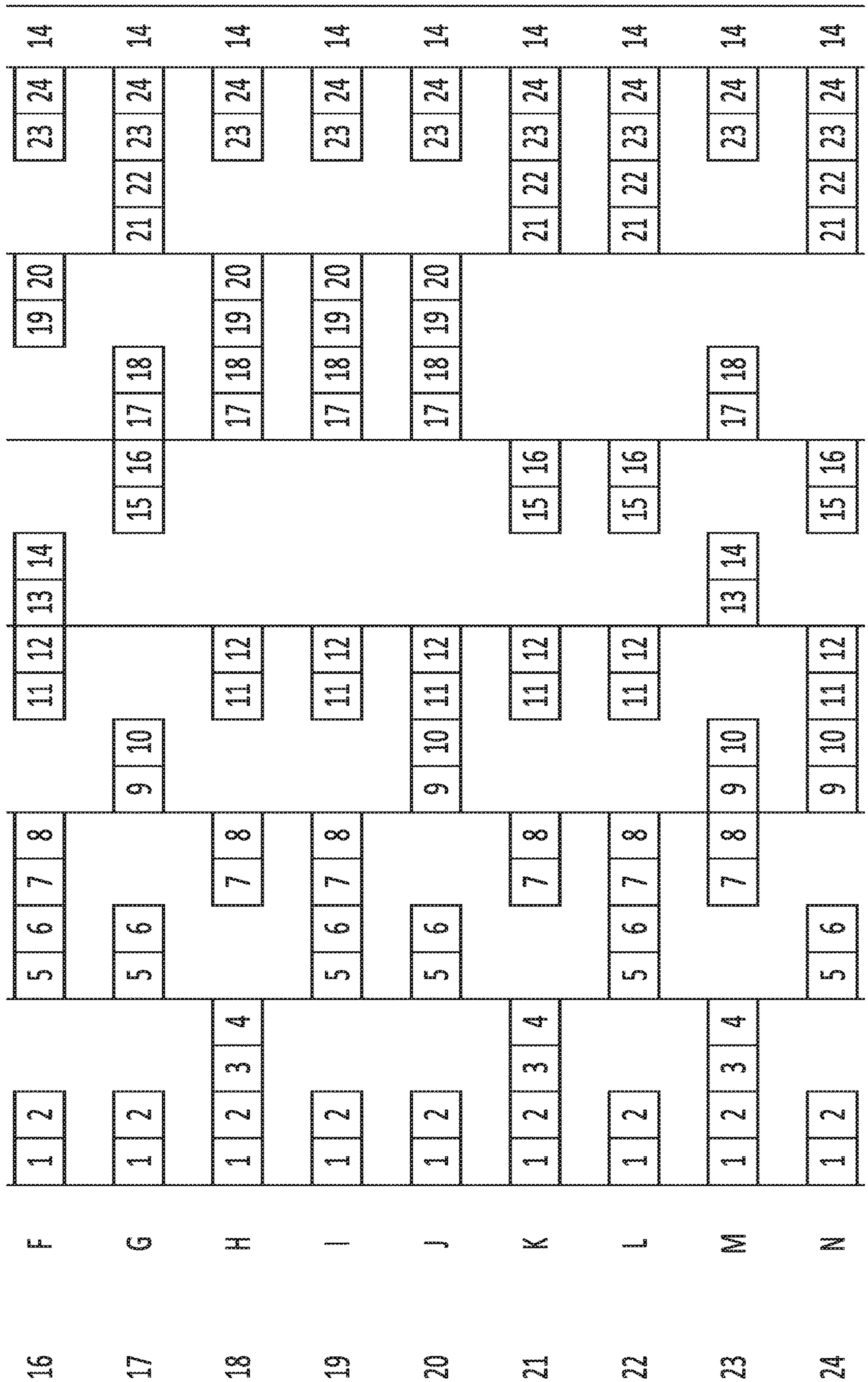
Figure 19D:
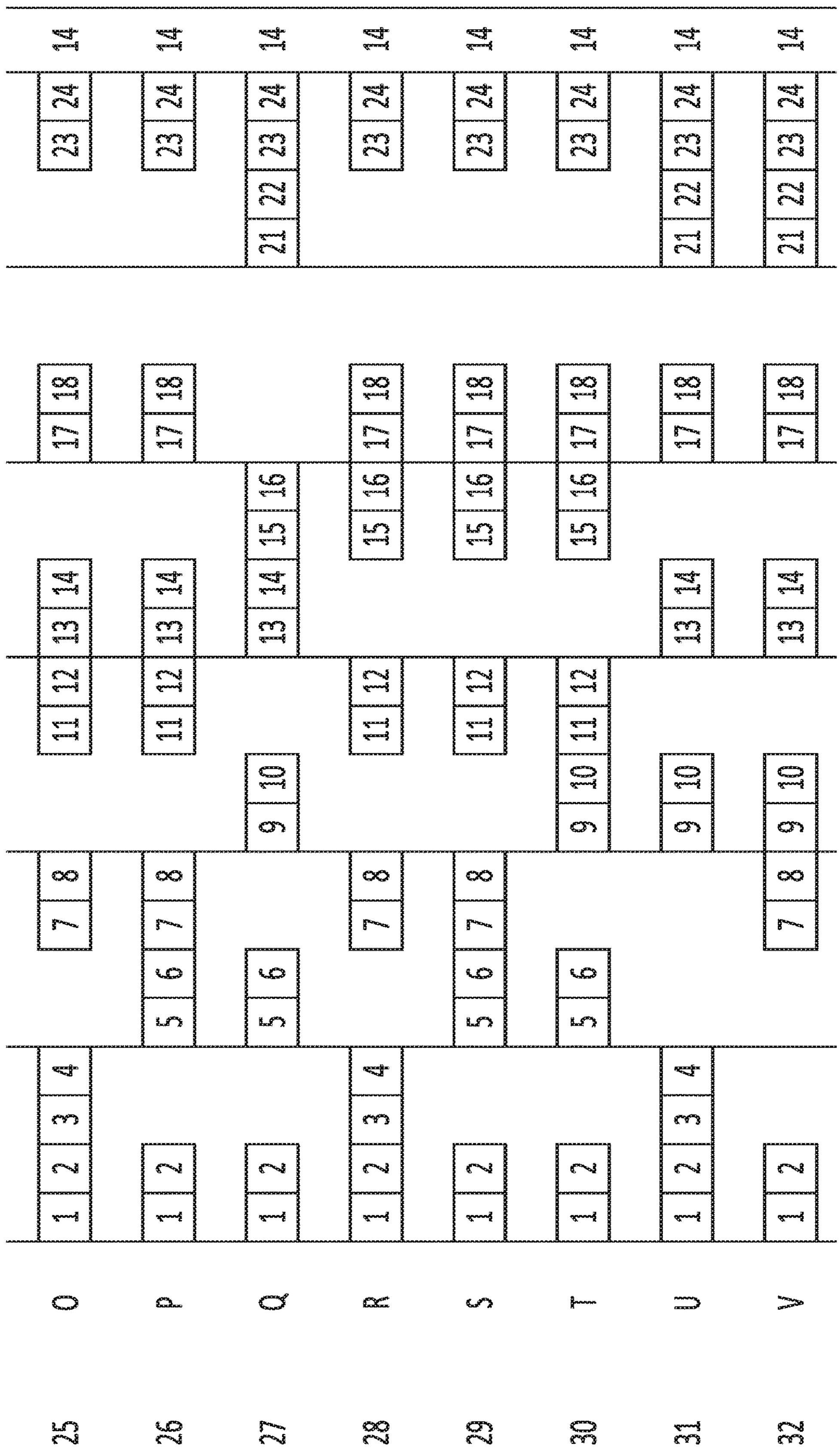
Figure 19E:
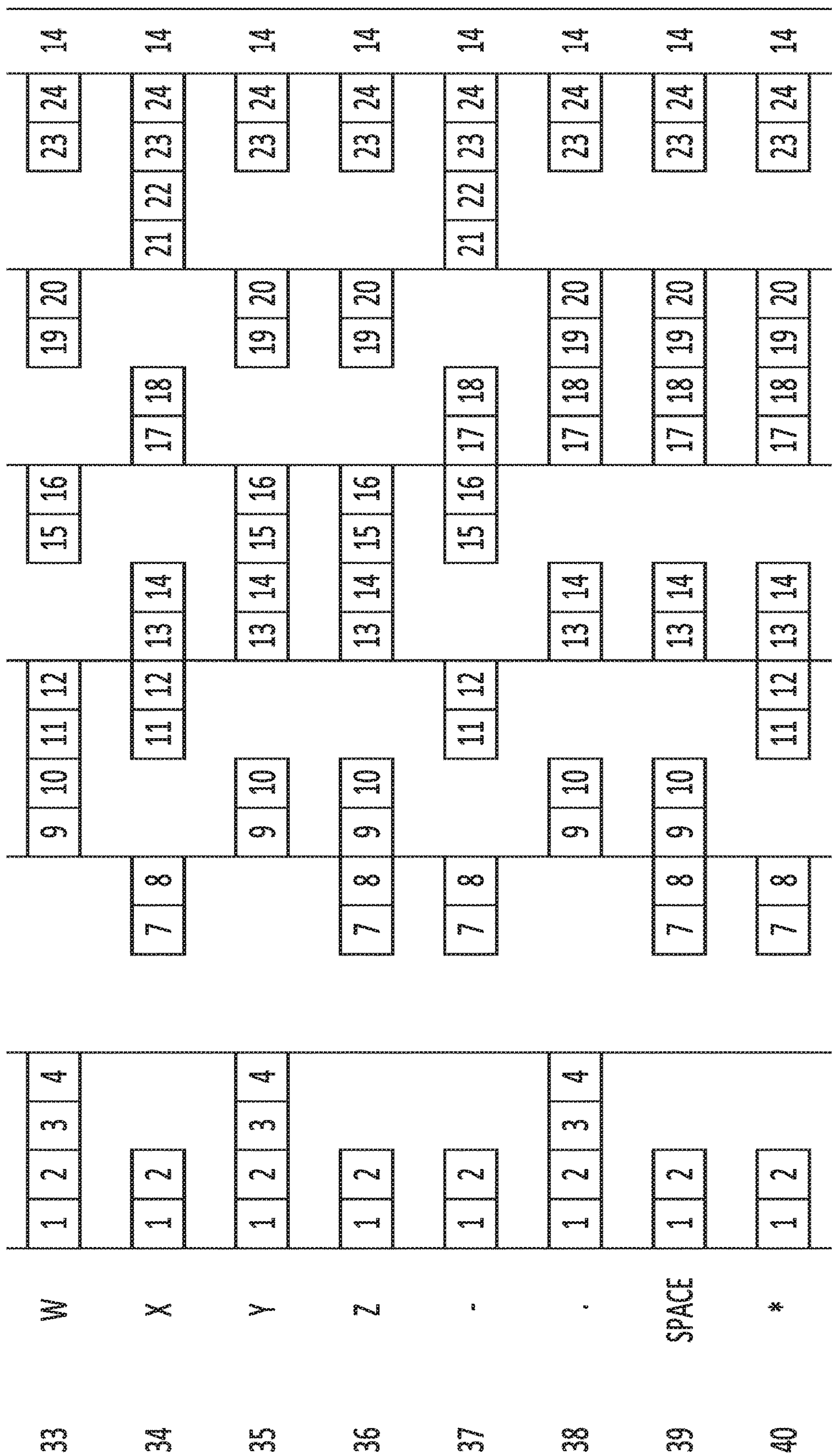
Figure 19F:
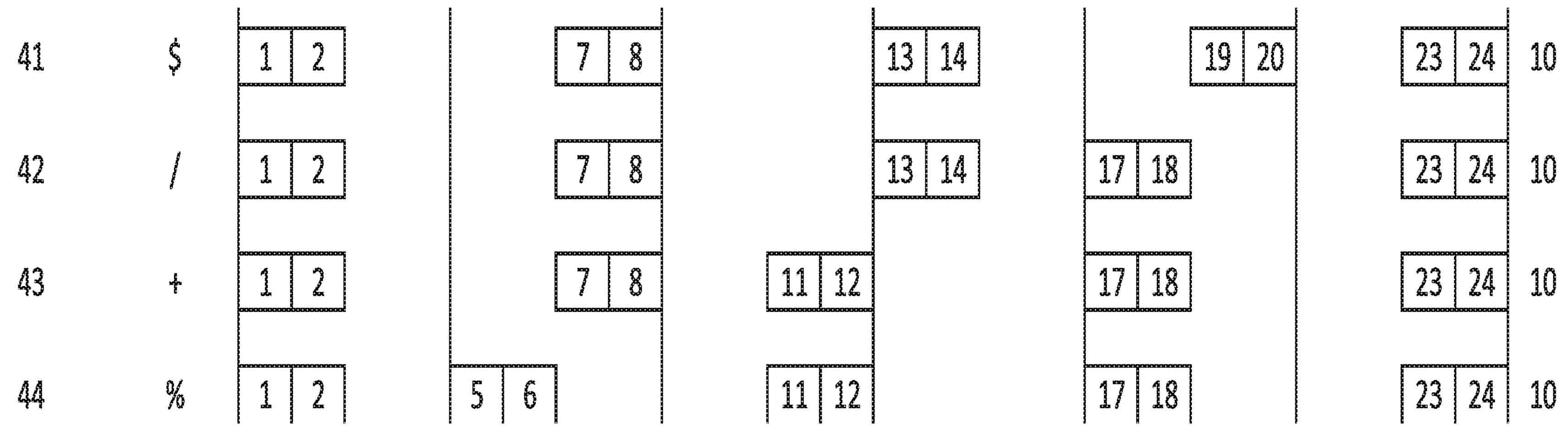

Via the 20-Bit Encoded Land Pattern for the Round Hole Land Encoding Position-Binary-and-Decimal Values partial table (FIGS. 1A-1F), as shown below, being utilized for the 3×5 Stylus Array Encoded Lands for engraving and work piece part/article as shown in FIGS. 2 and 3, as an example for having the 262,129-262,143 Encoded Land Values via using the encoded land engraving styluses FIGS. 4-18.

2-Flute Drill Encoded Land:

The following encoded data partial table FIGS. 67A-67F is for the Ø0.8 mm 2 flute drill point stylus as shown having a maximum binary value of 127 for the 7 raised encoded lands being bracketed between two Validation Reference lands created by the 2 leading cutting edges of the drill point, as shown in FIGS. 68A-68D, for an offset orbiting rotation stylus and FIGS. 69A-69D for a conventional straight rotation common centerline drill.

Figure 70:
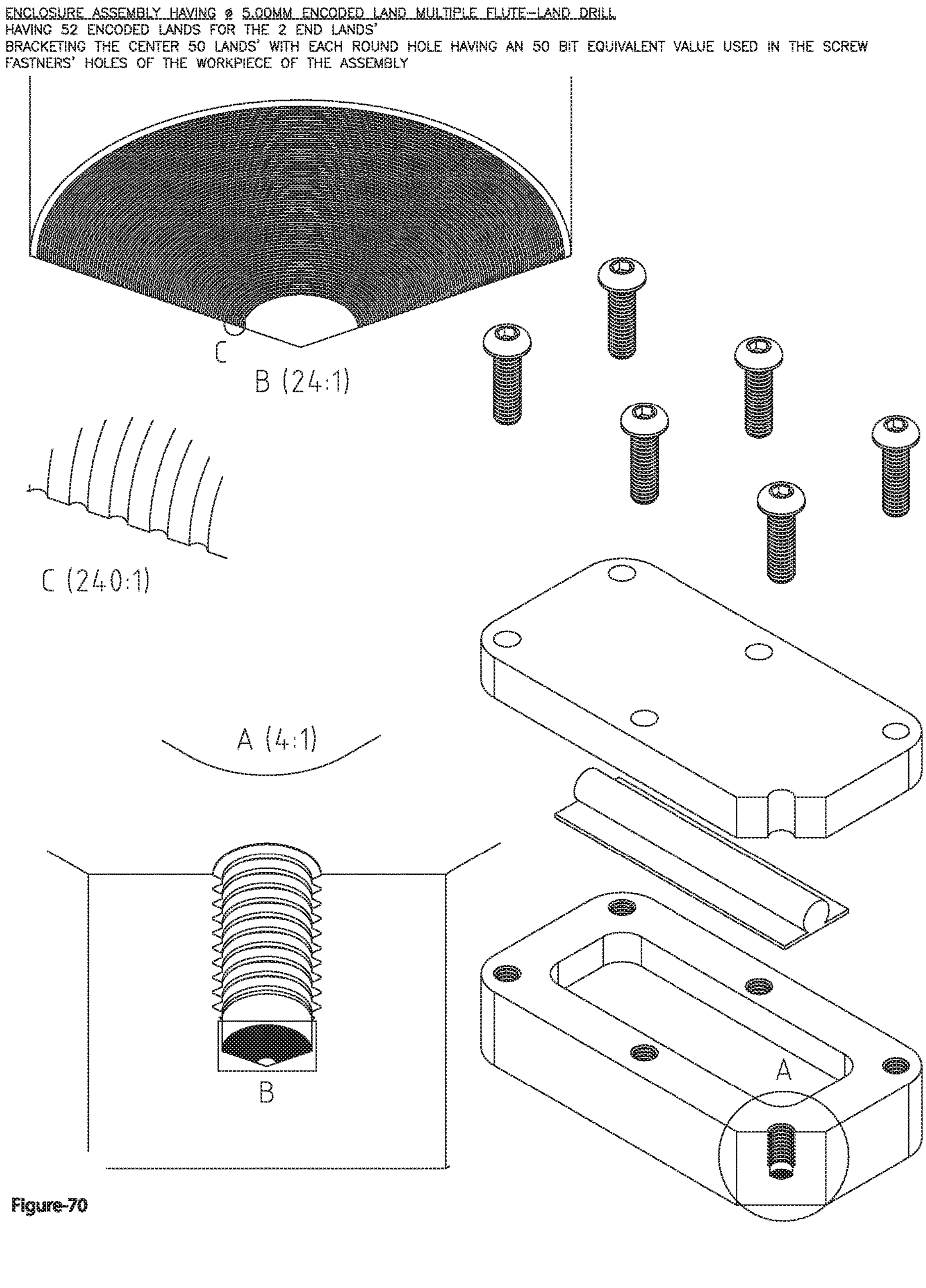
Figure 72:
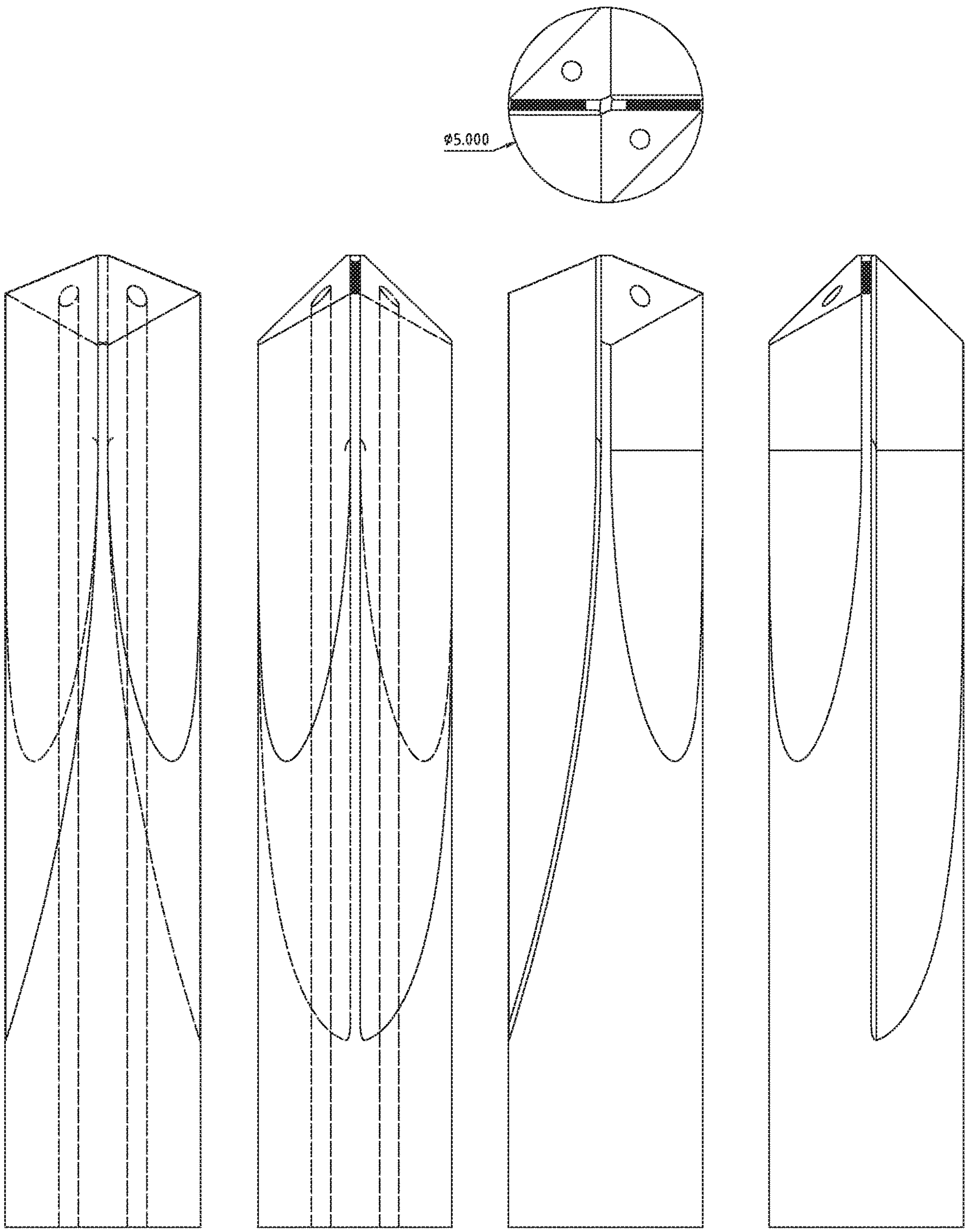
Figure 73:
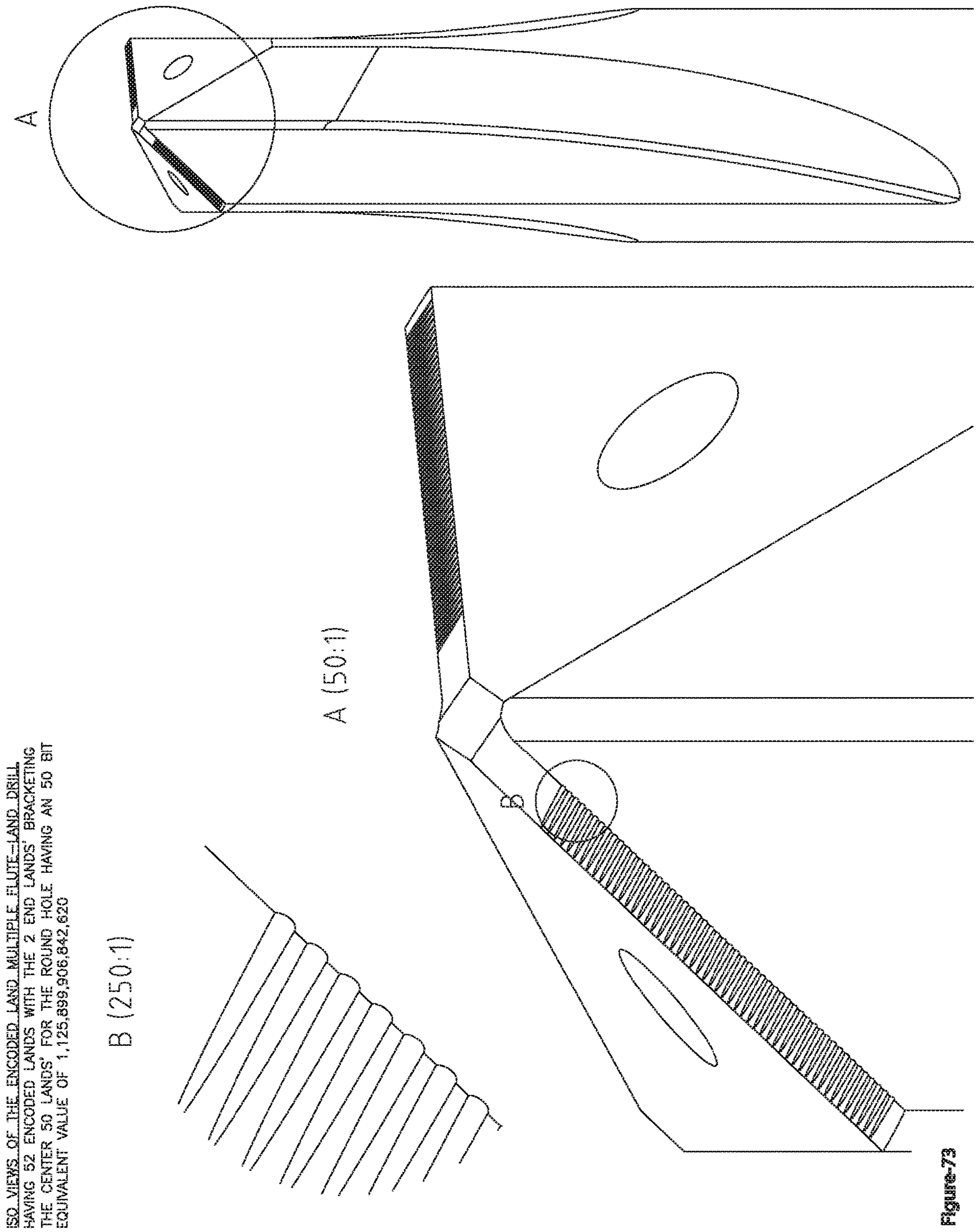
Figure 74:
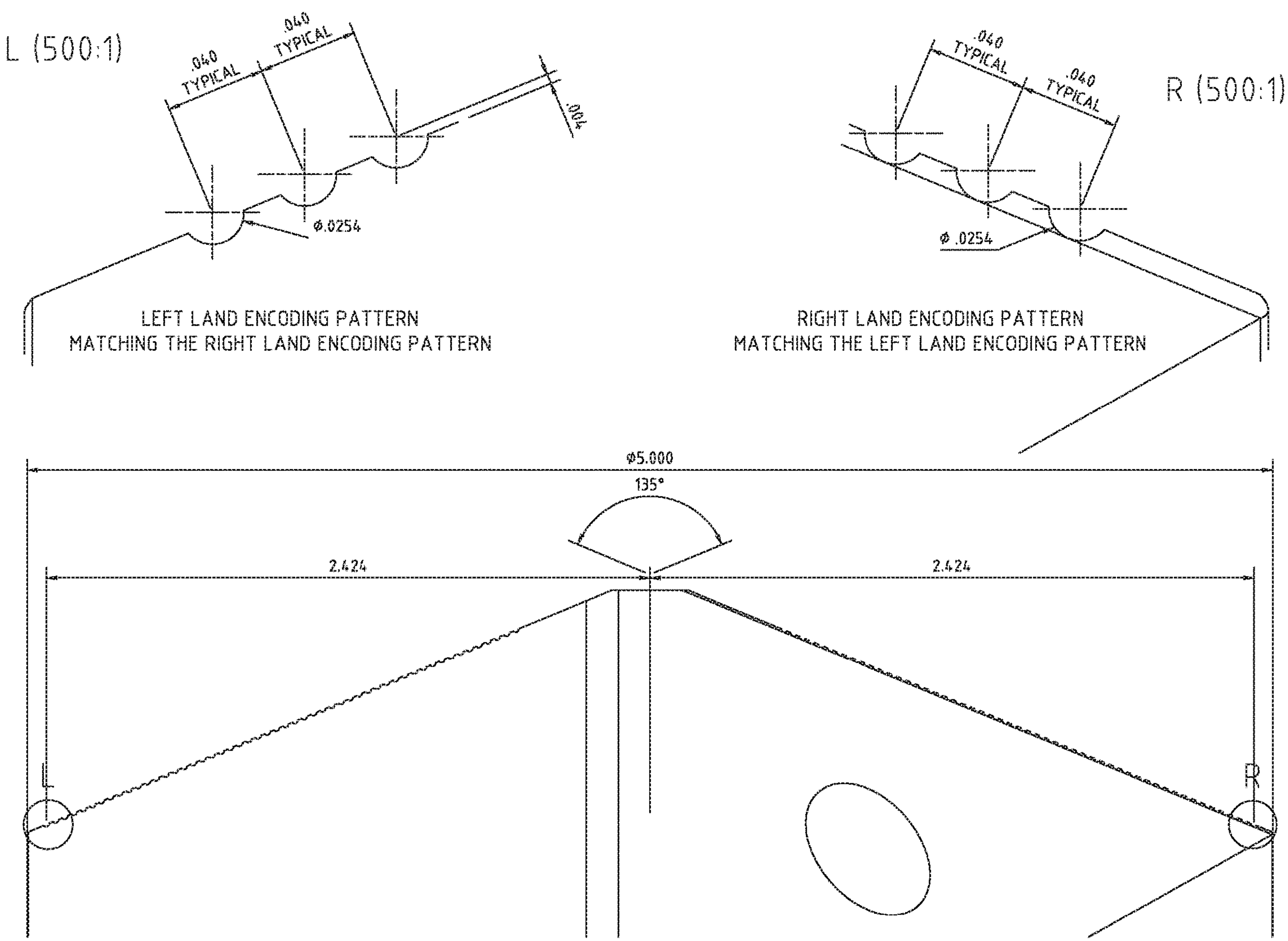
Figure 75:
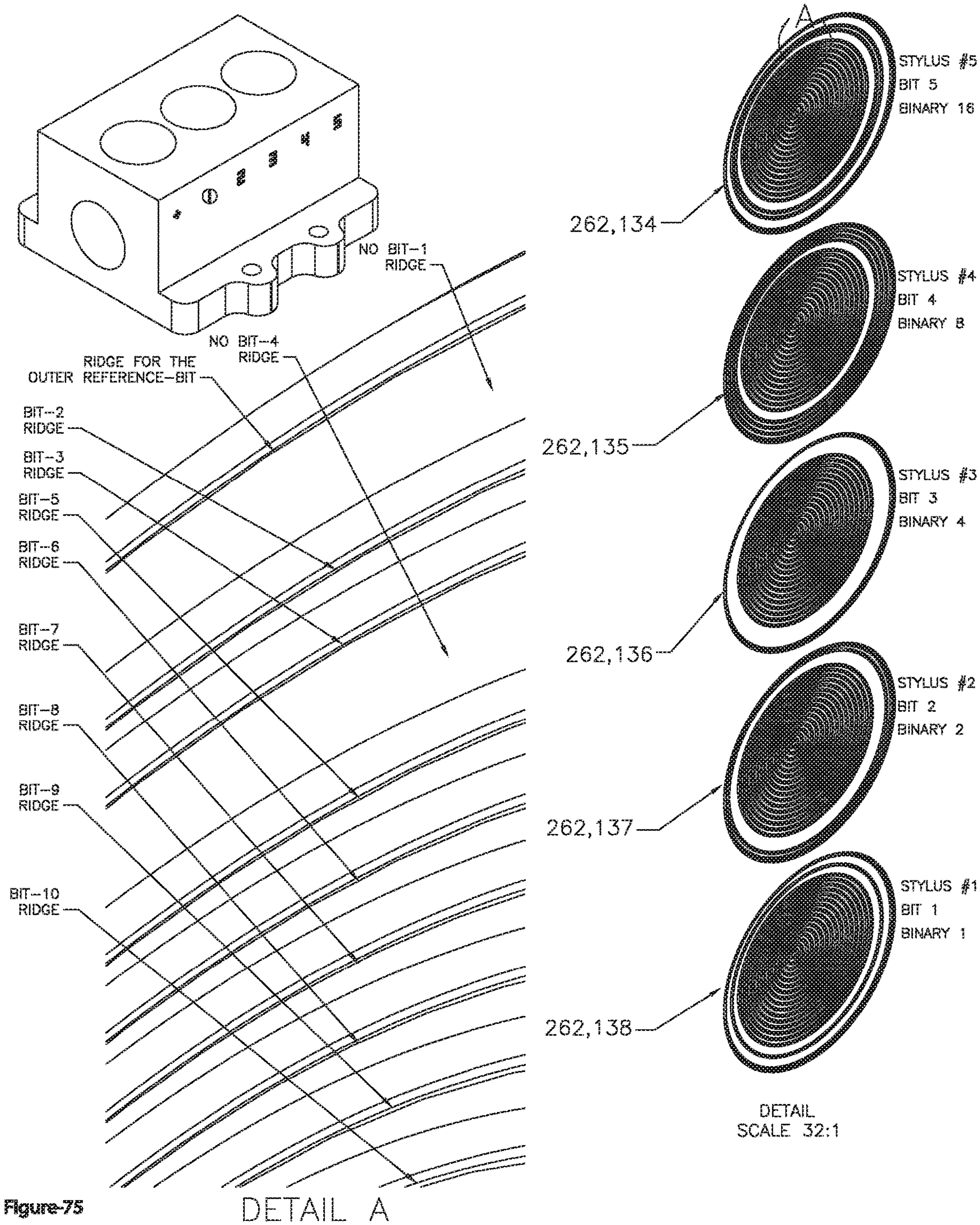
Figure 76:
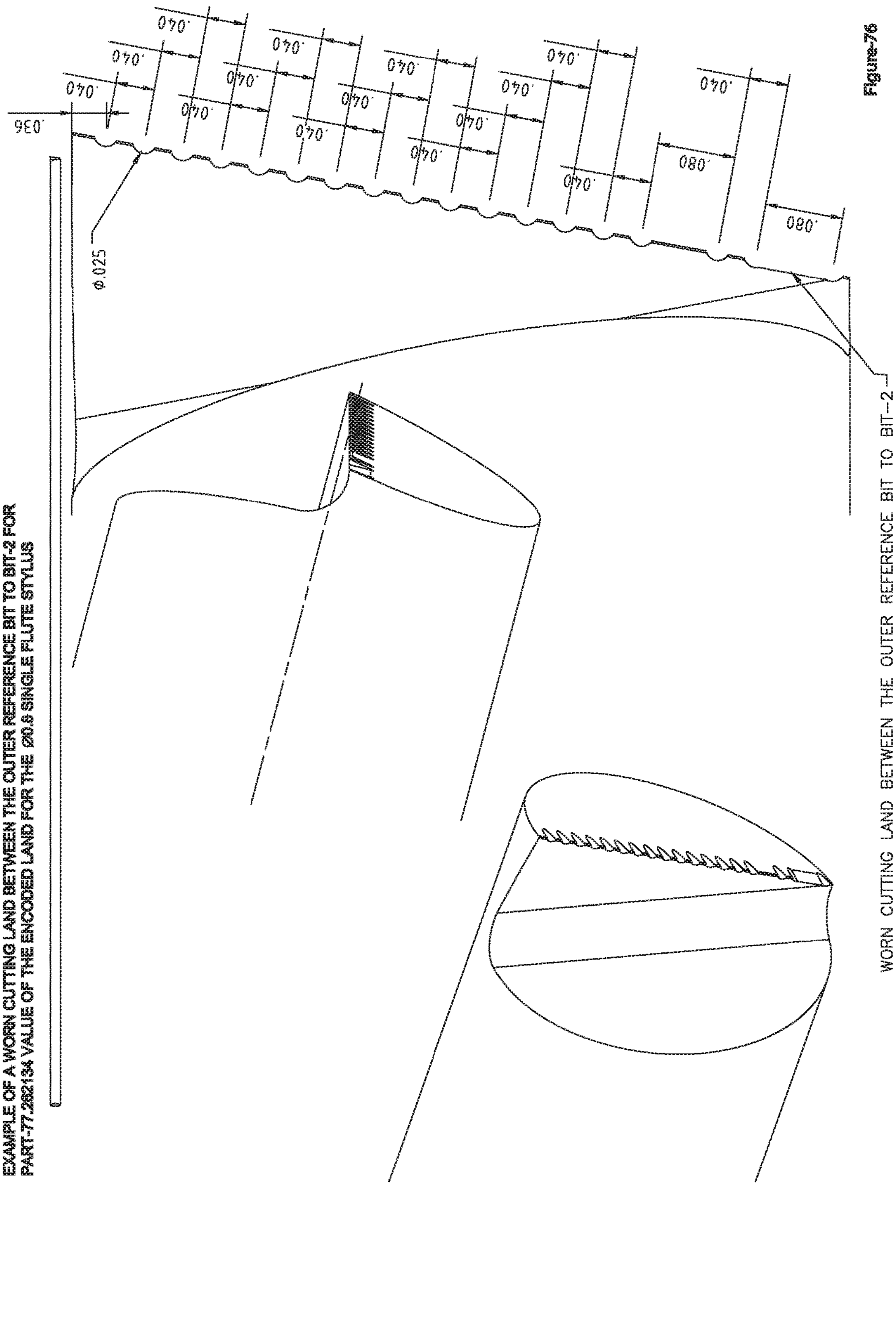
Figure 77:
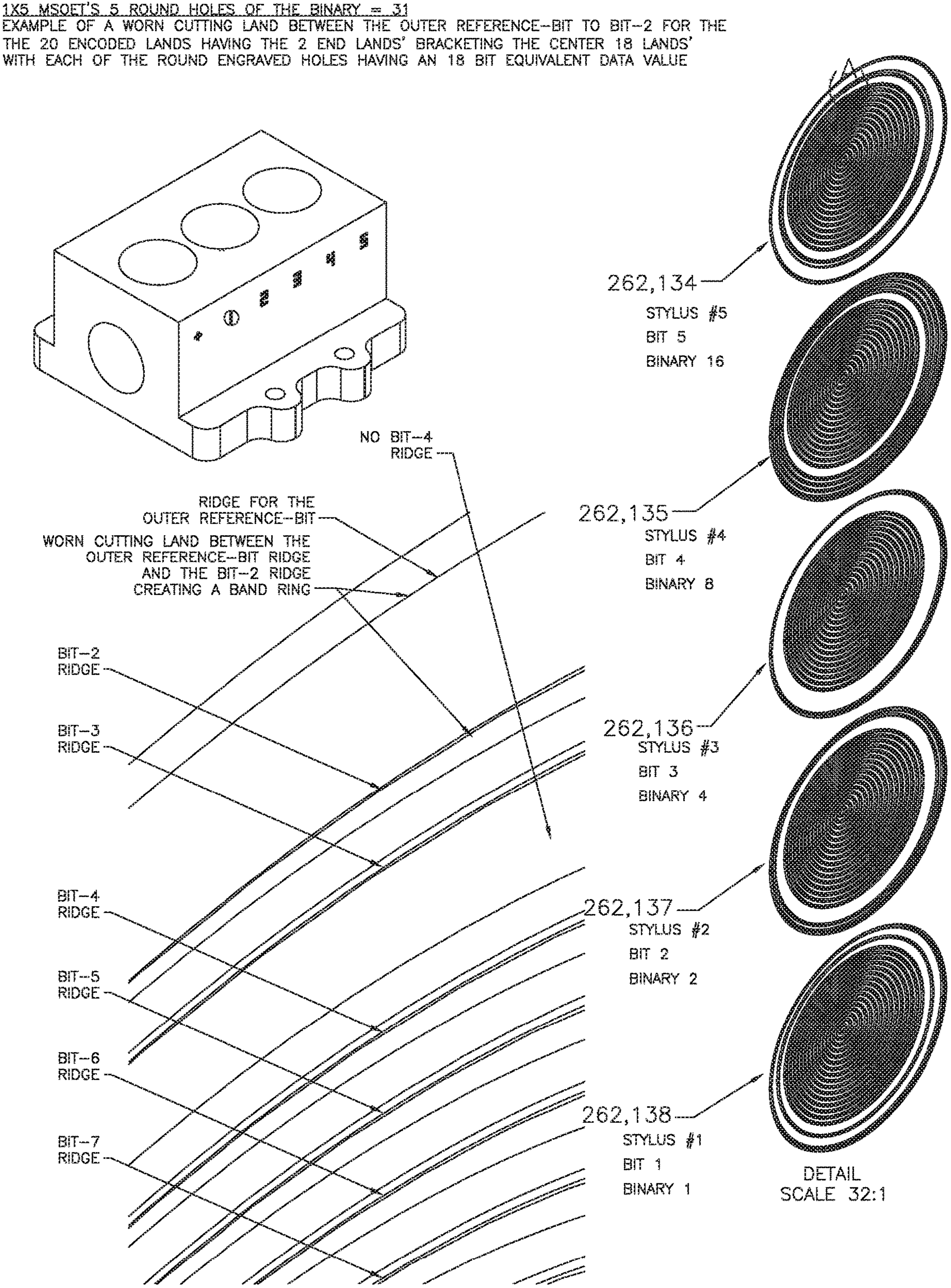
Figure 78:
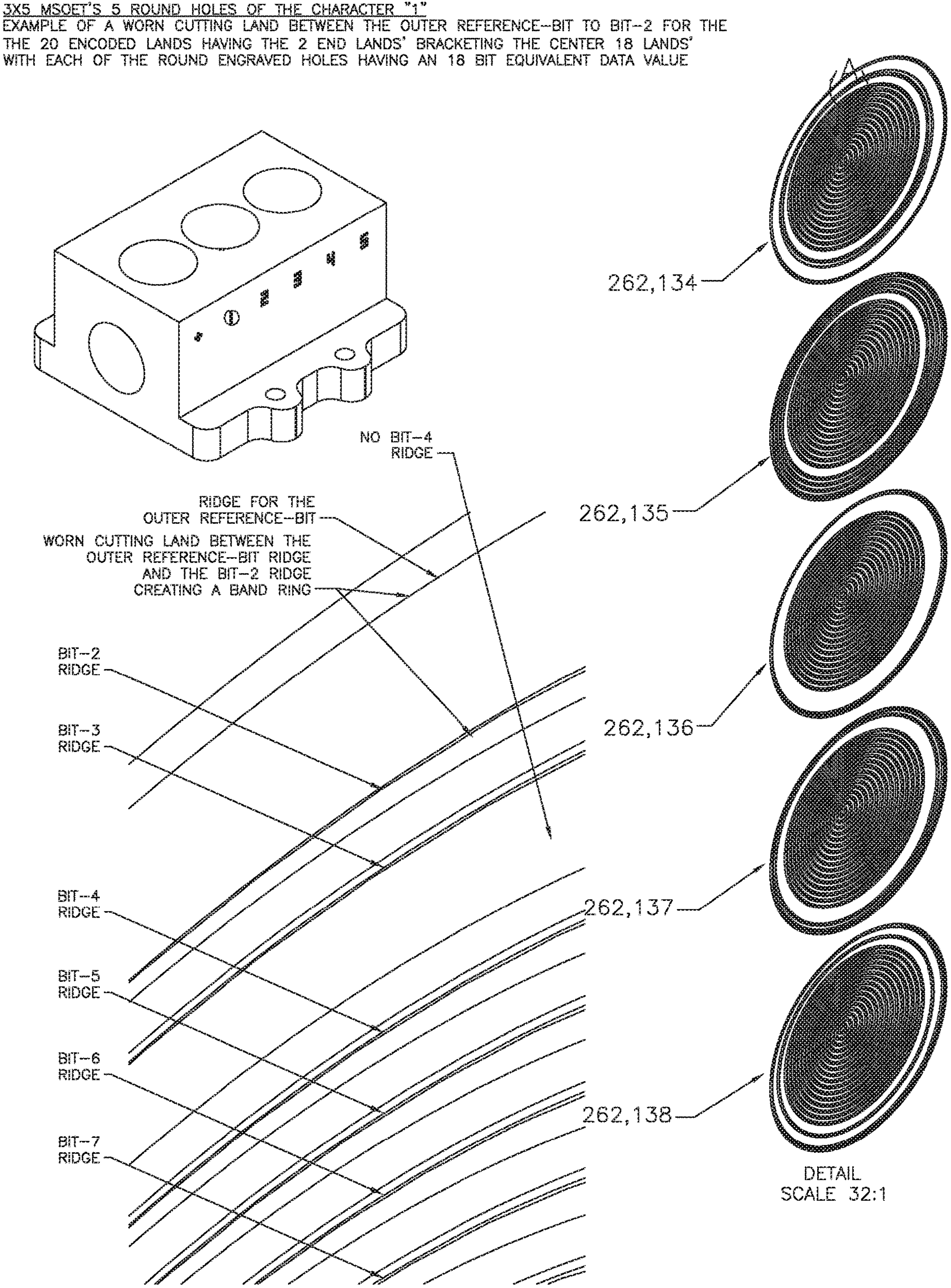

Drilling Tool Having Unique Notch and or Projection Features on the Leading Cutting Edge Land:

Providing an identifiable engraved character having encoded data for improving the identification and traceability of manufactured work piece parts/articles and their assemblies as shown in FIG. 70.

The following 52-Bit encoded data partial table for the Ø5.0 mm 2 flute drill point stylus is shown having a maximum binary value of 1,125,899,906,842,620 for the 50 raised encoded lands being bracketed between two Validation Reference lands created by the cutting edges of the pointed drill as shown in the partial table, FIGS. 71A-71R below that is used for the encoding rings created by the cutting lands' edge of the multiple flute drill as shown in FIGS. 70-74, that is compatible with the existing drilling tooling.

Figure 86:
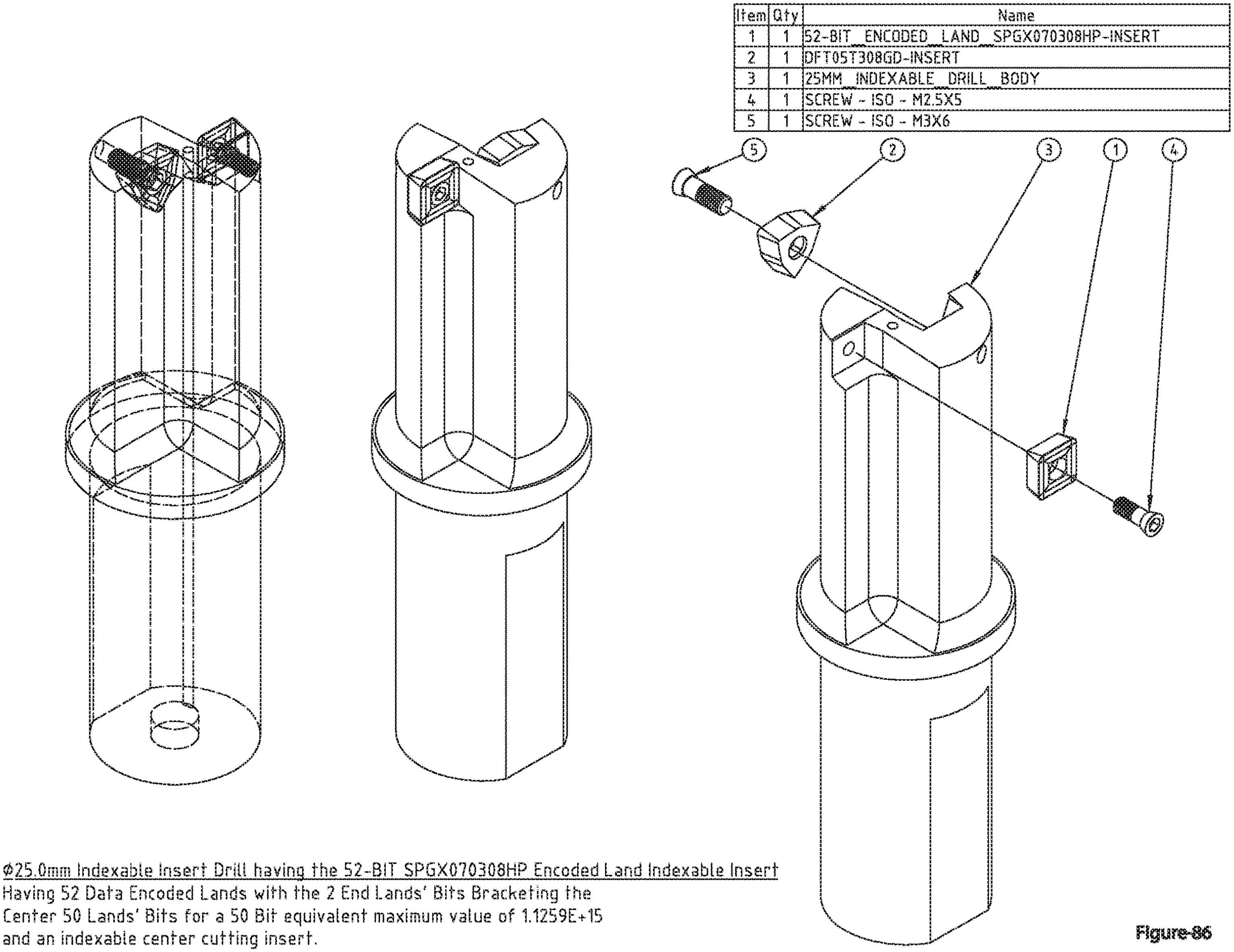

The 52-Bit Encodation can be utilized for the cutting land edges of the Indexable Insert as shown in FIG. 85 for an Indexable Drill body as shown in FIG. 86, that is compatible with existing drilling products.

Figure 87:
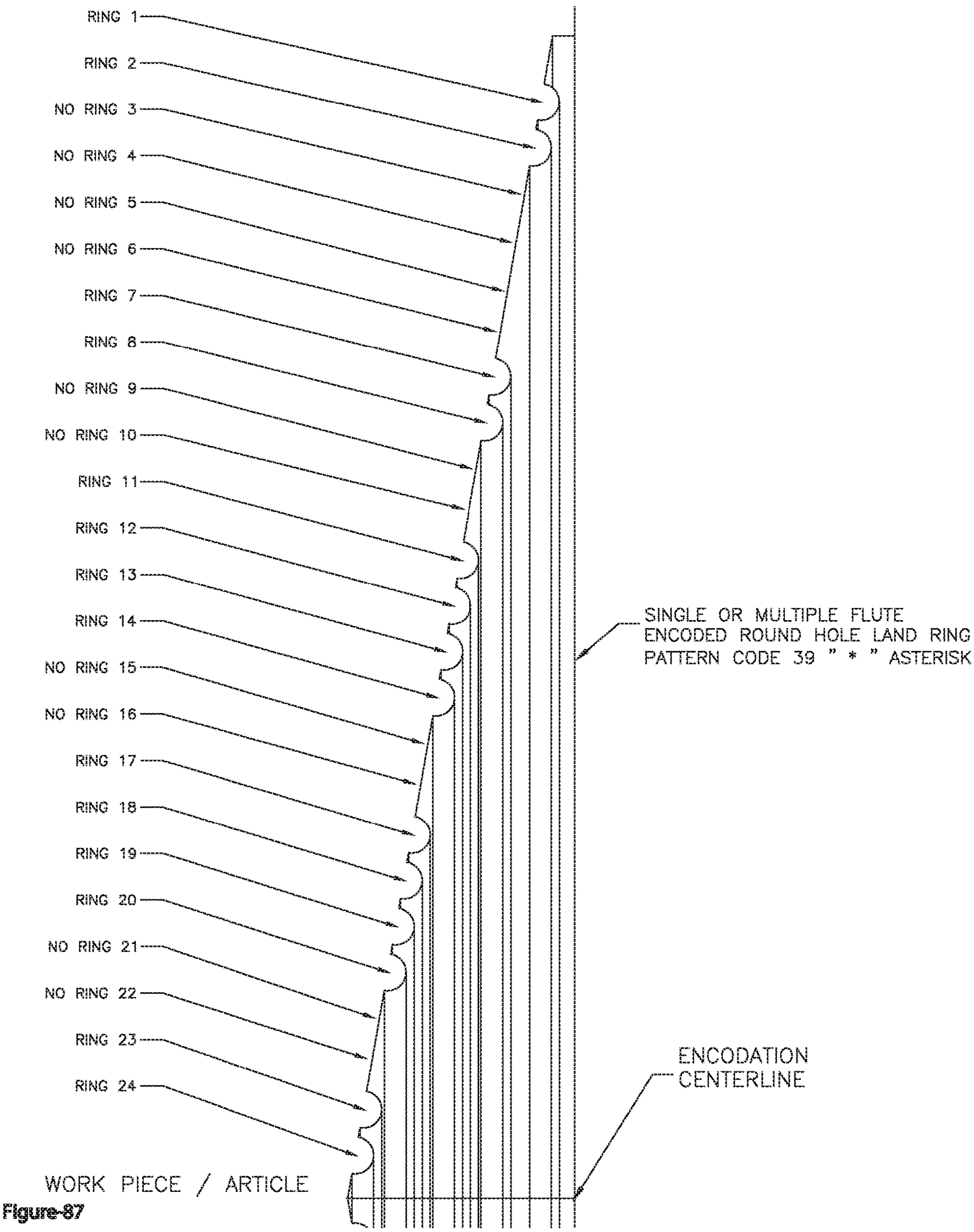

Unique Cutting Lands' Cross-Section Detail:

The uniqueness of the cutting land encoded data ring cross-section profiles' can be enhanced by first utilizing a (a) flat cutting land edge drill, insert, or stylus to create the smooth bottom profile for the hole's detail and next using the (b) groove encoded cutting land edge drill, insert, or stylus to a portion of its full depth to create a smooth top ridge cross-section detail for the encoded land ring as shown in FIG. 88, instead of the full curved arc detail for the encoded land ring being done with only the (b) second tool as shown in FIG. 87.

Utilization of the Styluses' Encodation Land Patterns to Improve the Data's Security and Manufacturing Integrity of the Work-Piece/Article:

By having the engraving tool's styluses' Encodation patterns being controlled by and provided by the purchaser of the work-piece/article that would be used by a supplier in the manufacture of the work-piece/article.

By having the engraving tool's styluses' Encodation patterns being controlled by and provided by the manufacturer's manufacturing compliance operations group of the work-piece/article that would be used in the manufacture of the work-piece/article in accordance to the products' manufacturing plan.

Data Capture and Utilization of the Styluses' Encodation Land Patterns to Improve the Data's Security and Manufacturing Integrity of the Work-Piece/Article:

By having the real time stamp for the data being engraved on the work-piece/article being captured by utilizing the Spindle Tooling for Work-piece verification and data collection as the work-piece part/article is being manufactured, with this data being collected, transferred, and exchanged.

Unique Cutting Lands' Wear Characteristics:

The encoded data pattern on the work-piece/article made by the worn cutting land edge of the data encoded drill, cutting insert, or stylus provides additional unique data for that specific item further enhancing its traceability as shown in FIGS. 75-84.

Figure 79:
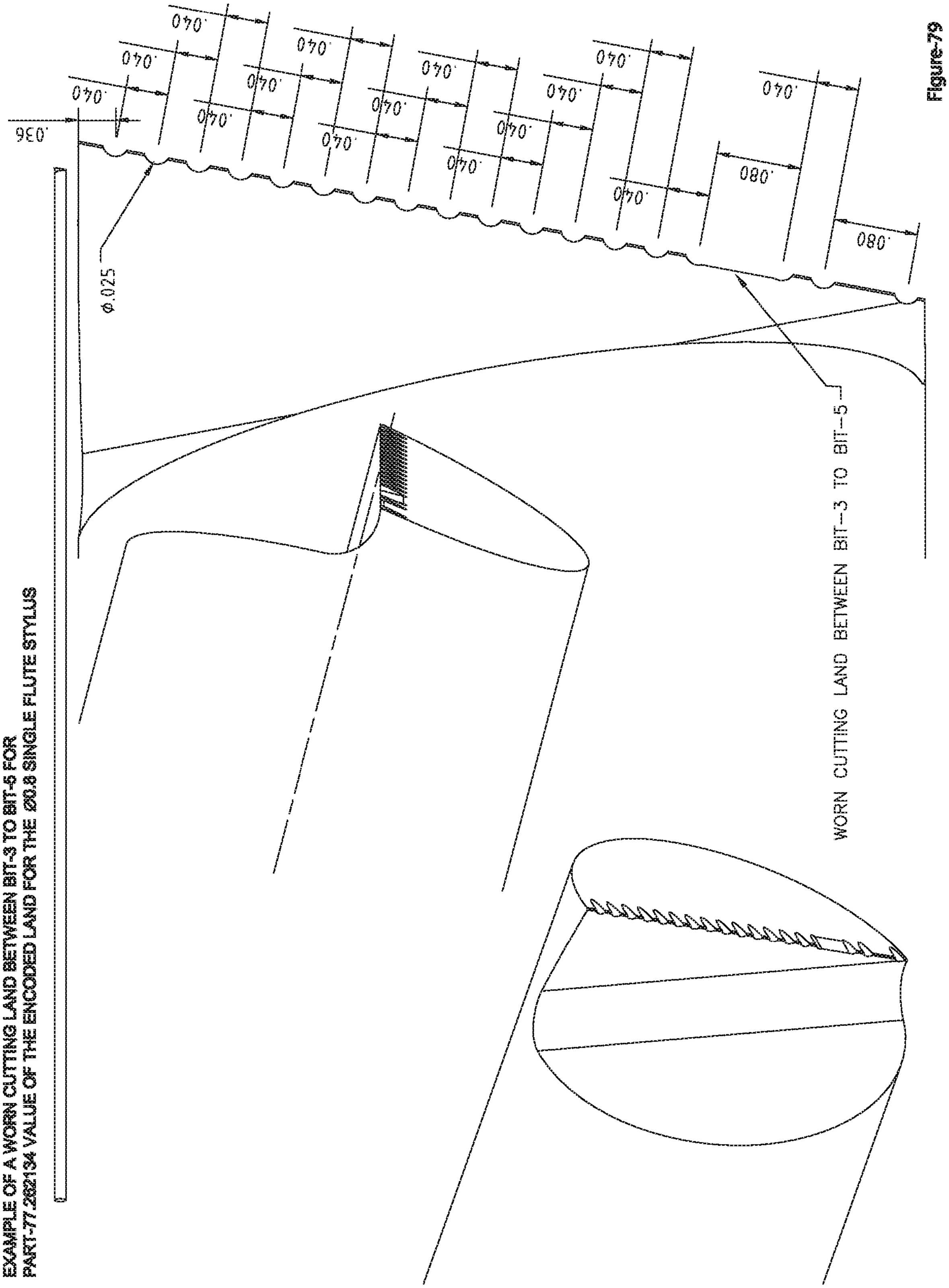
Figure 80:
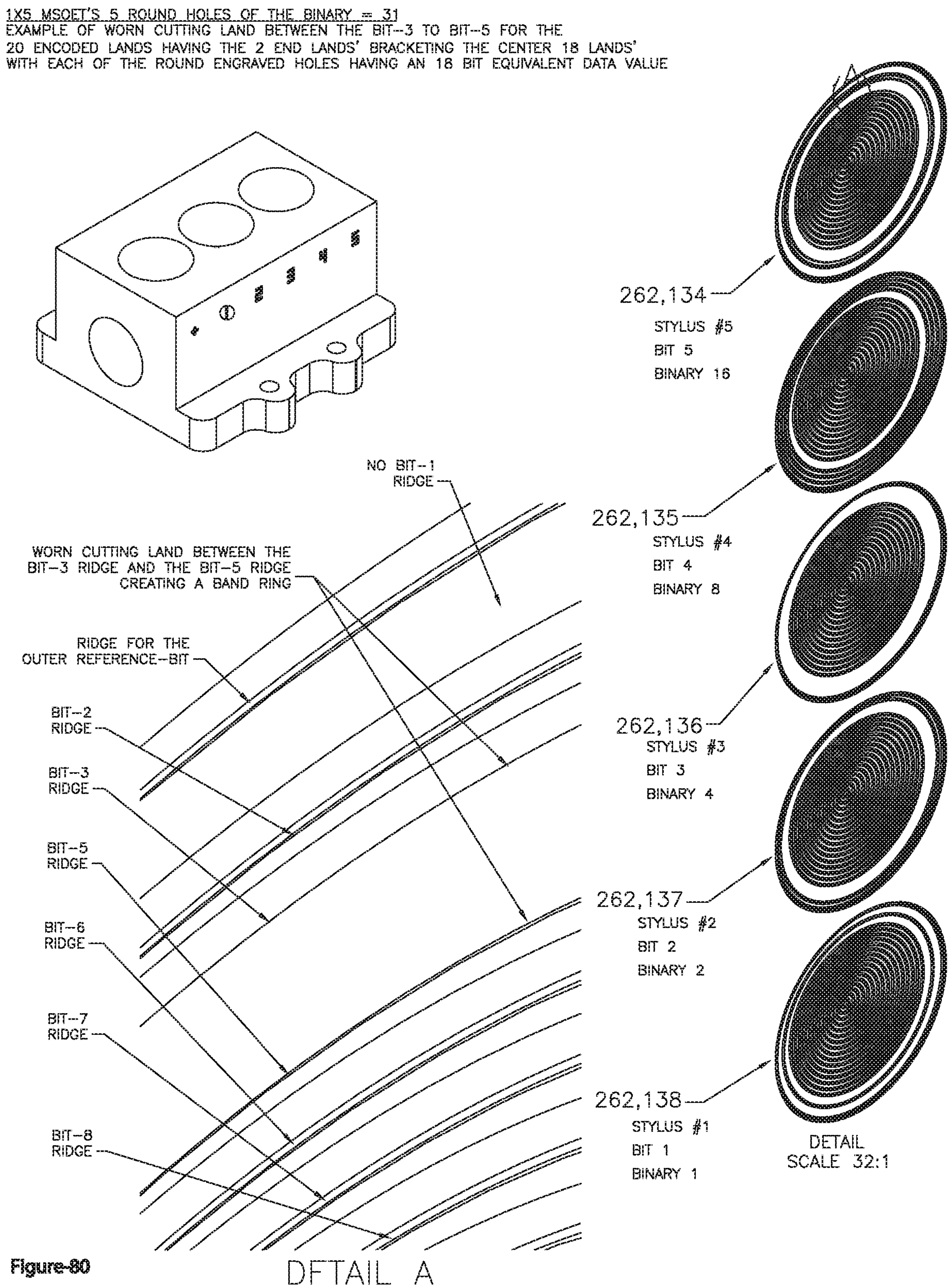
Figure 81:
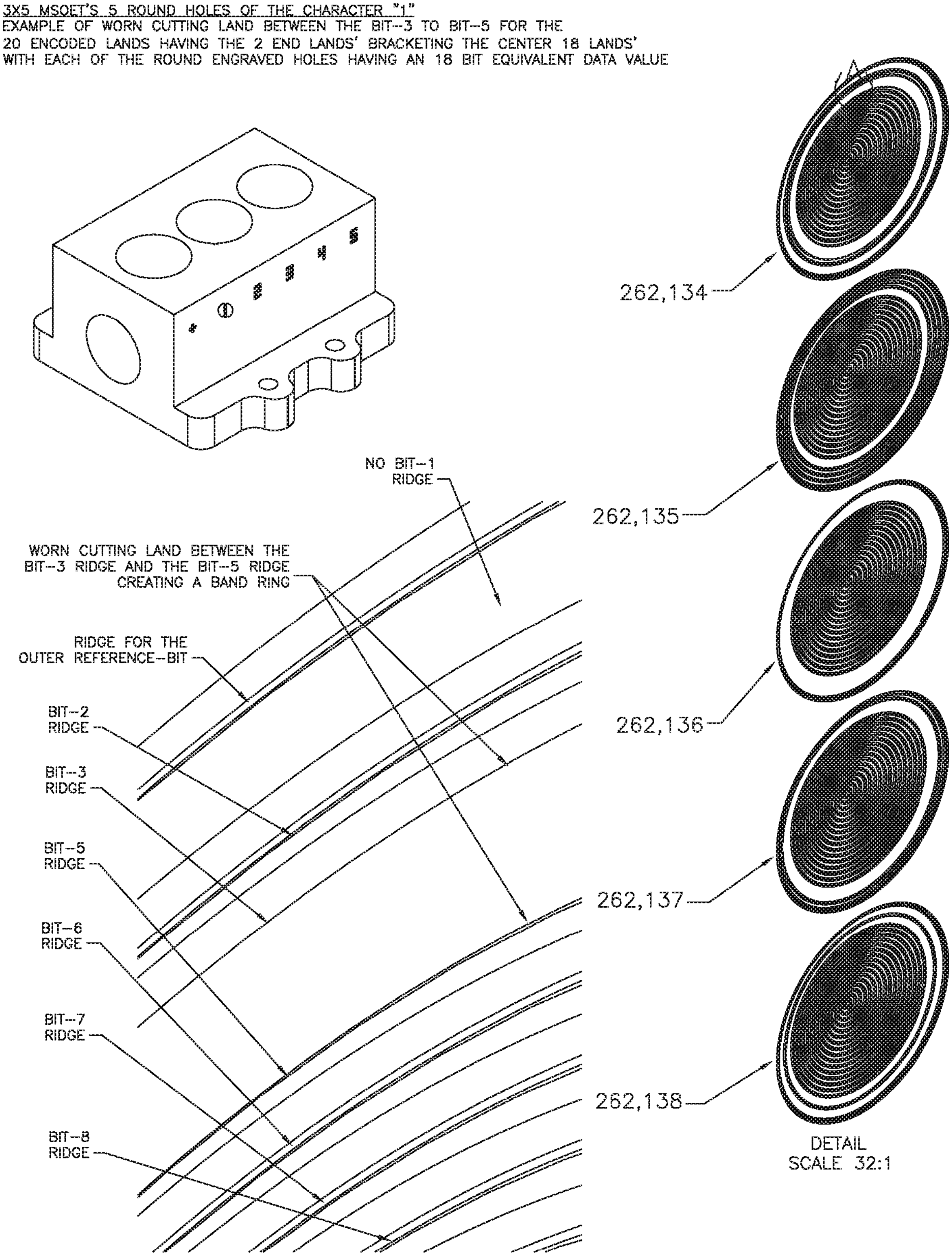
Figure 82:
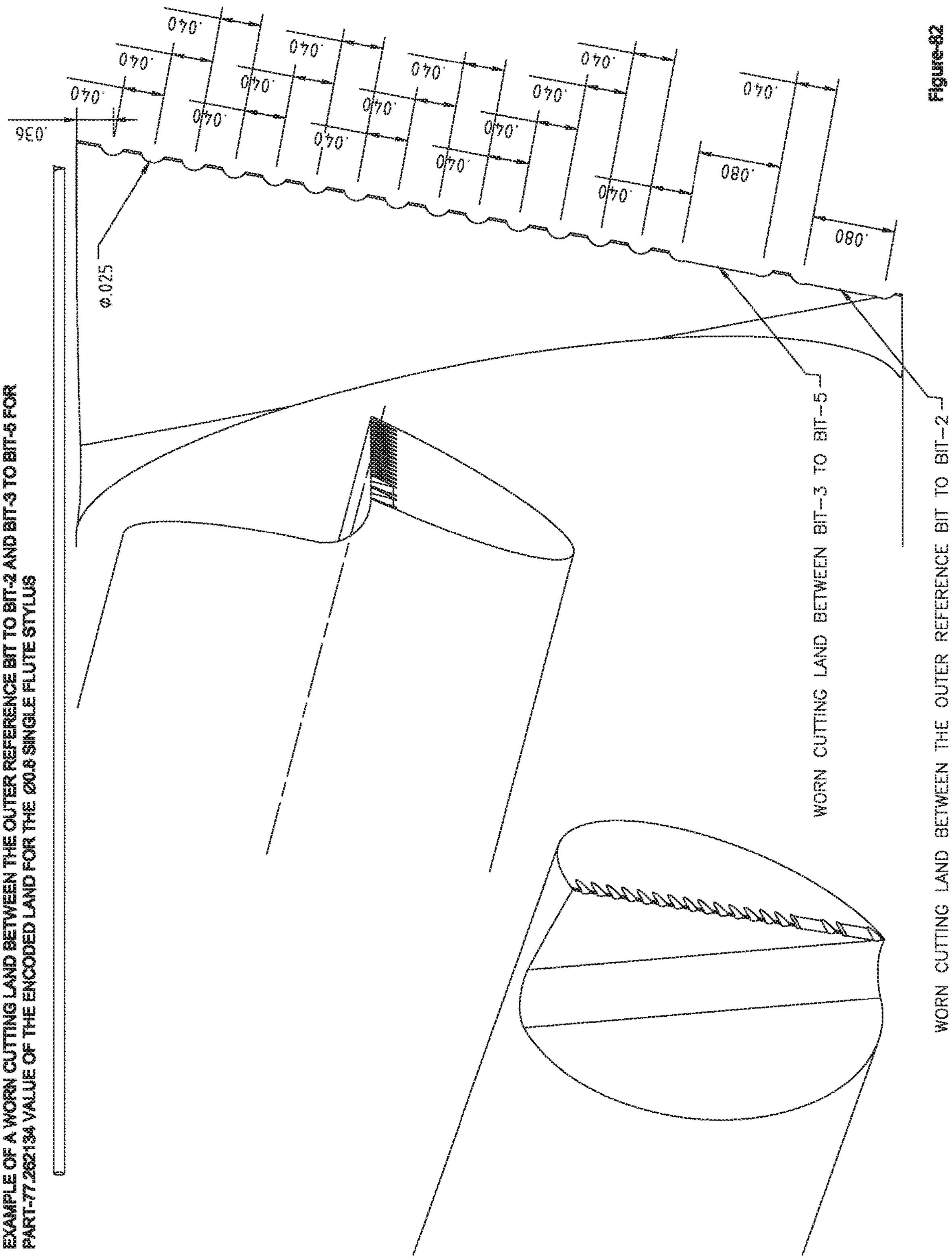
Figure 83:
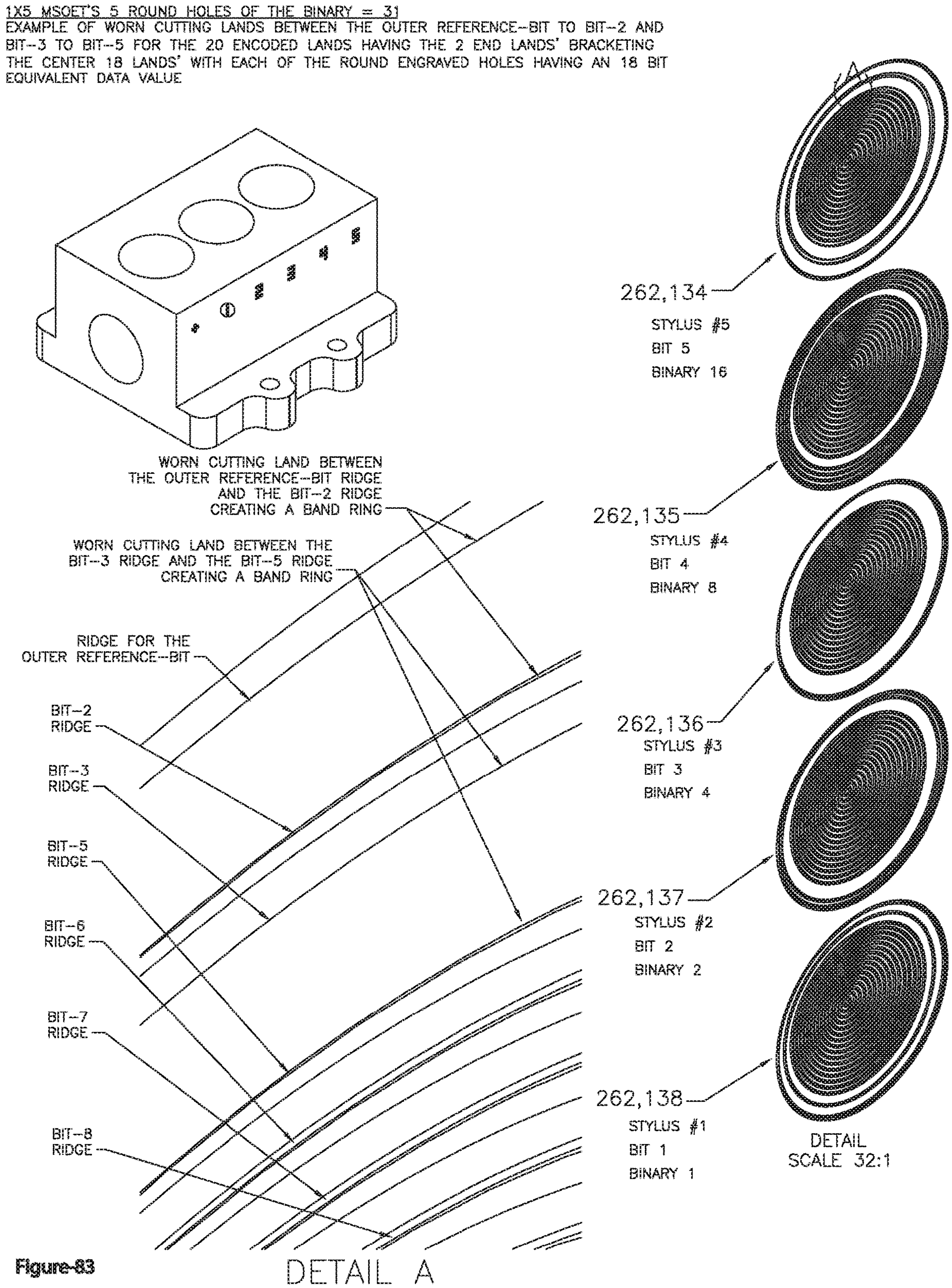
Figure 84:
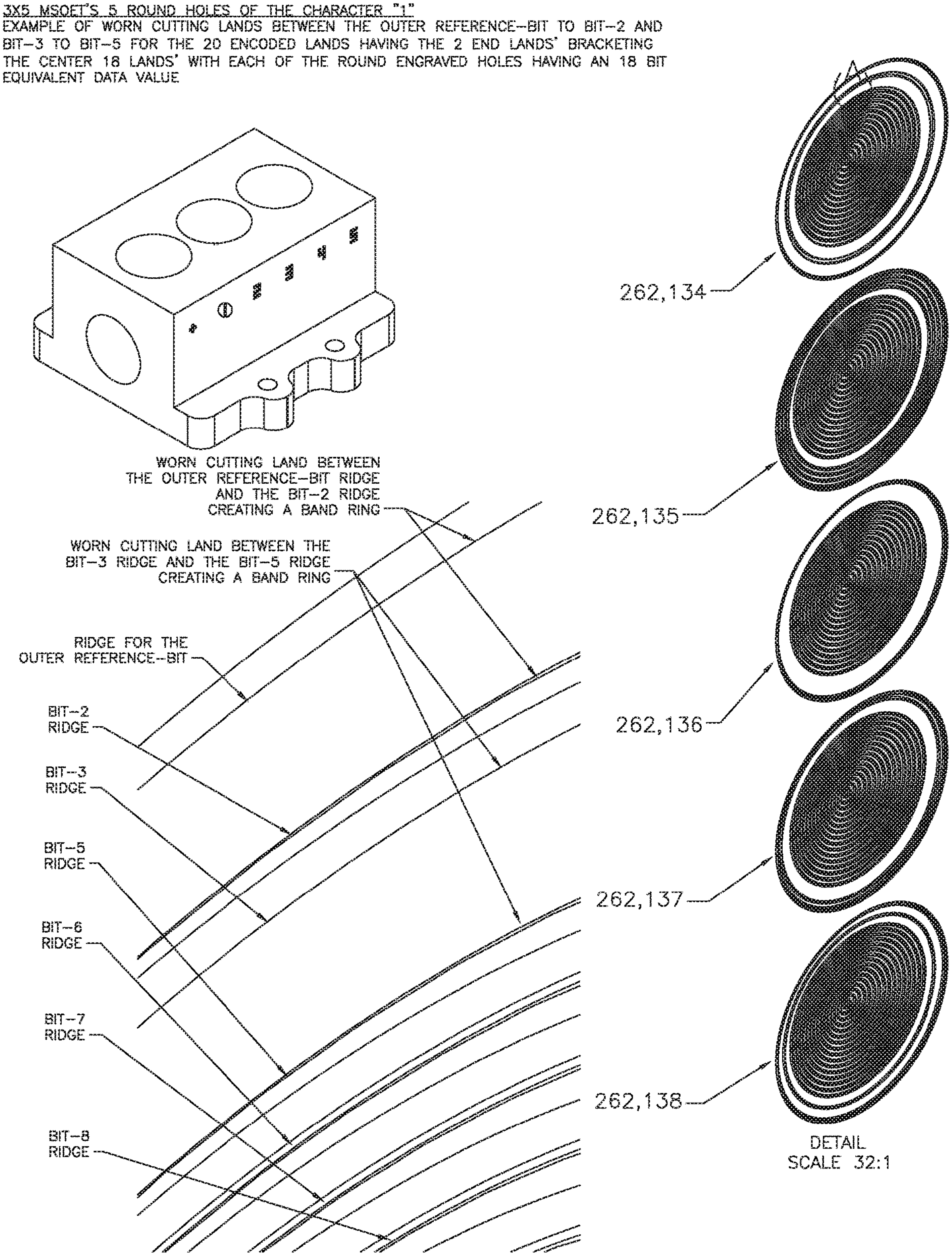

As demonstrated by the normal incremental progression of cutting tooling wear, as shown in FIGS. 75-78 and 82-84, or an incidental random tool wear event, as shown in FIGS. 79-81, via encountering a foreign object such as imbedded casting sand or hard spot in the work-piece part/article encountered during the engraving operation.

Utilization of the Unique Cutting, Lands' Wear Characteristics to Improve the Data's Security and Manufacturing Integrity of the Work-Piece/Article:

The sequential stylus(es) wear of the encoded lands and the sequential serial numbers of the work-piece/article would be consistent with a sequentially manufactured work-piece/article. While the non-sequential stylus(es) wear of the encoded lands versus the sequential serial numbers of the work-piece/article and or sequential stylus(es) wear of the encoded lands versus the non-sequential serial numbers of the work-piece/article would be consistent with a non-sequentially manufactured work-piece/article.

Data Capture and Utilization of the Unique Cutting Lands' Wear Characteristics to Improve the Data's Security and Manufacturing Integrity of the Work-Piece/Article:

Both the normal incremental progression of cutting tooling wear and the incidental random tool wear as being unique physical data that is encoded onto the work-piece part/article being captured as real time stamp data, by utilizing the Spindle Tooling for Work-piece verification and data collection as the work-piece part/article is being manufactured, with this data being collected, transferred, and exchanged.

Utilization of Existing Industry Standard Encodation Patterns for the Encoded Lands:

The grooved encoded cutting land can use the Code 39 Encodation patterns for the encoded land pattern either by having one character pattern per engraved feature, as shown in FIGS. 87 and 88, or multiple character patterns per engraved feature. With the round grooved encoded details' elimination of the false interpretation of the Code 39 Encodation's "Asterisk" and "P" characters' mirrored symbol images.

Figure 89:
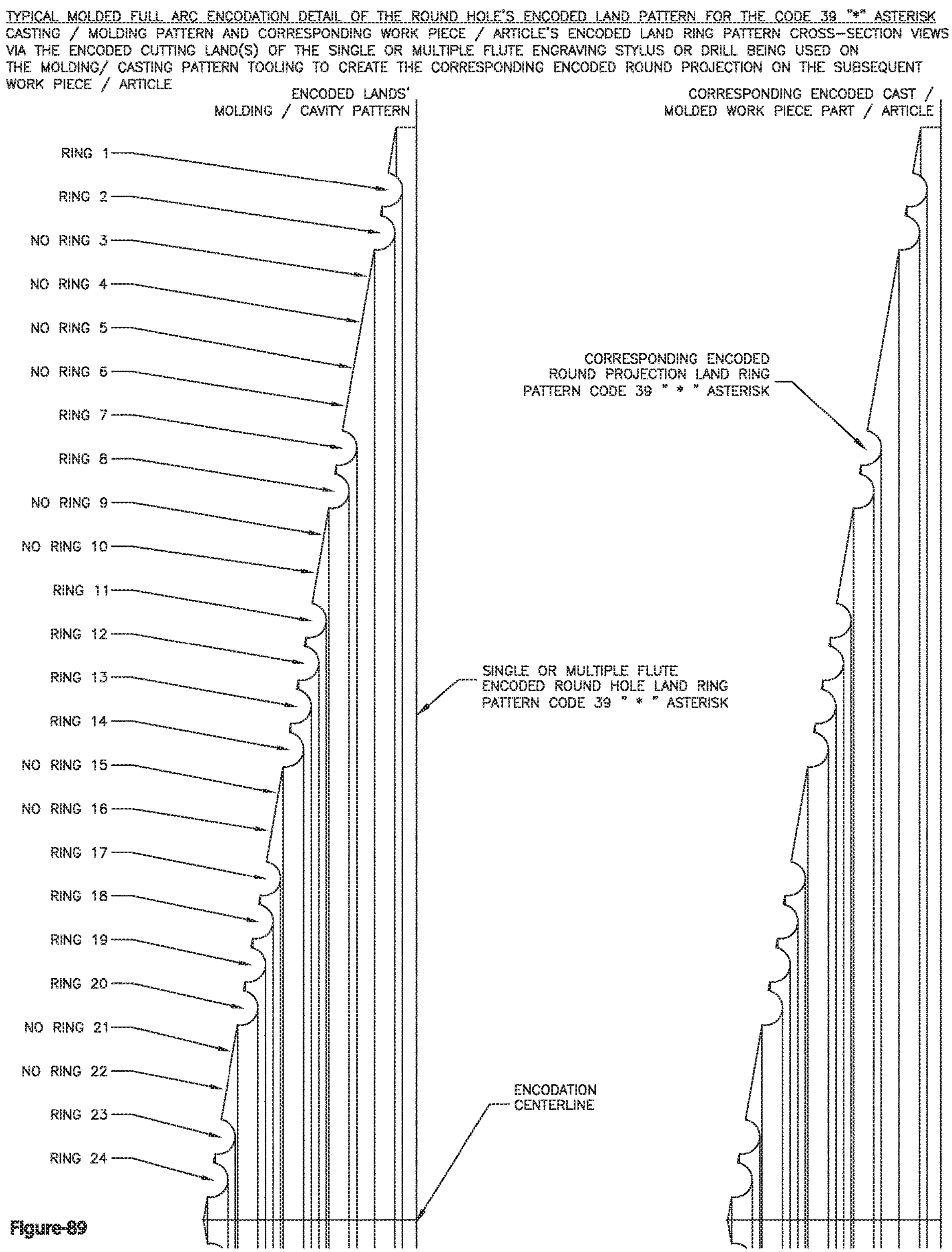
Figure 91A:
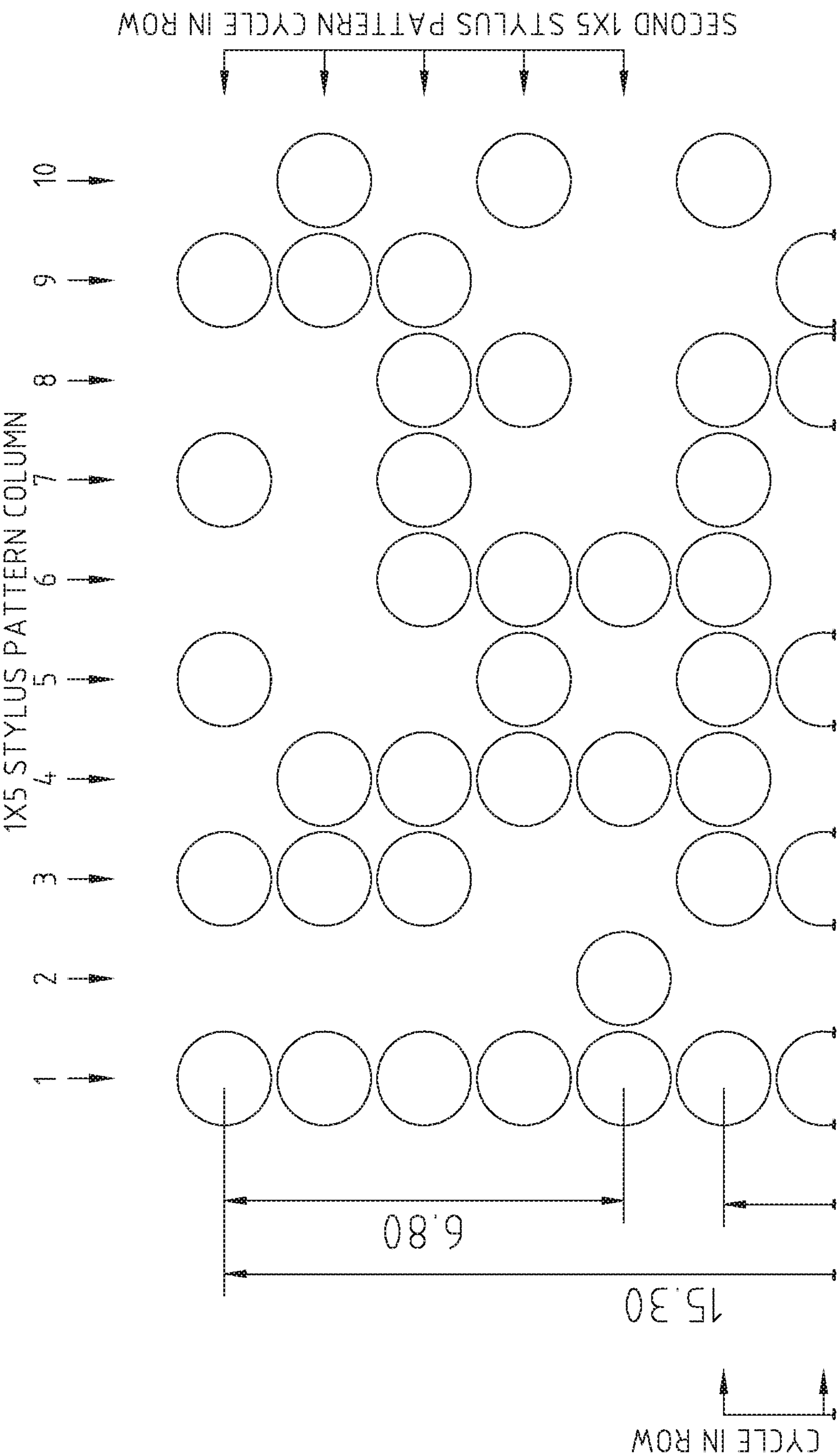
Figure 91B:
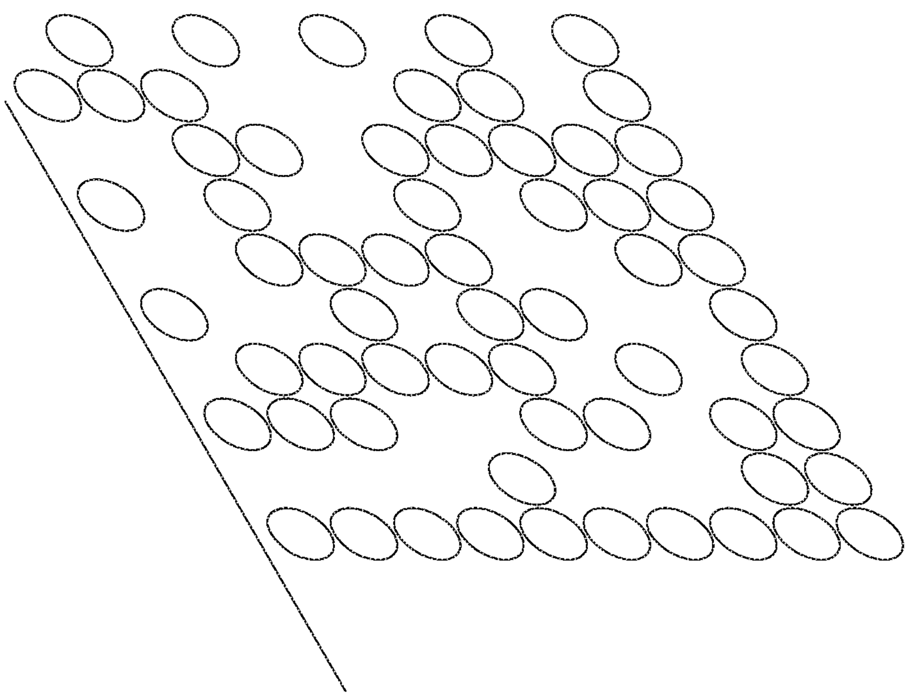
Figure 91C:
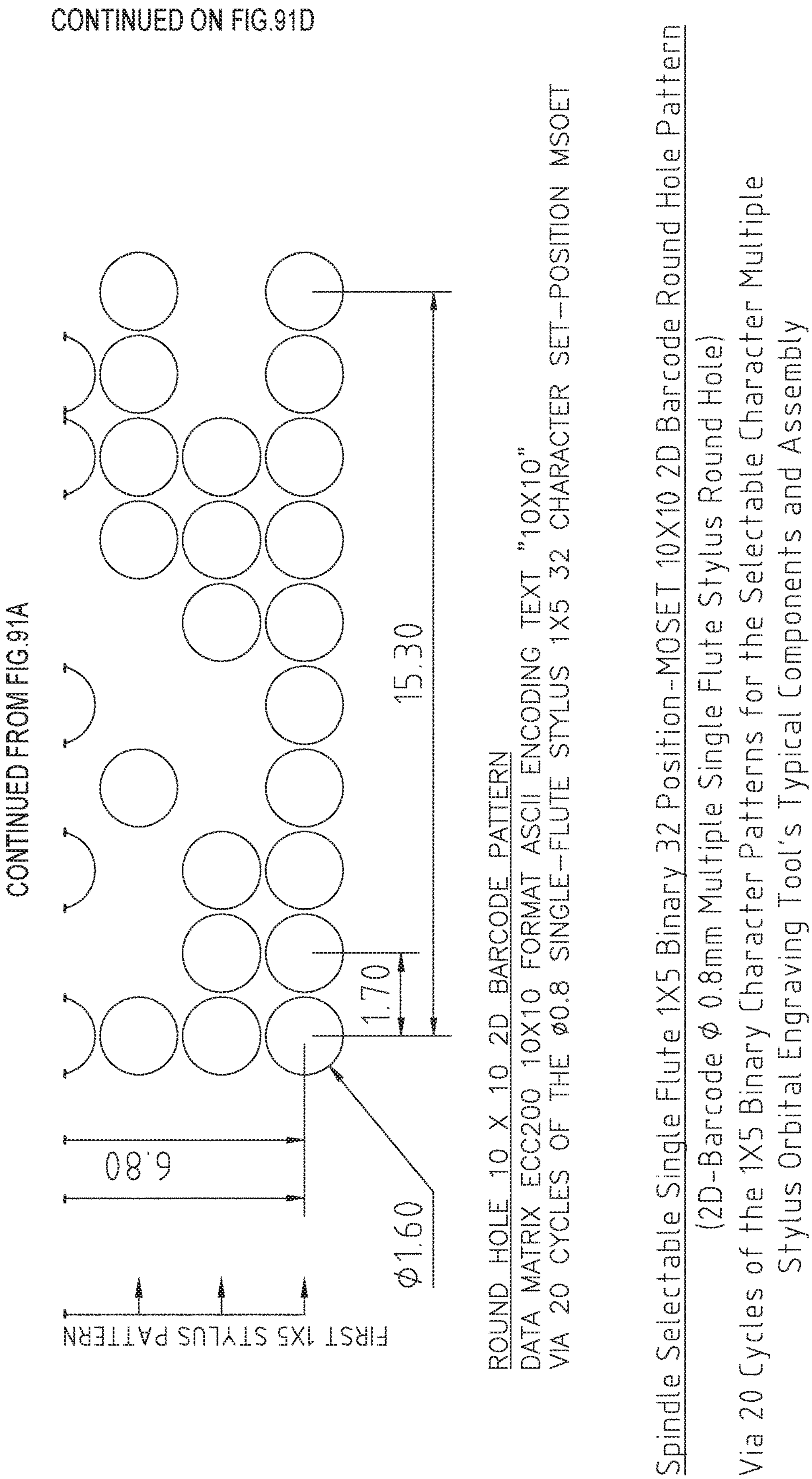
Figure 92B:
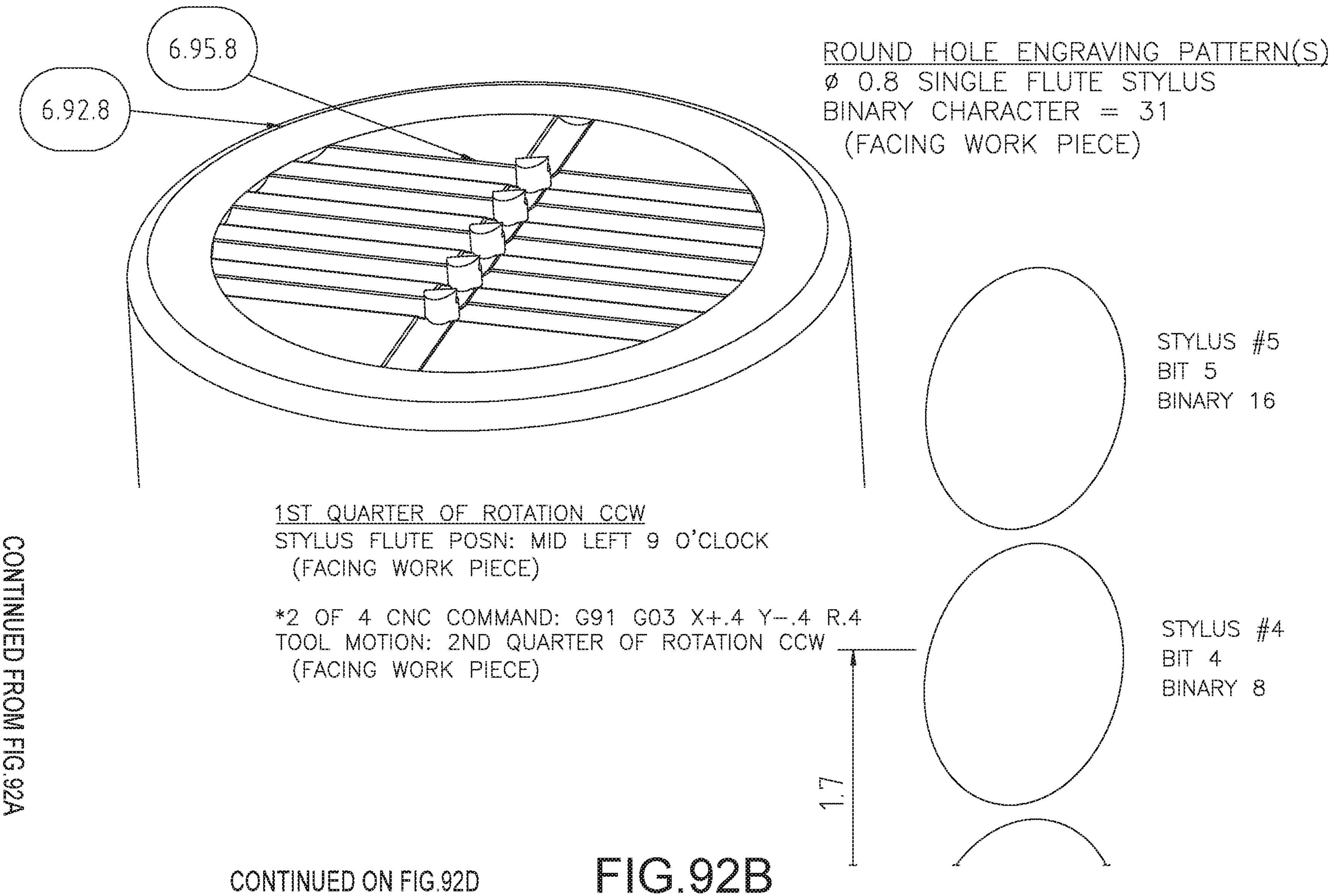
Figure 93A:
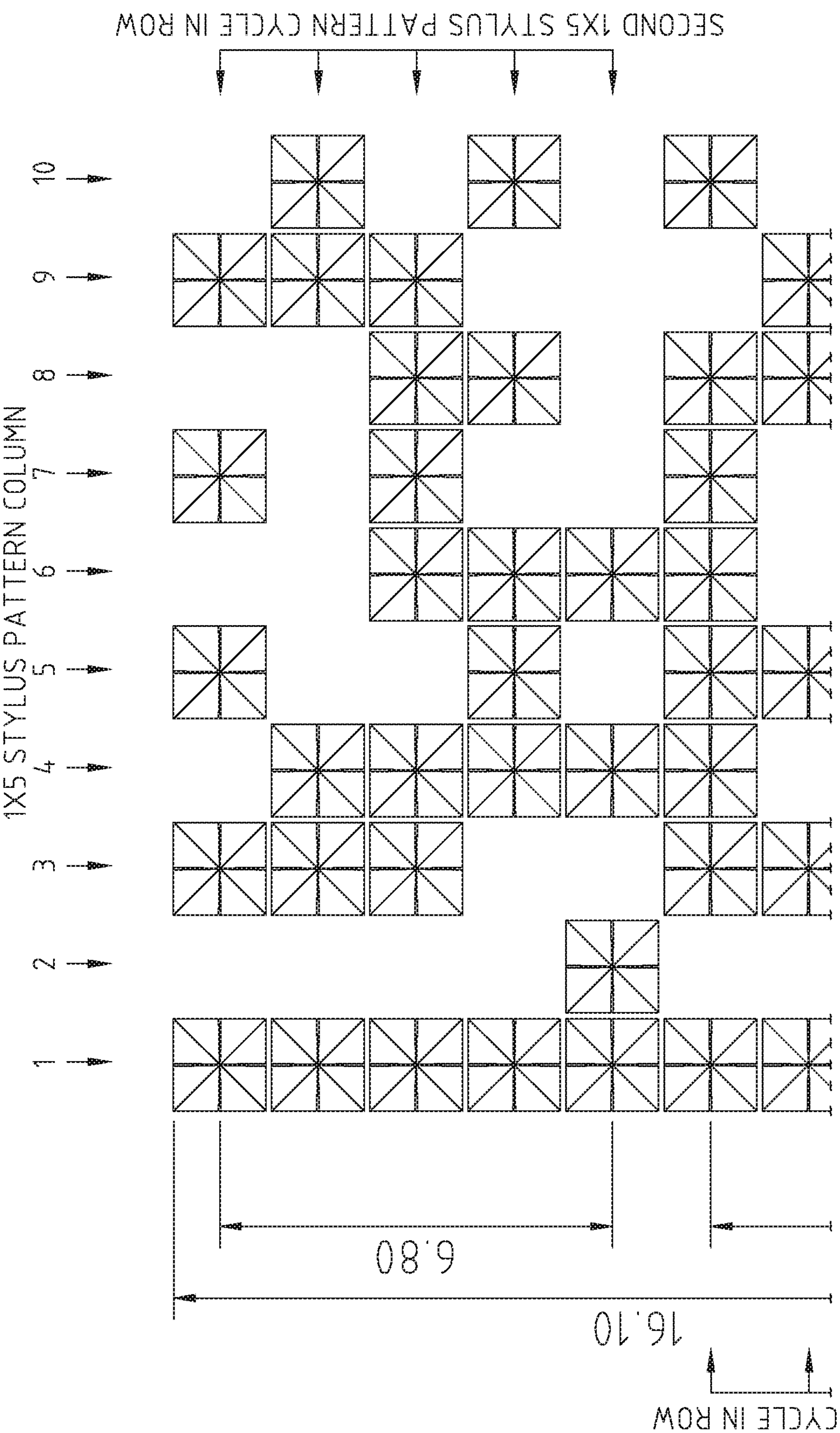
Figure 93B:
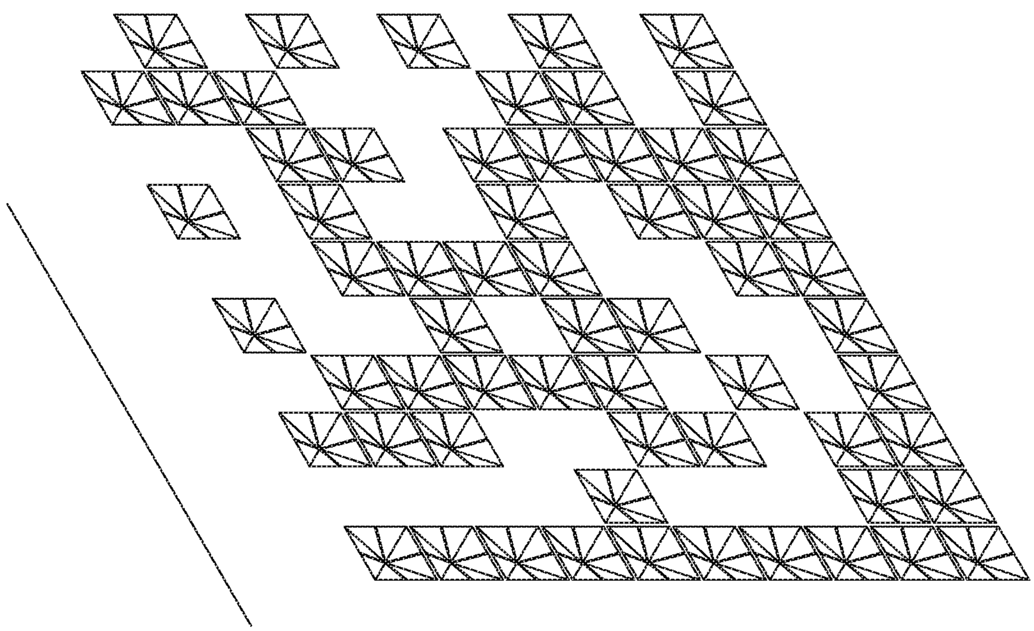
Figure 94A:
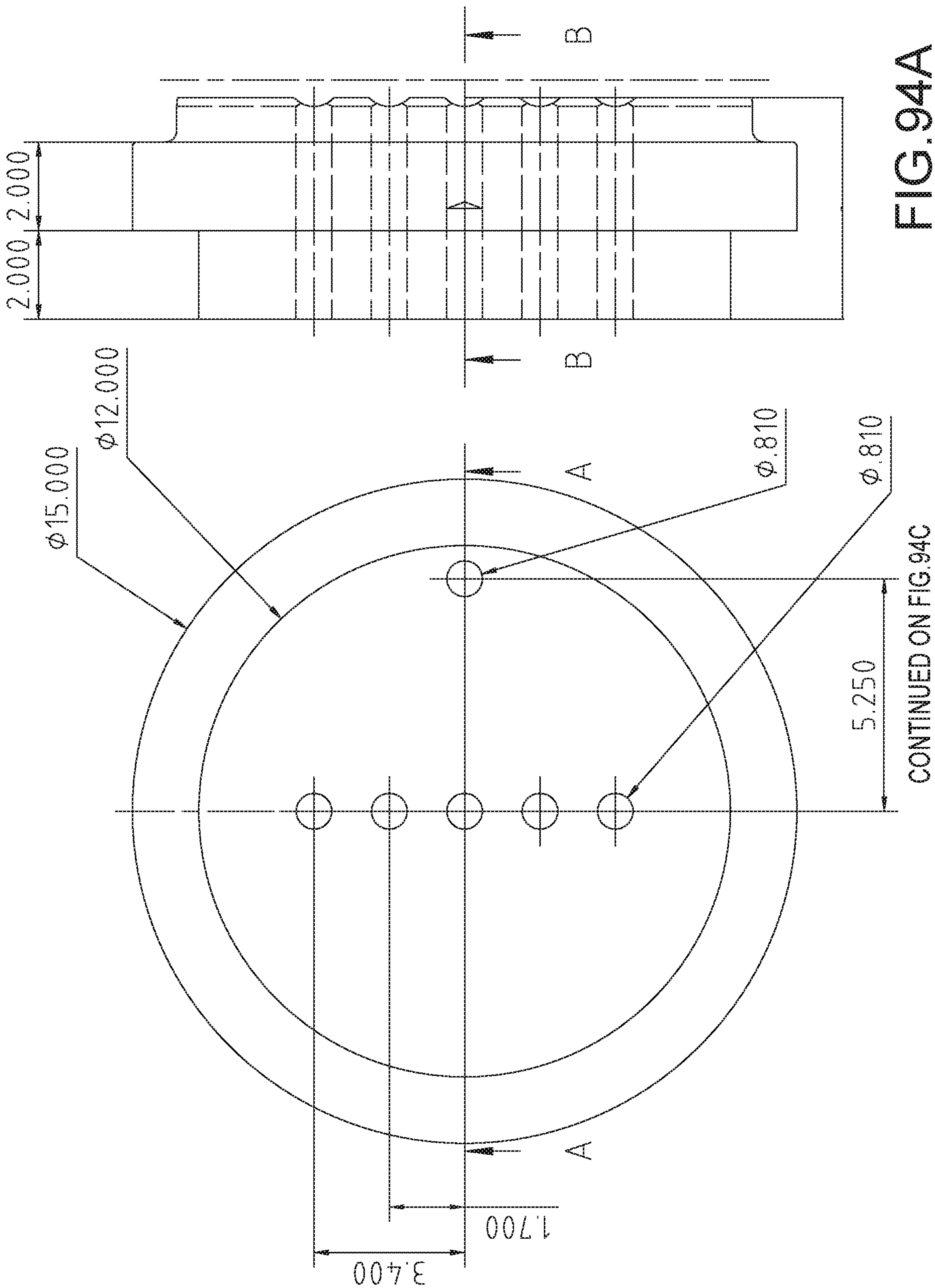
Figure 94B:
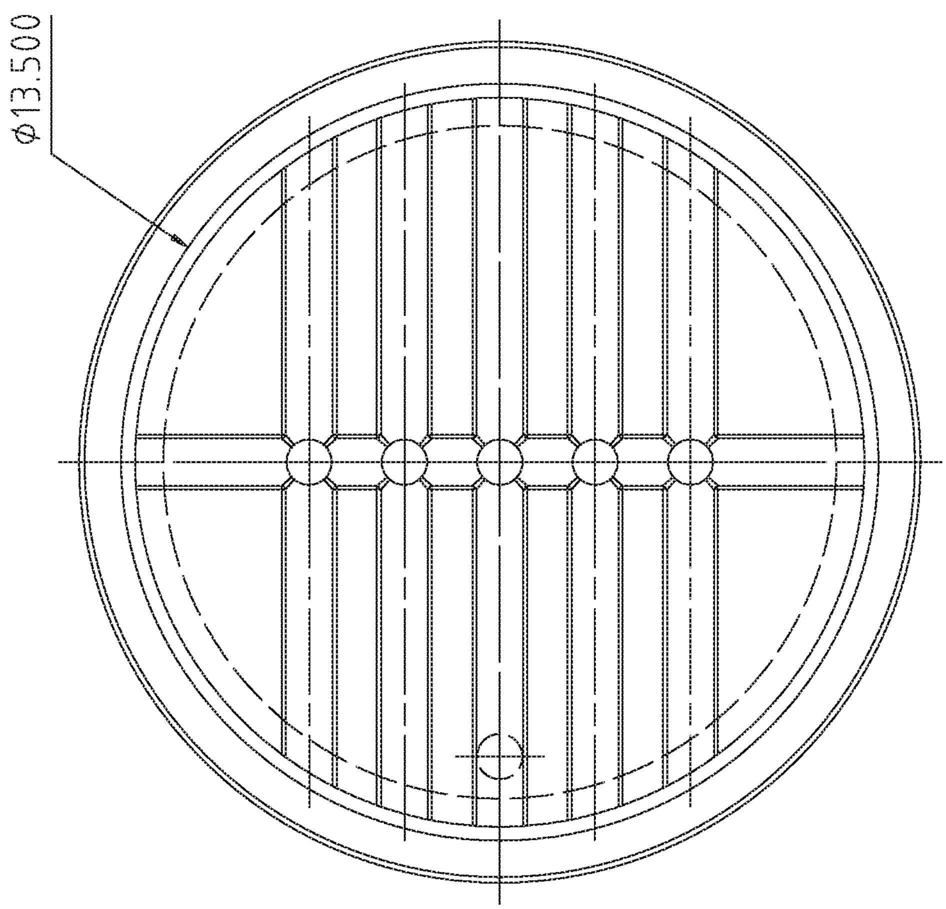
Figure 94C:
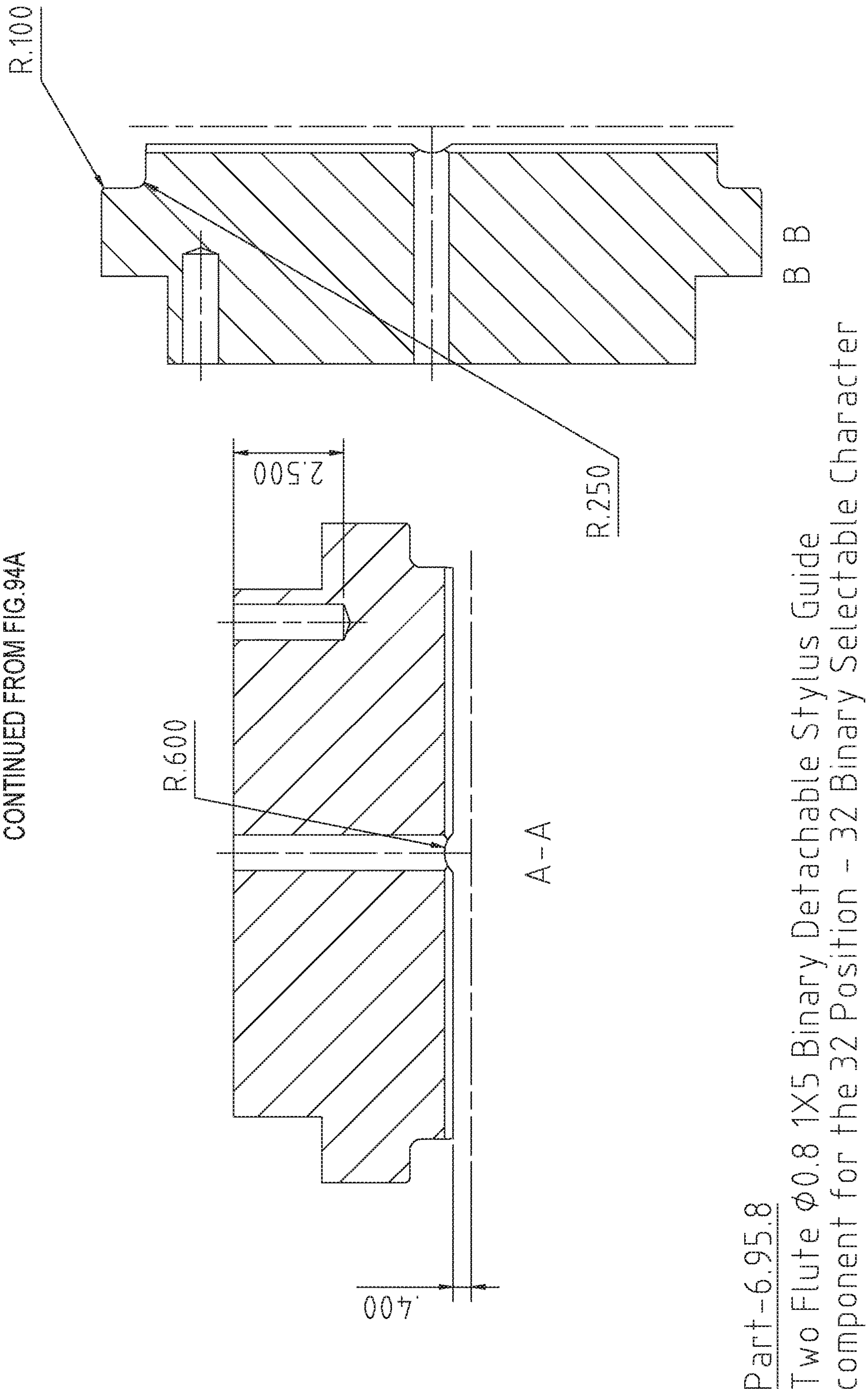
Figure 95A:
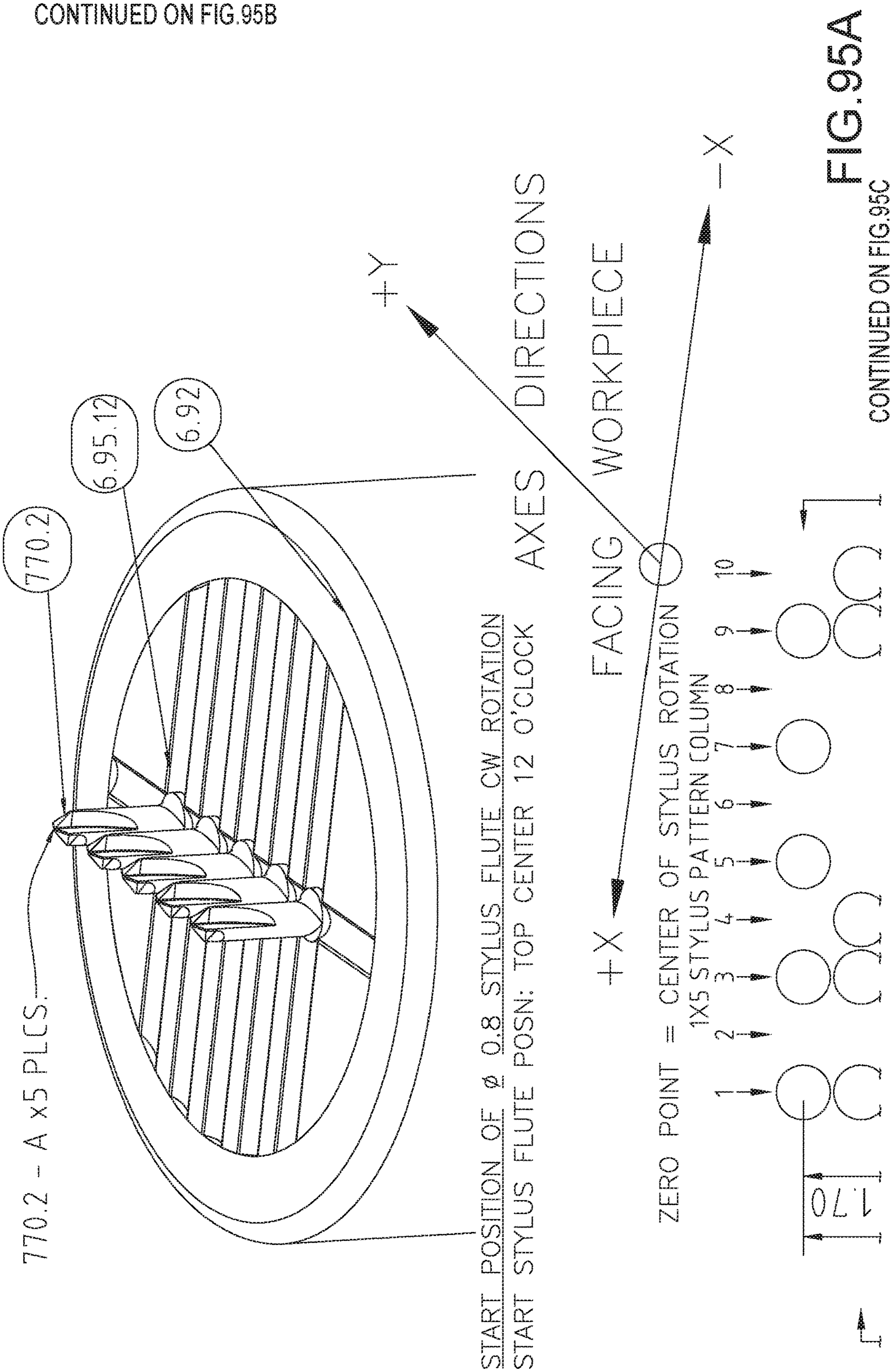
Figure 96:
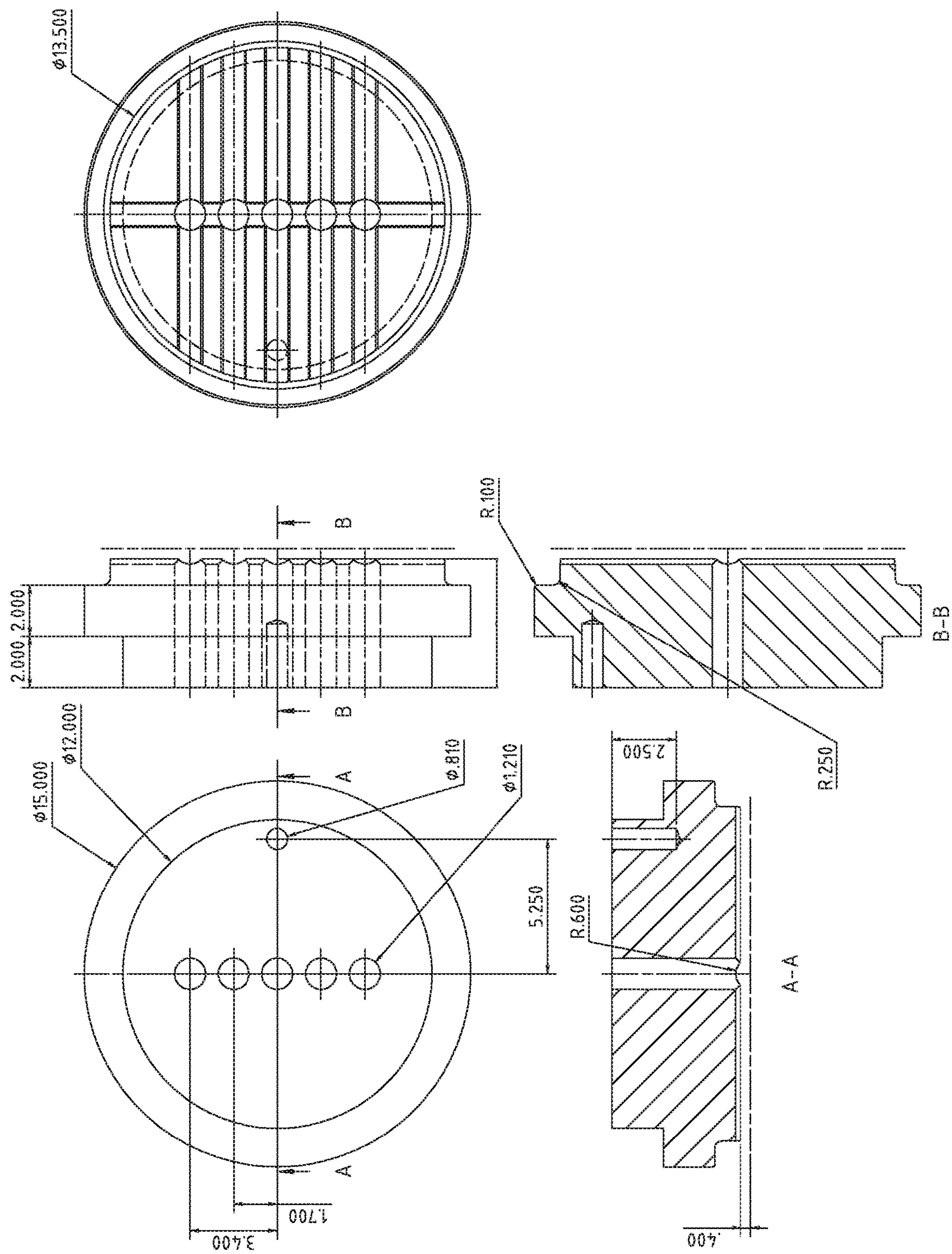
FIG. 96 is detailed drawing for Part-6.95 being a detachable stylus guide for the multiple stylus orbital engraving tool that is as shown as Part-6.95.12 in FIGS. 95A-95D.
Figure 97A:
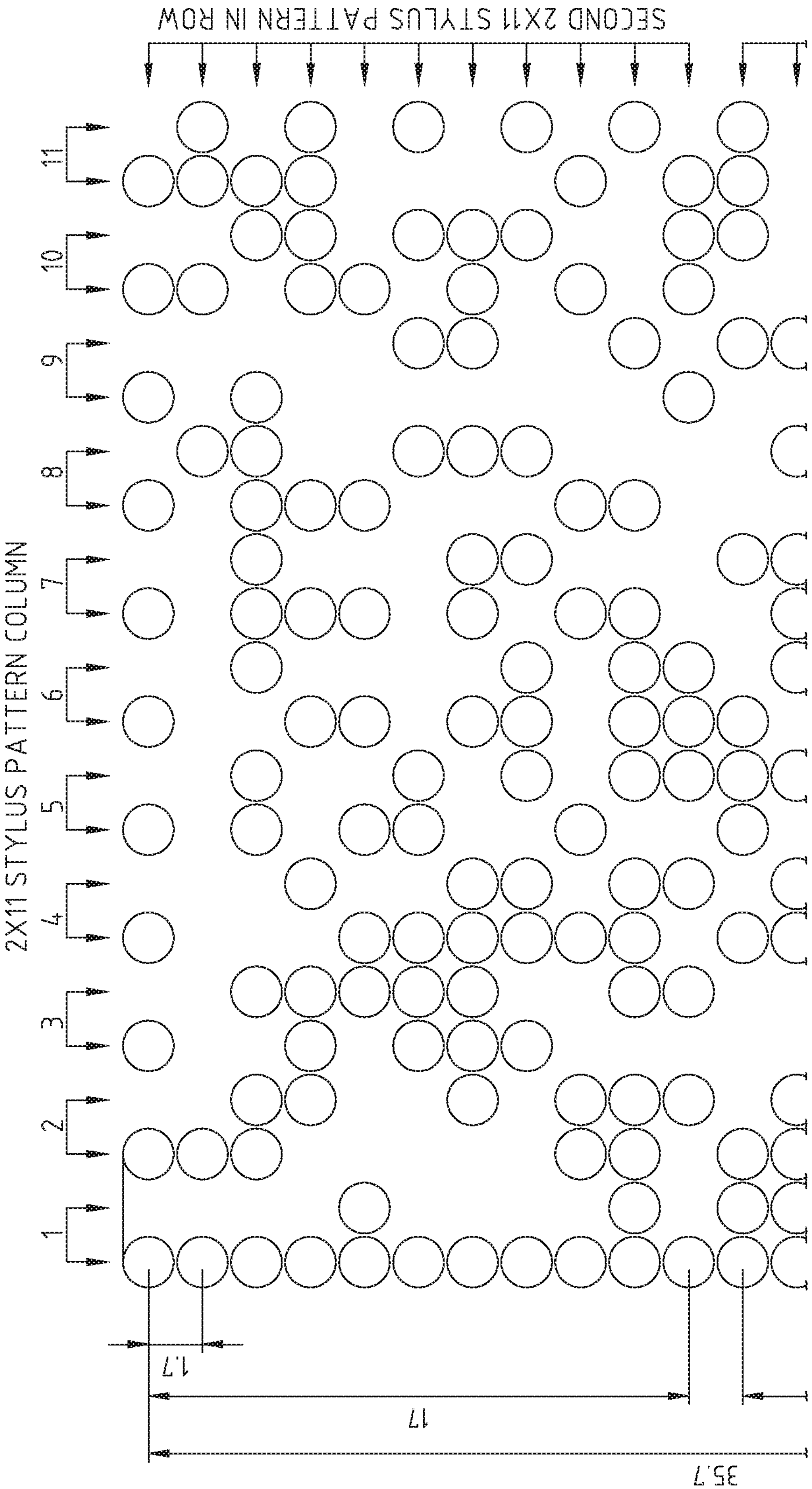
Figure 97B:
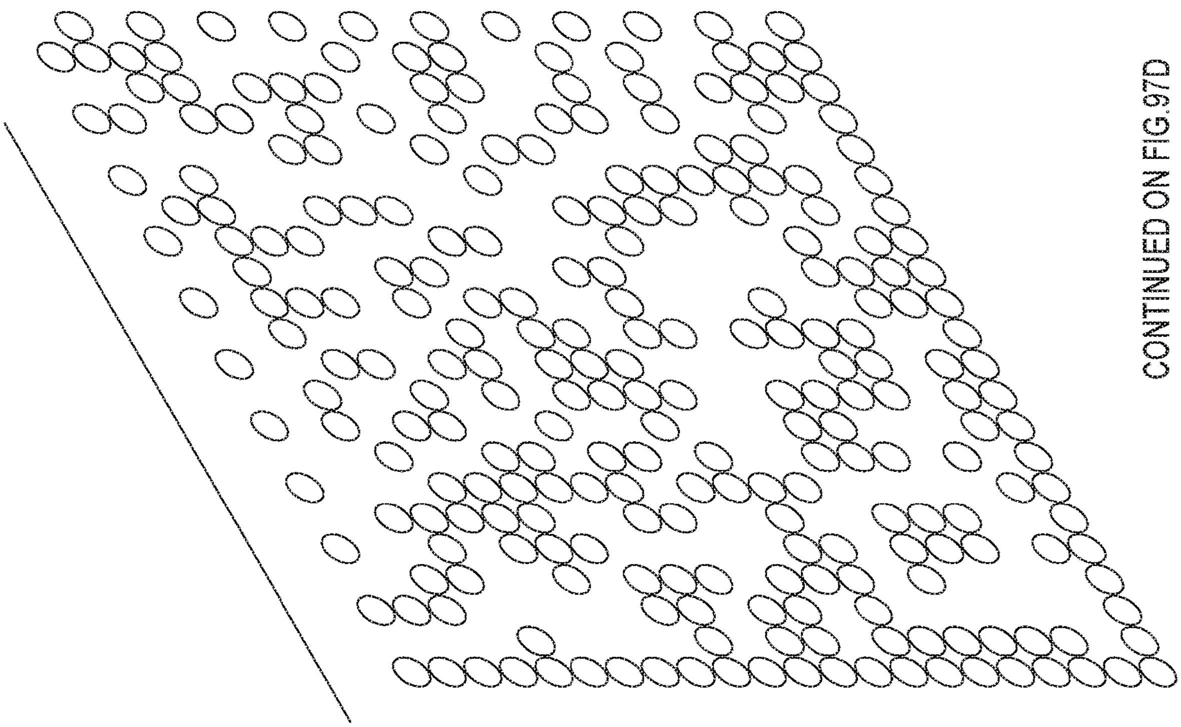
Figure 98A:
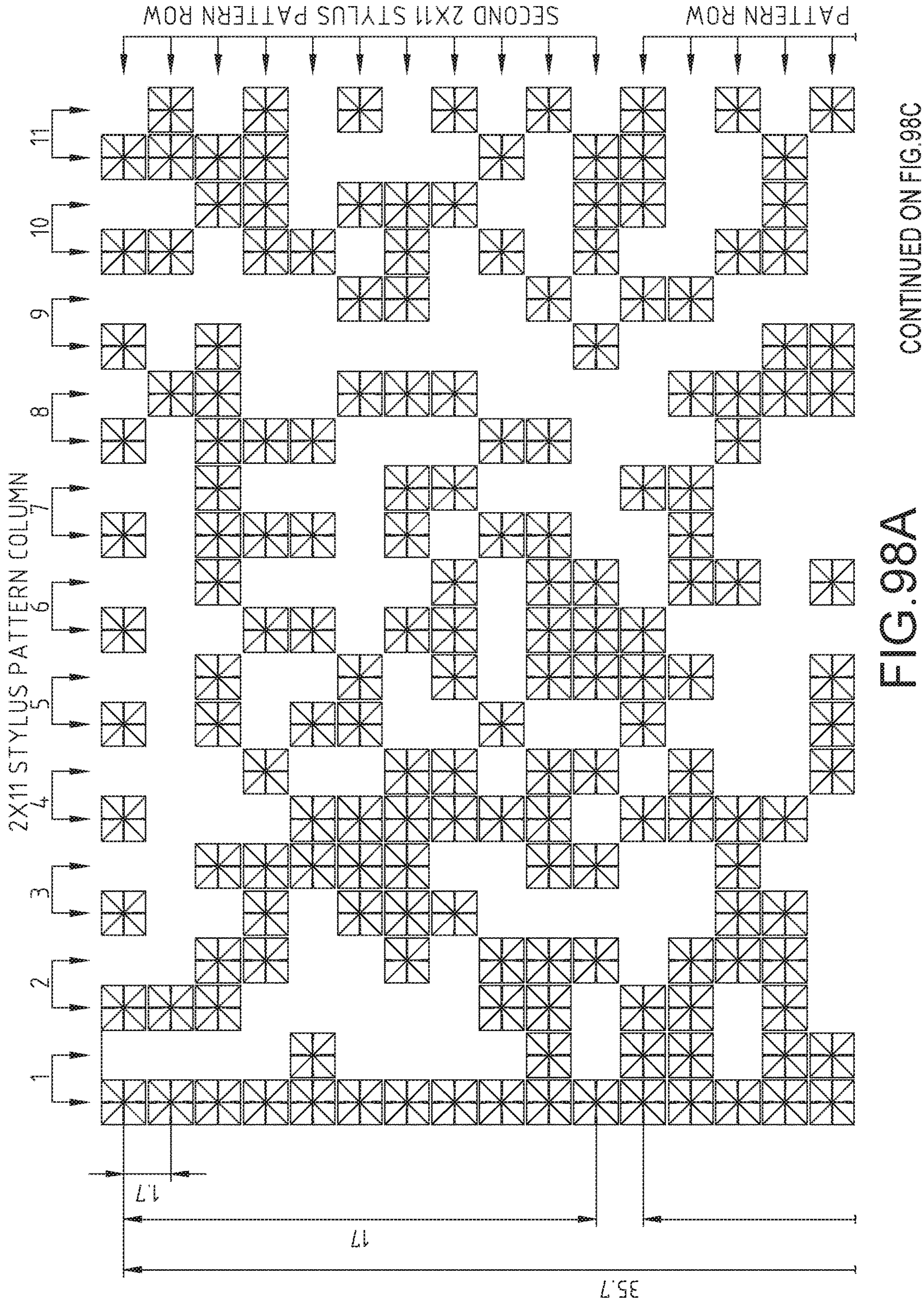
Figure 98B:
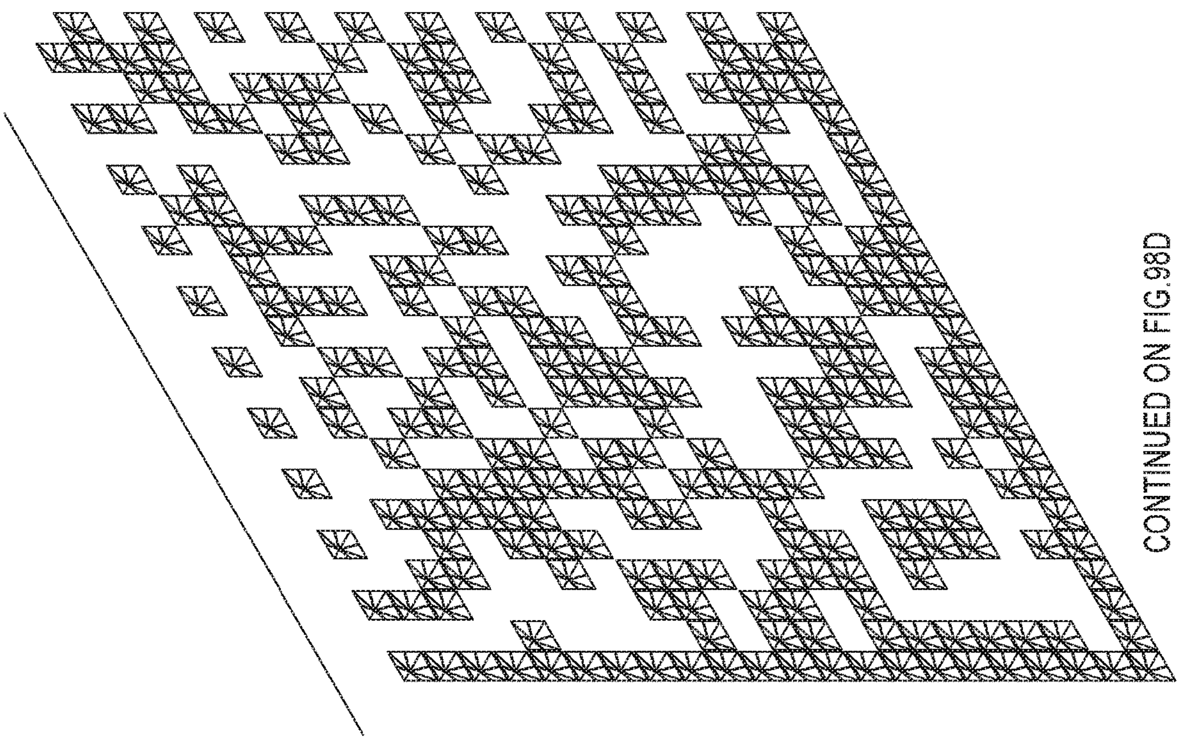
Figure 98C:
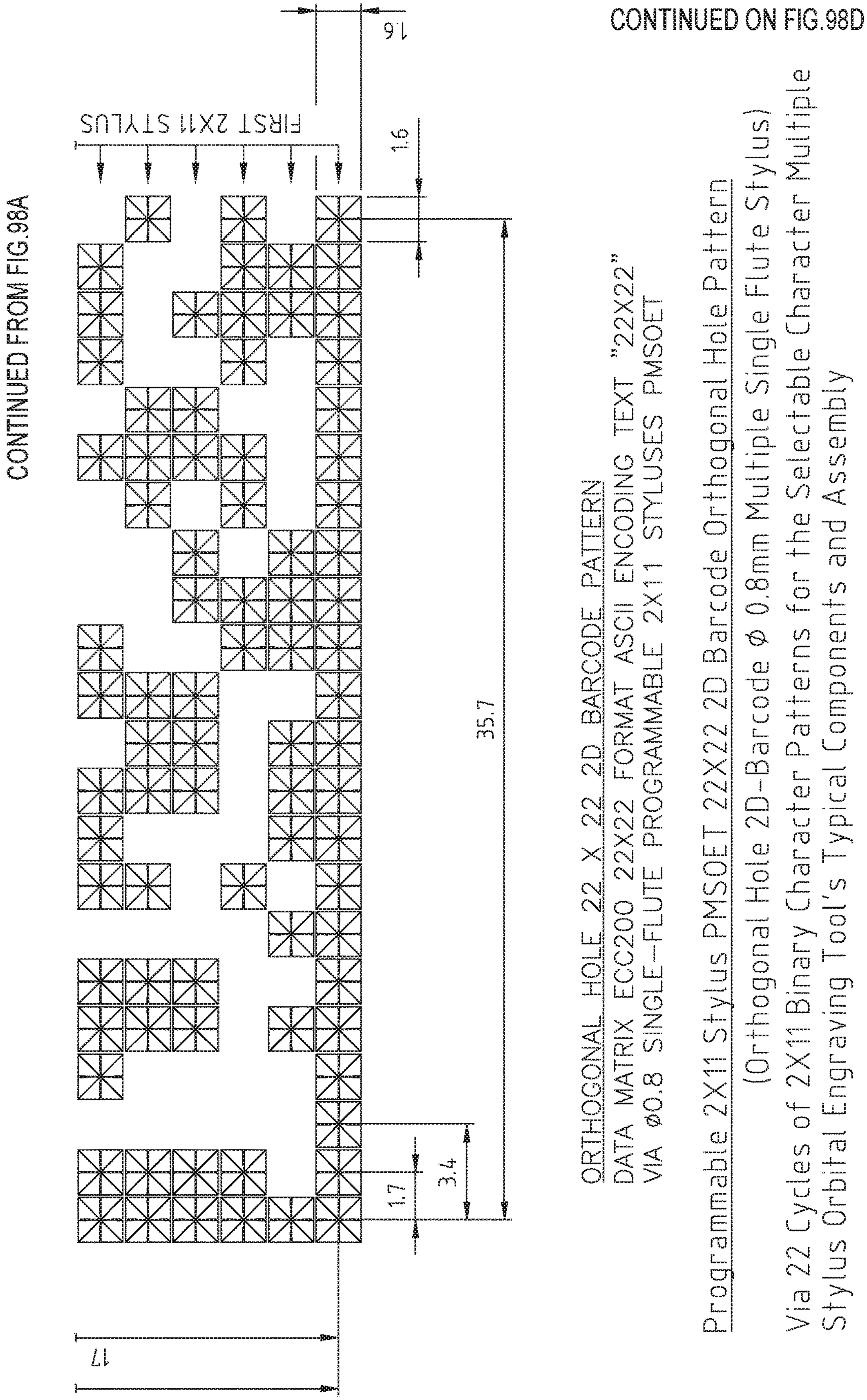
Figure 99A:
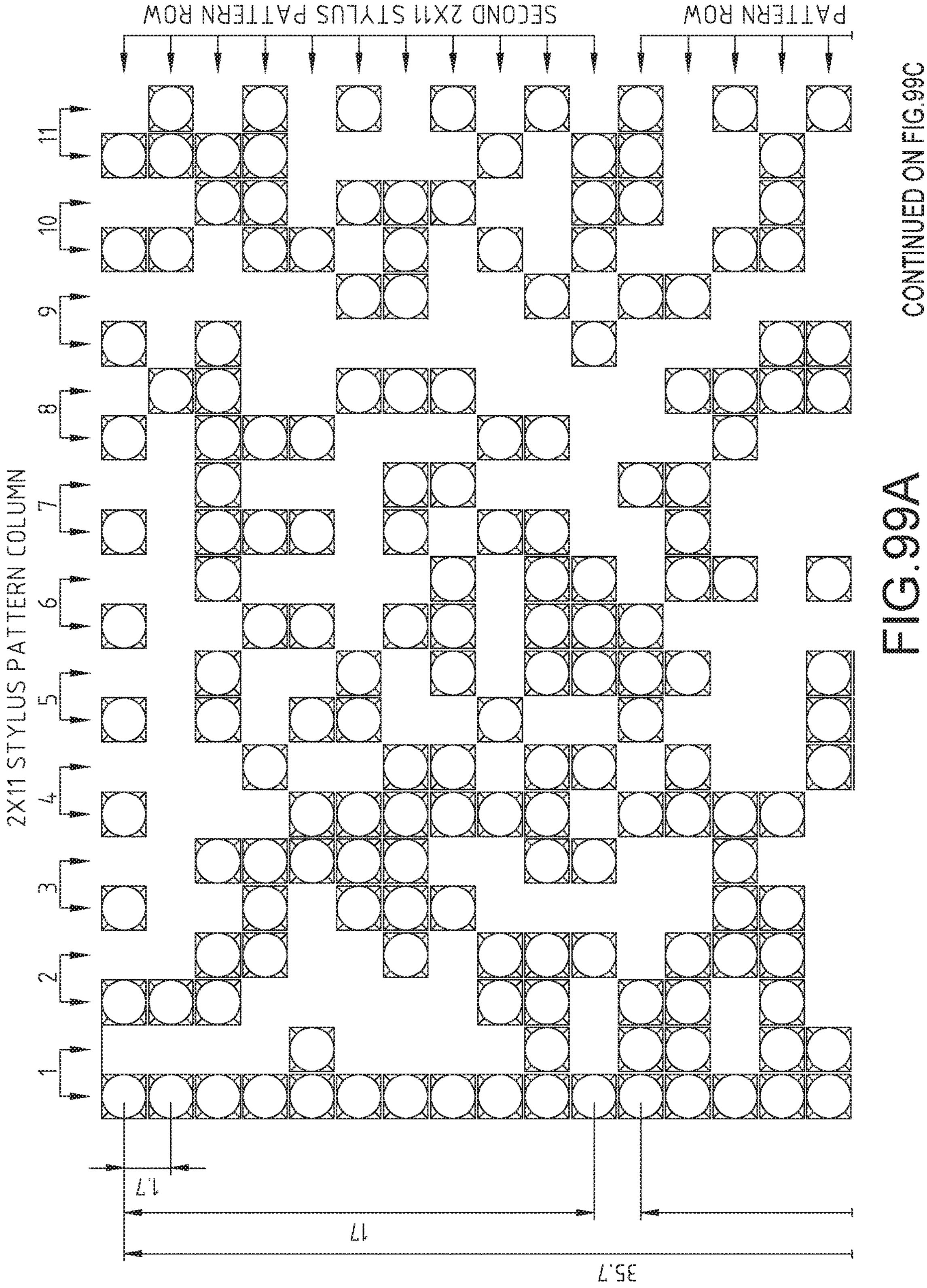
Figure 99B:
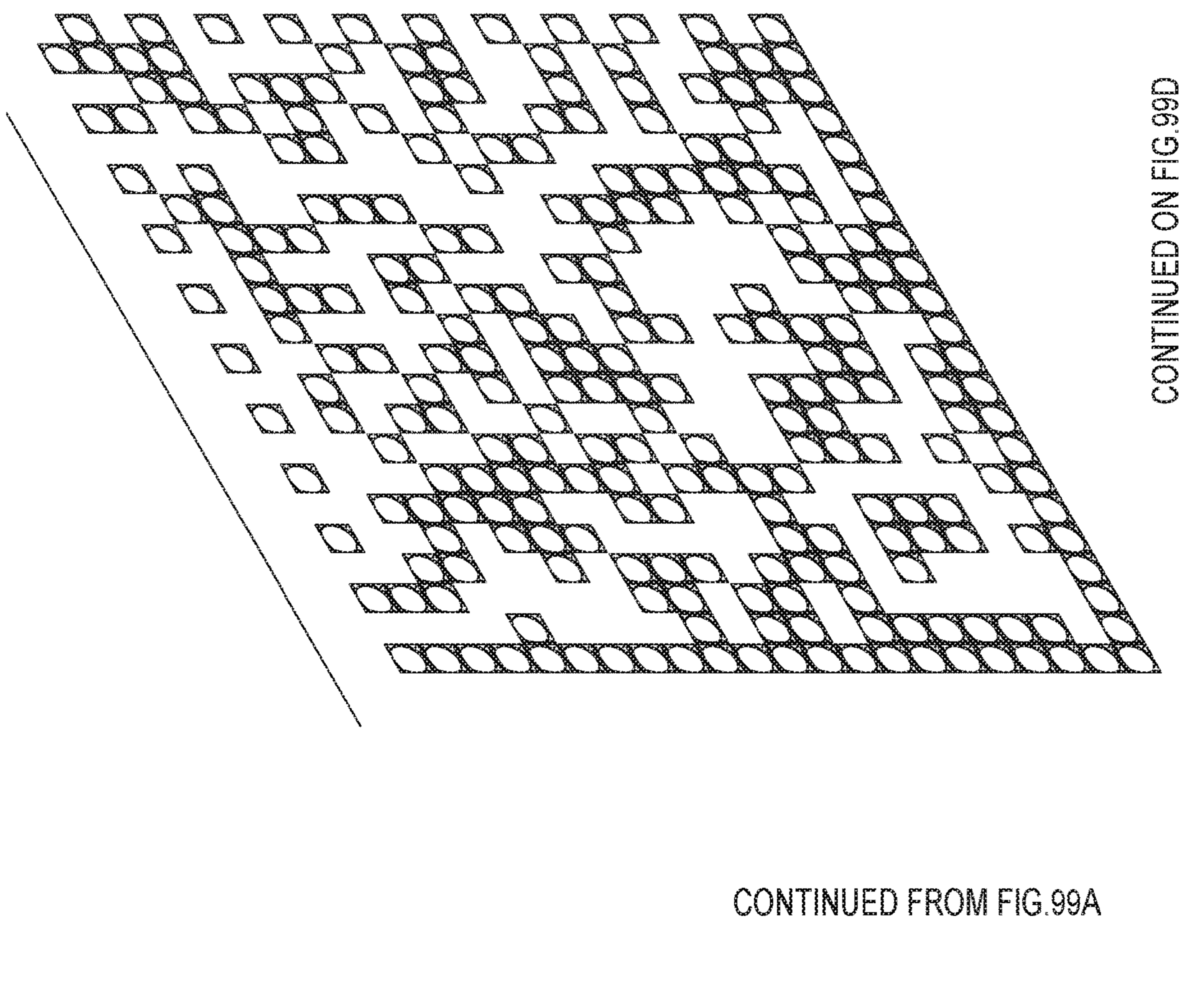

Cast and Molded and Stamped and Embossed Work-Piece Parts/Articles Utilizing the Encoded Lands:

The encoded cutting land of an engraving stylus or drill point can be utilized for the manufacturing of casting and molding and stamping and embossing tooling to create a corresponding encoded ring detail(s) on the work-piece or article, as shown in FIGS. 89 and 90, that is utilizing the "*" character from the 44 characters of the Code 39 Encodation patterns, as shown in FIGS. 19A-19F, with the encoded round ring detail(s) being readily incorporated in the tip detail of an injection molding work-piece parts'/articles' round ejector pin, either being at the pointed angle or being flat.

3-D Printed Work-Piece Parts and Articles Utilizing the Encoded Lands:

The encoded concave and/or convex ringed features of plastic or metallic 3-D printed work-piece parts and articles can be utilized as an authentication detail of a licensed 3-D work-piece part/article, optionally having the unique identification for the printer that "prints" the work piece part or article and/or the device's network address for traceability encoded into the identification data for the work piece part or article.

Data capture and utilization of the styluses' Encodation land patterns and unique cutting lands' wear characteristics can improve the data's security and manufacturing integrity of the work-piece/article.

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments. Accordingly, the embodiments are not limited except as by the appended claims.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. It will be appreciated that the same thing can be said in more than one way. Consequently, alternative language and synonyms may be used for any one or more of the terms discussed herein, and any special significance is not to be placed upon whether or not a term is elaborated or discussed herein. Synonyms for some terms are provided. A recital of one or more synonyms does not exclude the use of other synonyms. The use of examples anywhere in this specification, including examples of any term discussed herein, is illustrative only and is not intended to further limit the scope and meaning of the disclosure or of any exemplified term. Likewise, the disclosure is not limited to various embodiments given in this specification. Unless otherwise defined, all technical and scientific terms used herein have the same meaning as commonly understood by one of ordinary skill in the art to which this disclosure pertains. In the case of conflict, the present document, including definitions, will control.

What is claimed is:

1. An engraving tool for encoding data on a work piece, comprising:

an elongated shaft extending along a shaft axis between a first end portion and a second end portion; and one or more cutting edges disposed on the second end portion, selected ones of the one or more cutting edges including a plurality of notches arranged to form a pattern on a work piece according to a data encoding schema when the one or more cutting edges are moved against the work piece.

2. The engraving tool of claim 1, wherein the one or more cutting edges are arranged at an angle with respect to the shaft axis whereby the cutting edges form a conical feature when rotated against the work piece.

3. The engraving tool of claim 2, wherein the plurality of notches are arranged to form a pattern of ring lands within the conical feature.

4. The engraving tool of claim 2, wherein the plurality of notches are arranged to form a pattern of ring lands according to code 39.

5. The engraving tool of claim 2, wherein the plurality of notches are arranged to form a pattern of ring lands according to a 20-bit data encoding schema.

6. An engraving tool for encoding data on a work piece, comprising:

an elongated shaft extending along a shaft axis between a first end portion and a second end portion; and one or more cutting edges disposed on the second end portion and arranged with respect to the shaft axis, whereby the one or more cutting edges form a concave feature when rotated against the work piece;

selected ones of the one or more cutting edges including a plurality of notches arranged to form a pattern within the concave feature according to a data encoding schema.

7. The engraving tool of claim 6, wherein the plurality of notches are arranged to form a pattern of ring lands within the concave feature.

8. The engraving tool of claim 6, wherein the one or more cutting edges comprises two cutting edges.

9. The engraving tool of claim 6, wherein the one or more cutting edges are arranged at an angle with respect to the shaft axis whereby the cutting edges form a conical feature when rotated against the work piece.

10. An engraving tool for encoding data on a work piece, comprising:

an indexable drill body extending along a drill body axis; and an encoded cutting insert carried by the indexable drill body, the encoded cutting insert including multiple cutting edges, wherein at least one of the multiple cutting edges includes a plurality of notches arranged to form a pattern on a work piece according to a data encoding schema when the at least one of the multiple cutting edges is moved against the work piece.

11. The engraving tool of claim 10, wherein the multiple cutting edges comprises four cutting edges.

12. The engraving tool of claim 10, wherein the at least one of the multiple cutting edges is arranged at an angle with respect to the drill body axis whereby the at least one of the multiple cutting edges form a concave feature when rotated against the work piece.

13. The engraving tool of claim 12, wherein the plurality of notches are arranged to form a pattern of ring lands within the concave feature.

14. The engraving tool of claim 10, wherein the plurality of notches are arranged to form a pattern of ring lands according to code 39.

15. The engraving tool of claim 10, wherein the plurality of notches are arranged to form a pattern of ring lands according to a 20-bit data encoding schema.

* * * * *